United States Patent [19]

Raskin et al.

[11] Patent Number: 4,806,916
[45] Date of Patent: Feb. 21, 1989

[54] COMPUTER DISPLAY WITH TWO PART CURSOR FOR INDICATING LOCI OF OPERATION

[75] Inventors: Jef Raskin, Cupertino; James Winter, Los Angeles; Renwick Curry, Palo Alto, all of Calif.

[73] Assignee: Information Appliance, Inc., Palo Alto, Calif.

[21] Appl. No.: 937,157

[22] Filed: Dec. 2, 1986

Related U.S. Application Data

[63] Continuation-in-part of Ser. No. 902,339, Aug. 29, 1986, abandoned.

[51] Int. Cl.⁴ .......................... G09G 3/02; G06F 3/14
[52] U.S. Cl. .................................... 340/709; 364/521; 364/900
[58] Field of Search ... 364/200 MS File, 900 MS File, 364/146, 171, 188–190, 521; 340/709, 710, 723, 724; 400/83

[56] References Cited

U.S. PATENT DOCUMENTS

| 4,259,725 | 3/1981 | Andrews et al. | 340/724 X |
| 4,354,185 | 10/1982 | Worborschil | 340/709 |
| 4,739,318 | 4/1988 | Cohen | 340/709 |
| 4,742,473 | 5/1988 | Shugar et al. | 340/707 X |

Primary Examiner—Raulfe B. Zache
Assistant Examiner—Florin Munteanu
Attorney, Agent, or Firm—Townsend and Townsend

[57] ABSTRACT

A system for creating and modifying strings of symbols in a computer storage apparatus includes a two-part cursor for guiding the operator. One cursor part indicates the exact location where entered symbols will be inserted. A second cursor part highlights a selected substring which is the object of certain commands, such as the delete command. Internally, the system provides memory management techniques for inserting and deleting symbols in response to operator commands. The display, including the two-part cursor, is derived from the memory contents with the aid of pointers, tables, and state variables.

9 Claims, 8 Drawing Sheets

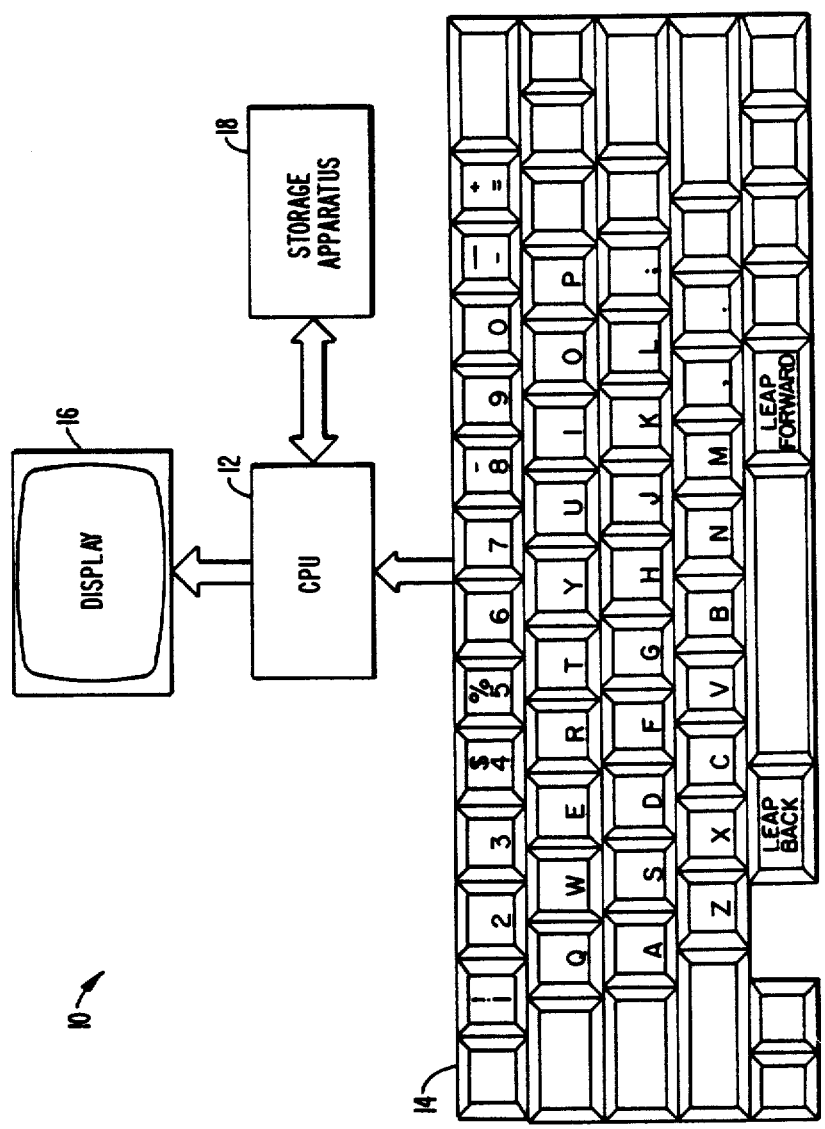
FIG._1.

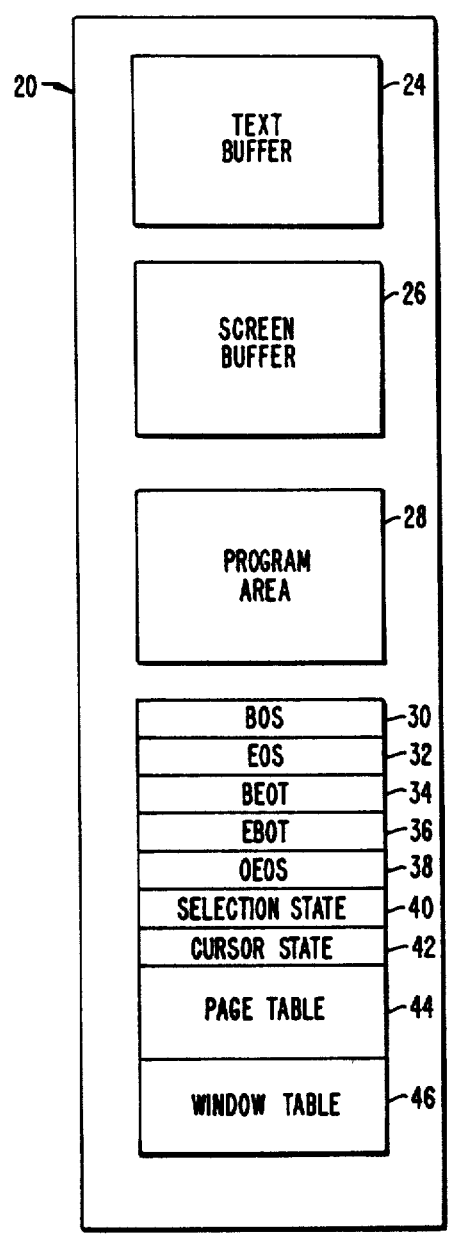
FIG._2.

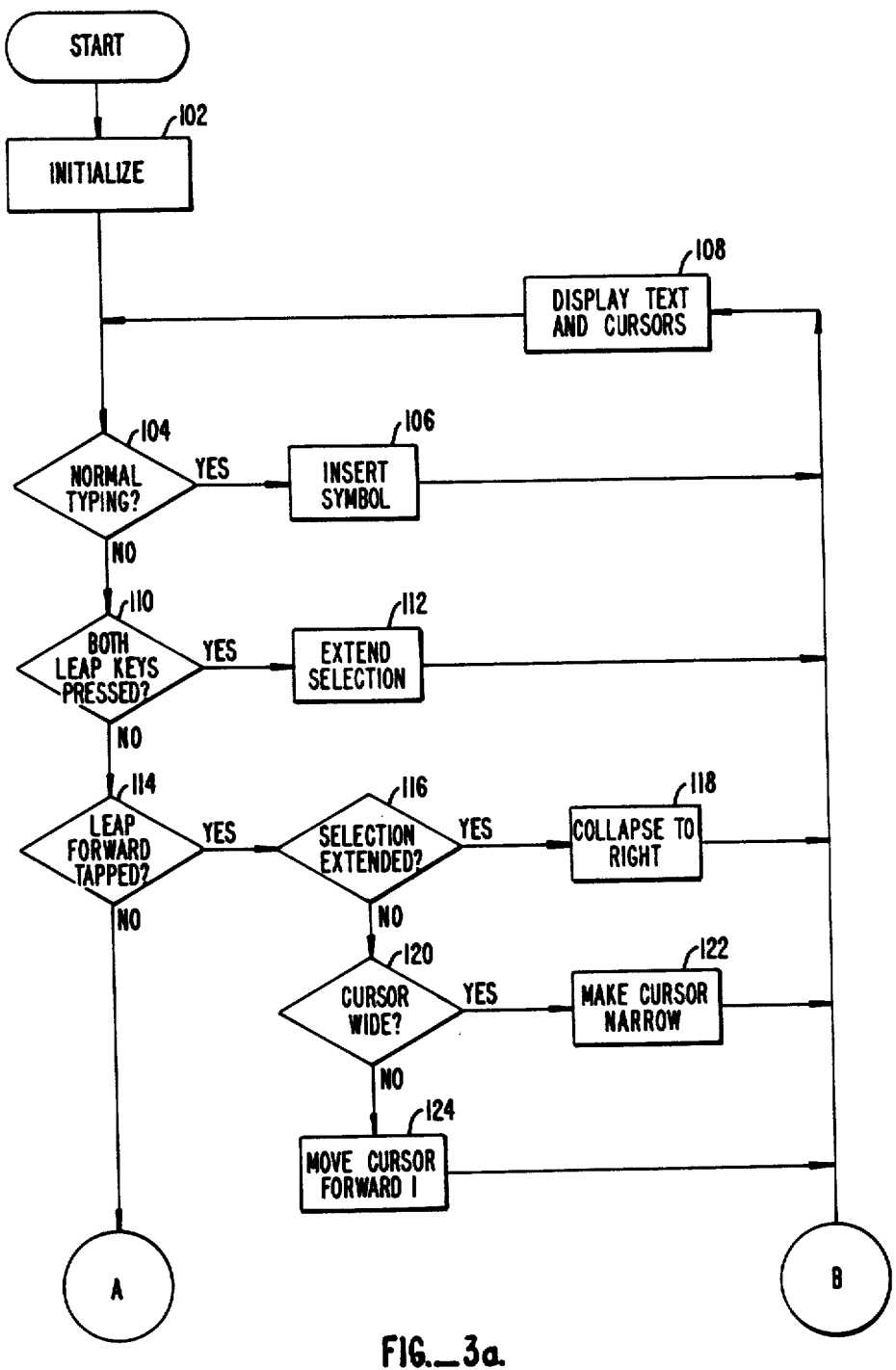
FIG._3a.
FIG._3. | FIG. 3a. | FIG. 3b. |

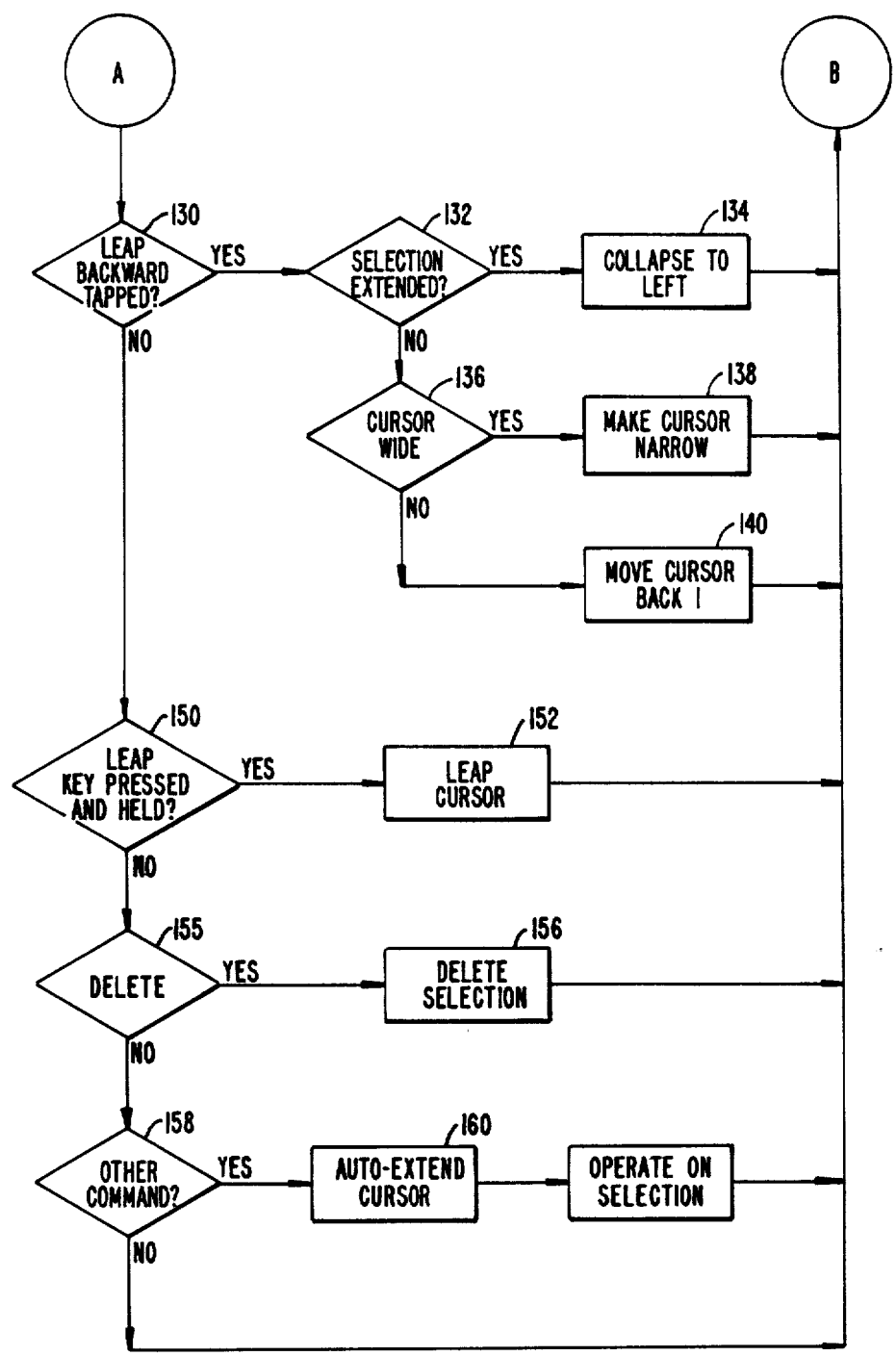
FIG._3b.

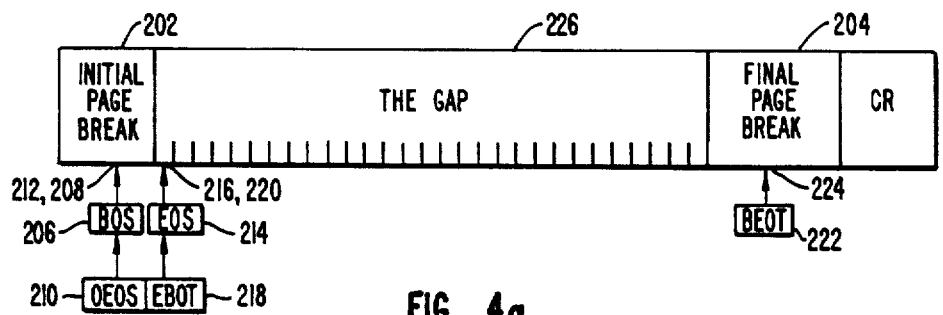
FIG._4a.
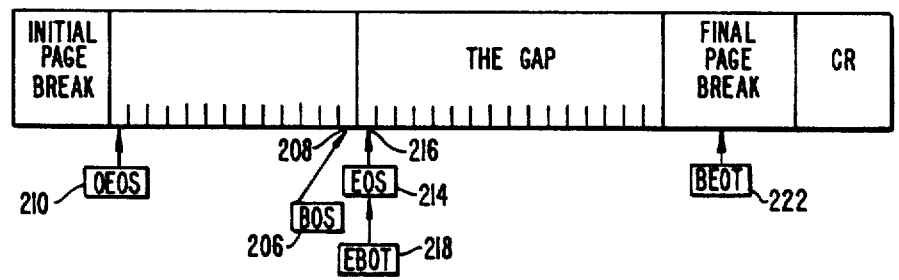
FIG._4b.
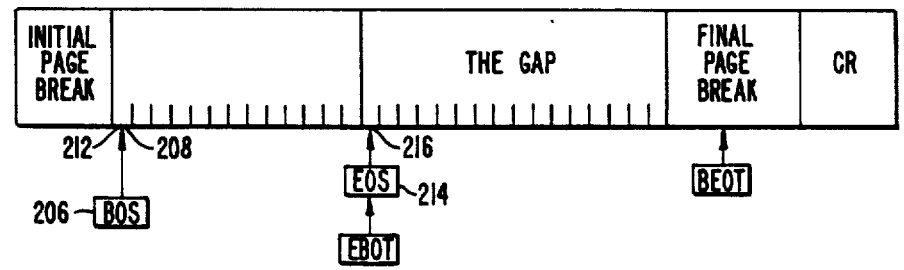
FIG._4c.
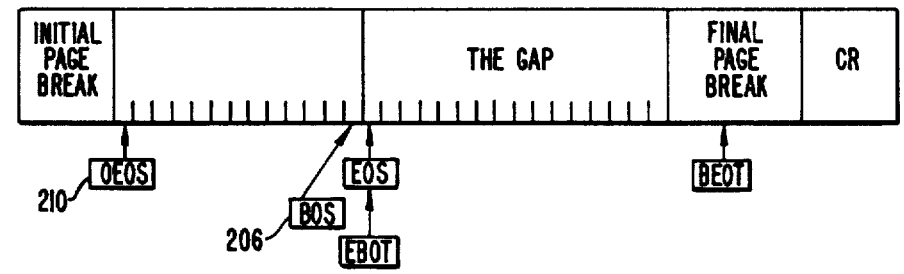
FIG._4d.

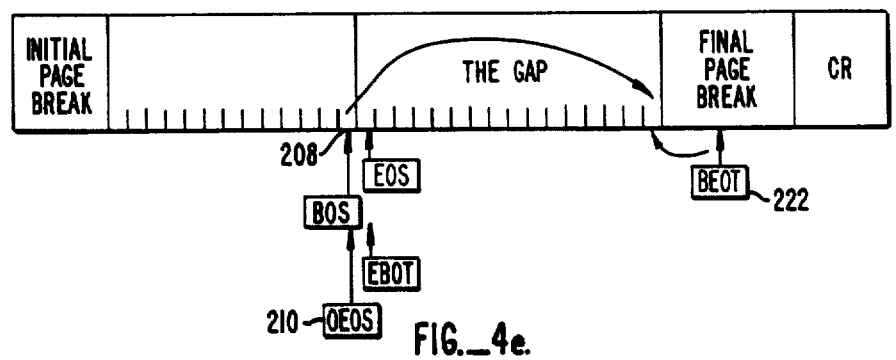
FIG._4e.
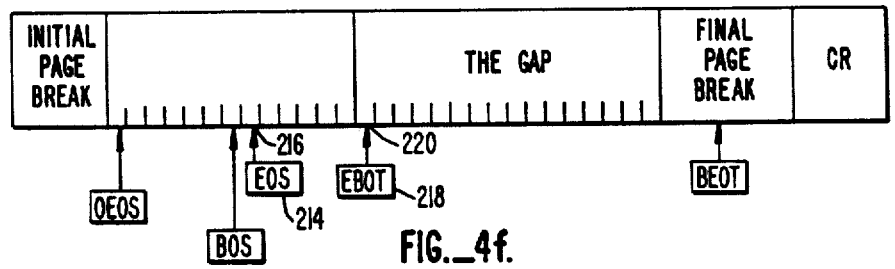
FIG._4f.
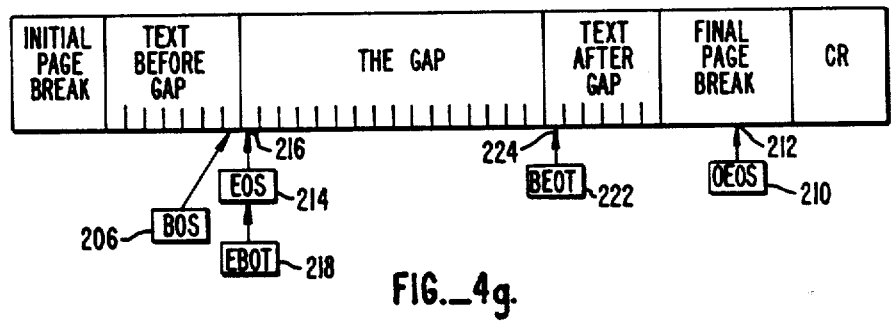
FIG._4g.
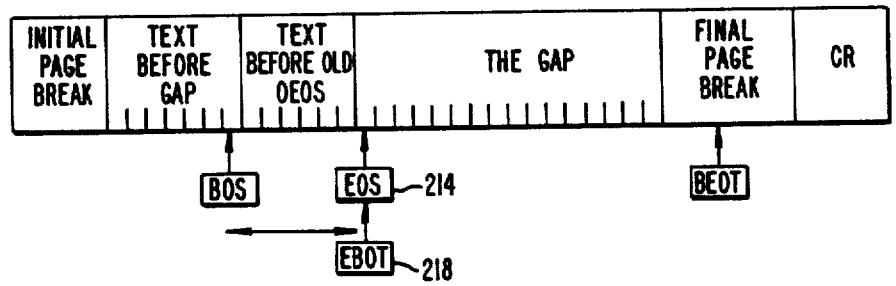
FIG._4h.

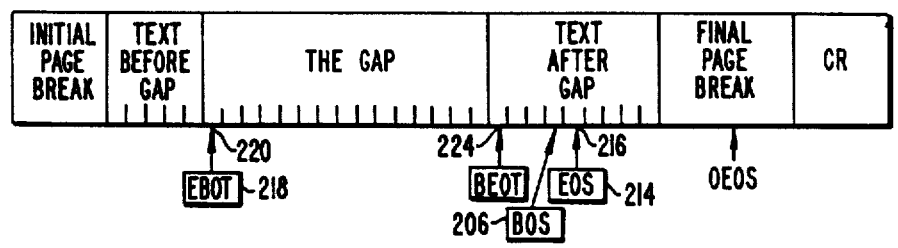
FIG._4i.
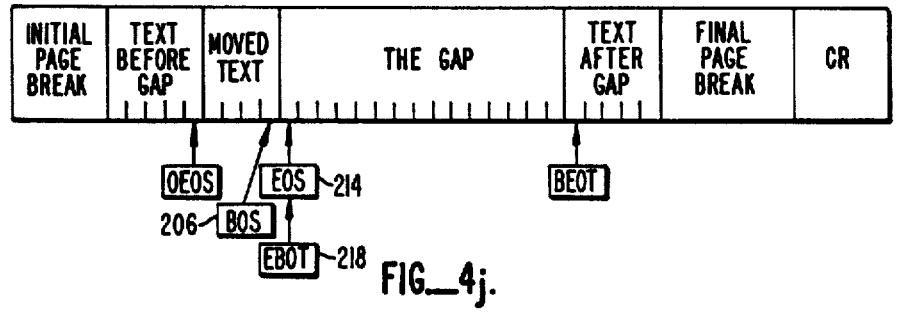
FIG._4j.
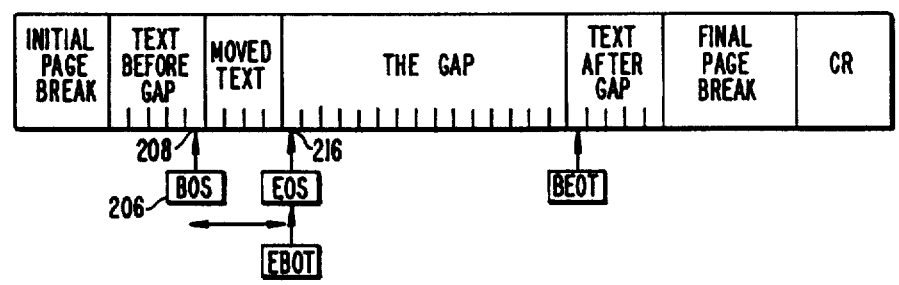
FIG._4k.
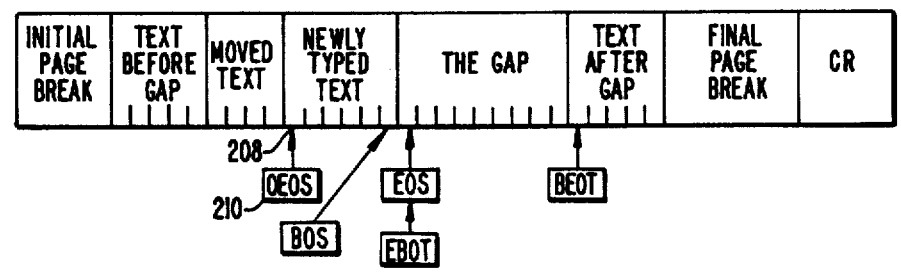
FIG._4l.

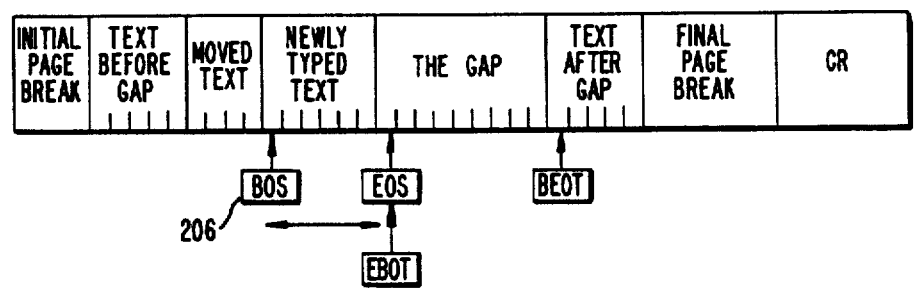
FIG._4m.

COMPUTER DISPLAY WITH AUTO-PART CURSOR FOR INDICATING LOCI OF OPERATION

CROSS-REFERENCE TO RELATED APPLICATION

This is a continuation-in-part of U.S. patent application No. 902,339, filed Aug. 29, 1986, now abandoned.

NOTICE REGARDING COPYRIGHTED MATERIAL

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates generally to a method and apparatus for creating and modifying a string of symbols in computer storage apparatus and, in particular, it relates to a method and apparatus which utilizes a two-part cursor for constantly indicating the effect of certain operations on a string of symbols stored in a computer.

In certain computer applications, such as word processing, an operator enters selected symbols, such as, for example, alphanumeric characters, via a keyboard (or other entry means). The entered symbols are stored in the storage apparatus of the computer system where they become part of a string of symbols. The stored string of symbols defines a document which, through the inclusion of special page break and carriage return symbols, may be subdivided into pages and lines of text. All or part of the stored string of symbols is displayed on a display device as additional symbols are entered and stored. To aid the operator, a cursor is usually displayed to indicate the position in the string where the next entered symbol will be inserted.

In prior art systems the cursor sits on a particular character (typically as: (i) a flashing block surrounding or, (ii) an underline beneath or, (iii) a vertical bar to the right or left of the character being pointed to.). The function of the cursor is to indicate a locus or site where a user action, such as inserting or deleting characters, will take place. However, in certain computer applications, such as word processing, there are usually two such loci, namely (i) that character that will be replaced or displaced when a new character is typed and (ii) that character that will be erased when the backspace or delete key is typed. They are not, in general, the same character. This is based on mimicking the operation of a typewriter.

In prior art systems the user has had to remember a rule such as: the insertion will be to the right of the cursor and deleting will be to the left. Neophytes find having to learn such a rule confusing. Even experienced user have trouble remembering to whence the cursor should be moved in order to insert or delete a character into the midst of text. For example, to remove the letter "x" from "anxd" in most examples of prior art systems, the user has to remember to move the cursor not to the "x", but to the "d;" but on some systems the user would have to remember to move the cursor to the "n". On a very few systems the user would be able to do the obvious and move the cursor to the "x" but on those systems the user has to aim "one off" for insertion rather than deletion so there is no overall benefit.

SUMMARY OF THE INVENTION

The method and apparatus of this invention provide a two-part cursor display which aids an operator in the creation and modification of a string of symbols. The two-part cursor serves to make explicit the exact loci of action of insert and delete operations. A first cursor part (herein called the "blinker," which is differentiated from the highlight by flashing or through some other visual distinction) marks that position in the string where a newly typed or inserted symbol (or symbols in the case of the insertion of a number of symbols simultaneously) will appear. A second cursor part (herein called the "highlight") marks a symbol (or symbols) that will be the object of certain operations, and particularly of the delete operation.

This relieves the operator from having to remember the confusing rules normally associated with the loci of action for cursor operation.

In a preferred embodiment, when the two-part cursor is moved to a particular character, either by a command, or via some device such as a joystick or mouse, or by some other method, the two parts both visually and functionally can "coalesce" onto a single character which then can either be deleted or can indicate the site where further characters will be inserted. Thus, to use our former example, to delete the "x" from "anxd" with the two-part cursor the user has to move the cursor to the obvious position, namely the "x". But because both parts of the two-part cursor coalesced when the cursor was moved, the user can also insert a character at that location. That is, on neither insertion nor deletion does the user have to move the cursor to a character that is "one off" from the desired location. The operator is able to concentrate on entering and deleting the desired symbols to create a stored string of symbols.

BRIEF DESCRIPTION OF THE FIGURES

FIG. 1 is a block diagram of an embodiment of a computing system for practicing the invention.

FIG. 2 is a block diagram illustrating the contents of the storage apparatus of the embodiment of FIG. 1.

FIG. 3 is composite of FIGS. 3a and 3b which show a flow chart of the method of the preferred embodiment.

FIGS. 4(a)–4(m) illustrate the contents of the text buffer of FIG. 2 during the operations shown in FIG. 3.

DESCRIPTION OF THE PREFERRED EMBODIMENT

FIG. 1 is a block diagram illustrating one embodiment of a computer system for practicing the invention. The system 10 includes a central processing unit (CPU) 12 coupled to a keyboard 14, a display unit 16, and storage apparatus 18. Storage apparatus 18 may include external memory (such as a disk subsystem) as well as internal memory. Keyboard 14 is adapted for transmitting various distinguishable types of signals to CPU 12 by means well-known in the art. For example, keyboard 14 includes standard alphanumeric symbol keys for normal typing. Activation of one of these keys causes the transmission to CPU 12 of signals coded by standard means (such as ASCII) to unambiguously identify a particular symbol. Keyboard 14 also includes two special "leap" keys at opposite ends of the space bar. One leap key is designated the leap backward key; the other is designated the leap forward key. These keys are connected to the CPU in such a way that the states in which either may be at any time (up or down) may be detected independently of the states of the other keys on the keyboard. The signls transmitted by activation (depression) of the leap keys can be differentiated to determine whether either key or both keys are activated, and for how long.

FIG. 2 is a block diagram illustrating the general organization of the internal memory 20 of storage apparatus 18. It will be understood that the precise storage location of the contents of the illustrated memory contents may vary over time, depending on the operation of the particular computer. Some or all of the contents may be "swapped" to and from an external storage device and/or may occupy different locations in internal memory at different times. For purposes of the invention, it is only important that the memory locations of the contents of these blocks are addressable by CPU 12 at any particular time.

Referring now to FIG. 2, the contents of memory 20 include a text buffer 24 for storing a string of encoded symbols, a screen buffer 26 for storing encoded symbols for display on the display device, and program area 28 for storing all or part of an applications program. In this embodiment, the method of the invention is implemented by the execution (by the CPU) of application program instructions which control the contents of text buffer 24 and screen buffer 26. The application program uses certain other addressable memory locations, including at least five pointers 30, 32, 34, 36, 38, two state variables 40, 42, and two tables 44, 46, the function and contents of each of which will be described below.

The preferred embodiment of the method of this invention will now be described in terms of the operation of the application program on text buffer 24 and screen buffer 26, in response to signals from keyboard 14. The contents of screen buffer 26 are displayed on the display device in a manner directly corresponding to the organization of the screen buffer. References to the displaying of symbols will therefore be understood to mean moving symbols to appropriate locations in the screen buffer.

FIGS. 3a and 3b show a flow chart illustrating a preferred embodiment of the method of this invention. FIGS. 4a-4f conceptually illustrate the contents of text buffer 24 after the operations shown in FIGS. 3a and 3b.

Referring to FIG. 3a, the method begins at block 102 by initializing the system. As shown in FIG. 4a, the text buffer is initialized by inserting a one byte initial page break indicator 202 at the beginning (low-address) part of the text buffer and a one byte final page break indicator 204 at the end of the text buffer. Page breaks serve to divide the text buffer into pages of symbols; no symbols are stored before the initial page break or after the final page break.

Five pointers are shown conceptually in FIGS. 4a-4m. These pointers are implemented by storing text buffer addresses in pointer storage locations 30, 32, 34, 36, 38 (FIG. 2) in memory 20. Referring to FIG. 4(a), the pointers are shown after initialization. A BOS (beginning of selection) pointer 206 points to BOS location 208, and an OEOS (old end of selection) pointer 210 points to OEOS location 212. BOS pointer 206 and OEOS pointer 210 are both initialized to point to initial page break 202. An EOS (end-of-selection) pointer 214 points to EOS location 216 and an EBOT (end of beginning of text) pointer 218 points to EBOT location 220. EOS pointer 214 and EBOT pointer 218 are initialized to point to the first storage location after initial page break 202. A BEOT (beginning of end of text) pointer 222 points to BEOT location 224 and is initialized to point to the final page break 204.

The region 226 of the text buffer beginning at EOS 216 and ending at the last symbol storage location before BEOT 222 is called the Gap. No active text is stored in the Gap; that is, the symbols which are stored in the Gap are not considered part of the string of symbols being constructed. The region from BOS 208 to EOS 216 is called the Selection. The Selection identifies a substring of symbol which, as will be seen, is used as the object to be operated on by certain commands.

At block 104 of FIG. 3a, a test is performed to determine whether the signals received from the keyboard represent normal typing. In this embodiment, normal typing means the activation of one of the alpha-numeric keys. If the signals from the keyboard indicate normal typing, the signals identify a specific symbol (for example, in ASCII) and the identified symbol is stored (block 106) in the text buffer. FIG. 4(b) shows the text buffer after several symbols have been stored. Each symbol is inserted in the text buffer at EOS 216, the first location in the Gap. After each symbol is stored at EOS, EOS pointer 214 is incremented by one symbol length to point to the next symbol storage location. In this embodiment, the symbol length is one byte, which is one addressable storage location; adjacent storage locations therefore have consecutive addresses.

In response to normal typing, EBOT pointer 218 is also incremented by one to point to the new first storage location in the Gap. After incrementing EOS pointer 214, BOS pointer 206 is assigned the address of the symbol storage location 208 preceding EOS.

When normal typing begins after initialization, OEOS pointer 210 is assigned the first value of BOS 208, and keeps this value as long as normal typing continues. This is the location of the first symbol entered.

The Selection is defined by the region from BOS 208 to EOS 216. During normal typing, the Selection therefore consists of the last symbol typed (no active symbol being stored at EOS).

On the display device of this embodiment, the symbols are displayed as they are entered from the keyboard and inserted in the text buffer. According to the invention, a two-part cursor is also displayed (block 108). The two parts of the cursor will be referred to as the blinker and the highlight.

The blinker indicates the position in the substring (corresponding to EOS) where the next typed symbol will be inserted. In some displays (e.g. bit-mapped) the blinker may appear between two symbols to indicate precisely where the insertion will take place; in other displays (e.g. character oriented) the blinker appears over a character (or page break symbol) and the left edge of the blinker indicates the insertion location. The embodiment described herein uses a character-oriented display.

The highlight indicates the Selection. The Selection is made obvious (and distinguished from the blinker) by reverse video, color, or other conventional techniques. During normal typing, the last symbol entered is highlighted and the blinker is on the next character or page break symbol.

At block 110 of the flow chart of FIG. 3a, the signals from the keyboard are tested to determine whether both leap keys are depressed. In this embodiment, the system responds to this action by extending the Selection (block 112). The Selection is considered to be extended when it consists of more than one character. FIG. 4c illustrates the selection extension operation when it is performed after initialization and normal typing. BOS pointer 206 is moved to OEOS location 212, by copying the address in OEOS pointer 210 to BOS pointer 206. OEOS pointer 210 becomes undefined. The Selection is thereby extended to the entire region from BOS 208 to EOS 216, to include all symbols entered since initialization. On the display, the part of the Selection which displayed is highlighted. (As will be seen below, the Selection extension operation always results in the selection of a well-defined, predictable substring; the selection of all symbols entered since initialization is limited to the present example, where only normal typing has been performed since initialization.) When the Selection is extended, one of the aforementioned state variables, Selection state varible 40, is set to indicate this fact.

Returning to the flow chart of FIG. 3, at block 114, the signals from the keyboard are tested to determine whether the leap forward key is tapped. The system responds to this signal in different ways, depending on the state of the two-part cursor. At block 116, the system tests the Selection state variable 40 to determine whether the Selection is presently extended. If it is, then at block 118 the Selection is "collapsed", i.e., restored to an unextended condition, wherein the Selection is one symbol. In this case, the Selection is collapsed (FIG. 4d) to the right end of the Selection by moving BOS pointer 206 to the last location before the Gap (by assigning the address EOS-1 to BOS pointer 206). OEOS pointer 210 saves the old value of BOS.

If the Selection is not extended when the leap forward key is tapped, then, at block 120, a test is made to determine whether the cursor is "wide." The two-part cursor of this invention is referred to as wide when the blinker follows the highlight by one character or symbol on the display (i.e., when the insertion location indicated by the left edge of the blinker immediately follows the highlighted character). The cursor is referred to as narrow when the blinker and the highlight are on the same character or symbol on the display (i.e., when the insertion location indicated by the left edge of the blinker immediately precedes the highlight). The second state variable, cursor state variable 42, is maintained to indicate a wide or narrow cursor.

If the Selection is not extended, and the cursor is wide when the leap forward key is tapped, then the cursor is made narrow (block 122) by moving the Selection and highlight forward one character and modifying cursor state variable 42. In the text buffer, if there is a symbol stored at BEOT 224 (other than the final page break symbol), this symbol is moved to EOS 216, and EOS pointer 214, EBOT pointer 218, BOS pointer 206, and BEOT pointer 222 are all incremented by one.

When the cursor is narrow, the blinker is displayed over the symbol stored at BOS to indicate that insertions will be made before this symbol. When the cursor is not narrow, the blinker is displayed over the symbol, if any, stored at BEOT.

The effect of normal typing when the cursor is narrow is shown in FIG. 4(e). BEOT pointer 222 is decremented by one, the symbol stored at BOS 208 is moved to new BEOT 224, and the typed symbol is inserted at BOS 208. OEOS pointer 210 saves the value of BOS location 208. The cursor is changed to wide and the cursor state variable is updated.

If the leap forward key is tapped and the Selection is not extended and the cursor is already narrow, than, at block 124, the narrow cursor is moved forward one symbol (unless it is already on the final page break). In the text buffer, if there is a symbol stored at BEOT 224, it is moved to EOS 216, and EOS pointer 218, BOS pointer 206, and BEOT pointer 222 are all incremented by one.

Referring to FIG. 3b, if the signals from the keyboard indicate that the leap backward key is tapped (tested at block 130), the Selection state variable is tested (at block 132) to determine whether the Selection is extended. If it is, then at block 134 the Selection is collapsed to the beginning of the Selection. In the text buffer, all symbols stored from BOS+1 to EOS are moved to the new BEOT, effectively moving the Gap. The new BEOT address is calculated as: BEOT=old BEOT−(EBOT−EOS). EOS pointer 214 and EBOT pointer 218 are then modified to point to the location BOS+1, making it the first location of the Gap. The cursor is made narrow and the blinker is at the symbol stored on BOS.

If the Selection is not extended when the leap backward key is tapped, the cursor state variable is tested at block 136 to determine whether the cursor is wide. If the cursor is wide, it is made narrow at block 138 by modifying the second state variable, causing the blinker to be moved to the symbol stored at BOS, effectively moving the blinker over the highlighted Selection.

If the leap backward key is tapped and the Selection is not extended and the cursor is narrow, then, at block 140, the narrow cursor is moved back one character (unless it is already on the initial page break). Any symbol stored at BOS is moved to after the Gap, and BOS pointer 206, EOS pointer 214, EBOT pointer 218 and BEOT pointer 222 are all decremented by one.

If the narrow cursor is on the initial page break after it is collapsed to the beginning of the Selection, it is changed to a wide cursor, because no symbols can be inserted before the initial page break.

If the signals from the keyboard indicate that either leap key is pressed and held (block 150), this is interpreted as a request to move the two-part cursor to a specific location. The move may be a content-based move in which the user specifies a substring in the text buffer (and possibly not on the display). The substring is located and displayed with a narrow cursor on the first symbol of the substring. A content-based cursor moving function ("leaping") is explained in detail in co-pending U.S. patent application serial No. 605,448, assigned to the assignee of the present application, the disclosure of which is hereby incorporated by reference. While the method of moving the cursor described therein is used in the preferred embodiment of the present invention, it will be understood that other conventional methods, such as cursor control keys, joy sticks, or "find" commands could be used with the present invention.

FIG. 4(f) shows the text buffer during a leap backwards, where the text buffer before the leap is as shown in FIG. 4(d). BOS pointer 206 points to the location leaped to, EOS pointer 214 points to the next location, and EBOT pointer 218 temporarily stays at the previous EOS location at the beginning of the Gap. The other pointers are not moved. FIG. 4(g) shows the text buffer and pointers after the leap operation is completed. All active text from new EOS 216 to old EBOT 220 is moved to new BEOT 224, effectively moving the Gap up to the new EOS. EBOT pointer 218 is then set to the new EOS address 216, OEOS pointer 210 is set to the old value of BEOT, and BEOT pointer 222 is set to the new start of text after the Gap. The new BEOT address is calculated as BEOT=old BEOT−(old EBOT−new EOS). After leaping, the cursor state variable is set to narrow and the blinker is on the symbol stored at BOS.

In an alternative embodiment, a "dragging" feature is provided. If the Selection is extended when the cursor movement (leap) function is invoked, the Selection is "dragged" to the target location and inserted there.

A second example of extending the Selection will now illustrate the effect of this operation when it is invoked immediately after a leap. The extension operation will result in the Selection being extended to the region bounded by the highlight before the leap and the highlight after the leap. FIG. 4(h) shows the effect of the extension operation when it is performed after the backward leap which results in the text buffer of 4(g). The symbols from BEOT to OEOS-1 are moved to EOS 216, effectively moving the Gap to where it was in FIG. 4(f). EOS pointer 214 and EBOT pointer 218 are updated to point to the start of the new Gap. BEOT pointer 224 is assigned the value of OEOS. The Selection extends from BOS to EOS and the blinker is at the character stored at BEOT.

FIG. 4(i) shows the text buffer during the leap forward operation. BOS pointer 206 points to the target location of the leap and EOS pointer 214 points to the next location. EBOT pointer 218 temporarily saves the old value of EOS. FIG. 4(j) shows the text buffer after completion of the leap forward. The symbols from old BEOT 224 to new BOS 206 are moved to the Gap at old EBOT 220; new EBOT pointer 218 and EOS pointer 214 are then set to: old EBOT+(new EOS−old BEOT). BOS pointer 206 is set to EOS minus 1 and OEOS pointer 210 is set to the old value of EBOT minus 1. It is seen that OEOS pointer 210 maintains the address of the location which was highlighted before the leap. The cursor is narrow and the blinker is at BOS.

If the Selection is now extended after the leap forward, the text buffer is as shown in 4(k). BOS pointer 206 is assigned the value of OEOS. The Selection extends from BOS 208 to EOS 216.

As illustrated in these examples of selection extension, if OEOS is greater than BOS, then the BEOT pointer is moved to OEOS, and the EOS pointer is moved to the beginning of the new Gap (after accounting for text moves). If OEOS is less than BOS, then the BOS pointer is moved to OEOS. Extending the Selection immediately after a leap results in the Selection being bounded by the Selection before the leap and the Selection after the leap. Extending the Selection after normal typing results in a Selection consisting of all symbols typed since the last leap.

FIG. 4(l) shows the text buffer and pointers when normal typing follows the leap operation shown in FIG. 4(j). The cursor is always narrow after a leap. When typing begins, the first symbol is entered at BOS 208 (because the cursor is narrow) and OEOS pointer 210 saves the value of BOS 208. If both leap keys are pressed, the Selection is extended by assigning the value of OEOS to BOS pointer 206, resulting in the extended Selection shown in FIG. 4(m), wherein all symbols entered since the last leap are selected.

The Selection may advantageously be used as the object for certain commands, such as print requests and delete requests. Referring to FIG. 3b, if the signals from the keyboard indicate a delete request (block 155) then the Selection is deleted. The delete operation (block 156) works as follows: When the cursor is wide, and the Selection is not extended, BOS pointer 206, EBOT pointer 218, and EOS pointer 214 are all decremented by one, effectively deleting the highlighted symbol by moving the Gap. If the Selection is extended, EOS pointer 214 and EBOT pointer 218 are assigned the address of BOS 208 and BOS pointer 206 is assigned the address of EOS-1. When the cursor is narrow, the symbol stored at BEOT 224 is moved to BOS 208, and BEOT pointer 222 is incremented by one. It will be noted that, when the cursor is wide (as it is during normal typing), successive deletions work to the left; when the cursor is narrow (as it is after it is moved, or leaped), successive deletions proceed to the right. This is consistent with the usual intentions of the operator.

Other commands that can operate on the Selection include "CALC" and "SEND." The "CALC" command takes the Selection and executes it as a program. It may, for example, send the Selection to the system's BASIC interpreter, where the program is interpreted and executed. The output of the program is then inserted at the gap and the Selection is deleted. The "SEND" command invokes telecommunications features and transmits the Selection to a remote location, such as another computer. A "RECEIVE" function may also be provided, with a message being received via telecommunications and inserted either at EOS (if there has not been any typing since the last leap) or OEOS (if there has been typing since the last leap).

In the preferred embodiment, certain commands which operate on the Selection (block 158) will automatically extend the Selection (block 160) if they are invoked when the Selection is not extended. For example, if the print command is received and the Selection is unextended, the system assumes that the user does not intend to print only one symbol. The system therefore extends the Selection in the same manner it would if both leap keys were pressed, and then it prints the extended Selection. Other commands, such as delete, do not cause automatic extension.

The tables 44 and 46 (FIG. 2) will now be explained so that the display operation may be fully understood. Page table 42 contains one entry for each page of text. Each entry on page table 44 contains a pointer and a line number. The pointer contains an address in the text buffer of the start of each page of text. The line number is the line number of the start of that page, counting from the beginning of the text. Pages can start either because there are enough symbols to fill a page or because the user entered a page break signal. After a leap operation, the page table is recalculated from the text buffer so that all of the pointers refer to the start of each page. This is necessary because the Gap may have been moved by the leap operation. It is not necessary to actually recalculate all page table entries, but only to adjust the pointer values based on how far the Gap has moved. Normal typing can also require updating of the page table from the cursor's page to the final page.

Window table 46 consists of one entry for each line on the display. Each entry contains: a pointer to the text buffer at the location of the beginning of the line; the line number on the page; and the page number in the text.

The content-based leap operation can result in the blinker being moved to a part of text buffer which is not yet displayed on the display. To display the leaped-to text, the page table is searched to find which page contains the EOS. The address value EOS is compared to the page pointers in the page table until a page pointer having an address greater than EOS is found, identifying the previous page as the page containing EOS. The end of the Selection (EOS) is to be displayed in the middle of the display. Assuming an embodiment with 24 lines per display screen, the page table is traversed backward until a page is located which at least 12 lines before EOS. The start of the 11 lines preceding the line with EOS, the start of the line with EOS, and the 12 lines after EOS are then located. The line start pointers, line numbers, and page numbers of these 24 lines are stored in the window table. The display routine then moves these 24 lines of text to the screen buffer for display on the display screen. When BOS is encountered, all symbols from BOS to EOS are hightlighted.

In the preferred embodiment, the method of this invention is performed on an Apple IIe computer operating under control of the FORTH program attached as Appendix 1 to this application.

The foregoing explanation of the preferred embodiment is intended to illustrate the invention rather than limit it. The scope of the invention may be ascertained from the appended claims.

APPENDIX 1

```
19
    0 ( DECOMPILER )   HEX                      0 Decompiler for Lyon's Forth
    1                                            1
    2 : .NAME  2+ NFA ID. ;                      2
    3                                            3
    4 : .N  ( ADDR CFA -- FLAG )  2+ >R          4
    5   R ' BRANCH = R ' OBRANCH = OR            5
    6   R ' (+LOOP) = OR R ' (LOOP) = OR         6
    7   DUP IF CR ENDIF                          7
    8   R ' LIT = O= R ' CLIT = O= AND           8
    9   IF R 2- .NAME ENDIF                      9
   10   R ' LIT = OR                            10
   11   IF 2+ DUP @ . 0                         11
   12   ELSE R ' CLIT =                         12
   13    IF 2+ DUP C@ . 1- 0                    13
   14    ELSE R ' (.") =                        14
   15     IF 2+ COUNT 2DUP TYPE + 2- 0          15
   16      22 EMIT SPACE                        16
   17     ELSE R ' ;S =                         17
   18   ENDIF ENDIF ENDIF R> DROP ;             18
   19                                           19
   20 : SEE  [COMPILE] '  2-                    20
   21   BEGIN 2+ DUP @ .N                       21
   22   UNTIL DROP CR ;                         22
   23                                           23
scr #   20
    0 ( metacompiler load block )                0 ( metacompiler load block )
    1                                            1
    2 FIRST B/BUF + -4 + DUP ' FIRST ! PREV !    2 FIRST B/BUF + 4 + DUP ' FIRST ! PREV !
    3                                            3
    4 DECIMAL 56 LOAD        ( printer aids )    4 DECIMAL 56 LOAD       ( printer aids
    5 ( DECIMAL 57 58 THRU   ( listing stuff)    5 ( DECIMAL 57 58 THRU  ( listing stuff
    6 1 PRINTING !           ( begin printer)    6 1 PRINTING !          ( begin printer
    7 DECIMAL 22 54 THRU     ( trans-compiler)   7 DECIMAL 22 54 THRU    ( trans-compiler
    8 DECIMAL 21 LOAD        ( Edde source)      8 DECIMAL 21 LOAD            ( Edde source
    9                                            9
   10                                           10
   11                                           11
   12                                           12
   13                                           13
   14                                           14
   15                                           15
   16                                           16
   17                                           17
   18                                           18
   19                                           19
   20                                           20
   21                                           21
   22                                           22
   23                                           23
```

21

```
  0 ( EDDE source load block ) HEX
  1
  2 LPON? HERE OLDDP ! AIM DP !  ( heading)
  3 CR ." There are " . ." tokens."
  4 CR CR OLDDP @ U. ." top of Lyon's"
  5 CR AIM U. ." beginning of bank 2" CR
  6 AIM 4000 0 FILL ( clean compile space )
  7 0 NAMED !   ( begin table on left )
  8
  9 DECIMAL 60 109 THRU
 10
 11 TKTABLE DUP  200 + DP !  ' AIM !
 12 0 NAMED !
 13
 14 DECIMAL 110 279 THRU
 15
 16 HEX CR CR HERE ADR U. ." end of bank 1"
 17 OLDDP @ DP !          ( footing )
 18
 19 DECIMAL 280 LOAD DECIMAL
 20
 21
 22 BELL LPDONE
 23
```

```
  0 ( load screen for EDDE )
  1
  2 LPON? HERE OLDDP ! AIM DP !  ( heading)
  3 CR ." There are " . ." tokens."
  4 CR CR OLDDP @ U. ." top of Lyon's"
  5 CR AIM U. ." beginning of bank 2" CR
  6 AIM 4000 0 FILL ( clean compile space )
  7 0 NAMED !   ( begin table on left )
  8
  9 DECIMAL 60 109 THRU ( bank 2 routines )
 10
 11 TKTABLE DUP  200 + DP !  ' AIM !
 12 0 NAMED !
 13
 14 DECIMAL 110 279 THRU
 15
 16 HEX CR CR HERE ADR U. ." end of bank 1"
 17 OLDDP @ DP !    ( footing )
 18
 19 DECIMAL 280 LOAD DECIMAL ( set vectors )
 20
 21 BELL LPDONE
 22
 23
``` scr #   22

```
  0 ( CONSTANTS NAME VAR ADR ) HEX
  1 : CON    CONSTANT ;      ( for brevity )
  2
  3 5A00 CON AIM       6A00 CON TKTABLE
  4  800 CON RAM       1200 CON LOMEM
  5 15A0 CON HIMEM     15C0 CON RTABLE
  6 1600 CON BOV       B3E0 CON EOV
  7 D000 CON ROM       BC00 CON SCREEN
  8
  9 VARIABLE OLDDP     VARIABLE TOKENS
 10 VARIABLE BOUND     VARIABLE RES
 11
 12 : NAME  HERE TOKENS @ DUP CONSTANT 0 ,
 13   ?CR 3 .R 2 SPACES ID. 6 SPACES
 14   1 TOKENS +! ;
 15 : ADR    AIM - ROM + ;
 16 : -ADR   ROM - AIM + ;
 17 : VAR    TOKENS @ CONSTANT 2 TOKENS +! ;
 18
 19 01 CON del         1D CON cr
 20 1B CON tab         1C CON ff
 21 24 CON CH          FF CON SSAV
 22 FB CON ASAV        FC CON PSAV
 23 FD CON XSAV        FE CON YSAV
```

```
  0 ( CONSTANTS NAME VAR ADR ) HEX
  1 AKA defined for brevity.
  2 AIM compiled Swyft TKTABLE token table
  3 RAM variables/tables RTABLE ram table
  4 LOMEM,HIMEM basic
  5 BOV begin cut       EOV end of text area
  6 ROM Swyft target    SCREEN
  7 OLDDP old DP        TOKENS next token #
  8 BOUND limits word length to y-reg range
  9 RES used by initialization
 10
 11 NAME associates a token with a word and
 12   reserves space for an address.
 13   T: later resolves this address to
 14   point to beginning of definition and
 15   compiles tokens of resolved words.
 16 ADR gives equivalent adr in ROM
 17 -ADR gives equivalent adr at AIM
 18 VAR associates a token with a word
 19
 20 key assignments.
 21 CH cursor position  SSAV status register
 22 ASAV accumulator    PSAV processor reg
 23 XSAV x register     YSAV y register
```

23

```
  0 ( PAGE0 VARIABLES ) HEX
  1
  2 ASSEMBLER DEFINITIONS
  3 50 CONSTANT X0    ( TWO BYTE TEMPS )
  4 52 CONSTANT X1
  5 54 CONSTANT X2
  6 56 CONSTANT X3
  7 58 CONSTANT X4
  8 5A CONSTANT X5
  9 5C CONSTANT Y0    ( ONE BYTE TEMPS )
```

```
  0 ( PAGE0 VARIABLES ) HEX
  1 two byte assembler temporaries:
  2 X0,X0+1
  3 X1,X1+1
  4 X2,X2+1
  5 X3,X3+1
  6 X4,X4=1
  7 X5,X5+1
  8 one byte assembler temporaries:
  9 Y0
```

```
10 5D CONSTANT Y1                            10 Y1
11 5E CONSTANT Y2                            11 Y2
12 5F CONSTANT WC    ( WRAP COUNT )          12 other temporaries:
13 60 CONSTANT WR    ( WRAP ADDRESS )        13 WC,WR wrap address and count of line to
14 62 CONSTANT VB    ( VARIABLE ADDRESS )    14 wrap. answer left in page table, e.g.
15 64 CONSTANT TSTAT ( XMIT STATUS )         15 VB variable address used by TO.
16 65 CONSTANT RSTAT ( RCEV STATUS )         16 TSTAT transmit status used by .INTERRUPT
17 66 CONSTANT XSAVE                         17 RSTAT receive status used by .INTERRUPT
18 67 CONSTANT YSAVE                         18 XSAVE x-reg temporary storage.
19 68 CONSTANT SSAVE                         19 YSAVE y-reg temporary storage.
20 69 CONSTANT IP                            20 SSAVE status reg temporary storage.
21 6B CONSTANT NEXT                          21 IP forth interpretive pointer.
22 A0 CONSTANT SP0                           22 NEXT forth next (within word) pointer.
23 FORTH DEFINITIONS                         23 SP0 forth stack.
``` scr #    24
```
 0 ( PASS 1 )                                 0 ( PASS 1 )
 1                                            1
 2 VOCABULARY SOURCE IMMEDIATE                2 negative tokens prevent tokenization
 3 SOURCE DEFINITIONS                         3 into token table; used for FRAG
 4                                            4 machine code
 5 -99 TOKENS ! ( FRAGs use in code only )    5
 6                                            6 the following are all NAME definitions:
 7 NAME .NEST  ( begins T: words )            7 .NEST  ( begins T: words )
 8 NAME .XLAT  ( keyboard lookup table )      8 .XLAT  ( keyboard lookup table )
 9 NAME .DISP0 ( address of display lines)    9 .DISP0 ( address of display lines)
10 NAME .DISP1                               10 .DISP1
11 NAME .SCR0  ( auxiliary display )         11 .SCR0  ( auxiliary display )
12 NAME .SCR1                                12 .SCR1
13 NAME .MSG0       NAME XYNEXT              13 .MSG0      XYNEXT
14 NAME .QUE        NAME YNEXT               14 .QUE       YNEXT
15 NAME .ON         NAME .ON/OFF             15 .ON        .ON/OFF
16 NAME .SCR        NAME .CURSOR             16 .SCR       .CURSOR
17 NAME .PRINT      NAME .DEFAULT            17 .PRINT     .DEFAULT
18 NAME .CH>F       NAME .B>F                18 .CH>F      .B>F
19 NAME .INTERRUPT  NAME .RECEIVE            19 .INTERRUPT .RECEIVE
20 NAME .LTABLE     NAME .USINGLE            20 .LTABLE    .USINGLE
21 NAME .RESET      NAME .MOVE-VARS          21 .RESET     .MOVE-VARS
22 NAME .MON        NAME .40COL              22 .MON       .40COL
23 NAME .STARTU     NAME .ENDU               23 .STARTU    .ENDU
```
25
```
 0 ( SOURCE )                                 0 ( SOURCE )
 1                                            1 disk version routines:
 2 NAME .LEMIT2    NAME D.LEMIT2              2 .LEMIT2    D.LEMIT2
 3 NAME .NEWDISK   NAME D.ZPMOVE              3 .NEWDISK   D.ZPMOVE
 4 NAME .CDISK     NAME D.CDISK               4 .CDISK     D.CDISK
 5 NAME .AUX       NAME D.AUX                 5 .AUX       D.AUX
 6 NAME .MAIN      NAME D.MAIN                6 .MAIN      D.MAIN
 7 NAME .XNEXT     NAME D.XNEXT               7 .XNEXT     D.XNEXT
 8 NAME .MONITOR   NAME D.MONITOR             8 .MONITOR   D.MONITOR
 9 NAME .B/F       NAME D.B/F                 9 .B/F       D.B/F
10 NAME .D444      NAME D.D444               10 .D444      D.D444
11 NAME .CH/F      NAME D.CH/F               11 .CH/F      D.CH/F
12 NAME .XFER      NAME D.XFER               12 .XFER      D.XFER
13 NAME .RTS       NAME D.RTS                13 .RTS       D.RTS
14 NAME .LEMIT     NAME D.LEMIT              14 .LEMIT     D.LEMIT
15 NAME .START     NAME D.START              15 .START     D.START
16 NAME .BOOT      NAME D.BOOT               16 .BOOT      D.BOOT
17                                           17 disk operations:
18 NAME *100US     NAME .SERIAL#             18 *100US     .SERIAL#
19 NAME ONDL       NAME OFFDL                19 ONDL       OFFDL
20 NAME DL12       NAME WB30                 20 DL12       WB30
```

```
21 NAME PHSW            NAME PHSW2           21  PHSW           PHSW2
22 NAME .SWYFT          NAME .SENDSWYFT      22  .SWYFT         .SENDSWYFT
23 NAME .WRAP           NAME BMP             23  .WRAP          BMP scr #   26
   0 ( SOURCE DEFINITIONS )                     0 ( SOURCE DEFINITIONS )
   1                                            1
   2 ( bank2 routines )                         2 bank 2 routines:
   3 NAME BOOT1          NAME MATCH             3  BOOT1          MATCH
   4 NAME 2.REVERSE      NAME 2.TOBUFF          4  2.REVERSE      2.TOBUFF
   5 NAME 2.ADJUST       NAME 2.?APPLE          5  2.ADJUST       2.?APPLE
   6 NAME 2.SEEK>        NAME 2.?EDDE           6  2.SEEK>        2.?EDDE
   7 NAME 2.SEEK<        NAME 2.CHECKSUM        7  2.SEEK<        2.CHECKSUM
   8 NAME 2.CMOVE2       NAME 2.?UPDATE         8  2.CMOVE2       2.?UPDATE
   9 NAME 2.<SEEK>       NAME 2.ENDWRAP         9  2.<SEEK>       2.ENDWRAP
  10 NAME 2.<WRITE>      NAME 2.PRESET         10  2.<WRITE>      2.PRESET
  11 NAME 2.40COL        NAME 2.ABOOT          11  2.40COL        2.ABOOT
  12 NAME 2.MON                                12  2.MON
  13 NAME 2.<READ>       NAME 2.NUDGE          13  2.<READ>       2.NUDGE
  14 NAME 2.WRITEO       NAME 2.PAGEPRINT      14  2.WRITEO       2.PAGEPRINT
  15 NAME 2.SHOWPAGE     NAME .DECIMATE        15  2.SHOWPAGE     .DECIMATE
  16 NAME 2.SERIAL#      NAME 2.@M             16  2.SERIAL#      2.@M
  17 NAME 2.V            NAME 2.@K             17  2.V            2.@K
  18 NAME 2.?X           NAME 2.QUE            18  2.?X           2.QUE
  19 NAME 2.SETMODEM     NAME 2.CONTROL        19  2.SETMODEM     2.CONTROL
  20 NAME 2.HARDPAGE     NAME 2.SOFTPAGE       20  2.HARDPAGE     2.SOFTPAGE
  21 NAME 2.STOP?        NAME 2.INCPAGES       21  2.STOP?        2.INCPAGES
  22 NAME end_of_bank2                         22  end_of_bank2
  23                                           23
27
   0 ( SOURCE DEFINITIONS )                     0 ( SOURCE DEFINITIONS )
   1                                            1 beginning of tokenization at TKTABLE.
   2 ( tokenized words called by T: words )     2   NAME creates token table and saves a
   3                                            3     space for an address;
   4 LPON? CR 0 TOKENS !                        4   T: later places address in TKTABLE
   5                                            5     which points to code for a word's
   6 NAME .BLIT       ( 0 )                     6     definition.
   7 NAME .2BYTERS    ( 1, not yet required )   7
   8 NAME .LIT        ( 2 )                     8 TOKEN :    NAME:
   9 NAME .BRAN       ( 3 )                     9   0          .BLIT
  10 NAME .OBRAN      ( 4 )                    10   1          .2BYTERS
  11 NAME .DO         ( 5 )                    11   2          .LIT
  12 NAME .LOOP       ( 6 )                    12   3          .BRAN
  13 NAME EXIT        ( 7 )                    13   4          .OBRAN
  14 NAME .VARIAB     ( must be token # 8)     14   5          .DO
  15 NAME .+LOOP      ( 9 )                    15   6          .LOOP
  16 NAME .LEAVE      ( A )                    16   7          EXIT
  17                                           17   8          .VARIAB must be token 8
  18                                           18              because 8 is used as the
  19                                           19              high byte address for
  20                                           20              variable table ($0800)
  21                                           21   9          .EXITLOOP
  22                                           22   A          .+LOOP
  23                                           23   B          .LEAVE scr #   28
   0 ( SOURCE DEFINITIONS )                     0 ( SOURCE DEFINITIONS )
   1                                            1
   2 NAME DUP            NAME 2DUP              2 tokenization of metacompiled FORTH:
   3 NAME ?DUP           NAME DROP              3  DUP            2DUP
   4 NAME ROT            NAME OVER              4  ?DUP           DROP
```

```
    5 NAME SWAP          NAME SWAB              5  ROT             OVER
    6 NAME R>            NAME R@                6  SWAP            SWAB
    7 NAME >R            NAME I                 7  R>              R@
    8                                           8  >R              I
    9 NAME @             NAME C@                9
   10 NAME !             NAME C!               10  @               C@
   11 NAME +!                                  11  !               C!
   12                                          12  +!
   13 NAME NEGATE        NAME ABS              13
   14 NAME AND           NAME OR               14  NEGATE          ABS
   15 NAME XOR                                 15  AND             OR
   16                                          16  XOR
   17                                          17
   18                                          18
   19                                          19
   20                                          20
   21                                          21
   22                                          22
   23                                          23
29
    0 ( SOURCE )                                0 ( SOURCE )
    1                                           1
    2 NAME -1            NAME 0                 2  tokenization of metacompiled FORTH
    3 NAME 1             NAME 2                 3  -1              0
    4 NAME +             NAME -                 4  1               2
    5                                           5  +               -
    6 NAME 1+            NAME 1-                6
    7 NAME 2*            NAME U2/               7  1+              1-
    8 NAME =             NAME 0=                8  2*              U2/
    9 NAME U<            NAME 0<                9  =               0=
   10 NAME UM/MOD        NAME UMIN             10  U<              0<
   11 NAME UMAX          NAME OMAX             11  UM/MOD          UMIN
   12                                          12  UMAX            OMAX
   13 NAME CMOVE         NAME CMOVE>           13
   14 NAME FILL                                14  CMOVE           CMOVE>
   15 NAME NOOP          NAME BEEP             15  FILL
   16                                          16  NOOP            BEEP
   17 NAME TO            NAME +TO              17
   18 NAME ADDR                                18  TO              +TO
   19                                          19  ADDR
   20 NAME MS                                  20
   21                                          21  MS
   22                                          22
   23                                          23 scr #   30
    0 ( SOURCE )                                0 ( SOURCE )
    1                                           1
    2 NAME WR!           NAME WR@               2  tokenization of Swyft:
    3 NAME WC@           NAME ROM?              3  WR!             WR@
    4 NAME LEXLEN        NAME TOPLINE           4  WC@             ROM?
    5                                           5  LEXLEN          TOPLINE
    6 NAME BOW                                  6
    7 NAME LOCLIN        NAME LOCCHR            7  BOW
    8 NAME SEL           NAME ?COLLAPSE         8  LOCLIN          LOCCHR
    9                                           9  SEL             ?COLLAPSE
   10 NAME DOPAGING      NAME NEXTPAGE         10
   11 NAME FIXTABLE      NAME NOTMATCH?        11  DOPAGING        NEXTPAGE
   12 NAME PAGEWRAP      NAME SAVEPAGE         12  FIXTABLE        NOTMATCH?
   13                                          13  PAGEWRAP        SAVEPAGE
   14 NAME PREALIGN      NAME +ALIGN           14
   15 NAME INCPAGES      NAME LASTPAGE         15  PREALIGN        +ALIGN
```

```
    16  NAME  ENDFORM          NAME  <ENDFORM>      16  INCPAGES       LASTPAGE
    17  NAME  ?ONPAGE                                17  ENDFORM        <ENDFORM>
    18  NAME  ?MORETEXT        NAME  FIXEND         18  ?ONPAGE
    19  NAME  STOP?                                  19  ?MORETEXT      FIXEND
    20                                               20  STOP?
    21                                               21
    22  NAME  HARDPAGE                               22  HARDPAGE
    23  NAME  SOFTPAGE                               23  SOFTPAGE
31
     0  ( SOURCE )                                    0  ( SOURCE )
     1                                                1
     2  NAME  WRAP             NAME  ENDWRAP          2  tokenization of Swyft:
     3  NAME  AFTERGAP                                3  WRAP           ENDWRAP
     4                                                4  AFTERGAP
     5  NAME  SHOWLINE         NAME  SETLINE          5
     6  NAME  PRESET           NAME  ?UPDATE          6  SHOWLINE       SETLINE
     7  NAME  ADJUST           NAME  TOBUFF           7  PRESET         ?UPDATE
     8  NAME  ENDWINDOW        NAME  ?SCROLL          8  ADJUST         TOBUFF
     9  NAME  ENDSCREEN?       NAME  SHOWPAGE         9  ENDWINDOW      ?SCROLL
    10  NAME  NEWND            NAME  REWINDOW        10  ENDSCREEN?     SHOWPAGE
    11                                               11  NEWND          REWINDOW
    12  NAME  FRESH            NAME  REFRESH         12
    13  NAME  REFRESHER        NAME  SHOW            13  FRESH          REFRESH
    14  NAME  SHOWMARK         NAME  NEWMARK         14  REFRESHER      SHOW
    15  NAME  RESHOW           NAME  OLDSHOW         15  SHOWMARK       NEWMARK
    16                                               16  RESHOW         OLDSHOW
    17                                               17
    18                                               18
    19                                               19
    20                                               20
    21                                               21
    22                                               22
    23.                                              23 cr #    32
     0  ( SOURCE ) HEX                                0  ( SOURCE ) HEX
     1                                                1
     2  NAME  SETDISP          NAME  SIGNON           2  tokenization of Swyft:
     3  NAME  MSGO             NAME  CLEAR            3  SETDISP        SIGNON
     4  NAME  SCROLL                                  4  MSGO           CLEAR
     5  NAME  DISP             NAME  AUXIL            5  SCROLL
     6  NAME  ?BLINK           NAME  ?LBLINK          6  DISP           AUXIL
     7  NAME  ON               NAME  OFF              7  ?BLINK         ?LBLINK
     8                                                8  ON             OFF
     9  NAME  QUE                                     9
    10  NAME  ?K               NAME  @K              10  QUE
    11  NAME  ?E               NAME  ?A              11  ?K             @K
    12  NAME  ?X               NAME  ?S              12  ?E             ?A
    13  NAME  ?D               NAME  FLUSH           13  ?X             ?S
    14                                               14  ?D             FLUSH
    15  NAME  SETMODEM         NAME  MEMIT           15
    16  NAME  ?M               NAME  ?LE             16  SETMODEM       MEMIT
    17  NAME  CONTROL          NAME  MAPPEND         17  ?M             ?LE
    18  NAME  ?SEND            NAME  ?RECFULL        18  CONTROL        MAPPEND
    19                                               19  ?SEND          ?RECFULL
    20                                               20
    21                                               21
    22                                               22
    23                                               23
```

```
33
    0 ( SOURCE ) HEX                              0 ( SOURCE ) HEX
    1                                             1 tokenization of Swyft:
    2 NAME PRINT        NAME SETPRINTER           2 PRINT           SETPRINTER
    3 NAME LEMIT        NAME LTYPE                3 LEMIT           LTYPE
    4 NAME LCR          NAME LCRS                 4 LCR             LCRS
    5 NAME PAGEPRINT    NAME ENDPAGE              5 PAGEPRINT       ENDPAGE
    6 NAME LMARGIN      NAME ULEMIT               6 LMARGINS        ULEMIT
    7 NAME ENDU         NAME STARTU               7 ENDU            STARTU
    8                                             8
    9 NAME REVERSE                                9 REVERSE
   10 NAME SEEK>        NAME SEEK<               10 SEEK>           SEEK<
   11 NAME FLIP/TRIM    NAME FLIP                11 FLIP/TRIM       FLIP
   12 NAME ?LEXXED                               12 ?LEXXED
   13 NAME RENCUR       NAME LEXCUR              13 RENCUR          LEXCUR
   14 NAME DEL          NAME [SEARCH]            14 DEL             [SEARCH]
   15 NAME SEARCH       NAME <SEARCH>            15 SEARCH          <SEARCH>
   16 NAME REP          NAME EXPAND              16 REP             EXPAND
   17 NAME AUTOEXTEND                            17 AUTOEXTEND
   18 NAME LEX          NAME REX                 18 LEX             REX
   19 NAME LXX          NAME RXX                 19 LXX             RXX
   20 NAME PRELEX       NAME POSTLEX             20 PRELEX          POSTLEX
   21 NAME LEXREX       NAME OUTLEX              21 LEXREX          OUTLEX
   22 NAME MOVE-GAP                              22 MOVE-GAP
   23 NAME CREEPSHOW    NAME CREEPER             23 CREEPSHOW       CREEPER scr #   34
    0 ( SOURCE ) HEX                              0 ( SOURCE ) HEX
    1                                             1
    2 NAME BASIC                                  2 tokenization of BASIC words:
    3                                             3 BASIC
    4 NAME TOBASIC      NAME TOINPUT              4
    5 NAME APPEND       NAME F>B                  5 TOBASIC         TOINPUT
    6 NAME VALIDATE     NAME START                6 APPEND          F>B
    7 NAME INITBASIC                              7 VALIDATE        START
    8 NAME DEFVARS      NAME RESETVARS            8 INITBASIC
    9 NAME BEFORE       NAME AFTER                9 DEFVARS         RESETVARS
   10 NAME ?MOVETEXT    NAME MOVETEXT            10 BEFORE          AFTER
   11 NAME WIDTHCHANGE                           11 MARGIN-CHANGES  CHECKCHANGES
   12 NAME MARGIN-CHANGES NAME CHECKCHANGES      12 SAVESTRINGS     LOADSTRINGS
   13 NAME SAVESTRINGS  NAME LOADSTRINGS         13 SAVE$           LOAD$
   14 NAME SAVE$        NAME LOAD$               14 V@              V!
   15 NAME V@           NAME V!                  15 V
   16 NAME V                                     16 FRAGMENTS
   17 NAME FRAGMENTS                             17 ROM-FRAGMENTS   DISK-FRAGMENTS
   18 NAME ROM-FRAGMENTS NAME DISK-FRAGMENTS     18
   19                                            19
   20                                            20
   21                                            21
   22                                            22
   23                                            23
35
    0 ( SOURCE )                                  0 ( SOURCE )
    1                                             1
    2 NAME LOAD         NAME SAVE                 2 tokenization of disk operations:
    3 NAME DRAG         NAME GET                  3 LOAD            SAVE
    4 NAME BOOT                                   4 DRAG            GET
    5                                             5 BOOT
    6 NAME DISKON       NAME PROT?                6
    7 NAME ?EDDE        NAME ?APPLE               7 DISKON          PROT?
    8 NAME ACT          NAME DEACT                8 ?EDDE           ?APPLE
    9 NAME CHECKSUM     NAME SERIAL#              9 ACT             DEACT
```

```
10 NAME RECAL                         10 CHECKSUM         SERIAL#
11 NAME <SEEK>       NAME SEEK        11 RECAL
12 NAME <READ>       NAME READ        12 <SEEK>           SEEK
13 NAME <WRITE>      NAME WRITE       13 <READ>           READ
14 NAME OLDLOAD      NAME <LOAD>      14 <WRITE>          WRITE
15 NAME WRITES       NAME WRITEO      15 OLDLOAD          <LOAD>
16 NAME APPLEDISK    NAME ABOOT       16 WRITES           WRITEO
17 NAME .40COL       NAME .MON        17 APPLEDISK        ABOOT
18                                    18 .40COL           .MON
19                                    19
20                                    20
21                                    21
22                                    22
23                                    23 scr #   36
   0 ( SOURCE ) HEX                      0 ( SOURCE )
   1                                     1
   2 NAME MAIN        NAME LOOKUP        2 MAIN             LOOKUP
   3 NAME COLD        NAME WARM          3 COLD             WARM
   4 NAME INIT        NAME <INIT>        4 INIT             <INIT>
   5 NAME RAMKEYS     NAME ?RAMKEYS      5 RAMKEYS          ?RAMKEYS
   6                                     6
   7 NAME DELETE      NAME CUT           7 DELETE           CUT
   8 NAME <ENTER>     NAME NEWPAGES      8 <ENTER>          NEWPAGES
   9                                     9
  10 NAME BUG         NAME RP!          10 BUG              RP!
  11                                    11
  12 NAME ENTER       NAME PASTE        12 ENTER            PASTE
  13 NAME TAB         NAME RESET        13 TAB              RESET
  14 NAME DISK        NAME SEND         14 DISK             SEND
  15                                    15
  16                                    16 storing a 0 in the lfa of the first
  17                                    17 definition of SOURCE vocabulary limits
  18                                    18 vocabulary searches to SOURCE
  19                                    19
  20                                    20 the value in tokens represents the
  21                                    21 actual number of tokens placed into
  22                                    22 the table
  23                                    23
37
   0 ( END OF SOURCE DEFINITIONS ) HEX    0
   1                                      1
   2 00 ' .NEST LFA                       2
   3 FORTH DEFINITIONS                    3
   4 !                                    4
   5                                      5
   6 LPDONE   TOKENS @                    6
   7                                      7
   8                                      8
   9                                      9
  10                                     10
  11                                     11
  12                                     12
  13                                     13
  14                                     14
  15                                     15
  16                                     16
  17                                     17
  18                                     18
  19                                     19
  20                                     20
```

```
scr #    38
   0 ( VARIABLES )                              0 ( VARIABLES )
   1 ASSEMBLER DEFINITIONS    800 TOKENS !      1 beginning of variables at RAM ($0800).
   2 ( 800 ) VAR ORIGIN       808 TOKENS !      2 ORIGIN
   3 ( 808 ) VAR BOT                            3 BOT            beginning of text.
   4 ( 80A ) VAR BEOT                           4 BEOT           beginning of end of text.
   5 ( 80C ) VAR EBOT                           5 EBOT           end of beginning of text.
   6 ( 80E ) VAR EOT                            6 EOT            end of text.
   7 ( 810 ) VAR BOS                            7 BOS            beginning of selection.
   8 ( 812 ) VAR EOS                            8 EOS            end of selection.
   9 ( 814 ) VAR TOP                            9 TOP            top line on screen.
  10 ( 816 ) VAR BOC                           10 BOC            beginning of cut buffer.
  11 ( 818 ) VAR OEOS                          11 OEOS           old end of selection.
  12 ( 81A ) VAR BOTTOM                        12 BOTTOM         bottom of all text area.
  13 ( 81C ) VAR DIRTY                         13 DIRTY          state of text.
  14 ( 81E ) VAR LOCAL1                        14 LOCAL1         (used as flag for creep).
  15 ( 820 ) VAR QIN                           15 QIN            pointer to que input.
  16 ( 822 ) VAR QOUT                          16 QOUT           pointer to que output.
  17 ( 824 ) VAR NARROW                        17 NARROW         state of cursor.
  18 ( 826 ) VAR CHAR                          18 CHAR           character buffer.
  19 ( 828 ) VAR LONG                          19 LONG           lines of text per page.
  20 ( 82A ) VAR WIDE                          20 WIDE           columns on page.
  21 ( 82C ) VAR YWRAP                         21 YWRAP          horizontal wrap.
  22 ( 82E ) VAR XFLAG                         22 XFLAG          state of apple (lex) keys.
  23 ( 830 ) VAR LCTR                          23 LCTR           cumulative line counter.
39
   0 ( VARIABLES ) HEX                          0 ( VARIABLES ) HEX
   1 ( 832 ) VAR PCT                            1 PCT            page count (temporary).
   2 ( 834 ) VAR LCT                            2 LCT            line count (temporary).
   3 ( 836 ) VAR LINES                          3 LINES          total # of lines in text.
   4 ( 838 ) VAR PAGES                          4 PAGES          total # of pages in text.
   5 ( 83A ) VAR CLIN                           5 CLIN           current cursor screen line.
   6 ( 83C ) VAR OLIN                           6 OLIN           old cursor line position.
   7 ( 83E ) VAR GAP                            7 GAP            space remaining (BEOT-EBOT).
   8 ( 840 ) VAR LINE#                          8 LINE#          line number.
   9 ( 842 ) VAR PAGE#                          9 PAGE#          page number.
  10 ( 844 ) VAR CTR                           10 CTR            counter for blink rate.
  11 ( 846 ) VAR LINREL                        11 LINREL         relative line.
  12 ( 848 ) VAR LINADR                        12 LINADR         line address.
  13 ( 84A ) VAR PAGEFLAG                      13 PAGEFLAG       state of page change.
  14 ( 84C ) VAR EFLAG                         14 EFLAG
  15 ( 84E ) VAR EOW                           15 EOW            end of window.
  16 ( 850 ) VAR RETN                          16 RETN           BASIC horizontal position.
  17 ( 852 ) VAR RETNCHR                       17 RETNCHR        character passed from BASIC.
  18 ( 854 ) VAR COL#                          18 COL#           horizontal position.
  19 ( 856 ) VAR .LF                           19 .LF            line feed (see SETPRINTER).
  20 ( 858 ) VAR .BL                           20 .BL            blanks to print for margin.
  21 ( 85A ) VAR LRFLAG                        21 LRFLAG         state of lexxing.
  22 ( 85C ) VAR CT                            22 CT
  23 ( 85E ) VAR PRINTBREAK                    23 PRINTBREAK     state of page break display.

scr #    40
   0 ( VARIABLES ) HEX                          0 ( VARIABLES ) HEX
   1 ( 860 ) VAR E#                             1 E#             line # of EOS.
   2 ( 862 ) VAR B#                             2 B#             line # of BOS.
   3 ( 864 ) VAR VECT                           3 VECT
   4 ( 866 ) VAR OLDE#                          4 OLDE#          previous line # of EOS.
```

```
  5 ( 868 ) VAR OLDB#
  6 ( 86A ) VAR NUFLAG
  7 ( 86C ) VAR LEXXING
  8 ( 86E ) VAR PTR
  9 ( 870 ) VAR W/2
 10 ( 872 ) VAR TRACK
 11 ( 874 ) VAR XPOS
 12 ( 876 ) VAR YPOS
 13 ( 878 ) VAR MQIN
 14 ( 87A ) VAR MQOUT
 15 ( 87C ) VAR BL0
 16 ( 87E ) VAR BL1
 17 ( 880 ) VAR BANK
 18 ( 882 ) VAR SAVECHAR
 19 ( 884 ) VAR FIRST
 20 ( 886 ) VAR SIZE
 21 ( 888 ) VAR ABOVE%
 22 ( 88A ) VAR BELOW%
 23 ( 88C ) VAR PAGE%
41
  0 ( VARIABLES ) HEX
  1 ( 88E ) VAR MARGIN%
  2 ( 890 ) VAR HALF-TRACK#
  3 ( 892 ) VAR LINESCOUNT
  4 ( 894 ) VAR EXTENDED
  5 ( 896 ) VAR LPAGE% ( 898 ) VAR PFLAG%
  6 ( 89A ) VAR THOROUGH?
  7 ( 89C ) VAR LASTC
  8 ( 89E ) VAR PRINT?    ( 8A0 ) VAR OLDPAGE
  9 ( 8A2 ) VAR DISK#     ( 8A4 ) VAR OLDISK#
 10 ( 8A6 ) VAR SAVED?
 11 ( 8A8 ) VAR FILLED-LEN
 12 ( 8AA ) VAR SSC?      ( 8AC ) VAR TEOS
 13 ( 8AE ) VAR SPACING ( 8B0 ) VAR LINEND%
 14 ( 8B2 ) VAR SEND%     ( 8B4 ) VAR HEAD%
 15 ( 8B6 ) VAR PLEN%     ( 8B8 ) VAR LOCAL2
 16 ( 8BA ) VAR UFLAG     ( 8BC ) VAR BELL?
 17 ( 8BE ) VAR SAVED     ( 8C0 ) VAR RESEEK
 18 ( 8C2 ) VAR NEWBOTTOM
 19 ( 8C4 ) VAR CUTPAGES
 20 ( 8C6 ) VAR WRAPDONE
 21
 22 8D0 CONSTANT USTART 8D8 CONSTANT UEND
 23 8E0 CONSTANT PBUF scr #   42
  0 ( ARRAYS ) HEX
  1
  2 900 CONSTANT PATT    920 CONSTANT KQUE
  3 930 CONSTANT CURR    980 CONSTANT UPDATE
  4 998 CONSTANT WND0    9B0 CONSTANT WND1
  5 9C8 CONSTANT WND2    9E0 CONSTANT WND3
  6 A00 CONSTANT PGS0    B00 CONSTANT PGS1
  7 C00 CONSTANT PGS2    D00 CONSTANT PGS3
  8
  9 E00 CONSTANT <LEMIT2>
 10 E10 CONSTANT <NDISK>
 11 E70 CONSTANT <CDISK>
 12 E80 CONSTANT <ZPMOVE>
 13 EE0 CONSTANT <AUX>
 14 EF0 CONSTANT <MAIN>
 15 F00 CONSTANT <XNEXT>
```

```
  5 OLDB#       previous line # of BOS.
  6 NUFLAG      state for new display.
  7 LEXXING     state for lex/rex operation.
  8 PTR
  9 W/2
 10 TRACK       desired track number.
 11 XPOS        display cursor x position.
 12 YPOS        display cursor y position.
 13 MQIN        modem que input pointer.
 14 MQOUT       modem que output pointer.
 15 BL0         used for cursor blinking.
 16 BL1         used for cursor blinking.
 17 BANK        active display bank.
 18 SAVECHAR
 19 FIRST
 20 SIZE
 21 ABOVE%      # of lines on top of page.
 22 BELOW%      # of lines at bottom.
 23 PAGE%       page number to print.

0 ( VARIABLES ) HEX
  1 MARGIN%     # of spaces for left margin.
  2 HALF-TRACK#
  3 LINESCOUNT
  4 EXTENDED
  5 LPAGE%
  6 PFLAG%
  7 THOROUGH?   wrap without interruption.
  8 LASTC       last command buffer.
  9 PRINT?      state for printing.
 10 OLDPAGE
 11 DISK#       disk identification #.
 12 OLDISK#     old disk identification #.
 13 SAVED?          FILLED-LEN  unused.
 14 SSC?        flag for super serial card.
 15 TEOS        temporary EOS.
 16 SPACING            LINEND%
 17 SEND%              HEAD%
 18 PLEN% page length   LOCAL2 xflag buffer
 19 UFLAG backup to u'l BELL?  sound bell?
 20 SAVED tracks saved  RESEEK find header.
 21
 22 underlining: USTART, UEND.
 23 PBUF        PR$ buffer.

0 ( ARRAYS ) HEX
  1 PATT search pattern KQUE key queue
  2 CURR printer/screen buffer for line.
  3 WND0, WND1 addr for line on display (WR)
  4 WND2 line on page (LCT)
  5 WND3 page number (PCT)
  6 PGS0, PGS1 addr for page (WR)
  7 PGS2, PGS3 cumulative # of lines (LCTR)
  8
  9 <LEMIT2> printer routine.
 10 <NDISK> call 3600.
 11 <CDISK> clear disk.
 12 <ZPMOVE> zero page move.
 13 <AUX>
 14 <MAIN>
 15 <XNEXT> exit from bank 2 routine.
```

```
16  F10  CONSTANT  <MON>                        16  <MON> call to Apple monitor.
17  F20  CONSTANT  <B/F>                        17  <B/F> basic/forth interface.
18  F30  CONSTANT  <D444>                       18  <D444> call to Apple BASIC.
19  F40  CONSTANT  <CH/F>                       19  <CH/F> character from basic to forth.
20  F50  CONSTANT  <XFER>                       20  <XFER> entry for bank 2 routine.
21  F60  CONSTANT  <RTS>                        21  <RTS> return from Apple BASIC.
22  F70  CONSTANT  <LEMIT>                      22  <LEMIT> printer routine.
23  FA0  CONSTANT  <START>                      23  <START> setup before BASIC.
43
 0  ( END OF VARIABLES )                         0  ( END OF VARIABLES )
 1                                               1
 2  1000 CONSTANT BASIC0                         2  BASIC0   BASIC zero page.
 3  1100 CONSTANT BASIC1                         3  BASIC1   BASIC page 1.
 4  1140 CONSTANT FORTH0                         4  FORTH0   forth zero page.
 5  11A0 CONSTANT FORTH1                         5  FORTH1   forth page 1.
 6  B400 CONSTANT MQUE                           6  TIMER    programmable counter
 7  FFF8 CONSTANT ROM?                           7  .IVEC    input from modem routine
 8                                               8  .OVEC    output to modem routine
 9  0 ' A.PLACE  LFA                             9  .SVEC    initialize modem routine
10  FORTH DEFINITIONS                           10  .QVEC    poll modem routine
11  !                                           11  MQUE     modem que - holds input
12                                              12  ROM? if the Swyft system is operating
13                                              13  from a disk then the value at this
14                                              14  location probably will be different
15                                              15
16                                              16  placing a 0 in the lfa of the first
17                                              17  definition stops vocabulary searches
18                                              18
19                                              19
20                                              20
21                                              21
22                                              22
23                                              23 scr #  44
 0  ( COMPILER DEFINITIONS ) VOCABULARY          0  ( COMPILER DEFINITIONS ) VOCABULARY
 1  COMPILER IMMEDIATE COMPILER DEFINITIONS      1  immediate compiler commands
 2  : DO SOURCE .DO FORTH C, 3 ;                 2  DO ( -- 3) compile .DO token
 3  : IF SOURCE .OBRAN FORTH C,                  3  IF ( -- 2) compile .OBRAN token
 4    HERE 0 C, 2 ;                              4  BEGIN ( --here 1)
 5  : BEGIN HERE 1 ;  : WHILE IF 2+ ;            5  WHILE ( -- 4)
 6  : >RESOLVE HERE BOUND @ - SWAP C! ;          6  >RESOLVE ( n --) resolve forward ref.
 7  : <LOOP>  C, FORTH BEGIN DUP 4 = WHILE       7  <LOOP>  ( 3 .loop --) compile .LOOP
 8    DROP >RESOLVE REPEAT 3 ?PAIRS ;            8  LOOP ( 3 --) compile .LOOP
 9  : LOOP  SOURCE .LOOP  FORTH <LOOP> ;         9  +LOOP ( 3 --) compile .+LOOP
10  : +LOOP SOURCE .+LOOP FORTH <LOOP> ;        10  UNTIL ( f --) compile .OBRAN
11  : <RESOLVE C, 1 ?PAIRS BOUND @ - C, ;       11  AGAIN ( --) compile .BRAN
12  : UNTIL SOURCE .OBRAN FORTH <RESOLVE ;      12  : THEN   0 >R FORTH BEGIN DUP 4 =
13  : AGAIN SOURCE .BRAN  FORTH <RESOLVE ;      13    WHILE >R >R REPEAT 2 ?PAIRS >RESOLVE
14  : THEN   0 >R FORTH BEGIN DUP 4 =           14    BEGIN R> -DUP WHILE R> REPEAT ;
15    WHILE >R >R REPEAT 2 ?PAIRS >RESOLVE      15  : REPEAT >R >R AGAIN R> R> 2- THEN ;
16    BEGIN R> -DUP WHILE R> REPEAT ;           16  : ELSE   0 >R FORTH BEGIN DUP 4 = WHILE
17  : REPEAT >R >R AGAIN R> R> 2- THEN ;        17    >R >R REPEAT 2 ?PAIRS SOURCE .BRAN
18  : ELSE   0 >R FORTH BEGIN DUP 4 = WHILE     18    FORTH C, 0 C, >RESOLVE HERE 1- 2
19    >R >R REPEAT 2 ?PAIRS SOURCE .BRAN        19    BEGIN R> -DUP WHILE R> REPEAT ;
20    FORTH C, 0 C, >RESOLVE HERE 1- 2          20  LEAVE compile .LEAVE 0 , here 4 0 c,
21    BEGIN R> -DUP WHILE R> REPEAT ;           21  ENDIF then
22  : LEAVE  SOURCE .LEAVE FORTH C, HERE 4      22
23    0 C, ;  : ENDIF THEN ;                    23
```

```
45
  0 ( COMPILER DEFINITIONS )
  1
  2 00 ' DO LFA
  3 FORTH DEFINITIONS
  4 !
```

```
  0 ( COMPILER DEFINITIONS )
  1
  2 store 0 in lfa of first word in
  3  compiler vocabulary to limit searches
  4
  5 GET#   common to ERRORIS, CALL, and >NUM
  6
  7 ERRORIS  compile error# phrase
  8
  9 CALL  compile call and address
``` scr # 46
```
  0 ( MORE COMPILER ) HEX
  1
  2 : ?COMMAND  ' -COMPILER 2+ @ (FIND)
  3   IF DROP CFA EXECUTE 1 ELSE 0 ENDIF ;
  4
  5 : ?VAR   ' ASSEMBLER 2+ @ (FIND) DUP
  6   IF 2DROP @ DUP 8FF U>
  7     IF SOURCE .LIT FORTH C,
  8     ELSE SWAB
  9     ENDIF , 1 ENDIF ;
 10
 11 : ?COMPILE  ' SOURCE 2+ @ (FIND) DUP
 12   IF 2DROP @ DUP 0< ABORT" FRAGment:"
 13   C, 1 ENDIF ;    ( all 1 byte tokens )
```

```
  0 ( MORE COMPILER ) HEX
  1
  2 : ?COMMAND  ( adr -- flag)
  3   true=executed compiler word
  4   false=not a compiler word
  5
  6 : ?VAR  ( adr -- flag)
  7   true=compiled either a .lit or
  8      .variable and its value
  9   false=not an assembler word
 10
 11 : ?COMPILE  ( adr -- flag)
 12   true=compiled a token
 13   false=not a source word, abort if
 14   token is negative (i.e., a fragment)
```

47
```
  0 ( MORE COMPILER ) HEX
  1
  2 : ?NUM   ( addr -- )
  3   0 OVER DUP C@ 1+ + ROT 1+
  4   DO I C@ 10 DIGIT
  5     IF SWAP 10 * +
  6     ELSE R> R> ." compile error: "
  7       HERE COUNT TYPE ABORT
  8     ENDIF
  9   LOOP DUP 100 U<
```

```
  0 ( MORE COMPILER ) HEX
  1
  2 : ?NUM   ( addr -- )
  3   in T: if it is not ?command, ?var or
  4   ?compile then try to convert it to a
  5   number; if successful, compile as a
  6   .blit or .lit (as appropriate), if not
  7   then abort with a compile error.
```

```
10  IF SOURCE .BLIT FORTH C, C,
11  ELSE SOURCE .LIT FORTH C, ,
12  THEN ;
13
14
15
16
17
18
19
20
21
22
23
``` scr #   48
```
 0 ( MORE COMPILER ) HEX
 1
 2 : T'  ( -- pfa )
 3   BL WORD ' SOURCE 2+ @ (FIND) 0=
 4   ABORT" not NAMEd " DROP
 5   NAMED @ 1 XOR DUP NAMED !
 6   IF CR 0 OUT !
 7   ELSE 28 OUT @ - SPACES
 8   THEN
 9   BASE @ HERE ADR HEX U. BASE !
10   DUP @ DUP 0<
11   IF DROP 5 SPACES
12   ELSE 3 .R SPACE SPACE
13   THEN HERE COUNT TYPE SPACE ;
14
15 : !FRAG   HERE ADR SWAP 2+ !
16   [COMPILE] ASSEMBLER ;
17
18
19
20
21
22
23
```

```
 0 ( MORE COMPILER ) HEX
 1
 2 : T'  ( -- pfa )
 3   abort if word not defined by NAME,
 4   otherwise print out its address and
 5   its token and then leave pfa on stack
 6
 7 : !FRAG  ( pfa --) resolve NAMEd word
 8   for fragment with ROM+offset
 9   and leave in assembler
10
11
12
13
14
15
16
17
18
19
20
21
22
23
```

49
```
 0 ( MORE COMPILER ) HEX
 1
 2 : FRAG  T' DUP !FRAG @ 0< 0=
 3   IF ." FRAG has a token" ABORT THEN ;
 4
 5 : LABEL  T' DUP !FRAG DUP @ 0<
 6   IF ." LABEL with no token" ABORT THEN
 7   HERE ADR SWAP @ DUP + TKTABLE + ! ;
 8
 9 : T:  LABEL
10   20 C, SOURCE ' .NEST FORTH 2+ @ ,
11   HERE 1- BOUND !
12   BEGIN BL WORD @ 3B01 = 0=
13   WHILE HERE ?COMPILE 0=
14    IF   HERE ?COMMAND 0=
15     IF   HERE ?VAR     0=
16      IF HERE ?NUM
17   ENDIF ENDIF ENDIF
18   REPEAT HERE BOUND @ - FF U>
19   ABORT" definition too large"
20   SOURCE EXIT FORTH C, ;
```

```
 0 ( MORE COMPILER ) HEX
 1 : FRAG  ( --) if it is a fragment then
 2   associate an address with the name
 3   (where the address points to code)
 4   otherwise abort.  the address is not
 5   placed in the token table.
 6   FRAGs are called by JSR and end in RTS
 7
 8 : LABEL ( --) if it is a label then
 9   associate an address with the token in
10   in the token table.  abort it token is
11   a code fragment (i.e., <0).  LABELs
12   are machine code ending with JMP NEXT.
13
14 : T: ( --) compiles tokenized words.
15   if NAME is found then compile JSR .NEST
16   to execute tokenized words, and compile
17   tokens until ";" found.
18   if BOUND exceeds $FF then the word is
19   too large for Y register incrementation
20   by NEXT so abort.
```

```
21                                          21  T: definitions end with JMP NEXT.
22                                          22
23                                          23 scr #    50
   0 ( MORE COMPILER )                         0 ( MORE COMPILER )
   1                                           1
   2 : \   BL WORD ' SOURCE 2+ @ (FIND)         2 : \  ( -- token)
   3   IF DROP 2+ @ DUP O=                     3    find a NAME; if not NAMED or not a
   4     IF HERE COUNT TYPE                    4    resolved fragment then abort.
   5    ." not yet a FRAGment" ABORT ENDIF     5
   6   ELSE HERE COUNT TYPE                    6  : TNEXT,
   7    ." not NAMEd" ABORT ENDIF ;            7    ending for a T: definition.
   8                                           8
   9 : TNEXT, ASSEMBLER NEXT JMP, ;            9  : "
  10                                          10    compile a string into the dictionary.
  11 : " 22 WORD C@ 1+ ALLOT ;                 11
  12                                          12  : H,
  13 : H, SWAB C, ;                            13    compile the hi byte only.
  14                                          14
  15 : TARGET   AIM 1000 - 17 4000 >DISK ;     15
  16                                          16  : TARGET
  17                                          17    save image of Swyft program on T1.7
  18                                          18    disk.
  19                                          19
  20                                          20
  21                                          21
  22                                          22
  23                                          23

51
   0 ( ADDITIONS TO THE METACOMPILER ) HEX     0 ( ADDITIONS TO THE METACOMPILER ) HEX
   1                                           1
   2 : ?FITS  ( # -- | aborts if HERE is       2 : ?FITS  aborts if HERE is
   3   more than # bytes beyond a page )       3   more than # bytes beyond a page
   4   HERE OFF AND SWAP U<                    4
   5   ABORT" Doesn't fit.  Try again" ;       5
   6                                           6
   7 : XFER   LABEL                            7 : XFER
   8   BL WORD ' SOURCE 2+ @ (FIND)            8  PURPOSE: transfer to machine language
   9   0= ABORT" doesn't exist "               9    routine in bank 2.  return through
  10   DROP DUP @ O<                           10   <xnext>.
  11   0= ABORT" don't transfer to a token "   11
  12   2+ @ ASSEMBLER DUP                      12   if the next two words are defined then
  13   YSAVE STY,                              13     point the first word to the following
  14   OFF AND #B LDY,                         14     code:
  15   SWAB OFF AND #B LDA,                    15   save y-reg and (using the resolved
  16   <XFER> JMP, ;                           16     address in the first word)
  17                                          17     lda# hi-byte and ldy# lo-byte
  18                                          18     then JMP <XFER>.
  19                                          19
  20                                          20
  21                                          21
  22                                          22
  23                                          23 scr #    52
   0 ( PROM BURNER FOR 2764'S ) ;S HEX         0 ( PROM BURNER FOR 2764'S ) ;S HEX
   1                                           1
   2 C0A0    CONSTANT DRA ( DATA A )           2
   3 DRA 2+  CONSTANT DRB ( DATA B )           3
   4 DRA 1+  CONSTANT CRA ( CTLR A )           4
```

```
 5 DRA 3 + CONSTANT CRB ( CTRL B )
 6 VARIABLE CNT
 7 : MS 0 DO 5 0 DO LOOP LOOP ;
 8 : ?T ?TERMINAL IF QUIT ENDIF ;
 9 : !AND OVER C@ AND SWAP C! ;
10 : !OR  OVER C@ OR SWAP C! ;
11 : PGML  DRB FB !AND ;
12 : PGMH  DRB 04 !OR ;
13 : CEL   DRB DF !AND ;
14 : CEH   DRB 20 !OR ;
15 : OEL   DRB EF !AND ;
16 : OEH   DRB 10 !OR ;
17 : VPPL  DRB 80 !OR ;
18 : VPPH  DRB 7F !AND ;
19
20 : INA CRA FB !AND  0 DRA C! CRA 4 !OR ;
21 : OTA CRA FB !AND FF DRA C! CRA 4 !OR ;
22 : OTB CRB FB !AND FF DRB C! CRB 4 !OR ;
23
53
 0 ( PROM PROGRAMMER ) ;S HEX
 1
 2 : CAL CRA C@ 38 OR F7 AND CRA C! ;
 3 : CAH CRA 38 !OR ;
 4 : CBL CRB C@ 38 OR F7 AND CRB C! ;
 5 : CBH CRB 38 !OR ;
 6
 7 : INI OTB INA PGMH CEH OEH
 8   DRB FC !AND
 9   VPPL CEH PGMH OEH ;
10 : RES CBH CBL 0 CNT !
11   DRB FC !AND ;
12 : COU CAL CAH 1 CNT +! ;
13 : INCR ( INCREMENT HIGH BITS )
14   DRB C@ DUP 1+ 3 AND SWAP FC AND OR
15   DRB C! ;
16 : BUMP COU CNT @ 0FFF AND 0=
17   IF INCR ENDIF ;
18 : ZAP PGML 35 MS PGMH ;
19 : SETS -DUP IF 0 DO BUMP LOOP THEN ;
20
21
22
23 scr #  54
 0 ( PROM PROGRAMMER ) ;S HEX
 1
 2 : BURN  CEL VPPH OTA RES SETS
 3   OVER + SWAP
 4   DO I C@ DRA C! ZAP BUMP ?T LOOP INI ;
 5 : READ  INA CEL OEL RES SETS
 6   OVER + SWAP
 7   DO DRA C@ I C! BUMP ?T LOOP INI ;
 8 : GET  30 EOV RAM
 9   DO I OVER 1 R/W 1+ 400 +LOOP DROP ;
10 : SAVE 30 EOV RAM
11   DO I OVER 0 R/W 1+ 400 +LOOP DROP ;
12 : START GET RE ;
13 : ROM0 INI AIM 1000 0 BURN
14   AIM 3000 + 800 1000 BURN ;
15 : ROM1 INI AIM 1000 + 2000 0 BURN ;
```

```
16 DECIMAL                                        16
17 : COPIER 141 1 5 BLKCOPY SAVE-IMAGE            17
18   SAVE ;                                       18
19                                                19
20                                                20
21                                                21
22                                                22
23                                                23
```
55
```
 0                                                 0
 1                                                 1
 2                                                 2
 3                                                 3
 4                                                 4
 5                                                 5
 6                                                 6
 7                                                 7
 8                                                 8
 9                                                 9
10                                                10
11                                                11
12                                                12
13                                                13
14                                                14
15                                                15
16                                                16
17                                                17
18                                                18
19                                                19
20                                                20
21                                                21
22                                                22
23                                                23
``` scr #   56
```
 0 ( writing a target image to disk ) HEX         0 ( writing a target image to disk ) HEX
 1                                                 1
 2 VARIABLE NAMED    0 NAMED !                     2 NAMED is used to determine which half of
 3 VARIABLE PRINTING  1 PRINTING !                 3  the page to print listing; a toggle
 4                                                 4
 5 : ?CR   ( -- ) NAMED @ 1 XOR DUP NAMED !        5 PRINTING is a flag to determine if a
 6   IF CR 0 OUT !                                 6  listing is to be printed.
 7   ELSE 28 OUT @ - SPACES THEN ;                 7
 8                                                 8 ?CR  ( -- )
 9 : LPON?   PRINTING @ IF LON THEN ;              9   formatting word for printing listing
10 : LPDONE  PRINTING @ IF FORM LOFF THEN ;       10   during compilation.
11                                                11
12 : >DISK    ( a n # ->  | copy # bytes          12 : LPON?  PRINTING @ IF LON THEN ;
13             from address a to block n )        13 : LPDONE PRINTING @ IF FORM LOFF THEN ;
14   400 /MOD SWAP >R                             14
15   OVER + DUP >R    SWAP DO                     15 >DISK   ( a n # --)
16     DUP I BLOCK 400 CMOVE                      16  copy # bytes from address a to block n.
17     UPDATE FLUSH  400 +                        17
18   LOOP   R> BLOCK  R> CMOVE                    18
19   UPDATE FLUSH ;                               19
20                                                20
21                                                21
22                                                22
23                                                23
```

57
```
  0 ( LISTIT, INDEXIT )
  1
  2 : PRINIT
  3   LON 27 EMIT 77 EMIT 27 EMIT 61 EMIT ;
  4 : PLIST BASE @ ROT ROT DECIMAL PRINIT
  5   1+ SWAP DO I 2+ I DO
  6     I BLOCK I 140 + BLOCK
  7     ."       SCR # " I 0 3 D.R
  8     ."
  9      SCR # " I 140 + 0 3 D.R CR
 10     25 0 DO ."              "
 11     I 0 3 D.R ." " 40 0 DO
 12       OVER J 40 * I + + C@ EMIT LOOP
 13     ."    "
 14     I 0 3 D.R ." " 40 0 DO
 15       DUP J 40 * I + + C@ EMIT LOOP CR
 16     LOOP CR CR CR CR DROP DROP
 17   LOOP FORM 2 +LOOP LOFF BASE ! ;
 18 : PINDEX DECIMAL PRINIT 1+ SWAP DO
 19   I 60 + 281 MIN I DO I BLOCK I 0 4 D.R
 20   ."  " 40 0 DO DUP I + C@ EMIT LOOP CR
 21   DROP LOOP FORM 60 +LOOP LOFF ;
 22
 23
```

```
  0 ( LISTIT, INDEXIT ) DECIMAL
  1
  2 : PRINIT
  3   printer initialization string.
  4
  5 : PLIST
  6
  7
  8 : PINDEX
  9
``` scr # 58
```
  0 ( LISTIT, INDEXIT & LOAD CONTROL )
  1
  2 : LISTIT BASE @ ROT ROT DECIMAL PRINIT
  3   1+ SWAP DO I 4 + I DO
  4     I BLOCK I 1+ BLOCK
  5     ."       SCR # " I 0 3 D.R
  6     ."
  7      SCR # " I 1+ 0 3 D.R CR
  8     25 0 DO ."              "
  9     I 0 3 D.R ." " 40 0 DO
 10       OVER J 40 * I + + C@ EMIT LOOP
 11     ."    "
 12     I 0 3 D.R ." " 40 0 DO
 13       DUP J 40 * I + + C@ EMIT LOOP CR
 14     LOOP CR CR CR CR DROP DROP
 15   2 +LOOP FORM 4 +LOOP LOFF BASE ! ;
 16 : INDEXIT DECIMAL PRINIT 1+ SWAP DO
 17   I 48 + 281 MIN I DO I BLOCK I 0 4 D.R
 18   ."  " 40 0 DO DUP I + C@ EMIT LOOP CR
 19   DROP LOOP FORM 48 +LOOP LOFF ;
 20
 21
 22
 23
```

```
  0 ( LISTIT, INDEXIT & LOAD CONTROL )
  1
  2 : LISTIT
  3
  4 : INDEXIT
```

59

```
10
11
12
13
14
15
16
17
18
19
20
21
22
23
```

```
10
11
12
13
14
15
16
17
18
19
20
21
22
23
``` scr #  60
```
 0 ( BOOT1 copy EDDE to ramcard ) HEX
 1
 2 FRAG BOOT1   SEI, 00 #B LDA,
 3 67F8 STA, 67F9 STA,       ( disk id )
 4 3C STA, 42 STA,
 5 20 #B LDA, 3D STA, 43 STA,
 6 2F #B LDA, 3F STA, FF #B LDA, 3E STA,
 7 SEC, C311 JSR,   ( auxmove )
 8 C009 STA, C083 LDA, C083 LDA,
 9 00 #B LDA, 3C STA, 42 STA,
10 20 #B LDA, 3D STA, D0 #B LDA, 43 STA,
11 2F #B LDA, 3F STA, FF #B LDA, 3E STA,
12 SEC, C311 JSR,   ( auxmove )
13 C08F LDA, C08F LDA,
14 00 #B LDA, 3C STA, 42 STA,
15 38 #B LDA, 3D STA, D0 #B LDA, 43 STA,
16 67 #B LDA, 3F STA, FF #B LDA, 3E STA,
17 SEC, C311 JSR,   ( auxmove )
18 C005 STA, C003 STA,
19 0 #B LDA, 39E STA, ( force cold start)
20 D200 JMP,
21
22
23
```

```
 0 FRAG BOOT1
 1 PURPOSE: move EDDE image to romcard.
 2
 3
 4
 5
 6
 7
 8
 9
10
11
12
13
14
15
16
17
18
19
20
21
22
23
```

61
```
 0 ( 2.REVERSE ) HEX
 1
 2 ( START   LENGTH --- )
 3 FRAG 2.REVERSE
 4 0 SP) LDA, X0 STA,
 5 1 SP) LDA, X0 1+ STA,
 6 2 SP) LDA, X1 STA,
 7 3 SP) LDA, X1 1+ STA,
 8 INX, INX, INX, INX, XSAVE STX,
 9 0 #B LDX,
10
11
12
13
14
15
16
17
18
19
20
```

```
 0 FRAG 2.REVERSE ( start length -- )
 1 PURPOSE: reverse the order of bytes,
 2 e.g., first byte is placed at the end,
 3 last byte is placed at the beginning.
 4 REASON: to move a section of a length
 5 from 1 end to the other in place (ie,
 6 without a buffer of equal length) can
 7 be done with a reverse of the entire
 8 section then reversal of 2 subsets of
 9 the length.
10
11 store the length in X0, the starting
12  address in X1.
13 set X-reg to 0 to defeat addressing
14  mode (eg, LDA($z-page-adr,X)).
15 while the length is greater than 2,
16  decrement the number of pages (X0),
17  set X2 to be equal to X0+X1 minus
18  1 page and decrement X0+1.
19  swap 1 page of bytes betw X0,Y (Y=FF)
20   and (X2,X) (X=0).
```

```
 21
 22
 23
```

```
 21  exchange the last bytes.
 22  ...
 23
``` scr #   62
```
  0 ( 2.REVERSE ... ) HEX
  1
  2 BEGIN, X0 1+ LDA, 2 #B CMP, CS
  3 WHILE, X0 1+ DEC, CLC,
  4 X1 LDA, X0 ADC, X2 STA,
  5 X1 1+ LDA, X0 1+ ADC, X2 1+ STA,
  6 X0 1+ DEC, OFF #B LDY,
  7 BEGIN,  X1 )Y LDA, X3 STA,
  8   X2 X) LDA, X1 )Y STA, X3 LDA,
  9   X2 X) STA, DEY, X2 INC, EQ
 10 UNTIL, X2 1+ INC, OFF #B CPY, NE
 11 IF, 0 #B CPY, NE
 12   IF,
 13   BEGIN,
 14     X1 )Y LDA, X3 STA, X2 X) LDA,
 15     X1 )Y STA, X3 LDA, X2 X) STA,
 16     X2 INC, DEY, EQ
 17   UNTIL,
 18   ENDIF,
 19   X1 )Y LDA, X3 STA, X2 X) LDA,
 20   X1 )Y STA, X1 )Y STA, X3 LDA,
 21   X2 X) STA,
 22   ENDIF, X1 1+ INC,
 23 REPEAT,
```

```
  0 ( 2.REVERSE... ) HEX
  1
  2 BEGIN, X0 1+ LDA, 2 #B CMP, CS
  3 WHILE, X0 1+ DEC, CLC,
  4 X1 LDA, X0 ADC, X2 STA,
  5 X1 1+ LDA, X0 1+ ADC, X2 1+ STA,
  6 X0 1+ DEC, OFF #B LDY,
  7 BEGIN, X1 )Y LDA, X3 STA,
  8   X2 X) LDA, X1 )Y STA, X3 LDA,
  9   X2 X) STA, DEY, X2 INC, EQ
 10 UNTIL, X2 1+ INC, OFF #B CPY, NE
 11 IF, 0 #B CPY, NE
 12   IF,
 13   BEGIN,
 14     X1 )Y LDA, X3 STA, X2 X) LDA,
 15     X1 )Y STA, X3 LDA, X2 X) STA,
 16     X2 INC, DEY, EQ
 17   UNTIL,
 18   ENDIF,
 19   X1 )Y LDA, X3 STA, X2 X) LDA,
 20   X1 )Y STA, X1 )Y STA, X3 LDA,
 21   X2 X) STA,
 22   ENDIF, X1 1+ INC,
 23 REPEAT,
```

63
```
  0 ( 2.REVERSE ... ) HEX
  1
  2 X0 LDA, .A LSR, CLC,
  3 X0 1+ LDY, NE IF, 80 #B ADC, ENDIF,
  4 TAY,
  5 X1 ADC, X2 STA, 0 #B LDA,
  6 X1 1+ ADC, X2 1+ STA,
  7 X0 LSR, CS
  8 IF, X2 INC, EQ IF, X2 1+ INC, ENDIF,
  9 ENDIF,
 10 BEGIN, DEY, OFF #B CPY, NE
 11 WHILE,
 12 X1 )Y LDA, X3 STA,
 13 X2 X) LDA, X1 )Y STA,
 14 X3 LDA, X2 X) STA,
 15 X2 INC, EQ IF, X2 1+ INC, ENDIF,
 16 REPEAT,
 17 XSAVE LDX, <XNEXT> JMP,
 18
 19
 20
 21
 22
 23
```

```
  0 ( 2.REVERSE... ) HEX
  1
  2 X0 LDA, .A LSR, CLC,
  3 X0 1+ LDY, NE IF, 80 #B ADC, ENDIF,
  4 TAY,
  5 X1 ADC, X2 STA, 0 #B LDA,
  6 X1 1+ ADC, X2 1+ STA,
  7 X0 LSR, CS
  8 IF, X2 INC, EQ IF, X2 1+ INC, ENDIF,
  9 ENDIF,
 10 BEGIN, DEY, OFF #B CPY, NE
 11 WHILE,
 12 X1 )Y LDA, X3 STA,
 13 X2 X) LDA, X1 )Y STA,
 14 X3 LDA, X2 X) STA,
 15 X2 INC, EQ IF, X2 1+ INC, ENDIF,
 16 REPEAT,
 17 XSAVE LDX, <XNEXT> JMP,
 18
 19
 20
 21
 22
 23
``` scr #   64
```
  0 ( 2.QUE ) HEX
  1
  2 FRAG 2.QUE  C010 STA,
  3 FF #B CMP, 0 #B ADC,
  4 7F #B AND, 20 #B CMP, NC
```

```
  0 FRAG 2.QUE ( --)
  1 PURPOSE: add a character to key queue
  2  during pattern search.
  3
  4 clear keyboard buffer.
```

```
  5  IF, TAY, HIMEM ,Y LDA, ENDIF,              5  decode key.
  6  CHAR LDY, PL                               6  if a regular character then add
  7  IF, 80 #B ORA, CHAR STA,                   7   to key queue.
  8  ELSE, QIN LDY, KQUE ,Y STA, DEY, MI        8
  9   IF, 4 #B LDY, ENDIF, QIN STY,             9
 10  ENDIF, RTS,                               10  NOTE: A-reg holds C000 value before
 11                                            11   calling this routine.
 12                                            12
 13                                            13
 14                                            14
 15                                            15
 16                                            16
 17                                            17
 18                                            18
 19                                            19
 20                                            20
 21                                            21
 22                                            22
 23                                            23

65
  0  ( MATCH ) HEX                              0  FRAG MATCH  ( 0 -- 0 | addr )
  1                                             1  PURPOSE: compare pattern at PATT to text
  2  FRAG MATCH                                 2   at X0+Y.
  3  X3 STY,  TYA, CLC,                         3
  4  PATT ADC, TAY, PATT LDX,                   4  input:
  5  BEGIN,  DEY, DEX, PL                       5    X0        address of text
  6  WHILE,                                     6    Y         offset beyond X0      X3
  7   PATT 1+ ,X LDA, 61 #B CMP, CS             7    PATT      length of pattern     X
  8   IF, 7B #B CMP, CS                         8    PATT+1    pattern (X chars)
  9    IF, X0 )Y CMP, NE                        9
 10     IF, X3 LDY, RTS, ENDIF,                10  store pattern length + offset in Y
 11    ELSE, X0 )Y EOR, 0DF #B AND, NE         11  store pattern length            in X
 12     IF, X3 LDY, RTS, ENDIF,                12  for each character in pattern
 13    ENDIF,                                  13   get the character from PATT
 14   ELSE, X0 )Y CMP, NE                      14   if it is lower case (61 thru 7A)
 15    IF, X3 LDY, RTS, ENDIF,                 15    ignore case
 16   ENDIF,                                   16    if it doesn't match restore Y-reg.
 17  REPEAT,                                   17    else: if it doesn't match exactly:
 18  PLA, PLA, XSAVE LDX,                      18      restore Y register
 19  CLC, X3 LDA, X0 ADC, 0 SP) STA,           19  if all characters match:
 20  0 #B LDA, X0 1+ ADC, 1 SP) STA,           20   discard return address (to exit from
 21  <XNEXT> JMP,                              21    2.SEEK> or 2.SEEK<).
 22                                            22   restore X register
 23                                            23   add offset to address, place on stack scr # 66
  0  ( 2.SEEK> ) HEX                            0  FRAG 2.SEEK>
  1                                             1  ( leftside rightside -- addr | 0 )
  2  ( LEFTSIDE RIGHTSIDE -- ADDR | 0 )         2  PURPOSE: search for pattern among text
  3  FRAG 2.SEEK>                               3   characters from leftside to rightside.
  4  SEC,                                       4
  5  2 SP) LDA, X0 STA, 0 SP) SBC, X5 STA,      5  store leftside in X0
  6  3 SP) LDA, X0 1+ STA, 1 SP) SBC,           6  store negative of length of text to be
  7  X5 1+ STA, INX, INX, 0 #B LDA,             7   searched in X5
  8  0 SP) STA, 1 SP) STA, CS                   8  store default 0 on stack
  9  IF, <XNEXT> JMP, ENDIF,                    9  return on negative length
 10                                            10  save X register
 11  XSAVE STX, SEC,                           11  negate value in X5
 12  0 #B LDA, X5 SBC,  X5 STA,                12  store first two characters from PATT
 13  0 #B LDA, X5 1+ SBC, X5 1+ STA,           13   in X1 and X2, ignoring case
 14                                            14
 15  PATT 1+ LDA, 0DF #B AND, X1 STA,          15  NOTE1: 2.SEEK> is exitted when 2.MATCH
```

```
16   PATT 2+ LDA, ODF #B AND, X2 STA,         16   discards the return address of 2.SEEK>
17                                            17   or if no match is found.
18                                            18
19                                            19
20                                            20
21                                            21
22                                            22
23                                            23
67
 0  ( 2.SEEK> ... ) HEX                        0
 1                                             1   while there are more than 90 characters
 2  BEGIN, X5 LDA, 90 #B CMP,                  2    to be searched
 3   X5 1+ LDA, 0 #B SBC, CS                   3    for a pattern length of one
 4   WHILE, PATT LDY, DEY, EQ                  4     compare with 80 text characters
 5    IF, BEGIN, X0 )Y LDA, ODF #B AND,        5      ignoring case
 6     X1 CMP, EQ IF, \ MATCH JSR, ENDIF,      6     for each match: call MATCH
 7     INY, MI UNTIL,                          7    for a pattern length greater than one
 8    ELSE, 1 #B LDY,                          8     for the first 80 text characters
 9     BEGIN, X0 )Y LDA, ODF #B AND, X2 CMP,   9      incrementing two at a time
10      EQ IF, DEY, X0 )Y LDA, ODF #B AND,    10      compare first two pattern characters
11      X1 CMP, EQ IF, \ MATCH JSR, ENDIF,    11       ignoring case
12      INY, X0 )Y LDA, ODF #B AND, ENDIF,    12      for each matched pair: call MATCH
13      INY, X1 CMP, EQ                       13    check for key press, call .QUE if need
14      IF, X0 )Y LDA, ODF #B AND, X2 CMP,    14     to add character to key queue after
15      EQ IF, DEY, \ MATCH JSR, INY, ENDIF,  15     every 80 characters searched.
16      ENDIF, INY, MI UNTIL,                 16    increment address of text to be
17    ENDIF, CLC,                             17     searched by 80
18    C000 LDA, MI IF, \ 2.QUE JSR, ENDIF,    18    decrement length to be searched by 80
19    X0 LDA, 80 #B ADC, X0 STA, CS           19
20    IF, X0 1+ INC, ENDIF, SEC,              20
21    X5 LDA, 80 #B SBC, X5 STA, NC           21
22    IF, X5 1+ DEC, ENDIF,                   22
23   REPEAT,                                  23 scr #    68
 0  ( 2.SEEK> ... ) HEX                        0
 1                                             1   for the last hunk of text
 2   0 #B LDY,                                 2    for each character match ignoring
 3   BEGIN,                                    3     case: call MATCH
 4    X0 )Y LDA, ODF #B AND, X1 CMP, EQ        4   match failed
 5    IF, \ MATCH JSR, ENDIF,                  5   restore X register
 6    INY, X5 CPY, EQ                          6
 7   UNTIL,                                    7
 8   XSAVE LDX, <XNEXT> JMP,                   8
```

```
69
  0 ( 2.SEEK< ) HEX
  1
  2 ( LEFTSIDE RIGHTSIDE --- ADDR OR 0 )
  3 FRAG 2.SEEK<
  4 SEC,
  5 0 SP) LDA, X0 STA, 2 SP) SBC, X5 STA,
  6 1 SP) LDA, X0 1+ STA, 3 SP) SBC,
  7 X5 1+ STA,
  8 INX, INX, 0 #B LDY, 0 SP) STY,
  9 1 SP) STY, NC
 10 IF, <XNEXT> JMP, ENDIF,
 11 X5 ORA, EQ IF, <XNEXT> JMP, ENDIF,
 12 XSAVE STX,
 13
 14 PATT 1+ LDA, 0DF #B AND, X1 STA,
 15 PATT 2+ LDA, 0DF #B AND, X2 STA,
 16
 17
 18
 19
 20
 21
 22
 23
```

```
 0 FRAG 2.SEEK<
 1 ( leftside rightside -- addr | 0 )
 2 PURPOSE: search for pattern among text
 3 characters from rightside to leftside.
 4
 5 store rightside in X0
 6 store length of text to be searched
 7   in X5
 8 store default 0 on stack
 9 return on negative or zero length
10 save X register
11 store first two characters from PATT
12   in X1 and X2, ignoring case
13
14
15 NOTE1: 2.SEEK< is exitted when 2.MATCH
16 discards the return address of 2.SEEK<
17 or if no match is found.
18
19
20
21
22
23
```

```
scr #   70
  0 ( 2.SEEK< ... ) HEX
  1
  2 BEGIN, X5 LDA, 90 #B CMP,
  3   X5 1+ LDA, 0 #B SBC, CS
  4 WHILE, X0 LDA, 80 #B SBC, X0 STA, NC
  5   IF, X0 1+ DEC, SEC, ENDIF,
  6   X5 LDA, 80 #B SBC, X5 STA, NC
  7   IF, X5 1+ DEC, ENDIF,
  8   7F #B LDY, PATT LDX, DEX, EQ
  9   IF,
 10     BEGIN, X0 )Y LDA, 0DF #B AND,
 11     X1 CMP, EQ IF, \ MATCH JSR, ENDIF,
 12     DEY, MI UNTIL,
 13   ELSE, BEGIN, X0 )Y LDA, 0DF #B AND,
 14     X1 CMP, EQ IF, INY, X0 )Y LDA,
 15     0DF #B AND, DEY, X2 CMP, EQ
 16     IF, \ MATCH JSR, ENDIF, X0 )Y LDA,
 17     0DF #B AND, ENDIF, DEY, X2 CMP, EQ
 18     IF, X0 )Y LDA, 0DF #B AND, X1 CMP,
 19     EQ IF, \ MATCH JSR, ENDIF,
 20     ENDIF, DEY, MI UNTIL,
 21   ENDIF,
 22   C000 LDA, MI IF, \ 2.QUE JSR, ENDIF,
 23 REPEAT,
```

```
 0
 1 while there are more than 90
 2   characters to be searched
 3   decrement address of text to be
 4   searched by 80
 5   decrement length to be searched by 80
 6   for a pattern length of one
 7     compare with 80 text characters
 8     ignoring case
 9     for each match: call MATCH
10   for a pattern length greater than one
11     for the first 80 text characters
12     decrementing two at a time
13     compare first two pattern characters
14     ignoring case
15     for each matched pair: call MATCH
16   check for key press and add characters
17   to key queue as necessary after
18   searching every 80 characters.
19
20
21
22
23
```

```
71
  0 ( 2.SEEK< ... ) HEX
  1
  2 X0 LDA, X5 SBC, X0 STA, NC
  3 IF, X0 1+ DEC, ENDIF, X5 LDY,
  4
  5 BEGIN,
  6   X0 )Y LDA, 0DF #B AND, X1 CMP, EQ
  7   IF, \ MATCH JSR, ENDIF,
  8   DEY, EQ
  9 UNTIL,
```

```
 0
 1 for less than 90 characters to be
 2   searched
 3   for each character match, ignoring
 4   case: call MATCH
 5 match failed
 6 restore X register
 7
 8
 9
```

```
10
11 XSAVE LDX, <XNEXT> JMP,
12
13
14
15
16
17
18
19
20
21
22
23
```

```
10
11
12
13
14
15
16
17
18
19
20
21
22
23
``` scr #  72
```
 0 ( 2.ADJUST ) HEX
 1 FRAG 2.ADJUST
 2 0 #B LDY, Y1 STY, Y2 STY,
 3 WR    LDA, EOS    CMP,
 4 WR 1+ LDA, EOS 1+ SBC,
 5 WC LDA, Y0 STA, CS
 6 IF, <XNEXT> JMP, ENDIF,
 7 WR ADC, X1 STA, TYA,
 8 WR 1+ ADC, X1 1+ STA, ( X1=LINE END )
 9 BOS LDA, X1 CMP,
10 BOS 1+ LDA, X1 1+ SBC, CS
11 IF, ( BOS>=LINE END )
12   X1 LDA, EBOT SBC, X0 STA,
13   X1 1+ LDA, EBOT 1+ SBC, NC
14   IF, <XNEXT> JMP, ENDIF,
15   X1    LDA, BEOT    CMP,
16   X1 1+ LDA, BEOT 1+ SBC, CS
17   IF, <XNEXT> JMP, ENDIF, SEC,
18   BOS LDA, BEOT SBC, X2 STA,
19   BOS 1+ LDA, BEOT 1+ SBC, X2 1+ STA,
20   X2 LDA, X0 SBC,
21   X2 1+ LDA, 0 #B SBC, CS
22   IF, <XNEXT> JMP, ENDIF,
23 ENDIF,
```

```
 0 FRAG 2.ADJUST
 1 PURPOSE: calculates offsets to normal
 2 and inverse fields during display
 3 of a line.
 4
 5 clear Y-reg, Y1 and Y2.
 6 subtract EOS from WR (setting carry).
 7 store wrap count in Y0.
 8 if wrap address >= to EOS then exit.
 9 otherwise add wrap count to wrap address
10 and store answer in X1 (line end).
11 if BOS >= line end (X1) and
12 if EBOT > line end (X1) then exit
13   else store line end (X1) - EBOT in X0.
14 otherwise (BOS still >= line end and)
15 if line end (X1) >= BEOT then exit.
16 otherwise store BOS - BEOT in X2.
17 if (BOS-BEOT) >= (line end-EBOT)
18   then exit.
19
20
21
22
23
```

73
```
 0 ( 2.ADJUST ... ) HEX
 1
 2 BOS LDA, X2 STA,
 3 BOS 1+ LDA, X2 1+ STA,
 4 EOS LDA, X3 STA,
 5 EOS 1+ LDA, X3 1+ STA,
 6 BEOT LDA, X1 CMP,
 7 BEOT 1+ LDA, X1 1+ SBC, CS
 8 IF, X2 LDA, BEOT CMP,
 9   X2 1+ LDA, BEOT 1+ SBC, CS
10   IF, X2 LDA, GAP SBC, X2 STA,
11    X2 1+ LDA, GAP 1+ SBC, X2 1+ STA,
12   ENDIF,
13   X3 LDA, BEOT CMP,
14   X3 1+ LDA, BEOT 1+ SBC, CS
15   IF, X3 LDA, GAP SBC, X3 STA,
16    X3 1+ LDA, GAP 1+ SBC, X3 1+ STA,
17   ENDIF,
18 ENDIF,
19
```

```
 0
 1 otherwise store BOS in X2 and EOS
 2   in X3.
 3 if BEOT >= line end (X1) and
 4 if BOS (X2) >= BEOT then store BOS -
 5   GAP in X2.
 6 if EOS (X3) >= BEOT then store EOS -
 7   GAP in X3.
 8
 9
10
11
12
13
14
15
16
17
18
19
```

```
scr #   74
  0 ( 2.ADJUST ... ) HEX                              0
  1                                                   1 if wrap address >= BOS and
  2 WR LDA, X2 CMP, ( WRAP>=BOS )                     2  if EOS (X3) >= line end (X1)
  3 WR 1+ LDA, X2 1+ SBC, CS                          3  then store Y0 in Y1
  4 IF, X3 LDA, X1 CMP, ( EOS>=ENDLINE )              4  else store EOS (X1) - wrap address
  5 X3 1+ LDA, X1 1+ SBC, CS                          5   in Y1, Y2.
  6 IF, Y0 LDA, Y1 STA,                               6  store Y-reg in Y0.
  7 ELSE, SEC, X3 LDA, WR SBC, Y1 STA,                7 else (WRAP<BOS)
  8   SEC, X1 LDA, X3 SBC, Y2 STA,                    8  store BOS (X2) - wrap address in Y0,
  9 ENDIF, Y0 STY,                                    9  if EOS >= line end then
 10 ELSE, SEC, ( WRAP<BOS )                          10   store Y1 with line end (X1) - BOS (X2)
 11 X2 LDA, WR SBC, Y0 STA,                          11 exit
 12 X3 LDA, X1 CMP, ( EOS>=ENDLINE )                 12
 13 X3 1+ LDA, X1 1+ SBC, CS                         13
 14 IF, X1 LDA, X2 SBC, Y1 STA,                      14
 15 ELSE, SEC,                                       15
 16   X3 LDA, X2 SBC, Y1 STA, SEC,                   16
 17   X1 LDA, X3 SBC, Y2 STA,                        17
 18 ENDIF,                                           18
 19 ENDIF,                                           19
 20 <XNEXT> JMP,                                     20
 21                                                  21
 22                                                  22
 23                                                  23
75
  0 ( 2.TOBUFF ) HEX                                  0 FRAG 2.TOBUFF
  1                                                   1 PURPOSE: convert/move text to display
  2 FRAG 2.TOBUFF                                     2  buffer highlighting selected text.
  3 XSAVE STX,                                        3   CAPS = 0 thru 1F
  4 50 #B LDY, WC CPY, NE                             4   cr = 7F
  5 IF, A0 #B LDA,                                    5  normal text with high bit on
  6   BEGIN, DEY, CURR ,Y STA, WC CPY, EQ             6   cr = A0
  7   UNTIL,                                          7
  8 ENDIF, DEY,                                       8  input:
  9 Y2 LDX, NE                                        9   WC      count of characters from text
 10 IF, WR )Y LDA, 1D #B CMP, EQ                     10   WR      address of text
 11   IF, A0 #B LDA, CURR ,Y STA, DEY, DEX,          11   Y2      count of trailing blanks
 12 ENDIF, NE                                        12   Y1      count of selected text
 13 IF,                                              13   PRINT? flag    true if printing
 14   BEGIN, WR )Y LDA, 80 #B ORA,                   14                  false if displaying
 15   CURR ,Y STA, DEY, DEX, EQ                      15   Y0      count of leading normal text
 16   UNTIL,                                         16
 17 ENDIF, ENDIF,                                    17  output:
 18                                                  18   CURR display buffer holds converted
 19                                                  19    text
 20                                                  20
 21                                                  21
 22                                                  22
 23                                                  23 scr #   76
  0 ( 2.TOBUFF ... ) HEX                              0
  1                                                   1
  2 Y1 LDX, NE                                        2
  3 IF, WR )Y LDA, 1D #B CMP, EQ                      3
```

```
 4  IF, 7F #B LDA, CURR ,Y STA, DEY, DEX,       4
 5  ENDIF, NE                                   5
 6  IF,                                         6
 7   BEGIN, PRINT? LDA, EQ                      7
 8    IF, WR )Y LDA, 40 #B CMP, CS              8
 9     IF, 60 #B CMP, NC                        9
10      IF, 1F #B AND, ENDIF,                  10
11     ENDIF,                                  11
12    ELSE, WR )Y LDA,                         12
13    ENDIF, CURR ,Y STA,                      13
14    DEY, DEX, EQ                             14
15   UNTIL,                                    15
16 ENDIF, ENDIF,                                16
17                                             17
18                                             18
19                                             19
20                                             20
21                                             21
22                                             22
23                                             23
77
 0 ( 2.TOBUFF ... ) HEX                         0
 1                                              1
 2 YO LDX, NE                                   2
 3 IF, WR )Y LDA, 1D #B CMP, EQ                 3
 4  IF, A0 #B LDA, CURR ,Y STA, DEY, DEX,       4
 5  ENDIF, NE                                   5
 6  IF,                                         6
 7   BEGIN, WR )Y LDA, 80 #B ORA,               7
 8    CURR ,Y STA, DEY, MI                      8
 9   UNTIL,                                     9
10 ENDIF, ENDIF,                                10
11 XSAVE LDX, <XNEXT> JMP,                     11
12                                             12
13                                             13
14                                             14
15                                             15
16                                             16
17                                             17
18                                             18
19                                             19
20                                             20
21                                             21
22                                             22
23                                             23
``` scr #  78

```
 0 ( 2.PRESET ) HEX                             0 2.PRESET
 1                                              1 PURPOSE: Decides what line to refresh,
 2 FRAG 2.PRESET                                2 gets variables from window arrays,
 3  OLIN LDY, WND2 ,Y LDA, EQ                   3 moves 82 bytes at BEOT to EBOT to wrap
 4  IF, DEY, ( 1ST LINE ON PAGE) ENDIF,         4
 5  DEY, MI IF, 0 #B LDY, ENDIF,                5 input: OLIN WND0-3
 6  CLIN STY, CLC,                              6 output: CLIN LCTR WR LCT PCT GAP
 7  CLIN LDA, TOP ADC, LCTR STA,                7
 8  0 #B LDA, TOP 1+ ADC, LCTR 1+ STA,          8 OLIN is line# of the last event.
 9  WND0 ,Y LDA, WR STA,                        9 WND2 is page relative line count.
10  WND1 ,Y LDA, WR 1+ STA,                    10 If the old line is at the top of a page
11  WND2 ,Y LDA, LCT STA,                      11 wrap beginning with the last line in
12  WND3 ,Y LDA, PCT STA,                      12 the preceding page.
13  EBOT    LDA, XO STA,                       13 else wrap beginning with the line above
14  EBOT 1+ LDA, XO 1+ STA,                    14 ie:
```

```
15  BEOT    LDA, X1 STA,                          15  CLIN = OLIN - 1 (not first line)
16  BEOT 1+ LDA, X1 1+ STA,    51 #B LDY,         16  CLIN = OLIN - 2 (first line on page)
17  BEGIN, X1 )Y LDA, X0 )Y STA, DEY, MI          17  CLIN = 0 (first line in text)
18  UNTIL, SEC,                                   18  LCTR = TOP + CLIN
19  BEOT LDA, EBOT SBC, GAP STA,                  19  WR   = CLINth element in WND0 and WND1
20  BEOT 1+ LDA, EBOT 1+ SBC, GAP 1+ STA,         20  LCT  = "                         WND2
21  <XNEXT> JMP,                                  21  PCT  = "                         WND3
22                                                22  Move 82 bytes at BEOT to EBOT.
23                                                23  GAP = BEOT - EBOT
79
 0  ( 2.40COL 2.MON 2.ABOOT )  HEX                 0  FRAG 2.40COL
 1                                                 1  PURPOSE: set 40 column display.
 2  FRAG 2.40COL                                   2
 3  C051 LDA, C00E STA,                            3  FRAG 2.ABOOT
 4  C056 LDA, C00C STA,                            4  PURPOSE: boot apple disk.
 5  C054 LDA, C000 STA,                            5
 6  F0 #B LDA,  36 STA,                            6  FRAG 2.MON
 7  FD #B LDA,  37 STA,                            7  PURPOSE: go to monitor from SWYFTCARD.
 8  FF #B LDA,  32 STA,                            8
 9  0 #B LDA,  24 STA,  25 STA, RTS,               9
10                                                10
11  FRAG 2.ABOOT    \ 2.40COL JSR,                11
12  0 #B LDA, 3F4 STA, 39E STA, 3E0 JMP,          12
13                                                13
14  ( copy text & variables to main ram )         14
15  FRAG 2.MON    \ 2.40COL JSR, FFF8 LDA,        15
16  EQ IF,  3C STA, 3D STA, 42 STA, 43 STA,       16
17    EBOT LDA, 3E STA,                           17
18    EBOT 1+ LDA, 3F STA,   CLC, C311 JSR,       18
19    BEOT LDA, 3C STA, 42 STA,                   19
20    BEOT 1+ LDA, 3D STA, 43 STA,                20
21    FF LDA, 3E STA,                             21
22    BF #B LDA, 3F STA,   CLC, C311 JSR,         22
23  ENDIF, <MON> JMP,                             23 scr #   80
 0  ( 2.<READ> )    HEX                            0  2.<READ>  ( -- )
 1                                                 1  PURPOSE: read a track (located by SEEK)
 2  FRAG 2.<READ>-                                 2    to ram (B3F0 through BFFF)
 3  XSAVE STX, F0 #B LDY,                          3    including a 16 byte preface
 4  0 #B LDA, X0 STA, B3 #B LDX,                   4
 5  X0 1+ STX, C0 #B LDA, X5 STA, CLV,             5
 6  SEI,                                           6
 7  BEGIN,                                         7
 8    BEGIN, C0EC LDA, MI UNTIL,                   8
 9    BEGIN, SWAP                                  9
10    BEGIN, SWAP ED #B CMP, EQ UNTIL,            10
11    BEGIN, C0EC LDA, MI UNTIL,                  11
12    DE #B CMP, EQ                               12
13  UNTIL, BEGIN, C0EC LDA, MI UNTIL,             13
14    DA #B CMP, EQ                               14
15  UNTIL,                                        15
16  BEGIN,                                        16
17    BEGIN, C0EC LDA, MI UNTIL,                  17
18    SEC, .A ROL, X2 STA, OFF #B CPY, EQ         18
19    IF, INX, X5 CPX, -1 DP +! ELSE,             19
20    X5 HERE 3 - C! CLC, ENDIF,                  20
21    BEGIN, C0EC LDA, MI UNTIL,                  21
22    X2 AND, X0 )Y STA, INY, X0 1+ STX, CS       22
23  UNTIL, XSAVE LDX, CLI, <XNEXT> JMP,           23
```

81
```
  0 ( *100US PHSW PHSW2 ONDL OFFDL ) HEX
  1
  2 FRAG *100US
  3 BEGIN, 11 #B LDX,
  4   BEGIN, DEX, EQ UNTIL,
  5   NOP, NOP, NOP, NOP, SEC, 1 #B SBC, EQ
  6 UNTIL, RTS,
  7
  8 FRAG PHSW  TRACK LDA,
  9 FRAG PHSW2 3 #B AND, .A ROL, TAX,
 10   COE0 ,X LDA, RTS,
 11
 12 FRAG ONDL
 13   3001 , 2428 , 1E20 , 1C1D , 1C1C ,
 14   1C1C ,
 15
 16 FRAG OFFDL
 17   2C70 , 2226 , 1E1F , 1C1D , 1C1C ,
 18   1C1C ,
 19
 20 FRAG DL12  RTS,
 21
 22 FRAG WB30 NOP, PHA, PLA, COED ,X STA,
 23   COEC ,X CMP, RTS,
```

```
  0 FRAG *100US ( A-reg -- )
  1 PURPOSE: delay by value in A-reg times
  2 100us.
  3
  4 FRAG PHSW  TRACK LDA,
  5 LABEL PHSW2 3 #B AND, .A ROL, TAX,
  6   COE0 ,X LDA, RTS,
  7
  8 FRAG ONDL
  9   3001 , 2428 , 1E20 , 1C1D , 1C1C ,
 10   1C1C ,
 11
 12 FRAG OFFDL
 13   2C70 , 2226 , 1E1F , 1C1D , 1C1C ,
 14   1C1C ,
 15
 16 FRAG DL12  ( -- )
 17   delay 12 machine cycles
 18
 19 FRAG WB30  ( -- )
 20   write a byte in 30 machine cycles
 21
 22
 23
``` scr #   82
```
  0 ( 2.<WRITE> ) HEX
  1
  2 FRAG 2.<WRITE> XSAVE STX, 0D #B LDA,
  3   X5 STA, B3 #B LDY, X0 1+ STY, CLV,
  4   0 #B LDX, X0 STX,
  5   0F0 #B LDY, TYA, PHA,
  6   SEI,
  7   COED ,X LDA, COEE ,X LDA, 0 #B LDY,
  8   OFF #B LDA, COEF ,X STA, COEC ,X CMP,
  9   PHA, PLA,
 10   BEGIN, \ DL12 JSR, \ DL12 JSR,
 11     COED ,X STA, COEC ,X CMP, NOP, DEY, EQ
 12   UNTIL, ED #B LDA, \ WB30 JSR,
 13   DE #B LDA, \ WB30 JSR, \ DL12 JSR,
 14   X0 LDA,
 15   DA #B LDA, COED ,X STA, COEC ,X CMP,
 16   PLA, TAY,
```

```
  0 FRAG 2.<WRITE>  ( -- )
  1 write a track (32 cycles per byte)
  2 from ram (B3F0 through BFFF)
  3 including:
  4   256 self-sync (40 cycle) bytes
  5   an EDDE header (ED DE DA)
  6   a 16 byte preface
  7   a 3K track image
  8
  9 soft switches:
 10   COED, COEC write a byte
 11   COED, COEE sense write protect
 12   COEF set mode to write
 13
 14 start code at a page boundary
```

83
```
  0 ( 2.<WRITE> ... ) HEX
  1
  2 BEGIN, X0 LDA, X0 )Y LDA, PHA, .A LSR,
  3   AA #B ORA, NOP, COED ,X STA,
  4   COEC ,X CMP, INY, EQ
  5   IF, X0 1+ INC, X5 DEC,
  6     -1 DP +! ELSE,
  7     X5 HERE 3 - C! \ DL12 JSR,
  8   ENDIF,
  9   PLA, AA #B ORA, COED ,X STA,
```

```
10    COEC ,X CMP, X5 LDA, EQ
11    UNTIL,
12    NOP, NOP, \ DL12 JSR,
13    DA #B LDA, COED ,X STA, COEC ,X CMP,
14    NOP, NOP, NOP,
15    DE #B LDA, \ WB30 JSR,
16    FF #B LDA, \ WB30 JSR, X0 LDA, NOP,
17    \ DL12 JSR, COEE ,X LDA,
18    XSAVE LDX,
19    CLI, <XNEXT> JMP,
20
21 A0 ?FITS
22
23
``` scr #   84
```
 0 ( 2.<SEEK> ) HEX                              0 FRAG 2.<SEEK> ( t --)
 1                                               1 PURPOSE: seek to track t.
 2 FRAG 2.<SEEK> 0 SP) LDA, X2 STA,
 3  INX, INX, XSAVE STX, TRACK CMP, EQ
 4  IF, <XNEXT> JMP, ENDIF,
 5  0 #B LDA, X0 STA,
 6  SEI,
 7  BEGIN, TRACK LDA, X1 STA, SEC,
 8   X2 SBC, NE
 9   WHILE, NC
10    IF, OFF #B EOR, TRACK INC,
11    ELSE, OFE #B ADC, TRACK DEC,
12    ENDIF,
13    X0 CMP, CS IF, X0 LDA, ENDIF,
14    0C #B CMP, NC IF, TAY, ENDIF, SEC,
15    \ PHSW JSR, NOP, \ ONDL ,Y LDA, NOP,
16    \ *100US JSR, X1 LDA, CLC,
17    \ PHSW2 JSR, \ OFFDL ,Y LDA,
18    \ *100US JSR, X0 INC, EQ
19   UNTIL, HERE OVER - 1- SWAP C!
20   \ *100US JSR, CLC, \ PHSW JSR,
21   CLI,
22   XSAVE LDX, <XNEXT> JMP,
23
```

85
```
 0 ( 2.?EDDE ) HEX                               0 FRAG 2.?EDDE ( -- flag )
 1                                               1 PURPOSE: checks disk for EDDE header.
 2 FRAG 2.?EDDE 0 #B LDY, DEX, DEX,              2 true means the disk was written by
 3  XSAVE STX, 0 SP) STY, 1 SP) STY,             3 EDDE, which means that on that track
 4  20 #B LDX, SEI,                              4 can be found the bytes: ED DE DA.
 5  BEGIN,
 6   BEGIN,
 7    BEGIN, DEY, EQ
 8     IF, DEX, EQ
 9      IF, XSAVE LDX, CLI, <XNEXT> JMP,
10      ENDIF,
11     ENDIF,
12     BEGIN, COEC LDA, MI UNTIL,
13     OED #B CMP, EQ UNTIL,
14     BEGIN, COEC LDA, MI UNTIL,
15     DE #B CMP, EQ UNTIL,
16     BEGIN, COEC LDA, MI UNTIL,
17     DA #B CMP, EQ UNTIL,
18     XSAVE LDX, 0 SP) INC,
19     CLI, <XNEXT> JMP,
```

```
20
21
22
23 scr #   86
  0 ( 2.?APPLE ) HEX
  1
  2 FRAG 2.?APPLE  DEX, DEX, XSAVE STX,
  3 0 #B LDY, 0 SP) STY, 1 SP) STY,
  4 7C #B LDX, 20 #B LDA, Y0 STA,
  5 SEI,
  6 BEGIN, DEY, EQ
  7   IF, Y0 DEC, EQ
  8     IF, XSAVE LDX, CLI, <XNEXT> JMP,
  9     ENDIF,
 10   ENDIF,
 11 BEGIN, C070 ,X LDA, MI UNTIL,
 12 BEGIN, SWAP
 13   BEGIN, SWAP D5 #B CMP, EQ UNTIL,
 14   BEGIN, C070 ,X LDA, MI UNTIL,
 15   AA #B CMP, EQ UNTIL,
 16 BEGIN, C070 ,X LDA, MI UNTIL,
 17 96 #B CMP, EQ UNTIL,
 18 XSAVE LDX, 0 SP) INC,
 19 CLI, <XNEXT> JMP,
 20
 21
 22
 23

87
  0 ( 2.CMOVE2 from bank2 to B400 )
  1
  2 FRAG 2.CMOVE2
  3 0 #B LDA, X0 STA, X1 STA, TAY,
  4 1 SP) LDA, X0 1+ STA,
  5 B4 #B LDA, X1 1+ STA,
  6 INX, INX, XSAVE STX, 0C #B LDX,
  7 BEGIN,
  8 BEGIN, X0 )Y LDA, X1 )Y STA, INY, EQ
  9 UNTIL, X0 1+ INC, X1 1+ INC, DEX, EQ
 10 UNTIL,
 11 XSAVE LDX, <XNEXT> JMP,
 12
 13 FRAG 2.CHECKSUM ( -- # )
 14 F0 #B LDY, B3 #B LDA, X0 1+ STA,
 15 0 #B LDA, X0 STA,
 16 PHA, BEGIN, PLA,
 17   BEGIN, X0 )Y EOR, INY, EQ UNTIL,
 18   PHA, X0 1+ INC, X0 1+ LDA,
 19   C0 #B CMP, EQ UNTIL,
 20 DEX, DEX, PLA, 0 SP) STA,
 21 0 #B LDA, 1 SP) STA, <XNEXT> JMP,
 22
 23 scr #   88
  0 ( 2.?UPDATE ) HEX
  1
  2 FRAG 2.?UPDATE  0 SP) LDY,
```

```
20
21
22
23

0 FRAG 2.?APPLE  ( -- flag )
 1 PURPOSE: check disk for Apple header.
 2 true means initialized by Apple DOS
 3 (see ?EDDE).
 4
 5
 6
 7
 8
 9
10
11
12
13
14
15
16
17
18
19
20
21
22
23

0 FRAG 2.CMOVE2  ( a(hi) -- )  cmove from
 1 bank to B400
 2
 3
 4
 5
 6
 7
 8
 9
10
11
12
13 2.CHECKSUM ( -- # )
14   calculate the EXCLUSIVE-OR checksum
15   for the ram buffer (B3F0 through BFFF)
16
17 NOTE: if the checksum byte is zero,
18   and the checsum is placed there,
19   the new checksum will be zero
20
21
22
23

0 FRAG 2.?UPDATE ( line# -- flag )
 1 PURPOSE: update line in window array.
 2 true means changed.
```

```
 3 WR LDA, WND0 ,Y CMP, EQ                          3
 4 IF, WR 1+ LDA, WND1 ,Y CMP, EQ                   4 Y-reg holds the line#.
 5  IF, LCT LDA, WND2 ,Y CMP, EQ                    5 if the address of the line, the line on
 6   IF, PCT LDA, WND3 ,Y CMP, EQ                   6 the page and the current page have not
 7    IF, 0 #B LDA, 0 SP) STA, 1 SP) STA,           7 changed then put a 0 on the stack and
 8    <XNEXT> JMP,                                  8 exit.
 9 ENDIF, ENDIF, ENDIF, ENDIF,                      9 otherwise (the address, line or page
10 WR    LDA, WND0 ,Y STA,                         10 have changed) update that element in
11 WR 1+ LDA, WND1 ,Y STA,                         11 the window array and put a -1 on the
12 LCT LDA, WND2 ,Y STA,                           12 stack.
13 PCT LDA, WND3 ,Y STA,                           13
14 OFF #B LDA, 0 SP) STA, 1 SP) STA,               14
15 <XNEXT> JMP,                                    15
16                                                 16
17                                                 17
18                                                 18
19                                                 19
20                                                 20
21                                                 21
22                                                 22
23                                                 23
89
 0 ( 2.WRITE0 image ) HEX                          0 FRAG 2.WRITE0
 1                                                  1 PURPOSE: write boot 0 track to disk.
 2 FRAG 2.WRITE0   XSAVE STX,                       2
 3 SEI, 60 #B LDX, C08D ,X LDA,                     3
 4 C08E ,X LDA, 0 #B LDA,                           4
 5 TAY, X0 STA, X1 STA, C #B LDA, X2 STA,           5
 6 FF #B LDA, C08F ,X STA, C08C ,X CMP,             6
 7 DE #B LDA, X0 1+ STA, X0 1+ STA,                 7
 8 DF #B LDA, X1 1+ STA,                            8
 9 BEGIN,                                           9
10  BEGIN, NOP, X0 )Y LDA, PL         ( 7)         10
11   IF, PHA, PLA, FF #B LDA,         ( 3/11)      11
12   ENDIF, C08D ,X STA, C08C ,X ORA, ( 9)         12
13   X0 LDA, X0 LDA, NOP, INY, EQ     ( 10)        13
14  UNTIL,                            ( 2/3)       14
15  BEGIN, X0 LDA, X1 )Y LDA, PL      ( 8)         15
16   IF, PHA, PLA, FF #B LDA,         ( 3/11)      16
17   ENDIF, C08D ,X STA, C08C ,X ORA, ( 9)         17
18   PHA, PLA, INY, EQ                ( 9)         18
19  UNTIL, NOP, X2 DEC, EQ            ( 7/3)       19
20 UNTIL,                             ( 2/3)       20
21 C08E ,X LDA,                                    21
22 XSAVE LDX, CLI, <XNEXT> JMP,                    22
23 62 ?FITS                                        23 scr #   90
 0 ( 2.NUDGE ) HEX ;S                               0
 1                                                  1
 2 FRAG 2.NUDGE -                                   2
 3 0 #B LDY, 0 SP) LDA, X0 STA,                     3
 4 1 SP) LDA, X0 1+ STA, INX, INX,                  4
 5 BEGIN, EBOT LDA, PGS0 ,Y CMP,                    5
 6  EBOT 1+ LDA, PGS1 ,Y SBC, CS                    6
 7  IF, CLC,                                        7
 8   PGS0 ,Y LDA, X0 ADC, PGS0 ,Y STA,              8
 9   PGS1 ,Y LDA, X0 1+ ADC, PGS1 ,Y STA,           9
10   SEC,                                          10
11  ENDIF, INY, NC                                 11
12 UNTIL,                                          12
13 WND0 LDA, X0 ADC, WND0 STA,                     13
```

```
 14  WND1 LDA, X0 1+ ADC, WND1 STA, CLC,       14
 15  BOS LDA, X0 ADC, BOS STA,                 15
 16  BOS 1+ LDA, X0 1+ ADC, BOS 1+ STA, CLC,   16
 17  EOS LDA, X0 ADC, EOS STA,                 17
 18  EOS 1+ LDA, X0 1+ ADC, EOS 1+ STA, CLC,   18
 19  BOT LDA, X0 ADC, BOT STA,                 19
 20  BOT 1+ LDA, X0 1+ ADC, BOT 1+ STA, CLC,   20
 21  EBOT LDA, X0 ADC, EBOT STA,               21
 22  EBOT 1+ LDA, X0 1+ ADC, EBOT 1+ STA,      22
 23  <XNEXT> JMP,                              23
91
  0  ( 2.SERIAL# ) HEX                          0  FRAG .SERIAL#
  1                                             1  PURPOSE: calculate a unique number.
  2  FRAG .SERIAL#   0 #B LDY,                  2
  3  BEGIN, DEY, NE                             3
  4  WHILE, X0 )Y LDA,                          4
  5  CLC, X2 ADC, X2 STA, CS                    5
  6  IF, X2 1+ INC, ENDIF,                      6
  7  X2 1+ LDA, .A ROL,                         7
  8  X2 LDA,    .A ROL, X2 STA,                 8  LABEL 2.SERIAL#  ( -- # )
  9  X2 1+ LDA, .A ROL, X2 1+ STA,              9  PURPOSE: calculate a unique number to
 10  REPEAT, RTS,                              10  place on a disk.
 11                                            11
 12  FRAG 2.SERIAL#  ( -- # )                  12  start with a seed of 0
 13  0 #B LDA, X2 STA, X2 1+ STA,              13  start with 100 hex bytes below cursor
 14  EBOT LDA, EBOT 1+ LDY,                    14  modify the seed with those bytes
 15  X0 STA, X0 1+ STY,                        15  end with 100 hex bytes above cursor
 16  \ .SERIAL# JSR,                           16  modify the seed with those bytes
 17  X0 1+ INC,                                17  store the result on the stack
 18  \ .SERIAL# JSR,                           18
 19  DEX, DEX, X2 LDA, 0 SP) STA,              19
 20  X2 1+ LDA, 1 SP) STA,                     20
 21  <XNEXT> JMP,                              21
 22                                            22
 23                                            23 scr #   92
  0  ( .DECIMATE ) HEX ( later: y0,1 -> x1-5)   0  FRAG .DECIMATE  ( -- )
  1                                             1  PURPOSE: subroutine convert hex number
  2  FRAG .DECIMATE                             2  in register to ascii characters
  3  0 #B LDA, PHA,                             3  in place.
  4  PCT LDA, CLC, PAGE% ADC, X1 STA,           4
  5  PCT 1+ LDA, PAGE% 1+ ADC, X2 STA,          5  Y    high order byte    X1
  6  80 #B AND, NE                              6  A    low                X2
  7  IF, PLA, FF #B LDA, PHA,                   7
  8  X1 EOR,      CLC, 1 #B ADC, X1 STA,        8  X3   ten thousands
  9  X2 LDA, FF #B EOR, 0 #B ADC, X2 STA,       9  X4   thousands
 10  ENDIF,                                    10  X5   hundreds
 11                                            11  Y0   tens
 12                                            12  Y1   ones
 13                                            13  X1   -1 is negative, 0 is positive
 14                                            14
 15                                            15
 16                                            16
 17                                            17
 18                                            18
 19                                            19
 20                                            20
 21                                            21
 22                                            22
 23                                            23
```

93

```
 0 ( .DECIMATE ... )   HEX
 1
 2 SEC, OFF #B LDY,
 3 BEGIN, INY, X1 LDA, 10 #B SBC, X1 STA,
 4 X2 LDA, 27 #B SBC, X2 STA, NC UNTIL,
 5 X1 LDA, 10 #B ADC, X1 STA,
 6 X2 LDA, 27 #B ADC, X2 STA, TYA,
 7 30 #B ORA, X3 STA, SEC, OFF #B LDY,
 8 BEGIN, INY, X1 LDA, E8 #B SBC, X1 STA,
 9 X2 LDA, 03 #B SBC, X2 STA, NC UNTIL,
10 X1 LDA, E8 #B ADC, X1 STA,
11 X2 LDA, 03 #B ADC, X2 STA, TYA,
12 30 #B ORA, X4 STA, SEC, OFF #B LDY,
13 BEGIN, INY, X1 LDA, 64 #B SBC, X1 STA,
14 X2 LDA, 00 #B SBC, X2 STA, NC UNTIL,
15 X1 LDA, 64 #B ADC, PHA,
16 TYA, 30 #B ORA, X5 STA,
17 SEC, OFF #B LDY, PLA,
18 BEGIN, INY, OA #B SBC, NC UNTIL,
19 OA #B ADC, 30 #B ORA, Y1 STA,
20 TYA, 30 #B ORA, YO STA,
21 PLA, X1 STA, RTS,
22
23
``` scr # 94

```
 0 ( 2.PAGEPRINT ) HEX
 1 FRAG 2.PAGEPRINT   XSAVE STX,
 2 W/2 LDA, MARGIN% ADC, .BL ADC, X2 STA,
 3 X2 DEC,
 4 BEGIN, 20 #B LDX, <LEMIT2> JSR, X2 DEC,
 5 EQ UNTIL, \ .DECIMATE JSR, X1 LDX, NE
 6 IF, 2D #B LDX, <LEMIT2> JSR, ENDIF,
 7 X3 LDX, 30 #B CPX, NE
 8 IF, <LEMIT2> JSR, X4 LDX, <LEMIT2> JSR,
 9   X5 LDX, <LEMIT2> JSR,
10   YO LDX, <LEMIT2> JSR,
11 ELSE, X4 LDX, 30 #B CPX, NE
12  IF, <LEMIT2> JSR,
13   X5 LDX, <LEMIT2> JSR,
14   YO LDX, <LEMIT2> JSR,
15  ELSE, X5 LDX, 30 #B CPX, NE
16   IF, <LEMIT2> JSR,
17    YO LDX, <LEMIT2> JSR,
18   ELSE, YO LDX, 30 #B CPX, NE
19    IF, <LEMIT2> JSR,
20 ENDIF, ENDIF, ENDIF, ENDIF,
21 Y1 LDX, <LEMIT2> JSR,
22 OD #B LDX, <LEMIT2> JSR,
23 XSAVE LDX, <XNEXT> JMP,
```

```
 0 FRAG 2.PAGEPRINT   ( -- )
 1 PURPOSE: print number at bottom of page.
 2
 3 input: W/2 MARGIN% PCT PAGE%
 4
 5 add MARGIN% to W/2
 6 add PCT to PAGE%, all 16 bits
 7 convert to decimal ascii characters
 8 replace Apple output vector
 9   with printer driver
10 print half a line of blanks
11 print page number ascii characters
12 restore output vector
```

95

```
 0 ( 2.SHOWPAGE ) HEX
 1
 2 FRAG 2.SHOWPAGE  WR LDA, EOT CMP, EQ
 3 IF, WR 1+ LDA, EOT 1+ CMP, EQ
 4  IF, ( 4F #B LDY, AO #B LDA,     scroll
 5   BEGIN, CURR ,Y STA, DEY, MI   problem?
 6   UNTIL, ) <XNEXT> JMP,
 7 ENDIF, ENDIF,
 8 OBD #B LDY, WC LDA, EQ
 9 IF, AD #B LDY, ENDIF, SEC,
```

```
 0 FRAG 2.SHOWPAGE  ( -- )
 1 PURPOSE: display page break symbols and
 2 page number.
 3
 4 if WRAP got to end of text,
 5   issue a line of spaces
 6 Y register holds pagebreak symbol
 7 if wrap count is zero,
 8   use implicit symbol: "-" (ascii AD),
 9   else explicit symbol: "=" (ascii BD)
```

```
10  WR LDA, BOS SBC, X2 STA,                    10  if WR is equal to or greater than BOS
11  WR 1+ LDA, BOS 1+ SBC, X2 1+ STA, CS        11  if WR less than EOS
12  IF, WR LDA, EOS CMP,                        12    toggle high bit (80) of symbol
13    WR 1+ LDA, EOS 1+ SBC, NC                 13    (make highlighted)
14    IF, TYA, 80 #B EOR, TAY, ENDIF,           14  if WR is equal to BOS,
15  ENDIF,                                       15    if wrap count zero,
16  X2 LDA, X2 1+ ORA, EQ                       16    use implicit symbol: "-" (ascii AD)
17  IF, WC LDA, EQ IF, AD #B LDY, ENDIF,        17  fill CURR with symbol
18  ENDIF,                                       18  strip high bit (80) of symbol
19  TYA, 4F #B LDY, CLC,                        19    (highlighting bit: false=highlight)
20  BEGIN, CURR ,Y STA, DEY, MI UNTIL,          20    and store it in X0
21  80 #B AND, X0 STA,                          21  place decimal page number in center
22                                               22    with a space on either side
23                                               23 scr #  96
 0  ( 2.SHOWPAGE ... ) HEX                       0
 1                                               1
 2  \ .DECIMATE JSR,   25 #B LDY,                2
 3  20 #B LDA, X0 ORA, CURR ,Y STA, INY,         3
 4  X1 LDA, NE IF,                               4
 5    2D #B LDA, X0 ORA, CURR ,Y STA, INY,       5
 6  ENDIF, X3 LDA, 30 #B CMP, NE                 6
 7  IF,      X0 ORA, CURR ,Y STA, INY,           7
 8    X4 LDA, X0 ORA, CURR ,Y STA, INY,          8
 9    X5 LDA, X0 ORA, CURR ,Y STA, INY,          9
10    Y0 LDA, X0 ORA, CURR ,Y STA, INY,         10
11  ELSE, X4 LDA, 30 #B CMP, NE                 11
12  IF,      X0 ORA, CURR ,Y STA, INY,          12
13    X5 LDA, X0 ORA, CURR ,Y STA, INY,         13
14    Y0 LDA, X0 ORA, CURR ,Y STA, INY,         14
15  ELSE, X5 LDA, 30 #B CMP, NE                 15
16    IF,     X0 ORA, CURR ,Y STA, INY,         16
17      Y0 LDA, X0 ORA, CURR ,Y STA, INY,       17
18    ELSE, Y0 LDA, 30 #B CMP, NE               18
19      IF, X0 ORA, CURR ,Y STA, INY,           19
20  ENDIF, ENDIF, ENDIF, ENDIF,                 20
21  Y1 LDA, X0 ORA, CURR ,Y STA, INY,           21
22  20 #B LDA, X0 ORA, CURR ,Y STA,             22
23  <XNEXT> JMP,                                23

97
 0  ( 2.@K 2.?X ) HEX                            0 FRAG 2.@K  ( -- char )
 1                                               1 PURPOSE: process keyboard character.
 2  FRAG 2.@K  DEX, DEX,                         2 inputs: CHAR KQUE QIN QOUT LASTC
 3  0 #B LDY, 1 SP) STY,                         3 outputs: CHAR SAVED? QOUT
 4  CHAR LDA, 7F #B AND,                         4
 5  0 SP) STA, CHAR STA,                         5 place contents of CHAR on stack
 6  QOUT LDY, QIN CPY, NE                        6 with its high bit clear
 7  IF, KQUE ,Y LDA, DEY, MI                     7 compare it to the last char, LASTC
 8    IF, 4 #B LDY, ENDIF, QOUT STY,             8 if the same
 9    80 #B ORA, CHAR STA,                       9   is it a control W?
10  ENDIF, <XNEXT> JMP,                         10   if it is, set SAVED?
11                                              11 else, clear SAVED?
12  FRAG 2.?X  ( LEX OR REX? )                  12 clear the high bit in CHAR
13  DEX, DEX, 0 #B LDY, 1 #B LDA,               13 check if the key queue is empty
14  C061 BIT, MI                                14 if it isn't
15  IF, DEY, C062 BIT, MI                       15   grab one character,
16    IF, XFLAG LDA, 3 #B ORA, ENDIF,           16   set its high bit
17  ELSE, C062 BIT, MI                          17   store it in CHAR
18    IF, DEY, 2 #B LDA, ENDIF,                 18   decrement queue index
19  ENDIF,                                      19
20  XFLAG STA, 0 SP) STY, 1 SP) STY,            20 LABEL 2.?X  ( -- mask | lex or rex? )
```

```
 21    <XNEXT> JMP,                                 21 PURPOSE: process lex/rex keys.
 22                                                 22  bit 0 = C061
 23                                                 23  bit 1 = C062 scr #   98
  0 ( 2.V ) HEX                                      0 FRAG 2.V  ( char-pair -- addr | 0 )
  1                                                  1 PURPOSE: locate the BASIC variable
  2 FRAG 2.V   1 SP) LDA, X0 STA,                    2  identified by its unique character
  3   0 SP) LDA, X0 1+ STA,                          3  pair.
  4   BASIC0 69 + LDA, X1 STA,                       4
  5   BASIC0 6A + LDA, X1 1+ STA,                    5  set each high bit, reverse byte order
  6   BASIC0 6B + LDA, X2 STA,                       6  find area BASIC placed them in
  7   BASIC0 6C + LDA, X2 1+ STA,                    7  look for that byte pattern
  8   0 #B LDY,                                      8   found: return address
  9   BEGIN, X1 )Y LDA, X0 CMP, EQ                   9   not: return 0
 10    IF, INY, X1 )Y LDA, X0 1+ CMP, EQ            10  both integers and string pointers
 11     IF, CLC, X1 LDA, 2 #B ADC,                  11   are 7 bytes long,
 12      0 SP) STA, X1 1+ LDA, 0 #B ADC,            12   so skip 7 bytes for each test
 13      1 SP) STA, <XNEXT> JMP,                    13
 14    ENDIF, DEY, ENDIF,                           14
 15    CLC, X1 LDA, 7 #B ADC, X1 STA, CS            15
 16    IF, X1 1+ INC, ENDIF,                        16
 17    CLC, X1 LDA, X2 CMP, CS                      17
 18    IF, X1 1+ LDA, X2 1+ CMP, ENDIF, CS          18
 19   UNTIL, 0 #B LDA, 0 SP) STA, 1 SP) STA,        19
 20   <XNEXT> JMP,                                  20
 21                                                 21
 22                                                 22
 23                                                 23
99
  0 ( 2.@M ) ;S                                      0
  1                                                  1
  2 ( -- char |  remove one character from           2
  3 the modem queue to the stack. If the             3
  4 buffer was full, RSTAT=FF, then send a           4
  5 control-S when it is half empty )                5
  6                                                  6
  7 FRAG 2.@M  DEX, DEX, MQOUT LDY,                  7
  8   MQUE ,Y LDA, 0 SP) STA,                        8
  9   INY, MQOUT STY,                                9
 10   RSTAT LDA, NE                                 10
 11   IF, SEC, MQOUT LDA, MQIN SBC, PL              11
 12    IF, 11 #B LDY,   ( send control Q )          12
 13     BEGIN, C0A9 LDA, 10 #B AND, NE              13
 14     UNTIL, C0A8 STY,                            14
 15     0 #B LDA, RSTAT STA,                        15
 16   ENDIF, ENDIF,                                 16
 17   0 #B LDA, 1 SP) STA,                          17
 18   <XNEXT> JMP,                                  18
 19                                                 19
 20                                                 20
 21                                                 21
 22                                                 22
 23                                                 23 scr #  100
  0 ( 2.ENDWRAP ) HEX                                0 FRAG 2.ENDWRAP ( -- flag )
  1                                                  1 PURPOSE: point wrap address (WR) to the
  2 FRAG 2.ENDWRAP   DEX, DEX, OFF #B LDY,           2  beginning of the next line.
  3   WR LDA, WC ADC, WR STA, CS                     3 update PCT LCT LCTR CLIN.
  4   IF, WR 1+ INC, ENDIF,  EBOT CMP,               4
```

```
 5  WR 1+ LDA, EBOT 1+ SBC, CS              5  add WC to WR
 6  IF, INY,                                 6  if WR is past EBOT set false and
 7   WR LDA, BEOT CMP,                       7   if WR is not past BEOT then
 8   WR 1+ LDA, BEOT 1+ SBC, NC              8    add GAP ...
 9   IF, WR LDA, GAP ADC, WR STA,            9    set WR that much past BEOT
10    WR 1+ LDA, GAP 1+ ADC, WR 1+ STA,    10    (ie, EBOT < WR < BEOT)
11   ENDIF, ENDIF,                         11  if WR goes past text
12  WR   LDA, EOT CMP,                     12   set WR to end of text
13  WR 1+ LDA, EOT 1+ SBC, CS              13  if PAGEFLAG is false (was set by WRAP)
14  IF, EOT LDA, WR STA,                   14   then: increment PCT, set LCT to zero
15      EOT 1+ LDA, WR 1+ STA,             15   else: increment LCT
16  ENDIF, 0 SP) STY, 1 SP) STY,           16  increment CLIN, LCTR
17  PAGEFLAG LDY, EQ                       17
18  IF, PCT INC, LCT STY,                  18
19  ELSE, LCT INC,                         19 NOTE1: WRAP sets PAGEFLAG
20  ENDIF, CLIN INC,                       20  true=PAGEFLAG=no page break generated.
21  LCTR INC, EQ IF, LCTR 1+ INC, ENDIF,   21 NOTE2: WC set by WRAP, SHOWPAGE.
22  <XNEXT> JMP,                           22
23                                         23
101
 0  ( 2.SETMODEM ) HEX                     0 FRAG 2.SETMODEM  ( -- )
 1                                         1 PURPOSE: initialize 6551 on super serial
 2  FRAG 2.SETMODEM                        2 card for use with modem.
 3  0 #B LDA, SSC? STA, SSC? 1+ STA,       3
 4  C205 LDA, 38 #B CMP, NE                4  if a super serial card isn't in slot 2
 5  IF, <XNEXT> JMP, ENDIF,                5  (C205 = 38 and C20C = 31) then set
 6  C20C LDA, 31 #B CMP, NE                6  SSC? to 0 and exit.
 7  IF, <XNEXT> JMP, ENDIF,                7  else, set SSC? to -1.
 8  FF #B LDA, SSC? STA, SSC? 1+ STA,      8  clear transmit (C0A9).
 9  0 #B LDA, C0A9 STA,                    9  place the two bytes in SE% (BASIC)
10  SEND% LDA, C0AA STA,                  10   in status (C0AA) and control (C0AB).
11  SEND% 1+ LDA, C0AB STA,               11  clear RSTAT and TSTAT.
12  0 #B LDA, TSTAT STA, RSTAT STA, CLI,  12  enable interrupts.
13  <XNEXT> JMP,                          13
14                                        14
15                                        15
16                                        16
17                                        17
18                                        18
19                                        19
20                                        20
21                                        21
22                                        22
23                                        23 scr # 102
 0  ( 2.HARDPAGE 2.SOFTPAGE ) HEX          0
 1                                         1
 2  FRAG 2.HARDPAGE ( addr -- )            2 FRAG 2.HARDPAGE ( address -- )
 3  PAGE# LDY, INY,                        3 PURPOSE: update page table for cursor
 4  0 SP) LDA, PGS0 ,Y STA,                4 creeper crossing a hard page break.
 5  1 SP) LDA, PGS1 ,Y STA,                5
 6  INX, INX, <XNEXT> JMP,                 6 store the address of the current page in
 7                                         7 the page table.
 8  FRAG 2.SOFTPAGE  ( flag -- )           8 the variable LOCAL1 is cleared, so that
 9  0 SP) LDA, NE                          9 CREEPER will work right.
10  IF, LOCAL2 LDA, 1 #B CMP, EQ          10
11   IF,                                  11
12    YPOS LDY, WND3 2 + ,Y LDA, TAY, CLC,12
13    PGS0 ,Y LDA, GAP   ADC, PGS0 ,Y STA,13
14    PGS1 ,Y LDA, GAP 1+ ADC, PGS1 ,Y STA,14
15   ELSE,                                15
```

```
16   YPOS LDY, WND3 ,Y LDA, TAY, SEC,                16
17     PGS0 ,Y LDA, GAP    SBC, PGS0 ,Y STA,         17
18     PGS1 ,Y LDA, GAP 1+ SBC, PGS1 ,Y STA,         18
19   ENDIF,                                          19
20   ENDIF,                                          20
21   INX, INX, <XNEXT> JMP,                          21
22                                                   22
23                                                   23
```

103
```
 0 ( <WRAP> ) HEX ;S                                  0
 1                                                    1
 2 FRAG <WRAP>  SEC,                                  2 FRAG 2.SOFTPAGE ( oldNARROW -- )
 3   WR LDA, YWRAP SBC, X5 STA,                       3 PURPOSE: update page table for cursor
 4   WR 1+ LDA, 0 #B SBC, X5 1+ STA,                  4   creeper crossing a soft page break.
 5   YWRAP LDY, cr #B LDA,                            5
 6   BEGIN, X5 )Y CMP, CS                             6   use vert cursor position on the screen
 7    IF, EQ IF, INY, ENDIF,                          7   (store YPOS. in Y register)
 8     TYA, YWRAP SBC, WC STA, EQ                     8 if creep was going left then
 9     IF, WC INC, ENDIF, RTS,                        9   if cursor was wide (stack element = 0)
10    ENDIF, INY, MI UNTIL,                          10    if cursor was on a page boundary
11    20 #B LDA, WIDE LDY, DEY, WR )Y CMP, NE        11     (window table - BEOT = 0)
12   IF, INY,  BEGIN, DEY, MI                        12    get page # from window table
13    IF, WIDE LDA, WC STA, RTS, ENDIF,              13    add gap
14    WR )Y CMP, EQ                                  14    and store in that page of page table
15    UNTIL, INY, WC STY, RTS, ENDIF,                15   else (creep was going right)
16   DEY, WR )Y CMP, EQ                              16    if cursor is at left margin (XPOS = 0)
17   IF, WIDE LDA, WC STA, RTS, ENDIF,               17    get page # from window table
18   WIDE LDY, WR )Y CMP, EQ                         18    subtract gap
19   IF, DEY, DEY, BEGIN, DEY, MI IF, WIDE           19    and store in that page of page table
20    LDA, WC STA, RTS, ENDIF, WR )Y CMP,            20 discard element from stack
21    EQ UNTIL, INY, WC STY, RTS, ENDIF,             21
22   WIDE LDA, WC STA, RTS,                          22
23                                                   23
``` scr # 104
```
 0 ( 2.WRAP BMP ) HEX ;S                              0
 1                                                    1
 2 FRAG 2.WRAP  \ <WRAP> JSR, <XNEXT> JMP,            2
 3                                                    3
 4 FRAG BMP   CLC,                                    4
 5   WC LDA, WR ADC, WR STA, CS                       5
 6   IF, WR 1+ INC, ENDIF,                            6
 7   EBOT CMP, WR 1+ LDA, EBOT 1+ SBC, NC             7
 8   IF, RTS, ENDIF,                                  8
 9   WR LDA, BEOT CMP,                                9
10   WR 1+ LDA, BEOT 1+ SBC, NC                      10
11   IF, WR LDA, GAP ADC, WR STA,                    11
12    WR 1+ LDA, GAP 1+ ADC, WR 1+ STA,              12
13   ENDIF,                                          13
14   RTS,                                            14
15                                                   15
16                                                   16
17                                                   17
18                                                   18
19                                                   19
20                                                   20
21                                                   21
22                                                   22
23                                                   23
```

105
```
 0 ( 2.STOP? ) HEX
 1
 2 FRAG 2.STOP?
 3 DEX, DEX, 0 #B LDA,
 4 0 SP) STA, 1 SP) STA,
 5 C061 LDA, C062 ORA, MI
 6 IF, <XNEXT> JMP, ENDIF,
 7 0 SP) DEC, 1 SP) DEC,
 8 TEOS 1+ LDA, WR 1+ CMP,
 9 TEOS LDA, WR SBC, NC
10 IF, <XNEXT> JMP, ENDIF,
11 MQIN LDA, MQOUT CMP, NE
12 IF, <XNEXT> JMP, ENDIF,
13 CHAR LDA, del 80 OR #B CMP, EQ
14 IF, <XNEXT> JMP, ENDIF,
15 CHAR LDA, tab 80 OR #B CMP, CS
16 IF, LEXXING LDA, EQ
17  IF, <XNEXT> JMP, ENDIF,
18 ENDIF,
19 0 SP) INC, 1 SP) INC,
20 <XNEXT> JMP,
21
22
23
```

```
 0 FRAG 2.STOP? ( -- flag )
 1 PURPOSE: true flag means interrupt
 2 wrapping to add a cr, ff, tab, delete
 3 or any printable character wrapped
 4 past TEOS. also process a modem
 5 character.
 6
 7 put 0 flag on stack.
 8 if a lex key then exit.
 9 put -1 flag on stack.
10 if wrapped past TEOS, or something in
11 modem queue, or a cr, ff, tab, delete
12 or any other printed character,
13 then exit.
14 put 0 flag on stack and exit.
``` scr # 106
```
 0 ( 2.INCPAGES ) HEX
 1
 2 ( endaddress increase startpage -- )
 3 FRAG 2.INCPAGES   0 SP) LDY,
 4 INX, INX,
 5 BEGIN, INY, 2 SP) LDA, PGS0 ,Y CMP,
 6  3 SP) LDA, PGS1 ,Y SBC, NC
 7  IF, DEY, PCT STY, 0 #B LDA, LCT STA,
 8   PGS2 ,Y LDA, LCTR STA,
 9   PGS3 ,Y LDA, LCTR 1+ STA,
10   INX, INX, INX, INX,
11   <XNEXT> JMP,
12  ENDIF, CLC, 0 SP) LDA, PGS0 ,Y ADC,
13  PGS0 ,Y STA, WR STA,
14  1 SP) LDA, PGS1 ,Y ADC,
15  PGS1 ,Y STA, WR 1+ STA,
16 AGAIN,
```

```
 0 FRAG 2.INCPAGES ( endaddress increase
 1 startpage -- )
 2 PURPOSE: update the page table by
 3 adding the increase from startpage to
 4 endaddress.
 5
 6 start examining the page table by
 7 setting Y-reg equal to startpage.
 8 while the end address is less than the
 9 address for each page (PGS0,1) add
10 the increase to that page (PGS0,1)
11 and update the wrap address (WR).
12 when the end address is larger than the
13 address for a page (PGS0,1) store
14 the last updated page in PCT, clear
15 LCT, store PGS2,3 into LCTR, and exit.
```

107

```
 0 LABEL UM/MOD
 1 ( double-number
 2 unsigned-divisor -- remainder quotient )
 3 PURPOSE: return the remainder and
 4 quotient of the unsigned mixed number
 5 division.
 6
 7 NOTE: this has been used in a number of
 8 places to determine the maximum that a
 9 number can be divided by plus one.
```

```
 10                                            10  e.g.,   ( n1 0 n2 -- n3 )
 11                                            11  UM/MOD SWAP IF 1+ ENDIF
 12                                            12  see, for example, MARGIN-CHANGES.
 13                                            13
 14                                            14
 15                                            15
 16                                            16
 17                                            17
 18                                            18
 19                                            19
 20                                            20
 21                                            21
 22                                            22
 23                                            23 scr #   108
  0                                             0
  1                                             1  2.CMOVE>
  2                                             2
  3                                             3
  4                                             4
  5                                             5
  6                                             6
  7                                             7
  8                                             8
  9                                             9
 10                                            10
 11                                            11
 12                                            12
 13                                            13
 14                                            14
 15                                            15
 16                                            16
 17                                            17
 18                                            18
 19                                            19
 20                                            20
 21                                            21
 22                                            22
 23                                            23
109
  0 CR 0 NAMED !                                0
  1 FRAG end_of_bank2                           1  return printing to left half of page
  2                                             2
  3                                             3  FRAG end_of_bank2    affords printout of
  4                                             4    the last available byte in bank 2
  5                                             5
  6                                             6
  7                                             7
  8                                             8
  9                                             9
 10                                            10
 11                                            11
 12                                            12
 13                                            13
 14                                            14
 15                                            15
 16                                            16
 17                                            17
 18                                            18
 19                                            19
 20                                            20
```

```
scr # 110
  0 ( INITIALIZATION CODE ) HEX                    0 initialization code at D200
  1                                                1
  2 ASSEMBLER                                      2 D200: 0A to X register, for IP = COLD
  3  0A #B LDX, MI                                 3 D204: 0B to X register, for IP = WARM
  4  IF, 0B #B LDX, ENDIF,                         4 D206: SEI, CLD,
  5  SEI, CLD, MI                                  5 D208: always branch to D022
  6  IF, SOURCE RESET C, WARM C, ASSEMBLER         6 D20A: RESET C,
  7   HERE RES !                                   7 D20B: WARM C,
  8   IP )Y LDA, INY, .A ASL, NC                   8 D20C: rom copy of Forth NEXT (at 006B)
  9   IF, HERE RES @ - 3 + NEXT + STA,             9
 10    ROM )JMP,                                  10 YNEXT: YSAVE LDY,
 11   ENDIF, HERE RES @ - 4 + NEXT + STA,         11 NEXT: IP )Y LDA, INY, .A ASL, NC
 12   CLC, ROM 100 + )JMP,                        12       IF, HERE RES @ - 3 + NEXT + STA,
 13   ROM 200 + )JMP,                             13        ROM )JMP,
 14  ENDIF, 0 #B LDY,                             14       ENDIF, HERE RES @ - 4 + NEXT +
 15  BEGIN, ROM 20C + ,Y LDA, NEXT ,Y STA,        15       STA, CLC, ROM 100 + )JMP,
 16   INY, 12 #B CPY, EQ                          16
 17  UNTIL,  IP STX,                              17 D222: copy code at D00C to NEXT.
 18  ROM 200 + SWAB OFF AND #B LDX,               18       point IP to $D20A (COLD) or to
 19  IP 1+ STX,                                   19       $D20B (WARM).
 20  08 #B LDX, VB 1+ STX,                        20       4F to return stack register.
 21  04F #B LDX, TXS,                             21       data stack pointer to X register.
 22  SP0 #B LDX, C010 LDA,                        22       clear the keyboard strobe.
 23  0 #B LDY, TNEXT,                             23
111
  0 ( listing header, copyright msg )              0 ( listing header, copyright msg )
  1                                                1
  2 CR CR CR    ." EDDE   Apple Version 104        2 message for compilation printout.
  3 3  1985 September 27  Friday"                  3
  4 CR CR CR AIM U. ." beginning of bank 1"        4
  5 CR                                             5
  6                                                6
  7 FRAG .MSG0              " SwyftCard 104        7 LABEL .MSG0
  8 3 //e Copyright 1985 Information Appli         8 PURPOSE: message for SwyftCard bootup.
  9 ance Inc."                                     9
 10                                               10
 11                                               11 NOTE1: the position of the version
 12 ( NOTE: if you change the version #,          12 number within .MSG0 must remain the
 13  you must ALSO update the screen that         13 same. it is used to correctly load
 14  .SWYFT is on - 216 )                         14 the key and command tables with the
 15                                               15 right values.
 16                                               16
 17                                               17
 18                                               18
 19                                               19
 20                                               20
 21                                               21
 22                                               22
 23                                               23 scr # 112
  0 ( NEST VARIABLE ) HEX                          0 ( NEST VARIABLE ) HEX
  1                                                1
  2 FRAG .NEST                                     2 FRAG .NEST
  3  PLA, X0 STA, PLA, X0 1+ STA,                  3 save current IP and Y-reg on stack,
  4  TYA, PHA, 0 #B LDA, PHA,                      4 put return address (from JSR .NEST)
```

```
 5  IP LDA, PHA, IP 1+ LDA, PHA,              5  into IP, initialize Y-reg = 1,
 6  XO LDA, IP STA, XO 1+ LDA, IP 1+ STA,     6  then JMP NEXT.
 7  1 #B LDY, TNEXT,                          7
 8                                            8  LABEL .VARIAB
 9  LABEL .VARIAB                             9  store page number ($08) and offset (next
10  IP )Y LDA, INY, YSAVE STY, 0 #B LDY,     10  number) in VB; get value pointed to in
11  VB STA, DEX, DEX,                        11  variable table and put on stack.
12  VB )Y LDA, 0 SP) STA, INY,               12
13  VB )Y LDA, 1 SP) STA,                    13  remember that IP and Y-reg point to
14  YSAVE LDY, TNEXT,                        14  current token (controlled by NEXT)
15                                           15  and that the token for .variab is $08
16                                           16  which is also the page for variables.
17                                           17  note that y-reg incremented, saved and
18                                           18  restored.
19                                           19
20                                           20  LABEL .CALL
21                                           21  PURPOSE: jump to the address in the two
22                                           22  bytes compiled following this token
23                                           23
```

113

```
 0          0
 1          1
 2          2
 3          3
 4          4
 5          5
 6          6
 7          7
 8          8
 9          9
10         10
11         11
12         12
13         13
14         14
15         15
16         16
17         17
18         18
19         19
20         20
21         21
22         22
23         23
``` scr # 114

```
 0          0
 1          1
 2          2
 3          3
 4          4
 5          5
 6          6
 7          7
 8          8
 9          9
10         10
11         11
12         12
```

```
 13
 14
 15
 16
 17
 18
 19
 20
 21
 22
 23
115
  0 ( CHAR. TRANSLATION TABLE ) HEX
  1
  2 FRAG .XLAT
  3 del C, ( DELETE :: RUBOUT )
  4  7  C, ( 01,^A ::  PASTE )
  5 00  C, ( 02,^B :: was PRINT )
  6 00  C, ( 03,^C :: was SEND )
  7  5  C, ( 04,^D :: SEND )
  8 00  C, ( 05,^E )
  9 00  C, ( 06,^F )
 10  8  C, ( 07,^G :: BASIC )
 11 00  C, ( 08,^H )
 12 tab C, ( 09,^I :: TAB )
 13 00  C, ( 0A,^J :: was PRINT)
 14 00  C, ( 0B,^k,UP-ARROW )
 15  4  C, ( 0C,^L :: DISK ) .
 16 cr  C, ( 0D,^m,CARRIAGE RETURN )
 17  2  C, ( 0E,^N :: PRINT )
 18 00  C, ( 0F,^O :: NOOP - was GET )
 19 00  C, ( 10,^P :: was BASIC )
 20 00  C, ( 11,^Q )
 21 00  C, ( 12,^R :: was 6 - GET, CUT )
 22 00  C, ( 13,^S )
 23 scr # 116
  0 ( CHARACTER TRANSLATION TABLE ) HEX
  1
  2 00  C, ( 14,^T )
  3 00  C, ( 15,^U )
  4 00  C, ( 16,^V )
  5 00  C, ( 17,^W :: was DISK )
  6 00  C, ( 18,^X )
  7 00  C, ( 19,^Y :: was PASTE )
  8  C  C, ( 1A,^Z )
  9 ff  C, ( 1B,ESCAPE :: PAGE )
 10 00  C, ( 1C,^\ )
 11  9  C, ( 1D,^] :: MON )
 12  3  C, ( 1E,^6 :: SORT, was OLDLOAD )
 13  B  C, ( 1F,^- )
 14
 15
 16
 17
 18
 19
 20
 21
 22
 23
```

```
 13
 14
 15
 16
 17
 18
 19
 20
 21
 22
 23
  0 ( CHAR. TRANSLATION TABLE ) HEX
  1
  2 FRAG .XLAT
  3 PURPOSE: used to translate a control
  4 character into an index.  The index
  5 is an offset into .LTABLE (the command
  6 table) which contains addresses for
  7 executable functions.  Since .XLAT
  8 is downloaded into ram the functions
  9 can be reassigned (see ?RAMKEYS and
 10 RAMKEYS).
 11
 12
 13
 14
 15
 16
 17
 18
 19
 20
 21
 22
 23

0
  1
  2
  3
  4
  5
  6
  7
  8
  9
 10
 11
 12
 13
 14
 15
 16
 17
 18
 19
 20
 21
 22
 23
```

117
```
  0 ( DISPLAY ARRAY ) HEX                      0 FRAG .DISP0
  1                                            1
  2 FRAG .DISP0                                2
  3                                            3
  4 400 C, 480 C, 500 C, 580 C,                4
  5 600 C, 680 C, 700 C, 780 C,                5
  6 428 C, 4A8 C, 528 C, 5A8 C,                6
  7 628 C, 6A8 C, 728 C, 7A8 C,                7
  8 450 C, 4D0 C, 550 C, 5D0 C,                8
  9 650 C, 6D0 C, 750 C, 7D0 C,                9 FRAG .DISP1
 10                                           10
 11 FRAG .DISP1                               11
 12                                           12
 13 400 H, 480 H, 500 H, 580 H,               13
 14 600 H, 680 H, 700 H, 780 H,               14
 15 428 H, 4A8 H, 528 H, 5A8 H,               15
 16 628 H, 6A8 H, 728 H, 7A8 H,               16
 17 450 H, 4D0 H, 550 H, 5D0 H,               17
 18 650 H, 6D0 H, 750 H, 7D0 H,               18
 19                                           19
 20                                           20
 21                                           21
 22                                           22
 23                                           23
``` scr # 118
```
  0 ( BUFFER FOR ALT SCREEN ) HEX              0 FRAG .SCR1
  1                                            1 PURPOSE: buffer for alternate screen.
  2 FRAG .SCR1                                 2
  3 SCREEN        H, SCREEN  28 + H,           3
  4 SCREEN 050 + H, SCREEN  78 + H,            4
  5 SCREEN 0A0 + H, SCREEN 0C8 + H,            5
  6 SCREEN 0F0 + H, SCREEN 118 + H,            6
  7 SCREEN 140 + H, SCREEN 168 + H,            7
  8 SCREEN 190 + H, SCREEN 1B8 + H,            8
  9 SCREEN 1E0 + H, SCREEN 208 + H,            9
 10 SCREEN 230 + H, SCREEN 258 + H,           10
 11 SCREEN 280 + H, SCREEN 2A8 + H,           11
 12 SCREEN 2D0 + H, SCREEN 2F8 + H,           12
 13 SCREEN 320 + H, SCREEN 348 + H,           13
 14 SCREEN 370 + H, SCREEN 398 + H,           14
 15                                           15
 16                                           16
 17                                           17
 18                                           18
 19                                           19
 20                                           20
 21                                           21
 22                                           22
 23                                           23
```

119
```
  0 ( BUFFER FOR ALT SCREEN ) HEX              0 FRAG .SCR0
  1                                            1 PURPOSE: buffer for alternate screen.
  2 FRAG .SCR0                                 2
  3 SCREEN        C, SCREEN  28 + C,           3
  4 SCREEN 050 + C, SCREEN  78 + C,            4
  5 SCREEN 0A0 + C, SCREEN 0C8 + C,            5
  6 SCREEN 0F0 + C, SCREEN 118 + C,            6
  7 SCREEN 140 + C, SCREEN 168 + C,            7
  8 SCREEN 190 + C, SCREEN 1B8 + C,            8
  9 SCREEN 1E0 + C, SCREEN 208 + C,            9
```

```
10  SCREEN 230 + C, SCREEN 258 + C,
11  SCREEN 280 + C, SCREEN 2A8 + C,
12  SCREEN 2D0 + C, SCREEN 2F8 + C,
13  SCREEN 320 + C, SCREEN 348 + C,
14  SCREEN 370 + C, SCREEN 398 + C,
15      .
16
17
18
19
20
21
22
23
``` scr #  120
```
 0  ( calls to 2nd bank ) HEX                           0 XFER creates a 7 byte structure which
 1                                                      1 will transfer control to the code in
 2  XFER REVERSE  -    2.REVERSE                        2 the alternate bank at D000 to DDFF.
 3  XFER SEEK>         2.SEEK>                          3 All routines in bank 2 return to bank
 4  XFER SEEK<         2.SEEK<                          4 1 by exiting through <XNEXT>.
 5  XFER ADJUST        2.ADJUST                         5
 6  XFER TOBUFF        2.TOBUFF                         6 For example, XFER will cause any
 7  XFER PRESET        2.PRESET                         7 reference REVERSE to access the
 8  XFER .40COL        2.40COL                          8 routine 2.REVERSE in bank 2.
 9  XFER ABOOT         2.ABOOT                          9
10  XFER .MON          2.MON                           10
11  XFER <READ>        2.<READ>                        11
12  XFER <SEEK>        2.<SEEK>                        12
13  XFER <WRITE>       2.<WRITE>                       13
14  XFER ?EDDE         2.?EDDE                         14
15  XFER ?APPLE        2.?APPLE                        15
16  XFER CHECKSUM      2.CHECKSUM                      16
17  XFER ENDWRAP       2.ENDWRAP                       17
18  XFER ?UPDATE       2.?UPDATE                       18
19  XFER PAGEPRINT     2.PAGEPRINT                     19
20  XFER SHOWPAGE      2.SHOWPAGE                      20
21  XFER SERIAL#       2.SERIAL#                       21
22  XFER V             2.V                             22
23                                                     23
```
121
```
 0  ( calls to 2nd bank ) HEX                           0
 1                                                      1
 2  XFER @K            2.@K                             2
 3  XFER ?X            2.?X                             3
 4  XFER SETMODEM      2.SETMODEM                       4
 5  XFER CONTROL       2.CONTROL                        5
 6  XFER WRITE0        2.WRITE0                         6
 7  XFER HARDPAGE      2.HARDPAGE                       7
 8  XFER SOFTPAGE      2.SOFTPAGE                       8
 9  XFER STOP?         2.STOP?                          9
10  XFER INCPAGES      2.INCPAGES                      10
11                                                     11
12  ;S                                                 12
13                                                     13
14  XFER @M            2.@M                            14
15  XFER CMOVE2        2.CMOVE2                        15
16  XFER WRAP          2.WRAP                          16
17  XFER LOCLIN        2.LOCLIN                        17
18  XFER LOCCHR        2.LOCCHR                        18
19                                                     19
20                                                     20
```

```
scr #  122
   0 ( .QUE ) HEX                                    0 .QUE ( -- )
   1                                                 1 PURPOSE: put keyboard character into
   2 FRAG .QUE  C010 STA,                            2   key queue.
   3   FF #B CMP, 0 #B ADC,                          3
   4   7F #B AND, 20 #B CMP, NC                      4 it looks to see if it is
   5   IF, TAY, HIMEM ,Y LDA, ENDIF,                 5 a control or special character, and if
   6   CHAR LDY, PL                                  6 not then puts it in the key queue.
   7   IF, 80 #B ORA, CHAR STA,                      7 the queue offset is pointed to by QIN.
   8   ELSE, QIN LDY, KQUE ,Y STA, DEY, MI           8 the value in TIMER (-1, -2, and -3)
   9    IF, 4 #B LDY, ENDIF, QIN STY,                9   is initialized, from value in TIMER.
  10   ENDIF, RTS,                                  10
  11                                                11 NOTE: A-reg holds byte read from $C000
  12                                                12   before calling this routine.
  13                                                13
  14                                                14
  15                                                15
  16                                                16
  17                                                17
  18                                                18
  19                                                19
  20                                                20
  21                                                21
  22                                                22
  23                                                23
123
   0 ( EXIT ) HEX                                    0 LABEL EXIT
   1                                                 1 restores previous IP and y-reg for NEXT
   2 LABEL EXIT                                      2
   3   PLA, IP 1+ STA, PLA, IP STA,                  3
   4   PLA, PLA, TAY, TNEXT,                         4 LABEL .2BYTERS
   5                                                 5 this word modifies NEXT
   6 LABEL .2BYTERS   IP )Y LDA, .A ASL, INY,        6
   7   NEXT 11 + STA, NEXT 10 + JMP,                 7
   8                                                 8
   9                                                 9
  10                                                10
  11                                                11
  12                                                12 note that IP for any one word is the
  13                                                13   address left by JSR next and that the
  14                                                14   y register is used to increment within
  15                                                15   that word (see screen 110).
  16                                                16
  17                                                17
  18                                                18
  19                                                19
  20                                                20
  21                                                21
  22                                                22
  23                                                23 scr #  124
   0                                                 0
   1                                                 1
   2                                                 2
   3                                                 3
   4                                                 4
```

```
    5                                          5
    6                                          6
    7                                          7
    8                                          8
    9                                          9
   10                                         10
   11                                         11
   12                                         12
   13                                         13
   14                                         14
   15                                         15
   16                                         16
   17                                         17
   18                                         18
   19                                         19
   20                                         20
   21                                         21
   22                                         22
   23                                         23
125
    0 ( .LIT ) HEX                             0 LABEL .LIT
    1                                          1 PURPOSE: compile a word sized literal.
    2 LABEL .LIT   DEX, DEX,                   2
    3  IP )Y LDA, 0 SP) STA, INY,              3
    4  IP )Y LDA, 1 SP) STA, INY, TNEXT,       4 LABEL .BLIT
    5                                          5 PURPOSE: compile a byte sized literal.
    6 LABEL .BLIT  DEX, DEX,                   6
    7  IP )Y LDA, 0 SP) STA, INY,              7
    8  0 #B LDA,  1 SP) STA, TNEXT,            8
    9                                          9
   10                                         10
   11                                         11
   12                                         12
   13                                         13
   14                                         14
   15                                         15
   16                                         16
   17                                         17
   18                                         18
   19                                         19
   20                                         20
   21                                         21
   22                                         22
   23                                         23 scr #  126
    0 ( .BRAN .OBRAN ) HEX                     0 LABEL .BRAN
    1                                          1 PURPOSE: force a branch. used, e.g., by
    2 LABEL .BRAN   -IP )Y LDA, TAY, TNEXT,    2  ELSE, by REPEAT.
    3                                          3
    4 LABEL .OBRAN                             4 LABEL .OBRAN
    5  0 SP) LDA, INX, 0 SP) ORA, NE           5 PURPOSE: conditional branch. used, e.g.,
    6 IF, INY, INX, TNEXT,                     6  by IF, WHILE.
    7 ENDIF, INX,                              7
    8  IP )Y LDA, TAY, TNEXT,                  8
    9                                          9
   10                                         10
   11                                         11
   12                                         12
   13                                         13
   14                                         14
   15                                         15
```

```
127
 0 ( .DO .LOOP ) HEX
 1
 2 LABEL .DO  TYA, PHA, PHA, SEC,
 3  3 SP) LDA, PHA, 2 SP) LDA, PHA,
 4  0 SP) LDA, 2 SP) SBC, X0 STA,
 5  1 SP) LDA, 3 SP) SBC, PHA,
 6  X0 LDA, PHA,
 7  INX, INX, INX, INX, TNEXT,
 8
 9 LABEL .LOOP  XSAVE STX, TSX,
10  0 RP) INC, EQ IF, 1 RP) INC, ENDIF, EQ
11  IF, TXA, 6 #B ADC, TAX, TXS,
12  ELSE, 4 RP) LDY,
13  ENDIF, XSAVE LDX, TNEXT,
14
15 LABEL .LEAVE
16  PLA, PLA, PLA, PLA, PLA, PLA,
17  IP )Y LDA, TAY, TNEXT,
18
19 LABEL I  DEX, DEX, XSAVE STX, TSX, CLC,
20  0 RP) LDA, 2 RP) ADC, PHA,
21  1 RP) LDA, 3 RP) ADC, XSAVE LDX,
22  1 SP) STA, PLA, 0 SP) STA, TNEXT,
23
```

```
 0 LABEL .DO ( to from -- )
 1 PURPOSE: initialize a loop.
 2
 3
 4 LABEL DROP ( n -- )
 5 PURPOSE: remove element from stack.
 6
 7
 8 LABEL .LOOP ( -- )
 9 PURPOSE: end a loop when the count has
10  been reached.
11
12
13 LABEL I ( -- i )
14 PURPOSE: place count of do-loop on stack
```

```
scr #  128
 0 ( .+LOOP ) HEX
 1
 2 LABEL .+LOOP  -YSAVE STY,
 3  1 SP) LDY,
 4  0 SP) LDA, INX, INX, XSAVE STX, TSX,
 5  0 RP) ADC, 0 RP) STA, TYA,
 6  1 RP) ADC, 1 RP) STA, TYA, MI
 7  IF, CS
 8   IF, 4 RP) LDY, XSAVE LDX, TNEXT,
 9   ENDIF,
10  ELSE, NC
11   IF, 4 RP) LDY, XSAVE LDX, TNEXT,
12   ENDIF,
13  ENDIF, CLC, TXA, 6 #B ADC, TAX, TXS,
14  XSAVE LDX, YSAVE LDY, TNEXT,
```

```
 0 LABEL .LEAVE
 1 PURPOSE: exit a do-loop unconditionally
 2
 3
 4 LABEL .+LOOP ( n -- )
 5 PURPOSE: exit a loop when the count has
 6  been reached (increment each loop by
 7  the n).
 8
 9
10 FRAG XYNEXT
11 PURPOSE: an alternate exit from LABEL
12  definitions: restore X and Y registers
```

```
129
  0 ( 0 1 2 -1 NOOP ) HEX                          0 LABEL 0 ( -- 0 )
  1                                                1
  2 LABEL 0   DEX, DEX, 0 #B LDA,                   2
  3 0 SP) STA, 1 SP) STA,                           3 LABEL 1 ( -- 1 )
  4 TNEXT,                                          4
  5                                                 5
  6 LABEL 1   DEX, DEX, 0 #B LDA,                   6 LABEL 2 ( -- 2 )
  7 1 SP) STA, 1 #B LDA, 0 SP) STA,                 7
  8 TNEXT,                                          8
  9                                                 9 LABEL -1 ( -- -1 )
 10 LABEL 2   DEX, DEX, 0 #B LDA,                  10
 11 1 SP) STA, 2 #B LDA, 0 SP) STA,                11
 12 TNEXT,                                         12 LABEL NOOP ( -- )
 13                                                13
 14 LABEL -1  DEX, DEX, OFF #B LDA,                14
 15 0 SP) STA, 1 SP) STA,                          15
 16 TNEXT,                                         16
 17                                                17
 18 LABEL NOOP TNEXT,                              18
 19                                                19
 20                                                20
 21                                                21
 22                                                22
 23                                                23 scr # 130
  0 ( CMOVE ) HEX                                   0 LABEL CMOVE ( from to # -- )
  1                                                 1 PURPOSE: move # of bytes from to.
  2 LABEL CMOVE  XSAVE STX, YSAVE STY,              2
  3 5 SP) LDA, X0 1+ STA,                           3
  4 4 SP) LDA, X0    STA,                           4
  5 3 SP) LDA, X1 1+ STA,                           5
  6 2 SP) LDA, X1    STA, 0 #B LDY,                 6
  7 1 SP) LDA, NE                                   7
  8 IF, BEGIN,                                      8
  9    BEGIN, X0 )Y LDA, X1 )Y STA, INY, EQ         9
 10    UNTIL, X0 1+ INC, X1 1+ INC,                10
 11    1 SP) DEC, EQ                               11
 12    UNTIL,                                      12
 13 ENDIF,  0 SP) LDA, NE                          13
 14 IF, TAX,                                       14
 15    BEGIN, X0 )Y LDA, X1 )Y STA, INY,           15
 16    DEX, EQ                                     16
 17    UNTIL,                                      17
 18 ENDIF,  XSAVE LDA, CLC, 6 #B ADC, TAX,         18
 19 YSAVE LDY, TNEXT,                              19
 20                                                20
 21                                                21
 22                                                22
 23                                                23
131
  0 ( CMOVE> ) HEX                                  0
  1                                                 1
  2 LABEL CMOVE>  YSAVE STY,                        2
  3 1 SP) LDA, X2 STA,                              3
  4 5 SP) ADC, X0 1+ STA, CLC,                      4
  5 3 SP) LDA, X2 ADC, X1 1+ STA,                   5
  6 4 SP) LDA, X0 STA,                              6
  7 2 SP) LDA, X1 STA,                              7
  8 0 SP) LDA, NE                                   8
  9 IF, TAY, DEY, NE                                9
```

```
10    IF, BEGIN, X0 )Y LDA, X1 )Y STA,        10
11      DEY, EQ UNTIL,                        11
12      ENDIF, X0 )Y LDA, X1 )Y STA,          12
13    ENDIF, X2 LDA, NE                       13
14    IF, BEGIN, OFF #B LDY,                  14
15      X0 1+ DEC, X1 1+ DEC,                 15
16      BEGIN, X0 )Y LDA, X1 )Y STA, DEY, EQ  16
17      UNTIL, X0 )Y LDA, X1 )Y STA,          17
18      X2 DEC, EQ                            18
19    UNTIL,                                  19
20    ENDIF, YSAVE LDY,                       20
21    CLC, TXA, 6 #B ADC, TAX, TNEXT,         21
22                                            22
23                                            23 scr #  132
 0 ( AND OR XOR ) HEX                          0 LABEL AND ( n1 n2 -- n3 )
 1                                             1 PURPOSE: logical AND n1 with n2 leaving
 2 LABEL AND                                   2   n3.
 3   0 SP) LDA, 2 SP) AND, 2 SP) STA,          3
 4   1 SP) LDA, 3 SP) AND, 3 SP) STA,          4
 5   INX, INX, TNEXT,                          5 LABEL OR ( n1 n2 -- n3 )
 6                                             6 PURPOSE: logical OR n1 with n2 leaving
 7 LABEL OR                                    7   n3.
 8   0 SP) LDA, 2 SP) ORA, 2 SP) STA,          8
 9   1 SP) LDA, 3 SP) ORA, 3 SP) STA,          9
10   INX, INX, TNEXT,                         10 LABEL XOR ( n1 n2 -- n3 )
11                                            11 PURPOSE: logical exclusive OR n1 with n2
12 LABEL XOR                                  12   leaving n3.
13   0 SP) LDA, 2 SP) EOR, 2 SP) STA,         13
14   1 SP) LDA, 3 SP) EOR, 3 SP) STA,         14
15   INX, INX, TNEXT,                         15
16                                            16
17                                            17
18                                            18
19                                            19
20                                            20
21                                            21
22                                            22
23                                            23
133
 0 ( DUP 2DUP DROP ) HEX                       0 LABEL DUP ( n -- n n )
 1                                             1 PURPOSE: duplicate n.
 2 LABEL DUP                                   2
 3   DEX, DEX,                                 3
 4   2 SP) LDA, 0 SP) STA,                     4 LABEL 2DUP ( n1 n2 -- n1 n2 n1 n2 )
 5   3 SP) LDA, 1 SP) STA,                     5 PURPOSE: duplicate n1 n2.
 6   TNEXT,                                    6
 7                                             7
 8 LABEL 2DUP                                  8
 9   DEX, DEX, DEX, DEX,                       9
10   4 SP) LDA, 0 SP) STA,                    10
11   5 SP) LDA, 1 SP) STA,                    11
12   6 SP) LDA, 2 SP) STA,                    12
13   7 SP) LDA, 3 SP) STA,                    13
14   TNEXT,                                   14
15                                            15
16 LABEL DROP  INX, INX, TNEXT,               16
17                                            17
18                                            18
19                                            19
20                                            20
```

```
scr #  134
    0 ( SWAP ROT ) HEX                          0 LABEL SWAP ( n1 n2 -- n2 n1 )
    1                                           1 PURPOSE: switch order of top two
    2 LABEL SWAP    -                           2  elements on stack.
    3  2 SP) LDA, PHA, 0 SP) LDA,                3
    4  2 SP) STA, PLA, 0 SP) STA,                4
    5  3 SP) LDA, PHA, 1 SP) LDA,                5 LABEL ROT ( n1 n2 n3 -- n2 n3 n1 )
    6  3 SP) STA, PLA, 1 SP) STA,                6 PURPOSE: bring third element on stack to
    7  TNEXT,                                    7  the top.
    8                                           8
    9 LABEL ROT                                 9
   10  4 SP) LDA, PHA, 2 SP) LDA,              10
   11  4 SP) STA, 0 SP) LDA,                   11
   12  2 SP) STA, PLA, 0 SP) STA,              12
   13  5 SP) LDA, PHA, 3 SP) LDA,              13
   14  5 SP) STA, 1 SP) LDA,                   14
   15  3 SP) STA, PLA, 1 SP) STA,              15
   16  TNEXT,                                  16
   17                                          17
   18                                          18
   19                                          19
   20                                          20
   21                                          21
   22                                          22
   23                                          23
135
    0 ( OVER ?DUP ) HEX                         0 LABEL OVER ( n1 n2 -- n1 n2 n1 )
    1                                           1 PURPOSE: duplicate second element on the
    2 LABEL OVER                                2  stack to the top.
    3  DEX, DEX,                                3
    4  4 SP) LDA, 0 SP) STA,                    4 LABEL ?DUP ( n1 -- 0 | n1 n1 )
    5  5 SP) LDA, 1 SP) STA,                    5 PURPOSE: duplicate element on the stack
    6  TNEXT,                                   6  if not zero.
    7                                           7
    8 LABEL ?DUP                                8
    9  0 SP) LDA, 1 SP) ORA, NE                 9
   10 IF, DEX, DEX,                            10
   11   3 SP) LDA, 1 SP) STA,                  11
   12   2 SP) LDA, 0 SP) STA,                  12
   13 ENDIF,                                   13
   14  TNEXT,                                  14
   15                                          15
   16                                          16
   17                                          17
   18                                          18
   19                                          19
   20                                          20
   21                                          21
   22                                          22
   23                                          23 scr #  136
    0 ( I R> >R R@ ) HEX                        0 LABEL R> ( -- n )
    1                                           1 PURPOSE: remove n from return stack.
    2 LABEL R>  DEX, DEX,                       2
    3  PLA, 0 SP) STA,                          3
    4  PLA, 1 SP) STA,  TNEXT,                  4 LABEL >R ( n -- )
```

```
 5                                              5 PURPOSE: place n on return stack.
 6 LABEL >R                                     6
 7  1 SP) LDA, PHA,                             7
 8  0 SP) LDA, PHA,                             8 LABEL R@ ( -- n )
 9  INX, INX,  TNEXT,                           9 PURPOSE: copy element from return stack.
10                                             10
11 LABEL R@  DEX, DEX,                         11
12  PLA, 0 SP) STA,                            12
13  PLA, 1 SP) STA, PHA,                       13
14  0 SP) LDA, PHA, TNEXT,                     14
15                                             15
16                                             16
17                                             17
18                                             18
19                                             19
20                                             20
21                                             21
22                                             22
23                                             23
137
 0 ( LEAVE ) HEX ;S                             0
 1                                              1
 2 LABEL LEAVE                                  2
 3  XSAVE STX, TSX,                             3
 4  1 RP) LDY,                                  4
 5  0 RP) LDA, 1 #B ADC, 2 RP) STA, EQ          5
 6  IF, INY, ENDIF, TYA,                        6
 7  3 RP) STA,                                  7
 8  XSAVE LDX, TNEXT,                           8
 9                                              9
10                                             10
11                                             11
12                                             12
13                                             13
14                                             14
15                                             15
16                                             16
17                                             17
18                                             18
19                                             19
20                                             20
21                                             21
22                                             22
23                                             23 scr #  138
 0 ( 1+ 1- )                                    0 LABEL 1+ ( n -- n+1 )
 1                                              1 PURPOSE: add one to element on stack.
 2 LABEL 1+                                     2
 3  0 SP) INC, EQ                               3
 4  IF, 1 SP) INC, ENDIF,                       4 LABEL 1- ( n -- n-1 )
 5  TNEXT,                                      5 PURPOSE: subtract one from element on
 6                                              6  stack.
 7 LABEL 1-                                     7
 8  0 SP) LDA, EQ                               8
 9  IF, 1 SP) DEC, ENDIF,                       9
10  0 SP) DEC,                                 10
11  TNEXT,                                     11
12                                             12
13                                             13
14                                             14
15                                             15
```

```
139
 0 ( @ C@ ) HEX
 1
 2 LABEL @
 3  0 X) LDA, PHA,
 4  0 SP) INC, EQ
 5  IF, 1 SP) INC, ENDIF,
 6  0 X) LDA,
 7  1 SP) STA, PLA,
 8  0 SP) STA,  TNEXT,
 9
10 LABEL C@
11  0 X) LDA, 0 SP) STA,
12  0 #B LDA, 1 SP) STA,
13  TNEXT,
```

```
 0 LABEL @ ( address -- word-value )
 1 PURPOSE: given address, return the value
 2  residing there.
 3
 4
 5 LABEL C@ ( address -- byte-value )
 6 PURPOSE: given address, return the value
 7  residing there.
```

```
scr #  140
 0 ( ! C! +! )
 1
 2 LABEL !
 3  2 SP) LDA, 0 X) STA,
 4  0 SP) INC, EQ
 5  IF, 1 SP) INC, ENDIF,
 6  3 SP) LDA, 0 X) STA,
 7  INX, INX, INX, INX, TNEXT,
 8
 9 LABEL C!
10  2 SP) LDA, 0 X) STA,
11  INX, INX, INX, INX, TNEXT,
12
13 LABEL +!
14  2 SP) LDA, 0 X) ADC, 0 X) STA,
15  0 SP) INC, EQ
16  IF, 1 SP) INC, ENDIF,
17  3 SP) LDA, 0 X) ADC, 0 X) STA,
18  INX, INX, INX, INX, TNEXT,
```

```
 0 LABEL ! ( n address -- )
 1 PURPOSE: store the value at the address.
 2
 3
 4 LABEL C! ( b address -- )
 5 PURPOSE: store the byte value at the
 6  address.
 7
 8
 9 LABEL +! ( n address -- )
10 PURPOSE: increment the value at the
11  address by the value n.
```

41
```
  0 ( TO ADDR +TO ) HEX
  1
  2 LABEL TO   YSAVE STY, 0 #B LDY,
  3   2 SP) LDA, VB )Y STA, INY,
  4   3 SP) LDA, VB )Y STA, YSAVE LDY,
  5   INX, INX, INX, INX, TNEXT,
  6
  7 LABEL ADDR
  8   VB LDA, 0 SP) STA,
  9   VB 1+ LDA, 1 SP) STA,
 10   TNEXT,
 11
 12 LABEL +TO  YSAVE STY, 0 #B LDY,
 13   VB )Y LDA, 2 SP) ADC, VB )Y STA, INY,
 14   VB )Y LDA, 3 SP) ADC, VB )Y STA,
 15   YSAVE LDY, INX, INX, INX, INX, TNEXT,
 16
 17
 18
 19
 20
 21
 22
 23
```

```
 0 LABEL TO  ( value constant -- )
 1 PURPOSE: store the value in place of
 2   the value normally returned by the
 3   constant.
 4
 5 LABEL +TO ( value constant -- )
 6 PURPOSE: replace the constant with the
 7   sum of the value and the constant.
 8
 9 LABEL ADDR ( constant -- address )
10 PURPOSE: put the address of the last
11   constant on the stack in place of the
12   value returned by the constant.
13
14
15
16
17
18
19
20
21
22
23
``` scr # 142
```
  0 ( + - NEGATE ) HEX
  1
  2 LABEL +       -
  3   0 SP) LDA, 2 SP) ADC, 2 SP) STA,
  4   1 SP) LDA, 3 SP) ADC, 3 SP) STA,
  5   INX, INX, TNEXT,
  6
  7 LABEL -   SEC,
  8   2 SP) LDA, 0 SP) SBC, 2 SP) STA,
  9   3 SP) LDA, 1 SP) SBC, 3 SP) STA,
 10   INX, INX, TNEXT,
 11
 12 LABEL NEGATE  SEC,
 13   0 #B LDA, 0 SP) SBC, 0 SP) STA,
 14   0 #B LDA, 1 SP) SBC, 1 SP) STA,
 15   TNEXT,
 16
 17
 18
 19
 20
 21
 22
 23
```

```
 0 LABEL + ( n1 n2 -- n3 )
 1 PURPOSE: add n1 to n2 leaving n3.
 2
 3
 4 LABEL - ( n1 n2 -- n3 )
 5 PURPOSE: subtract n2 from n3 leaving n3.
 6
 7
 8 LABEL NEGATE ( n1 -- n2 )
 9 PURPOSE: subtract n1 from zero leaving
10   n2.
11
12
13
14
15
16
17
18
19
20
21
22
23
```

143
```
 0 ( BEEP FILL ) HEX
 1
 2 T: BEEP   100 0
 3   DO 1 0 DO LOOP 1 C030 C! LOOP ;
 4
 5 T: FILL  SWAP >R OVER C!
 6   DUP 1+ R> 1- CMOVE ;
 7
 8
 9
```

```
 0 FILL ( address # value -- )
 1 PURPOSE: fill from address for # bytes
 2   with the value.
 3
 4 .ERRORIS ( -- )
 5 PURPOSE: take next byte from word,
 6   store it in ERROR, and beep.
 7
 8 BEEP ( -- )
 9 PURPOSE: sound the Apple speaker.
```

```
scr # 144
 0
 1
 2
 3
 4
 5
 6
 7
 8
 9
10
11
12
13
14
15
16
17
18
19
20
21
22
23
145
 0 ( UM/MOD ) HEX                            0 LABEL UM/MOD
 1                                           1 ( double-number
 2 LABEL UM/MOD   YSAVE STY,                 2 unsigned-divisor -- remainder quotient )
 3   0 SP) LDA, X0 STA,                      3 PURPOSE: return the remainder and
 4   1 SP) LDA, X1 STA,                      4 quotient of the unsigned mixed number
 5   2 SP) LDA, X4 STA,                      5 division.
 6   3 SP) LDA, X5 STA,                      6
 7   4 SP) LDA, .A ASL, X2 STA,              7 NOTE: this has been used in a number of
 8   5 SP) LDA, .A ROL, X3 STA,              8 places to determine the maximum that a
 9 XSAVE STX,   10 #B LDX,                   9 number can be divided by plus one.
10 BEGIN, X4 ROL, X5 ROL, SEC,              10 e.g.,    ( n1 0 n2 -- n3 )
11   X4 LDA, X0 SBC, TAY,                   11 UM/MOD SWAP IF 1+ ENDIF
12   X5 LDA, X1 SBC, CS                     12 see, for example, MARGIN-CHANGES.
13   IF, X4 STY, X5 STA, ENDIF,             13
14   X2 ROL, X3 ROL, DEX, EQ                14
15 UNTIL,  XSAVE LDX,                       15
16   X5 LDA, 5 SP) STA,                     16
17   X4 LDA, 4 SP) STA,                     17
18   X3 LDA, 3 SP) STA,                     18
19   X2 LDA, 2 SP) STA,                     19
20   INX, INX, YSAVE LDY, TNEXT,            20
```

```
scr # 146
  0 ( 2* U2/ SWAB )  HEX                          0 LABEL 2* ( n -- n*2 )
  1                                                1 PURPOSE: multiply n by 2.
  2 LABEL 2*                                       2
  3  0 SP) ASL, 1 SP) ROL, TNEXT,                  3
  4                                                4 LABEL U2/ ( n -- n/2 )
  5 LABEL U2/                                      5 PURPOSE: unsigned divide n by 2.
  6  1 SP) LSR, 0 SP) ROR, TNEXT,                  6
  7                                                7
  8 LABEL SWAB  0 SP) LDA, PHA, 1 SP) LDA,         8 LABEL SWAB ( n1 -- n2 )
  9  0 SP) STA, PLA, 1 SP) STA, TNEXT,             9 PURPOSE: swap the upper and lower bytes
 10                                               10  of n1 to give n2.
 11                                               11
 12                                               12
 13                                               13
 14                                               14
 15                                               15
 16                                               16
 17                                               17
 18                                               18
 19                                               19
 20                                               20
 21                                               21
 22                                               22
 23                                               23
147
  0 ( = 0= ) HEX                                   0 LABEL = ( n1 n2 -- flag )
  1                                                1 PURPOSE: leave a true flag if n1 equals
  2 LABEL = YSAVE STY, 0 #B LDY,                   2  n2.
  3  2 SP) LDA, 0 SP) CMP, EQ                      3
  4 IF, 3 SP) LDA, 1 SP) CMP, ENDIF, EQ            4 FRAG .Y@
  5 IF, DEY, ENDIF,                                5 PURPOSE:  an alternate exit from
  6 INX, INX, 1 SP) STY, 0 SP) STY,                6  LABEL definitions:  stores Y register
  7 YSAVE LDY, TNEXT,                              7  onto stack, jumps to YNEXT
  8                                                8
  9                                                9 LABEL 0= ( n -- flag )
 10 LABEL 0= YSAVE STY, 0 #B LDY,                 10 PURPOSE: leave a true flag if n equals
 11  0 SP) LDA, 1 SP) ORA, EQ                     11  zero.
 12 IF, DEY, ENDIF,                               12
 13  0 SP) STY, 1 SP) STY,                        13
 14 YSAVE LDY, TNEXT,                             14
 15                                               15
 16                                               16
 17                                               17
 18                                               18
 19                                               19
 20                                               20
 21                                               21
 22                                               22
 23                                               23 scr # 148
  0 ( U< 0< ABS ) HEX                              0 LABEL U< ( n1 n2 -- flag )
  1                                                1 PURPOSE: leave a true flag if n1 is less
  2 LABEL U<                                       2  than n2.
  3  2 SP) LDA, 0 SP) CMP,                         3
  4  3 SP) LDA, 1 SP) SBC,                         4 LABEL 0< ( n -- flag )
```

```
 5  INX, INX, OFF #B LDA, 0 #B ADC,         5  PURPOSE: leave a true flag if n is less
 6  0 SP) STA, 1 SP) STA,                   6   than zero.
 7  TNEXT,                                  7
 8                                          8  LABEL ABS ( n -- u )
 9  LABEL 0<  YSAVE STY,                    9  PURPOSE: leave the unsigned (absolute)
10  0 #B LDY, 1 SP) LDA, MI                10   value of n.
11  IF, DEY, ENDIF,                        11
12  0 SP) STY, 1 SP) STY,                  12
13  YSAVE LDY, TNEXT,                      13
14                                         14
15                                         15
16  LABEL ABS  1 SP) LDA, MI               16
17  IF, SEC,                               17
18  0 #B LDA, 0 SP) SBC, 0 SP) STA,        18
19  0 #B LDA, 1 SP) SBC, 1 SP) STA,        19
20  ENDIF, TNEXT,                          20
21                                         21
22                                         22
23                                         23
149
 0  ( UMIN UMAX OMAX ) HEX                  0  LABEL UMIN ( u1 u2 -- umin )
 1                                          1  PURPOSE: leave the unsigned minimum of
 2  LABEL UMIN                              2   u1 and u2.
 3  2 SP) LDA, 0 SP) CMP,                   3
 4  3 SP) LDA, 1 SP) SBC, CS                4  LABEL UMAX ( u1 u2 -- umax )
 5  IF, 0 SP) LDA, 2 SP) STA,               5  PURPOSE: leave the unsigned maximum of
 6      1 SP) LDA, 3 SP) STA,               6   u1 and u2.
 7  ENDIF, INX, INX,                        7
 8  TNEXT,                                  8  LABEL OMAX ( n -- 0 | n )
 9                                          9  PURPOSE: leave the greater positive
10  LABEL UMAX                             10   integer comparing n with zero.
11  2 SP) LDA, 0 SP) CMP,                  11
12  3 SP) LDA, 1 SP) SBC, NC               12
13  IF, 0 SP) LDA, 2 SP) STA,              13
14      1 SP) LDA, 3 SP) STA,              14
15  ENDIF, INX, INX,                       15
16  TNEXT,                                 16
17                                         17
18  LABEL OMAX  1 SP) LDA, MI              18
19  IF, 0 #B LDA, 0 SP) STA, 1 SP) STA,    19
20  ENDIF,                                 20
21  TNEXT,                                 21
22                                         22
23                                         23 scr # 150
  0                                         0
  1                                         1
  2                                         2
  3                                         3
  4                                         4
  5                                         5
  6                                         6
  7                                         7
  8                                         8
  9                                         9
 10                                        10
 11                                        11
 12                                        12
 13                                        13
 14                                        14
 15                                        15
```

```
151
   0 ( ?K QUE ?A ?S ) HEX                    0 LABEL ?K ( -- flag )
   1                                         1 PURPOSE: detect if a key has been
   2 LABEL ?K  YSAVE STY, DEX, DEX,           2  pressed.
   3  0 #B LDY, CHAR LDA, MI                  3
   4  IF, DEY, ENDIF, 0 SP) STY,              4 LABEL ?A ( -- flag )
   5  1 SP) STY, YSAVE LDY, TNEXT,            5 PURPOSE: detect if "again" key has been
   6                                          6  pressed.
   7 LABEL QUE  YSAVE STY, C000 LDA, MI       7  true means "Tab" key pressed.
   8  IF, \ .QUE JSR, ENDIF, YSAVE LDY,       8  this is the EDDE "again" key.
   9  TNEXT,                                  9
  10                                         10 LABEL ?S ( -- flag )
  11 LABEL ?A ( AGAIN? )  YSAVE STY,         11 PURPOSE: valid search for character(?).
  12  DEX, DEX, 0 #B LDY,                    12  true means normal character typed.
  13  CHAR LDA, tab 80 OR #B CMP, EQ         13
  14  IF, DEY, 07F AND, CHAR STA, ENDIF,     14
  15  0 SP) STY, 1 SP) STY, YSAVE LDY,       15
  16  TNEXT,                                 16
  17                                         17
  18 LABEL ?S ( SEARCH FOR CHAR ? )          18
  19  YSAVE STY, DEX, DEX, 0 #B LDY,         19
  20  CHAR LDA, ff 80 OR #B CMP, CS          20
  21  IF, DEY, ENDIF, 0 SP) STY,             21
  22  1 SP) STY, YSAVE LDY, TNEXT,           22
  23                                         23 scr #  152
   0 ( ?E ?D ) HEX                           0 LABEL ?E ( -- flag )
   1                                         1 PURPOSE: return true if both lex keys
   2 LABEL ?E ( EXPAND SELECTION? )          2  are being pressed.
   3  YSAVE STY, DEX, DEX, 0 #B LDY,         3  used to expand selection.
   4  XFLAG LDA, 3 #B CMP, EQ IF, DEY, ENDIF, 4  forth equivalent  : ?E  XFLAG C@ 3 = ;
   5  0 SP) STY, 1 SP) STY, YSAVE LDY,       5
   6  TNEXT,                                 6 LABEL ?D ( -- flag )
   7                                         7 PURPOSE: return true if delete key has
   8 LABEL ?D ( DELETE FROM PATTERN? )       8  been pressed.
   9  YSAVE STY, DEX, DEX,                   9  used to delete from the search pattern.
  10  0 #B LDY, CHAR LDA,                    10
  11  del 80 OR #B CMP, EQ IF, DEY, ENDIF,   11 LABEL QUE ( -- )
  12  0 SP) STY, 1 SP) STY, YSAVE LDY,       12 PURPOSE: fetch character from keyboard
  13  TNEXT,                                 13  and place in keyboard queue.
  14                                         14  also jump to the subroutine at .QVEC
  15                                         15  keyboard uses C000 and .QUE.
```

```
153
  0 ( MSG ) HEX
  1
  2 LABEL MSG0  YSAVE STY, 0 #B LDA, X1 STA,
  3 \ .MSG0 OFF AND #B LDA,
  4 \ .MSG0 SWAB OFF AND #B LDY,
  5 X0 STA, X0 1+ STY,
  6 0 #B LDY,
  7 X0 )Y LDA, TAY,
  8 BEGIN, X0 )Y LDA, 80 #B ORA,
  9   CURR 1- ,Y STA, DEY, EQ
 10 UNTIL,
 11 X0 )Y LDA, TAY, A0 #B LDA,
 12 BEGIN, CURR ,Y STA, INY, 50 #B CPY, EQ
 13 UNTIL,
 14 DEX, DEX, X1 LDA, 0 SP) STA,
 15 YSAVE LDY,
 16
 17
 18
 19
 20
 21
 22
 23
```

```
 0 LABEL MSG0 ( -- 0 )
 1 PURPOSE: puts signon message in CURR,
 2   places a zero on the stack, and then
 3   executes DISP (next word in dictionary)
 4
 5 save y-reg, set X1 to zero.
 6 store the address of .MSG0 at X0.
 7 put length of .MSG0 in y-reg.
 8 set high bit of each element of .MSG0
 9   and store in CURR (excluding count).
10 put blanks after at the end of CURR.
11 leaves a zero on the stack.
12 ...
13
14
15
16
17
18 NOTE: next word (disp) is executed
19   immediately after this word.
20
21
22
23
```

```
scr # 154
  0 ( DISP ) HEX
  1
  2 LABEL DISP  YSAVE STY,
  3 0 SP) LDA, INX, INX, XSAVE STX,
  4 TAY, 1 #B LDA, UPDATE ,Y STA,
  5 \ .DISP0 ,Y LDA, X0    STA,
  6 \ .DISP1 ,Y LDA, X0 1+ STA,
  7 \ .SCR0  ,Y LDA, X1    STA,
  8 \ .SCR1  ,Y LDA, X1 1+ STA,
  9 C001 STA, C055 STA,
 10 4F #B LDX, 27 #B LDY,
 11 BEGIN,
 12   CURR ,X LDA, X1 )Y STA, DEX,
 13   CURR ,X LDA, X0 )Y STA, DEX, DEY,
 14   CURR ,X LDA, X1 )Y STA, DEX,
 15   CURR ,X LDA, X0 )Y STA, DEX, DEY, MI
 16 UNTIL,
 17 CLIN LDA, XSAVE LDX, YSAVE LDY, TNEXT,
 18
 19
 20
 21
 22
 23
```

```
 0 LABEL DISP ( n -- )
 1 PURPOSE: distribute text in CURR for
 2   display.
 3
 4 clear keyboard buffer, set soft switch
 5   (C055).
 6 save x-reg.
 7 put stack element in y-reg.
 8 store 1 in UPDATE array.
 9 put .DISP element into X0.
10 put .SCR0 element into X1.
11 set x-reg for 79 ($4f) columns.
12 set y-reg for 39 ($27) columns.
13 take every other element in CURR and
14   store in position pointed to by .DISP,
15   and the other elements and store into
16   the position pointed to by .SCR0.
17 load a-reg with CLIN.
18 restore x-reg.
19
20
21
22
23
```

```
155
  0 ( AUXIL ) HEX
  1
  2 LABEL AUXIL  YSAVE STY,
  3 XSAVE STX, 0 #B LDX,
  4 BEGIN, UPDATE ,X LDA, NE
  5   IF, 0 #B LDA, UPDATE ,X STA,
  6     \ .SCR0  ,X LDA, X0    STA,
  7     \ .SCR1  ,X LDA, X0 1+ STA,
  8     \ .DISP0 ,X LDA, X1    STA,
  9     \ .DISP1 ,X LDA, X1 1+ STA,
```

```
 0 LABEL AUXIL ( -- )
 1 PURPOSE: update screen/display elements.
 2
 3 save x-reg, load x-reg with zero.
 4 if an element needs updating (UPDATE
 5   array) then clear UPDATE element,
 6   store .SCR0 element in X0 and .DISP0
 7   element in X1.
 8 attend to modem if necessary. waiting
 9   for C019 eliminates screen flicker.
```

```
10    BEGIN, C019 LDA, PL               10  clear keyboard strobe, set soft
11    UNTIL, ROM? LDA, NE               11  switch (C054).
12    IF, C000 STA,                     12  set y-reg to 39 ($27).
13    ELSE, C001 LDA,                   13  move elements from .SCR0 to .DISP0.
14    ENDIF, C054 STA, 27 #B LDY,       14  attend to modem if necessary. waiting
15    BEGIN,                            15  for C019 eliminates screen flicker.
16     X0 )Y LDA, X1 )Y STA, DEY,       16  restore x-reg.
17     X0 )Y LDA, X1 )Y STA, DEY,       17
18     X0 )Y LDA, X1 )Y STA, DEY,       18
19     X0 )Y LDA, X1 )Y STA, DEY, MI    19
20    UNTIL,                            20
21   ENDIF, INX, 18 #B CPX, EQ          21
22  UNTIL, XSAVE LDX, YSAVE LDY, TNEXT, 22
23                                      23
```

```
scr #  156
  0 ( LEXLEN ROM? ) HEX                  0 LABEL LEXLEN ( -- n )
  1                                      1 PURPOSE: put length of search pattern
  2 LABEL LEXLEN  DEX, DEX,              2 onto the stack.
  3   0 #B LDA, 1 SP) STA,               3 forth equivalent  : LEXLEN  PATT C@ ;
  4   PATT LDA, 0 SP) STA, TNEXT,        4
  5                                      5 LABEL ROM? ( -- n )
  6 LABEL ROM? DEX, DEX,                 6 PURPOSE: the returned value is used to
  7   ROM? LDA, 0 SP) STA,               7 determine whether the disk version or
  8   ROM? 1+ LDA, 1 SP) STA,            8 the rom version of Swyft is being
  9   TNEXT,                             9 used; different FRAGMENTS are used
 10                                     10 depending on the version.
 11                                     11 the value is zero if using the disk
 12                                     12 version.
 13                                     13 forth equivalent  : ROM?  ROM? C@ ;
 14                                     14
 15                                     15
 16                                     16
 17                                     17
 18                                     18
 19                                     19
 20                                     20
 21                                     21
 22                                     22
 23                                     23
157
  0 ( SETDISP CLEAR SIGNON FLUSH ) HEX   0 LABEL SETDISP ( --)
  1                                      1 PURPOSE: adjust display switches.
  2 LABEL SETDISP                        2
  3   C001 STA, C051 LDA, C054 LDA,      3 C00D 80 column display on
  4   C00D STA, C00F STA, TNEXT,         4 C00F alternate character set on
  5                                      5 C051 text mode on
  6 T: CLEAR  CURR 50 A0 FILL            6 C054 page 2 off, main memory
  7   DO I DISP LOOP AUXIL ;             7
  8                                      8 T: CLEAR  (a b -- )
  9 T: SIGNON MSG0 18 1 CLEAR ;          9 PURPOSE: clear screen lines a to b-1.
 10                                     10
 11 ( FLUSHES KEYBOARD BUFFER )         11 T: SIGNON ( --)
 12 T: FLUSH                            12 PURPOSE: clear screen, display message.
 13   0 CHAR TO                         13
 14   QIN QOUT TO                       14 T: FLUSH ( --)
 15   0 C010 C! ;                       15 PURPOSE: flush Swyft (CHAR, QOUT,
 16                                     16 QIN) and Apple (C010) keyboard buffers.
 17                                     17
 18                                     18
 19                                     19
 20                                     20
```

```
scr # 158
   0 ( .40COL .MON ABOOT ) HEX ;S
   1
   2 FRAG .40COL
   3   C051 LDA, C00E STA,
   4   C056 LDA, C00C STA,
   5   C054 LDA, C000 STA,
   6   F0 #B LDA,  36 STA,
   7   FD #B LDA,  37 STA,
   8   FF #B LDA,  32 STA,
   9   0 #B LDA, 24 STA, 25 STA, RTS,
  10
  11 LABEL ABOOT   \ .40COL JSR,
  12   0 #B LDA, 3F4 STA, 39E STA, 3E0 JMP,
  13
  14
  15
  16
  17
  18
  19
  20
  21
  22
  23
159
   0 ( .MON ) HEX ;S
   1
   2 ( copy text & variables to main ram )
   3 FRAG .MON   \ .40COL JSR, FFF8 LDA, EQ
   4   IF,  3C STA, 3D STA, 42 STA, 43 STA,
   5     EBOT LDA, 3E STA,
   6     EBOT 1+ LDA, 3F STA,
   7     CLC, C311 JSR,
   8     BEOT LDA, 3C STA, 42 STA,
   9     BEOT 1+ LDA, 3D STA, 43 STA,
  10     FF LDA, 3E STA,
  11     BF #B LDA, 3F STA,
  12     CLC, C311 JSR,
  13   ENDIF, <MON> JMP,
  14
  15
  16
  17
  18
  19
  20
  21
  22
  23 scr # 160
   0
   1
   2
   3
   4
```

```
 5                                                  5
 6                                                  6
 7                                                  7
 8                                                  8
 9                                                  9
10                                                 10
11                                                 11
12                                                 12
13                                                 13
14                                                 14
15                                                 15
16                                                 16
17                                                 17
18                                                 18
19                                                 19
20                                                 20
21                                                 21
22                                                 22
23                                                 23
161
 0 ( <SCR> ) HEX                                    0 FRAG .SCR
 1                                                  1 PURPOSE: from X1 to X0, move 40 bytes
 2 FRAG .SCR  0 #B LDX,                             2 at a time, for 24 lines of the screen
 3 BEGIN, 27 #B LDY,                                3
 4  \ .DISP0    ,X LDA, X0    STA,                  4
 5  \ .DISP0 1+ ,X LDA, X1    STA,                  5
 6  \ .DISP1    ,X LDA, X0 1+ STA,                  6
 7  \ .DISP1 1+ ,X LDA, X1 1+ STA,                  7
 8   BEGIN, X1 )Y LDA, X0 )Y STA, DEY,              8
 9     X1 )Y LDA, X0 )Y STA, DEY, MI                9
10   UNTIL, INX, 17 #B CPX, EQ                     10
11   UNTIL, RTS,                                   11
12                                                 12
13                                                 13
14                                                 14
15                                                 15
16                                                 16
17                                                 17
18                                                 18
19                                                 19
20                                                 20
21                                                 21
22                                                 22
23                                                 23 scr # 162
 0 ( SCROLL ) HEX                                   0 LABEL SCROLL
 1                                                  1 PURPOSE: scroll the text up if you are
 2 LABEL SCROLL -YSAVE STY,                         2 on the last character of the display
 3 XSAVE STX, 0 #B LDY,                             3 window.
 4 CLIN DEC, TOP INC, EQ                            4
 5 IF, TOP 1+ INC, ENDIF,                           5
 6 BEGIN, WND0 1+ ,Y LDA, WND0 ,Y STA,              6
 7   WND1 1+ ,Y LDA, WND1 ,Y STA,                   7
 8   WND2 1+ ,Y LDA, WND2 ,Y STA,                   8
 9   WND3 1+ ,Y LDA, WND3 ,Y STA,                   9
10   INY, 17 #B CPY, EQ                            10
11 UNTIL, C001 STA,                                 11
12 C055 STA, \ .SCR JSR,                            12
13 BEGIN, C019 LDA, PL UNTIL,                       13
14 C054 LDA, \ .SCR JSR,                            14
15 XSAVE LDX, YSAVE LDY, TNEXT,                     15
```

```
 16                                            16
 17                                            17
 18                                            18
 19                                            19
 20                                            20
 21                                            21
 22                                            22
 23                                            23
163
  0 ( .ON/OFF .ON ON OFF ) HEX                  0 FRAG .ON/OFF ( -- )
  1 FRAG .ON/OFF YPOS LDY,                      1 PURPOSE: calculates cursor position.
  2 \ .DISP0 ,Y LDA, X0 STA,                    2
  3 \ .DISP1 ,Y LDA, X0 1+ STA,                 3 X0=address of beginning of display line
  4 BEGIN, C019 LDA, PL                         4 picks up characters from the modem
  5 UNTIL, XPOS LDY, BANK LDA, EQ               5  placing them into the modem que
  6 IF,  C001 STA, C055 STA,                    6 regY=YPOS
  7 ELSE, ROM? LDA, NE                          7 sets the proper ram video bank
  8  IF, C000 STA, ELSE, C001 LDA, ENDIF,       8
  9  C054 STA, ENDIF, RTS,                      9
 10                                            10
 11 FRAG .ON YSAVE LDY,                        11
 12 LABEL ON   YSAVE STY, \ .ON/OFF JSR,       12
 13  X0 )Y LDA, OFF #B CMP, NE                 13
 14  IF, SAVECHAR STA, OFF #B LDA,             14
 15   X0 )Y STA, ENDIF,                        15
 16  ROM? LDA, NE                              16
 17  IF, C000 STA, ELSE, C001 LDA, ENDIF,      17
 18  C054 STA, YSAVE LDY, TNEXT,               18
 19                                            19
 20 LABEL OFF  YSAVE STY, \ .ON/OFF JSR,       20
 21  SAVECHAR LDA, X0 )Y STA, ROM? LDA, NE     21
 22  IF, C000 STA, ELSE, C001 LDA, ENDIF,      22
 23  C054 STA, YSAVE LDY, TNEXT,               23 scr # 164
  0 ( <CURSOR> ) HEX                            0 FRAG ON ( -- )
  1                                             1 PURPOSE: save Y-reg before doing .ON
  2 FRAG .CURSOR -X0 STA, X0 1+ STY,            2
  3 18 #B LDY,                                  3 FRAG .ON ( -- )
  4 BEGIN, DEY,                                 4 PURPOSE: display cursor on screen.
  5  X0    LDA, WND0 ,Y CMP,                    5
  6  X0 1+ LDA, WND1 ,Y SBC, CS                 6 do the following if the character on
  7 UNTIL, NE                                   7 the screen is not a del character:
  8 IF, X0 LDA, GAP SBC, SEC,                   8 put del character on screen (into ram)
  9 ELSE, X0 LDA,                               9 (little checkerboard),
 10 ENDIF, WND0 ,Y SBC, YPOS STY,              10 saving current character in SAVECHAR
 11 .A LSR, XPOS STA, 0 #B LDA, 0 #B ADC,      11 turn regular ram back on.
 12 BANK STA,  BL0 LDA, CTR STA,               12
 13 BL0 1+ LDA, CTR 1+ STA,  RTS,              13 FRAG OFF ( -- )
 14                                            14 PURPOSE: turn cursor off.
 15                                            15
 16                                            16 put character on screen (into ram)
 17                                            17 turn regular ram back on
 18                                            18
 19                                            19
 20                                            20
 21                                            21
 22                                            22
 23                                            23
```

165
```
  0 ( RENCUR ) HEX
  1 LABEL RENCUR  YSAVE STY, BEOT LDA,
  2 BEOT 1+ LDY, \ .CURSOR JSR, SEC,
  3 WND0 ,Y LDA, BEOT SBC, X2 STA, SEC,
  4 WND1 ,Y LDA, BEOT 1+ SBC, X2 ORA, EQ
  5 IF, EOS 1+ LDA, X1 1+ STA, 0 #B LDY,
  6   EOS LDA, EQ IF, X1 1+ DEC, ENDIF,
  7   1 #B SBC, X1 STA, X1 )Y LDA,
  8   20 #B CMP, CS
  9   IF, YPOS LDY, YPOS DEC, SEC,
 10     EOS LDA, WND0 1- ,Y SBC,
 11     .A LSR, XPOS STA, 0 #B LDA, 0 #B ADC,
 12     BANK STA,
 13 ENDIF, ENDIF, 0 #B LDA, NARROW 1+ STA,
 14 NARROW STA, XPOS LDY, W/2 CPY, CS
 15 IF, XPOS STA, YPOS INC, ENDIF,
 16 BEOT LDA, YPOS LDY, WND0 ,Y CMP, EQ
 17 IF, BEOT 1+ LDA, WND1 ,Y CMP, EQ
 18   IF, BEGIN, WND0 1- ,Y LDA,
 19   WND0 ,Y CMP, NE IF, \ .ON JMP, ENDIF,
 20   WND1 ,Y LDA, WND1 1- ,Y CMP, NE
 21     IF, \ .ON JMP, ENDIF, DEY, YPOS DEC,
 22   AGAIN,
 23 ENDIF, ENDIF, \ .ON JMP,
```

```
  0 FRAG .CURSOR ( -- )
  1 PURPOSE: calculates cursor position
  2 given address in regs A,Y.
  3
  4 output:
  5 X0=address
  6 YPOS=line number
  7 XPOS=column number divided by 2
  8 BANK=column number (even or odd)
  9 CTR=blinking rate counter value (BLO)
 10
 11 looks in window table for entry that
 12 is less than or equal to that address
``` scr # 166
```
  0 ( LEXCUR ) HEX
  1
  2 LABEL LEXCUR -YSAVE STY,
  3 0 #B LDA, LOCAL1 DUP 1+ STA, STA,
  4 OFF #B LDA, NARROW DUP 1+ STA, STA,
  5 EOS 1+ LDY, EOS LDA, EQ
  6 IF, DEY, ENDIF, 0 #B SBC,
  7 \ .CURSOR JSR,
  8 0 #B LDY, X0 )Y LDA, ff #B CMP, EQ
  9 IF, X0 1+ DEC, DEY, X0 )Y LDA,
 10 X0 1+ INC, 20 #B CMP, CS
 11 IF, SEC, YPOS LDY, NE
 12   IF, WND0 ,Y LDA, DEY, WND0 ,Y SBC,
 13   PHA, SEC,
 14   WND1 1+ ,Y LDA, WND1 ,Y SBC,
 15   0FE #B AND, NE
 16   IF, PLA, CLC, GAP SBC, PHA, ENDIF,
 17   PLA, WIDE CMP, NE
 18   IF, YPOS STY, .A LSR, XPOS STA,
 19     0 #B LDA, 0 #B ADC, BANK STA,
 20 ENDIF, ENDIF, ENDIF, ENDIF,
 21 \ .ON JMP,
 22
 23
167
 0
 1
 2
 3
 4
 5
 6
 7
 8
 9
```

```
  0 LABEL RENCUR ( -- )
  1 PURPOSE: put a "fat" cursor on screen.
  2 "Fat" means a checkerboard on character
  3 and a highlight to the left.
  4
  5 calculates cursor position from BEOT
  6 if cursor is at beginning of line
  7   look at last character in selection
  8   if it isn't a control character
  9     place the blinker on the line above
 10     where the next character will go
 11   if it is a control character
 12     place the blinker at the beginning
 13     of the next line
 14 set LEXXED to zero: fat cursor
 15 if cursor is in last display position
 16   place blinker at beginning next line
 17   >>>> *** why isn't BANK set? *** <<<<
 18 if cursor is at beginning of line
 19   and just follows an implicit page brk
 20   then: place the blinker at the
 21   implicit page break, in the first cell
 22
 23

0 LABEL LEXCUR ( -- )
  1 PURPOSE: put a "thin" cursor on the
  2 character. "Thin" means a checkerboard
  3 and a highlight alternate on the same
  4 character.
  5
  6 set LEXXED to -1: thin cursor
  7 calculate cursor position from EOS-1
  8 if character is an explicit page break
  9   and previous character is normal
```

```
10                                              10  and not first line in display
11                                              11  and previous line isn't full
12                                              12   calculate XPOS by subtracting
13                                              13    low order bytes in window table
14                                              14    if previous line starts below gap
15                                              15      (high order difference isn't -2)
16                                              16      then: subtract GAP from window diff
17                                              17   (fixes "del" bug: 9Jan85)
18                                              18   then: place blinker on previous line
19                                              19
20                                              20
21                                              21
22                                              22
23                                              23 scr #  168
 0                                               0
 1                                               1
 2                                               2
 3                                               3
 4                                               4
 5                                               5
 6                                               6
 7                                               7
 8                                               8
 9                                               9
10                                              10
11                                              11
12                                              12
13                                              13
14                                              14
15                                              15
16                                              16
17                                              17
18                                              18
19                                              19
20                                              20
21                                              21
22                                              22
23                                              23
169
 0 ( FLIP FLIP/TRIM SEL BOW ) HEX                0 T: FLIP ( start len1 len2 -- )
 1                                               1 PURPOSE: from start, swap the bytes so
 2 ( STR  LEN1  LEN2  --- )                      2  that the positions of length1 and
 3 T: FLIP                                       3  length2 are swapped.
 4   ROT >R 2DUP + R@ SWAP REVERSE                4
 5   R@ OVER REVERSE                              5 T: FLIP/TRIM ( start len1 len2 len3 -- )
 6   R> + SWAP REVERSE ;                          6 PURPOSE: store cut.
 7                                               7
 8 ( STR  LEN1 LEN2 LEN3 --- )                    8 T: SEL  ( -- EOS-BOS )
 9 T: FLIP/TRIM                                  9 PURPOSE: returns length of selected
10   2DUP SWAP >R >R + + OVER >R REVERSE        10  text.
11   R> DUP R@ REVERSE                          11
12   R> + R> REVERSE ;                          12 T: BOW  ( -- addr )
13                                              13 PURPOSE: returns address of beginning of
14 LABEL SEL   SEC, DEX, DEX,                   14  display window.
15   EOS    LDA, BOS    SBC, 0 SP) STA,         15
16   EOS 1+ LDA, BOS 1+ SBC, 1 SP) STA,         16
17   TNEXT,                                     17
18                                              18
19 LABEL BOW   DEX, DEX,                        19
20   WNDO LDA, 0 SP) STA,                       20
```

```
21 WND1 LDA, 1 SP) STA, TNEXT,
22
23
``` scr # 170
```
 0 ( ?BLINK ?LBLINK ?LEXXED ) HEX
 1
 2 T: ?BLINK -1 CTR +TO CTR
 3 IF CTR BL1 DIRTY 0= IF U2/ U2/ ENDIF =
 4   IF OFF ENDIF
 5 ELSE ON
 6   BL0 DIRTY 0= IF U2/ U2/ ENDIF CTR TO
 7 ENDIF ;
 8
 9 T: ?LBLINK SEL 2 U< IF ?BLINK ENDIF ;
10
11 T: ?LEXXED  NARROW
12 IF -1 BEOT +TO  EBOT 1- C@ BEOT C!
13   -1 EOS +TO -1 EBOT +TO
14   -1 BOS +TO
15   0 NARROW TO
16 ENDIF ;
17
18
19
20
21
22
23
```

```
 0 T: ?BLINK ( -- )  blink cursor
 1 PURPOSE: toggle for the cursor to make
 2 it blink.
 3 if the text is not dirty then blink the
 4 cursor at 4 times its normal speed.
 5 decrement CTR.
 6 when it is BL1, turn blinker off.
 7 when it is 0, turn blinker on
 8 and set CTR to BL0.
 9
10 T: ?LBLINK ( -- )
11 PURPOSE: if less than two characters are
12 selected, blink cursor.
13
14 T: ?LEXXED ( -- )
15 PURPOSE: if LEXXED is true then move
16 a character from EBOT 1- across gap to
17 new BEOT.
```

171
```
 0 ( .WRAP ) HEX
 1
 2 FRAG .WRAP  SEC, WR LDA, YWRAP SBC,
 3  X5 STA, WR 1+ LDA, 0 #B SBC,
 4  X5 1+ STA, YWRAP LDY, cr #B LDA,
 5  BEGIN, X5 )Y CMP, CS
 6  IF, EQ IF, INY, ENDIF,
 7    TYA, YWRAP SBC, WC STA, EQ
 8   IF, WC INC, ENDIF, RTS,
 9  ENDIF, INY, MI
10  UNTIL, 20 #B LDA, WIDE LDY,
11  DEY, WR )Y CMP, NE
12  IF, INY,
13   BEGIN, DEY, MI
14    IF, WIDE LDA, WC STA, RTS,
15    ENDIF, WR )Y CMP, EQ
16   UNTIL, INY, WC STY, RTS,
17  ENDIF, DEY, WR )Y CMP, EQ
18  IF, WIDE LDA, WC STA, RTS,
19  ENDIF,
20
21
22
23
```

```
 0 FRAG .WRAP ( -- )
 1 PURPOSE: given character at wrap
 2 address (WR) return wrap count (WC)
 3 for line.
 4
 5 X5+YWRAP initially equal to WR.
 6 UNTIL either a cr or ff or end of line
 7 if a cr or ff
 8  if a cr, increment count by one
 9  increment wrap count by count
10  if wrap count is 0, increment to one
11  exit
12 else increment count.
13 if there are 1 or 2 blanks at end of
14 line then wrap the last word by
15 decrementing until a blank is found,
16 increment to first character of word,
17 and exit.
18 if the line is full of blanks or
19 characters then do not wrap line
20 (ie, WC set equal to WIDE).
``` scr # 172
```
 0 ( .WRAP ... WRAP BMP ) HEX
 1
 2 WIDE LDY, WR-)Y CMP, EQ
 3 IF, DEY, DEY,
 4  BEGIN, DEY, MI
```

```
0 LABEL WRAP ( -- )
1 PURPOSE: call .WRAP.
2
3 FRAG BMP ( -- )
4 PURPOSE: add the wrap count to the wrap
```

```
 5   IF, WIDE LDA, WC STA, RTS,
 6     ENDIF, WR )Y CMP, EQ
 7   UNTIL, INY, WC STY, RTS,
 8   ENDIF, WIDE LDA, WC STA, RTS,
 9
10 LABEL WRAP  YSAVE STY,
11   \ .WRAP JSR, YSAVE LDY, TNEXT,
12
13 FRAG BMP  CLC,
14   WC LDA, WR ADC, WR STA, CS
15   IF, WR 1+ INC, ENDIF,
16   EBOT CMP, WR 1+ LDA, EBOT 1+ SBC, NC
17   IF, RTS, ENDIF,
18   WR LDA, BEOT CMP,
19   WR 1+ LDA, BEOT 1+ SBC, NC
20   IF, WR LDA, GAP ADC, WR STA,
21     WR 1+ LDA, GAP 1+ ADC, WR 1+ STA,
22   ENDIF, RTS,
23
```

```
 5   address. if EBOT < wrap address < BEOT
 6   then also add the GAP to the wrap
 7   address.
 8
 9 add wrap count to wrap address.
10 if the new wrap address exceeds EBOT
11   then exit.
12 otherwise if new wrap address is less
13   than BEOT
14   then add gap to the new wrap address.
```

173
```
 0 ( LOCLIN ) HEX
 1
 2 LABEL LOCLIN  YSAVE STY,
 3   0 SP) LDA, X0 STA,
 4   1 SP) LDA, X0 1+ STA, INX, INX,
 5   PAGES LDY, INY,
 6   BEGIN, DEY,
 7     X0     LDA, PGS2 ,Y CMP,
 8     X0 1+ LDA, PGS3 ,Y SBC, CS
 9   UNTIL,  PAGE# STY,
10   PGS0 ,Y LDA, WR STA,
11   PGS1 ,Y LDA, WR 1+ STA,
12   X0 LDA, PGS2 ,Y SBC, LINREL STA,
13   OFF #B LDY, X3 STY,
14   BEGIN, X3 INC, X3 LDA, LINREL CMP, NE
15     IF, \ .WRAP JSR, \ BMP JSR, CLC,
16       C000 LDA, MI IF, \ .QUE JSR, ENDIF,
17     ENDIF, CS
18   UNTIL,
19   WR    LDA, LINADR STA,
20   WR 1+ LDA, LINADR 1+ STA,
21   YSAVE LDY, TNEXT,
22
23
```

```
 0 LABEL 2.LOCLIN  ( line-number -- )
 1 PURPOSE: given cumulative line number
 2   return with  LINREL, LINADR, and PAGE#
 3   for that line-number.
 4
 5 store line# in X0.
 6 store total # of pages in Y-reg.
 7 search backwards in page table from
 8   y-reg 1+ until the page is found for
 9   the line address in X0.
10 store this page# (y-reg) in PAGE#.
11 store the address of the page in WR.
12 calculate offset within page (LINREL).
13 .WRAP this page until line LINREL,
14   BMPing across gap if necessary.
15   attend to key queue if necessary.
16 store wrap address for the beginning of
17   the line containing the line-number
18   in LINADR.
``` scr # 174
```
 0 ( LOCCHR ) HEX
 1
 2 LABEL LOCCHR  YSAVE STY,
 3   0 SP) LDA, X0 STA,
 4   1 SP) LDA, X0 1+ STA, INX, INX,
 5   PAGES LDY, INY,
 6   BEGIN, DEY,
 7     X0     LDA, PGS0 ,Y CMP,
 8     X0 1+ LDA, PGS1 ,Y SBC, CS
 9   UNTIL,
10   PGS0 ,Y LDA, WR STA,
11   PGS1 ,Y LDA, WR 1+ STA,
12   PGS2 ,Y LDA, LINE# STA,
13   PGS3 ,Y LDA, LINE# 1+ STA,
14   PAGE# STY, 0 #B LDY, X3 STY,
15   BEGIN, X3 INC, \ .WRAP JSR,
```

```
 0 LABEL 2.LOCCHR  ( character-address -- )
 1 PURPOSE: given an address for a
 2   character in text this word then
 3   returns PAGE#, LINADR, LINREL and LINE#
 4   where the address was found.
 5
 6 store address in X0.
 7 load y-reg with total # of pages (PAGES)
 8 search backwards in page array for wrap
 9   address that contains the value in X0.
10 when it is found then update WR and
11   LINE# from page table.
12 store y-reg in PAGE#.
13 wrap lines and bump across gap if
14   necessary.
15 update LINADR, LINREL, LINE#.
```

```
 16    C000 LDA, MI IF, \ .QUE JSR, ENDIF,      16
 17    WR LDA, X2 STA,                          17
 18    WR 1+ LDA, X2 1+ STA,                    18
 19    \ BMP JSR, SEC,                          19
 20    WR LDA, X0 SBC, X4 STA,                  20
 21    WR 1+ LDA, X0 1+ SBC, CS                 21
 22    UNTIL,                                   22
 23                                             23
175
  0  ( LOCCHR, .... ) HEX                       0
  1                                             1
  2  X4 ORA, EQ                                 2
  3  IF, WR LDA, WR 1+ LDY,                     3
  4  ELSE, X2 LDA, X2 1+ LDY, X3 DEC,           4
  5  ENDIF,                                     5
  6  LINADR STA, LINADR 1+ STY,                 6
  7  X3 LDA, LINREL STA, CLC,                   7
  8  LINE# ADC, LINE# STA, CS                   8
  9  IF, LINE# 1+ INC, ENDIF,                   9
 10  YSAVE LDY, TNEXT,                         10
 11                                            11
 12                                            12
 13                                            13
 14                                            14
 15                                            15
 16                                            16
 17                                            17
 18                                            18
 19                                            19
 20                                            20
 21                                            21
 22                                            22
 23                                            23
``` scr #  176

```
  0  ( WC@ WR@ WR! REWINDOW ) HEX              0 LABEL WC@   ( -- n )
  1                                            1 PURPOSE: return the wrap count.
  2  LABEL WC@  DEX, DEX,                      2
  3  WC LDA, 0 SP) STA,                        3 LABEL WR@   ( -- n )
  4  0 #B LDA, 1 SP) STA, TNEXT,               4 PURPOSE: return the wrap address.
  5                                            5
  6  LABEL WR@  DEX, DEX,                      6 LABEL WR!  ( address -- )
  7  WR LDA, 0 SP) STA,                        7 PURPOSE: store the address from the
  8  WR 1+ LDA, 1 SP) STA, TNEXT,              8  stack into the wrap address.
  9                                            9
 10  LABEL WR!  0 SP) LDA, WR STA,            10 LABEL REWINDOW  ( address -- )
 11  1 SP) LDA, WR 1+ STA,                    11 PURPOSE: initialize the window table.
 12  INX, INX, TNEXT,                         12 set up first line on screen with
 13                                           13 address on stack (WND0,WND1 with the
 14  LABEL REWINDOW  YSAVE STY,               14 Y-reg = 0).
 15  0 SP) LDA, WND0 STA,                     15 put zeroes into rest of the WND0,WND1
 16  1 SP) LDA, WND1 STA,  INX, INX,          16 elements (Y-reg decrementing from $17
 17  0 #B LDA, OLIN STA,  17 #B LDY,          17  to 1).
 18  BEGIN, WND0 ,Y STA, WND1 ,Y STA,         18 clear OLIN.
 19    DEY, EQ                                19
 20  UNTIL, YSAVE LDY, TNEXT,                 20
 21                                           21
 22                                           22
 23                                           23
```

```
177
  0 ( FIXEND ?SCROLL ENDSCREEN? AFTERGAP )
  1 HEX
  2
  3 T: FIXEND
  4   BEOT EOT =
  5   IF -1 BEOT +TO 1C BEOT C! ENDIF ;
  6
  7 T: ?SCROLL   CLIN 18 =
  8   IF WR@ EOT U< DUP 0=
  9    IF DROP NARROW 0= ENDIF
 10    IF AUXIL SCROLL ENDIF ENDIF ;
 11
 12 T: ENDSCREEN?
 13   WR@ BEOT = IF ?SCROLL ENDIF ;
 14
 15 LABEL AFTERGAP   YSAVE STY,
 16   CLIN LDA, 0 #B SBC, OLIN STA,
 17   DEX, DEX, 0 #B LDY, 17 #B CMP, NE
 18   IF, DEY, ENDIF,
 19   0 SP) STY, 1 SP) STY, YSAVE LDY,
 20   TNEXT,
 21
 22
 23
```

```
  0 T: FIXEND  ( -- )
  1 PURPOSE: if the last character of text
  2   was deleted then replace it with
  3   another form feed character.
  4
  5 T: ?SCROLL ( -- )
  6 PURPOSE: scroll the display.
  7   scroll one line up
  8   if the current line is 18 and
  9   if the wrap address < EOT or
 10   if wrap address = EOT and you did not
 11    lex to the end.
 12
 13 T: ENDSCREEN? ( -- )
 14 PURPOSE: scroll display until wrap
 15   address equals the BEOT.
 16
 17 LABEL AFTERGAP ( -- flag )
 18 PURPOSE: is current line offscreen?
 19 set OLIN=CLIN-1.
 20 if OLIN is not the last line then the
 21  flag is true.
 22 otherwise OLIN is the last line and the
 23  flag is false.
```

```
scr #  178
  0 ( XYNEXT YNEXT STOP? ) HEX
  1
  2 FRAG XYNEXT XSAVE LDX,
  3 FRAG YNEXT   YSAVE LDY, TNEXT,
  4 ;S
  5 LABEL STOP?
  6   DEX, DEX, 0 #B LDA,
  7   0 SP) STA, 1 SP) STA,
  8   C061 LDA, C062 ORA, MI
  9   IF, TNEXT, ENDIF,
 10   0 SP) DEC, 1 SP) DEC,
 11   TEOS 1+ LDA, WR 1+ CMP,
 12   TEOS LDA, WR SBC, NC
 13   IF, TNEXT, ENDIF,
 14   MQIN LDA, MQOUT CMP, NE
 15   IF, TNEXT, ENDIF,
 16   CHAR LDA, del 80 OR #B CMP, EQ
 17   IF, TNEXT, ENDIF,
 18   CHAR LDA, tab 80 OR #B CMP, CS
 19   IF, LEXXING LDA, EQ
 20    IF, TNEXT, ENDIF,
 21   ENDIF,
 22   0 SP) INC, 1 SP) INC,
 23   TNEXT,
```

```
179
  0 ( SAVEPAGE NEXTPAGE ) HEX
  1
  2 LABEL SAVEPAGE   ( -- ) YSAVE STY,
  3   LCT LDY, EQ
  4   IF, PCT LDY,
  5    WR    LDA, PGS0 ,Y STA,
  6    WR 1+ LDA, PGS1 ,Y STA,
  7    LCTR  LDA, PGS2 ,Y STA,
  8    LCTR 1+ LDA, PGS3 ,Y STA,
  9   ENDIF, YSAVE LDY, TNEXT,
```

```
  0 LABEL SAVEPAGE ( -- )
  1 PURPOSE: if the line count for the page
  2   (LCT) is zero then update a page in the
  3   page table.
  4
  5 INPUTS: LCT PCT WR LCTR
  6 OUTPUTS: PGS0 PGS1 PGS2 PGS3
  7
  8 NOTE: previously called PAGEBOUND.
  9
```

```
10                                              10
11 ;S                                           11
12                                              12
13 LABEL NEXTPAGE  ( addr -- page# )            13
14   YSAVE STY, FF #B LDY,                      14 ;S
15   BEGIN,                                     15
16     BEGIN, INY,                              16 LABEL NEXTPAGE ( addr -- page# )
17       A00 )Y LDA,   X0 STA, 0 SP) CMP,       17
18       B00 )Y LDA, X0 1+ STA, 1 SP) SBC, NC   18 this is part of Jonathan's routine to
19     UNTIL, Y0 STY,                           19 speed up the updating of the page table
20     0 #B LDY, X0 )Y LDX, ff #B CPX, EQ       20
21   UNTIL, 0 #B LDA, 1 SP) STA,                21
22   Y0 LDA, 0 SP) STA, YSAVE LDY, TNEXT,       22
23                                              23 scr #  180
   0 ( PAGEWRAP ) HEX ;S                        0 ;S LABEL PAGEWRAP
   1                                            1
   2 LABEL PAGEWRAP  ( -- )  YSAVE STY,         2
   3   BEGIN, \ .WRAP JSR,                      3
   4     LCT INC, CLC, WC LDA, NE               4 this is part of Jonathan's routine to
   5     IF, WR ADC, WR STA, CS                 5 speed up the updating of the page table
   6       IF, WR 1+ INC, ENDIF, ENDIF,         6
   7     0 #B LDY, WR )Y LDA, ff #B CMP, EQ     7
   8     IF, INY, WR INC, CS                    8
   9       IF, WR 1+ INC, ENDIF,                9
  10     ELSE, LCT LDA, LONG CMP, EQ           10
  11       IF, INY, ENDIF,                     11
  12     ENDIF, DEY, EQ                        12
  13   UNTIL,                                  13
  14   PCT INC, CLC, LCT LDA, LCTR ADC, CS     14
  15   IF, LCTR 1+ INC, ENDIF,                 15
  16   0 #B LDA, LCT STA, YSAVE LDY, TNEXT,    16
  17                                           17
  18                                           18
  19                                           19
  20                                           20
  21                                           21
  22                                           22
  23                                           23
181
   0 ( NOTMATCH? ) HEX ;S                      0 ;S LABEL NOTMATCH?
   1                                           1
   2 LABEL NOTMATCH?  ( addr -- flag )         2 LABEL FIXTABLE
   3   XSAVE STX, YSAVE STY, OFF #B LDY,       3
   4   SEC, 0 #B LDA, CUTPAGES SBC, TAX,       4 these are part of Jonathan's routine to
   5   D00 ,S LDA, 1 SP) CMP, EQ               5 speed up the updating of the page table
   6   IF, C00 ,X LDA, 0 SP) CMP, EQ           6
   7     IF, INY, ENDIF, ENDIF,                7
   8   XSAVE LDX, 0 SP) STY, 1 SP) STY,        8
   9   YSAVE LDY, TNEXT,                       9
  10                                          10
  11 LABEL FIXTABLE  ( -- )  YSAVE STY,       11
  12   SEC, 0 #B LDA, CUTPAGES SBC, TAY,      12
  13   SEC, LCTR LDA, C00 ,Y SBC, X0 STA,     13
  14   LCTR 1+ LDA, D00 ,Y SBC, X0 1+ STA,    14
  15   BEGIN, CLC,                            15
  16     C00 ,Y LDA, X0 ADC, C00 ,Y STA,      16
  17     D00 ,Y LDA, X0 1+ ADC, D00 ,Y STA,   17
  18     INY, EQ                              18
  19   UNTIL,                                 19
  20   CLC, LINES LDA, X0 ADC, LINES STA,     20
```

```
21  LINES 1+ LDA, XO 1+ ADC, LINES 1+ STA,        21
22  CLC, PCT LDA, CUTPAGES ADC, PAGES STA,        22
23  YSAVE LDY, TNEXT,                             23
``` scr # 182
```
 0  ( DOPAGING ) HEX ;S                            0  ;S T: DOPAGING
 1                                                 1
 2  T: DOPAGING                                    2  this is part of Jonathan's routine to
 3  PRESET WRAPDONE                                3  speed up the updating of the page table
 4  IF BEOT NEXTPAGE OLDPAGE TO                    4
 5    PAGES OLDPAGE - 1+ CUTPAGES TO               5
 6    E00 A00                                      6
 7    DO I OLDPAGE +                               7
 8    I 100 + PAGES OLDPAGE - 1+ DUP >R -          8
 9    R> CMOVE                                     9
10    100 +LOOP                                   10
11    0 WRAPDONE TO                               11
12  ENDIF                                         12
13  BEGIN WR@ BEOT U<                             13
14  WHILE SAVEPAGE PAGEWRAP                       14
15  REPEAT                                        15
16  BEGIN STOP? IF EXIT ENDIF                     16
17    SAVEPAGE WR@ NOTMATCH?                      17
18  WHILE PAGEWRAP                                18
19  REPEAT FIXTABLE -1 WRAPDONE TO                19
20  E00 A00                                       20
21  DO I PCT + I 100 + CUTPAGES CMOVE             21
22  100 +LOOP ;                                   22
23                                                23
```

183
```
 0  ( SAVEPAGE ?ONPAGE ) HEX                       0  LABEL ?ONPAGE ( -- flag )
 1                                                 1  PURPOSE: detect if currently on a page.
 2  LABEL ?ONPAGE  DEX, DEX,                       2
 3  YSAVE STY, 0 #B LDY,                           3  false = first character is a formfeed
 4  WC STY, WR )Y LDA, ff #B CMP, EQ               4  or an implicit page break belongs
 5  IF, INY, WC INC,                               5  sets the wrap count WC accordingly
 6  ELSE, LCT LDA, LONG CMP, EQ                    6  true = don't change WC
 7    IF, INY, ENDIF,                              7
 8  ENDIF, DEY, PAGEFLAG STY,                      8  NOTE: PAGEFLAG retains value of flag.
 9  0 SP) STY, 1 SP) STY, YSAVE LDY,               9
10  TNEXT,                                        10
``` scr # 184
```
 0  ( ?MORETEXT LASTPAGE ) HEX                     0  LABEL ?MORETEXT ( -- flag )
 1                                                 1  PURPOSE: flag indicates if wrapping has
 2  LABEL ?MORETEXT  DEX, DEX,                     2  reached the end of text.
 3  YSAVE STY, FF #B LDY,                          3
 4  WR LDA, EOT CMP,                               4  if the wrap address >= EOT then true
```

```
 5  WR 1+ LDA, EOT 1+ SBC, CS
 6  IF, INY, ENDIF,.
 7  0 SP) STY, 1 SP) STY, YSAVE LDY,
 8  TNEXT,
 9
10 LABEL LASTPAGE  YSAVE STY, PCT LDY,
11  OFF #B LDA,
12  BEGIN, INY, NE
13  WHILE, PGS0 ,Y STA, PGS1 ,Y STA,
14   PGS2 ,Y STA, PGS3 ,Y STA,
15  REPEAT, YSAVE LDY, TNEXT,
16
17
18
19
20
21
22
23
```

```
 5  flag.
 6  otherwise false flag.
 7
 8
 9  LABEL LASTPAGE  ( -- )
10  PURPOSE: fills elements at the end of
11   the page table with $FF.
12   The value $FF is used by other words
13   when scanning backwards from the end
14   of the page table to find valid page
15   table elements.
16
17  from PCT+1 to the end of the page table
18   fill all page table elements with FF.
19
20
21
22
23
```

185
```
 0 ( INCPAGES ) HEX ;S
 1
 2 ( endaddress increase startpage -- )
 3 LABEL INCPAGES  YSAVE STY, 0 SP) LDY,
 4  INX, INX,
 5  BEGIN, INY, 2 SP) LDA, PGS0 ,Y CMP,
 6   3 SP) LDA, PGS1 ,Y SBC, NC
 7   IF, DEY, PCT STY, 0 #B LDA, LCT STA,
 8    PGS2 ,Y LDA, LCTR STA,
 9    PGS3 ,Y LDA, LCTR 1+ STA,
10    YSAVE LDY, INX, INX, INX, INX,
11    TNEXT,
12   ENDIF, CLC, 0 SP) LDA, PGS0 ,Y ADC,
13   PGS0 ,Y STA, WR STA,
14   1 SP) LDA, PGS1 ,Y ADC,
15   PGS1 ,Y STA, WR 1+ STA,
16  AGAIN,
17
18
19
20
21
22
23
``` scr # 186
```
 0 ( <ENDFORM> ENDFORM ) HEX
 1
 2 LABEL ENDFORM- YSAVE STY, OLIN LDY,
 3  WND0 ,Y LDA, WR    STA,
 4  WND1 ,Y LDA, WR 1+ STA,
 5  WND2 ,Y LDA, LCT STA,
 6  WND3 ,Y LDA, PCT STA,
 7  TOP LDA, OLIN ADC, LCTR STA,
 8  TOP 1+ LDA, 0 #B ADC, LCTR 1+ STA,
 9  YSAVE LDY,
10
11 T: <ENDFORM>
12  BEGIN ?MORETEXT
13  WHILE SAVEPAGE
14   ?ONPAGE IF WRAP ENDIF
15   ENDWRAP DROP
```

```
 0 LABEL ENDFORM  ( -- )
 1 PURPOSE: set up parameters then call
 2  <ENDFORM>.
 3 set up WR, LCT and PCT with
 4 values of the last line changed (OLIN)
 5 in window table (WND0,1,2,3) and
 6 update LCTR.
 7
 8 NOTE: no TNEXT, executes <ENDFORM>
 9
10 T: <ENDFORM>  ( -- )
11 PURPOSE: update page table by wrapping
12  from the current line until the end of
13  text or until interrupted by any key.
14
15 while there is still text to wrap
```

```
 16    QUE THOROUGH? 0=                          16   update page table if first line.
 17    IF ?BLINK STOP? IF EXIT ENDIF ENDIF        17   if not at a page break, wrap line.
 18    REPEAT  0 THOROUGH? TO                    18   point WR to beginning of next line.
 19    SAVEPAGE                                  19   if an interrupt event occurs exit
 20    LCTR LINES TO   PCT PAGES TO              20    unless desire to thoroughly update.
 21    LASTPAGE ;                                21   update page table for last break.
 22                                              22   update LINES and PAGES.
 23                                              23   clear remainder of page table.
187
  0 ( PREALIGN +ALIGN ) HEX                      0  T: PREALIGN ( -- )
  1                                              1  PURPOSE: prepare to update page table
  2 T: PREALIGN  80 WIDE - YWRAP TO              2   from the beginning of text.
  3 WIDE U2/ W/2 TO  BEOT EBOT - GAP TO          3
  4 BEOT EBOT 51 CMOVE                           4  initialize YWRAP, W/2, GAP,
  5 0 LCT TO 0 LCTR TO 0 PCT TO                  5   LCT, LCTR, PCT, LINES, PAGES.
  6 -1 THOROUGH? TO BOT WR! ;                    6  move $51 text elements to EBOT for
  7                                              7   wrapping.
  8 ( old-EBOT old-BOT -- )                      8
  9 T: +ALIGN  PREALIGN                          9
 10 BOT SWAP - -1 INCPAGES <ENDFORM> ;           10 T: +ALIGN ( old-EBOT old-BOT --)
 11                                              11 PURPOSE: update page table in minimum
 12                                              12  amount of time by adding offset to
 13                                              13  page table elements before gap.
 14                                              14
 15                                              15 set up for align (PREALIGN).
 16                                              16 calculate endaddress and increase.
 17                                              17 -1 will start INCPAGES at the beginning
 18                                              18  of the page table.
 19                                              19 add increase to early pages.
 20                                              20 wrap lines to end of text (<ENDFORM>).
 21                                              21
 22                                              22
 23                                              23 scr #  188
  0 ( ENDWINDOW SETLINE ) HEX                    0  T: ENDWINDOW ( -- )
  1                                              1  PURPOSE: set end of window (EOW) if
  2 LABEL ENDWINDOW  EFLAG LDA, NE               2   necessary.
  3 IF, WR    LDA, EOW STA,                      3  set end of window (EOW) to
  4    WR 1+ LDA, EOW 1+ STA,                    4  the wrap address (WR) if EFLAG (end
  5 ENDIF,  TNEXT,                               5  flag?) is true.
  6                                              6
  7 LABEL SETLINE  INX, INX,                     7  LABEL SETLINE ( line# -- )
  8 YSAVE STY, 0 SP) LDY,                        8  PURPOSE: updates WR, LCT, PCT, and WC
  9 WND0 ,Y LDA, WR STA,                         9   from line# element in window table.
 10 WND1 ,Y LDA, WR 1+ STA,                     10  if last line on screen update WC from
 11 WND2 ,Y LDA, LCT STA,                       11   EOW else from window table.
 12 WND3 ,Y LDA, PCT STA,                       12
 13 17 #B CPY, EQ                               13 <<<<** bug **>>>>
 14 IF, EOW LDA,                                14 if a line contains gap
 15 ELSE, WND0 1+ ,Y LDA,                       15 WC will be set incorrectly
 16 ENDIF, SEC, WR SBC, WC STA,                 16
 17 YSAVE LDY, TNEXT,                           17
 18                                             18
 19                                             19
 20                                             20
 21                                             21
 22                                             22
 23                                             23
```

```
180
  0 ( FRESH SHOWLINE REFRESH ) HEX
  1
  2 T: SHOWLINE QUE ?ONPAGE
  3   IF WRAP ADJUST TOBUFF
  4   ELSE SHOWPAGE
  5   ENDIF DISP QUE ENDWRAP ;
  6
  7 T: FRESH PRESET
  8   BEGIN CLIN ?UPDATE DROP
  9    SAVEPAGE CLIN SHOWLINE
 10    WHILE ?SCROLL
 11    REPEAT
 12    1 EFLAG TO ENDSCREEN?
 13    AFTERGAP
 14    IF 18 CLIN
 15      DO I ?UPDATE
 16        IF I SHOWLINE DROP
 17        ELSE 0 EFLAG TO LEAVE
 18        ENDIF
 19      LOOP
 20    ENDIF AUXIL ENDWINDOW ;
 21
 22 T: REFRESH OFF FRESH RENCUR ENDFORM ;
 23 scr #  190
  0 ( REFRESHER SHOW RESHOW )  HEX
  1
  2 T: RESHOW  DUP SETLINE
  3    DO I ?UPDATE DROP I SHOWLINE DROP
  4    LOOP AUXIL ;
  5
  6 T: SHOW  18 0 RESHOW WR@ EOW TO ;
  7
  8 ( # -- | redisplay # lines before EOS )
  9 T: REFRESHER
 10    OLIN SWAP - 1- OMAX OLIN TO
 11    EOS TEOS TO ENDFORM -1 TEOS TO
 12    FRESH ;
 13
 14
 15
 16
 17
 18
 19
 20
 21
 22
 23
191
  0 ( TOPLINE NEWND ) HEX
  1
  2 LABEL TOPLINE
  3    LINREL LDA, WND2 STA,
  4    PAGE# LDA, WND3 STA,
  5    0 #B LDA, WND2 1+ STA,
  6    0 #B LDA, WND3 1+ STA,
  7    TNEXT,
  8
  9 T: NEWND   E# TOP U< TOP 17 + E# U< OR
```

```
 0 T: SHOWLINE ( -- flag ) display a line.
 1 true=end of selection displayed.
 2 if line is not a page break or CR then
 3   wrap this line, adjust, move to buffer
 4 else construct pagebreak symbols.
 5 display the line, adjust page table.
 6
 7 T: FRESH  ( -- )  refresh screen
 8 and update page table re: display.
 9 prepare text, CLIN, LCT PCT, LCTR
10 BEGIN update element in window array.
11   if page brk update page array.
12   display line.
13 WHILE eos not displayed
14   if this is last line then scroll.
15 REPEAT eos is last screen char scroll
16 set OLIN to CLIN-1
17 if not on last line.
18 then for each line changed
19   update window table, display line.
20 update auxiliary half of video.
21 update EOW if change beyond screen.
22
23

0 T: REFRESH refresh screen, wrap pages.
 1
 2 T: RESHOW  ( end-line# start-line# -- )
 3 PURPOSE: show each line and then show
 4  the auxilliary video.
 5
 6 T: SHOW  ( -- )
 7 PURPOSE: display new screen using new
 8  parameters.
 9 updates LCT, PCT, and WR
10 for each line on screen
11 and until end of selection displayed
12  update element in window array
13  and display line or page break
14 if end of selection is displayed
15  and there are more lines to be shown
16  show remaining lines on screen
17 display auxiliary video
18 store wrap address into EOW
19
20 T: REFRESHER ( n -- )
21 PURPOSE: redisplay n lines before EOS.
22
23

0 LABEL TOPLINE ( -- )
 1 PURPOSE: set beginning of window array
 2  to LINREL and PAGE# and zero next byte.
 3
 4 T: NEWND  ( -- )
 5 PURPOSE: if new window then update
 6  parameters.
 7 if eos is not on screen or EOS = BOW
 8  then: set NUFLAG = true
 9  else: set NUFLAG = false
```

```
10  EOS BOW = OR DUP NUFLAG TO            10  if entire selection won't fit
11  IF B# 17 + E# U<                       11  or will fit in less than half screen
12    IF E# OB -                           12  put eos in middle of screen
13    ELSE E# B# OB + U<                   13  if entire select takes more than half
14      IF E# OB - ELSE B# ENDIF           14  set top line to be bos
15    ENDIF OMAX                           15  prevent negative or too large text
16    LINES 18 - OMAX UMIN                 16  pointers
17    DUP LOCLIN TOP TO                    17  update LINREL, LINADR, PAGE#, and TOP
18    LINADR REWINDOW                      18  initialize window table with
19    TOPLINE                              19  LINADR, LINREL, and PAGE#
20  ENDIF ;                                20  NOTE1: returns flag in NUFLAG, true =
21                                         21  display must be changed.
22  ;S                                     22  NOTE2: E# and B# determine the new
23  LINES TOP 18 + U< TOP 0= 0= AND OR     23  selection.

scr # 192
 0  ( NEWMARK OLDSHOW SHOWMARK ) HEX       0  T: NEWMARK  ( lowside highside -- )
 1                                         1  PURPOSE: update E# and B# (the line
 2  ( lowside highside -- )                2  numbers for the EOS and BOS).
 3  T: NEWMARK  E# OLDE# TO B# OLDB# TO    3  save E# and B# in OLDE# and OLDB#.
 4  DUP EOS =                              4  if EOS or BOS are new then update E# and
 5  IF DROP                                5  B# using LOCCHR (which updates LINREL,
 6  ELSE DUP LOCCHR LINE# E# TO EOS TO     6  PAGE#, LINE#, E#).
 7  ENDIF DUP BOS =                        7
 8  IF DROP                                8
 9  ELSE DUP EOS 1- =                      9  T: OLDSHOW  ( -- )
10    IF E# 1-                            10  PURPOSE: show all lines in which
11    ELSE DUP LOCCHR LINE#               11  selection may have changed keeping old
12    ENDIF  B# TO BOS TO                 12  display window.
13  ENDIF ;                               13
14                                        14  T: SHOWMARK  ( lowside highside -- )
15  T: OLDSHOW                            15  PURPOSE: show selection on screen.
16  E# OLDE# UMAX TOP - 2 + 18 UMIN       16  update parameters (NEWMARK) for new
17  B# OLDB# UMIN TOP - 2 - OMAX          17  selection.
18  OVER 1- UMIN RESHOW ;                 18  NUFLAG set true if EOS not on the
19                                        19  current display (NEWND).
20  ( lowside highside -- )               20  if new text is to be displayed
21  T: SHOWMARK  NEWMARK NEWND NUFLAG     21  SHOW new selection.
22  IF SHOW ELSE OLDSHOW ENDIF ;          22  else show old selection (OLDSHOW).
23                                        23
193
 0  ( ?UNSCROLL ) HEX ;S                   0
 1                                         1
 2  T: ?UNSCROLL                           2
 3  E# TOP - DUP 18 U<                     3
 4  IF DUP OLIN TO PRESET                  4
 5   18 CLIN                               5
 6   DO CLIN ?UPDATE DROP PAGEBOUND        6
 7    ?ONPAGE                              7
 8    IF WRAP ENDIF                        8
 9    ENDWRAP DROP                         9
10    ?MORETEXT 0=                        10
11    IF PAGEBOUND                        11
12     CLIN 18 = 0= TOP AND               12
13     IF -1 TOP +TO TOP LOCLIN           13
14      LINADR REWINDOW TOPLINE           14
15      DROP 0                            15
16     ENDIF LEAVE                        16
17    ENDIF                               17
18  LOOP OFF 18 OVER 1- OMAX RESHOW       18
19  WR@ EOT TO                            19
20  ENDIF DROP ;                          20
```

```
 21
 22
 23 scr # 194
  0
  1
  2
  3
  4
  5
  6
  7
  8
  9
 10
 11
 12
 13
 14
 15
 16
 17
 18
 19
 20
 21
 22
 23
195
  0  ( CUT ) HEX
  1
  2  T: CUT   BOT >R BOS >R
  3   BOS LOCCHR LINE# B# TO
  4   BOC  BOT BOC -
  5   BOS BOT -  SEL  FLIP/TRIM
  6   SEL BOC + BOT - DUP BOS +TO
  7   DUP OEOS +TO
  8   DUP BOT +TO
  9   BOW + REWINDOW
 10   BOT BOS U< BOS +TO
 11   1C BOT C!
 12   BOS 1+ DUP EOS TO EBOT TO
 13   FIXEND
 14   R> R> +ALIGN
 15   B# E# TO  NEWND
 16   0 OLIN TO OFF FRESH RENCUR OFF
 17   FLUSH ;
 18
 19
 20
 21
 22
 23 scr # 196
  0  ( DELETE ) HEX
  1
  2  T: DELETE  EBOT BOT - EOT BEOT - + 2 =
  3   IF EXIT ENDIF
  4   OEOS EOS 1+ U< BOS OEOS U< AND
```

```
 21
 22
 23

0 T: CUT  ( -- )
 1 PURPOSE: move selection to cut buffer,
 2  refresh screen, update as quickly as
 3  possible.
 4
 5 save BOT and BOS for +ALIGN.
 6 update B# since selection is deleted.
 7 delete old cut and move selection
 8  to the cut buffer.
 9 adjust for the old cut being removed:
10  decrement BOS, OEOS, and BOT
11  and update window table.
12 if bos is not bot, decrement BOS.
13 make sure bot has a form feed.
14 update EOS and EBOT.
15 put form feed at end of text.
16 +align page table using BOT & BOS
17  (initialize YWRAP, W/2, GAP, LCT,
18   LCTR ,PCT, LINES, PAGES).
19 force TOP to be too large for NEWND.
20 set E# to B#
21 update selection related variables:
22  LINREL, LINADR, PAGE#, TOP
23 cursor off, fresh screen, rencur.

0 T: NIBBLE  ( -- )
 1 PURPOSE: delete one character
 2
 3  operate on one character only
 4  if at beginning of text then move up
 5   one character like creeper
 6  else (not at beginning)
 7   if narrow cursor and not at end of
 8    text then (remove char from right)
 9    delete character if not at end
10    update BEOT if not at end
11    update screen
12   else (fat cursor) so move 1 character
13    to the left and
14    if at end of screen then display new
15    put form feed at end of text (FIXEND)
16     and refresh screen
17  if OEOS is anywhere within gap, set
18   OEOS to BOS
19
20
21
22
23

0 T: CREEPDOWN
 1 PURPOSE: copy char, update BEOT, EBOT
 2
 3 T: DELETE  ( -- )
 4 PURPOSE: delete character or selection
```

```
 5    IF BOS OEOS TO ENDIF
 6    BOS 1+ EOS -
 7    IF CUT
 8    ELSE BOT BOS =
 9      IF BEOT C@ EBOT C! 1 EOS +TO
10      1 BOS +TO 1 BEOT +TO 1 EBOT +TO
11      OFF FRESH LEXCUR ENDFORM
12      ELSE NARROW EOT BEOT = O= AND
13        IF EOT BEOT = O=
14          IF BEOT C@ BOS C! ENDIF
15          BEOT EOT - IF 1 BEOT +TO ENDIF
16          OFF FRESH LEXCUR ENDFORM
17        ELSE -1 EOS +TO -1 EBOT +TO
18          -1 BOS +TO EOS BOW =
19          IF TOP OC - OMAX DUP TOP TO
20            LOCLIN LINADR REWINDOW
21            TOPLINE
22          ENDIF FIXEND REFRESH
23    ENDIF ENDIF ENDIF -1 DIRTY TO ;
```

```
197
 0 ( ?COLLAPSE <ENTER> ENTER ) HEX
 1
 2 T: ?COLLAPSE  1 SEL U< EXTENDED OR
 3  IF 0 OLIN TO EOS OEOS TO
 4    0 EXTENDED TO ENDIF ;
 5
 6 T: <ENTER>  EOS 100 + BEOT U<
 7  OVER 01C = O=  PAGES OCA U< OR AND
 8  IF ?LEXXED ?COLLAPSE
 9    LONG 4 U< 80 PAGES U< AND
10    OVER 01D = AND  OVER 01C = OR
11    IF -1 THOROUGH? TO ENDIF
12    EOS C! 1 EOS +TO 1 EBOT +TO
13    EOS 1- BOS TO
14    FIXEND  FRESH -1 DIRTY TO
15  ELSE DROP BEEP
16  ENDIF ;
17
18 T: ENTER
19  OFF <ENTER> RENCUR OFF ENDFORM
20  PAGES OCA U< O=
21  IF DELETE BEEP ENDIF ;
22
23
```

```
 5
 6  exit if text is empty
 7  if a selection is made (ie, more than
 8  one character) then CUT
 9  else (operate on one character only)
10    if at beginning of text then move up
11    one character like creeper
12    else (not at beginning)
13      if narrow cursor and not at end of
14      text then (remove char from right)
15      delete character if not at end
16      update BEOT if not at end
17      update screen
18    else (fat cursor) so move 1 character
19    to the left and
20    if at end of screen then display new
21    put form feed at end of text (FIXEND)
22    and refresh screen
23  set dirty bit
```

```
 0 T: ?COLLAPSE  ( -- )
 1 PURPOSE: reset OEOS.
 2 if selection contains 1 or more
 3 characters or EXTENDED then set OLIN
 4 and EXTENDED to 0 and set OEOS to EOS.
 5
 6 T: <ENTER>  ( char -- )
 7 PURPOSE: enter character into text and
 8 the screen.
 9 if there is enough room for adding
10   characters or new pages then
11   ?LEXXED, collapse selection.
12   if less than 4 lines/page and more than
13   $80 pages or page character and pages
14   >= $C0 then set THOROUGH? to true.
15   place char at end of selection and
16   move EOS and EBOT up one.
17   set BOS to EOS-1.
18   make certain page char at end of text.
19   FRESH screen.
20 else (no room) ignore and beep.
21
22 T: ENTER  ( char -- )
23 PURPOSE: enter character to text.
```

```
scr # 198
 0 ( TAB ) HEX
 1
 2 T: TAB EOS 100 + BEOT U<
 3   IF ?LEXXED  ?COLLAPSE
 4     XPOS 25 U<
 5     IF 5 XPOS 2* BANK +
 6       0 5 UM/MOD DROP -
 7       EOS OVER 20 FILL
 8       DUP EOS +TO DUP EBOT +TO
 9       EOS 1- BOS TO   FIXEND
10       REFRESH -1 DIRTY TO
11       PAGES OCA U< O=
12       IF EOS OVER - BOS TO
13         DUP NEGATE EBOT +TO
```

```
 0 T: TAB ( -- )
 1 PURPOSE: add spaces to next tab stop.
 2
 3 if there is enough room then
 4 reset lexxed and OEOS states.
 5 if the horizontal position < $25 then
 6   calculate next tab position, add
 7   spaces to text, update EOS and EBOT,
 8   make certain a form feed is at the
 9   end of the text, refresh screen.
10 else add a carriage return to the text,
11 else (not enough room) beep.
12
13
```

```
14      DELETE BEEP ENDIF DROP                     14
15      ELSE 1D ENTER                              15
16      ENDIF                                      16
17    ELSE BEEP                                    17
18    ENDIF ;                                      18
19                                                 19
20                                                 20
21                                                 21
22                                                 22
23                                                 23
199
 0 ( NEWPAGES ) HEX                                 0 T: NEWPAGES   ( old-EBOT old-BOT -- )
 1                                                  1 PURPOSE: update page table.
 2 ( old-EBOT old-BOT -- )                          2
 3 T: NEWPAGES                                      3 put form feed at end of text.
 4   FIXEND                                         4 redo page table.
 5   +ALIGN                                         5 if there are not enough pages then
 6   PAGES OCA U< O=                                6   delete selection.
 7   IF DELETE BEEP                                 7 else display new selected area (NEWND).
 8   ELSE EOS LOCCHR                                8 update OEOS.
 9     LINE# E# TO  NEWND                           9 force FRESH to begin at OLIN = 0.
10     BOS OEOS TO                                 10 fat cursor.
11     0 OLIN TO                                   11 set dirty bit.
12     OFF FRESH RENCUR OFF                        12
13     -1 DIRTY TO                                 13
14   ENDIF ;                                       14
15                                                 15
16                                                 16
17                                                 17
18                                                 18
19                                                 19
20                                                 20
21                                                 21
22                                                 22
23                                                 23 scr #  200
 0 ( PASTE ) HEX                                    0 T: INSERT  ( -- )
 1                                                  1 PURPOSE: move from cut buffer to EOS.
 2 T: PASTE ?LEXXED BOC BOT =                       2
 3   IF BEEP EXIT ENDIF                             3 ?LEXXED insures that LEXXED is 0.
 4   EOS U2/ BOT BOC - U2/ + 80 +                   4 if enough room and there is something
 5   BEOT U2/ U<                                    5 in the cut buffer then copy from cut
 6   IF                                             6 buffer to EOS, update page table.
 7     EOS BOS TO                                   7 else not enough room so actually move
 8     BOC BOT BOC - >R EOS R@ CMOVE                8 cut buffer to EOS by removing cut
 9     R> DUP EOS +TO EBOT +TO                      9 buffer entirely (FLIP), update page
10     EBOT BOT NEWPAGES                           10 table and BOT.
11   ELSE                                          11 clear keyboard queue and strobe.
12     BOC BOT BOC - EBOT BOT - FLIP               12
13     EBOT BOT BOC - - BOS TO                     13
14     7000 TOP TO                                 14
15     EBOT BOT BOC BOT TO NEWPAGES                15
16     BEEP                                        16
17   ENDIF FLUSH ;                                 17
18                                                 18
19                                                 19
20                                                 20
21                                                 21
22                                                 22
23                                                 23
```

```
201
    0 ( LEX REX [SEARCH] ) HEX
    1
    2 T: LEX EOS EBOT 1+ U<
    3 IF BOT EBOT 1-
    4   EOS UMIN SEEK<
    5   ?DUP IF EXIT ENDIF
    6 ENDIF BEOT EOS BEOT U<
    7 IF EOT LEXLEN - 1+
    8 ELSE EOS ENDIF SEEK< ;
    9
   10 T: REX EBOT EOS 1+ U<
   11 IF BEOT EOS 1- UMAX EOT SEEK>
   12   ?DUP IF EXIT ENDIF
   13 ENDIF EOS EBOT U<
   14 IF EOS 1- ELSE BOT ENDIF
   15 EBOT LEXLEN - 1+ SEEK> ;
   16
   17 T: [SEARCH]  RESEEK
   18 IF EBOT EOS TO 0 RESEEK TO ENDIF
   19 XFLAG 1 =
   20 IF LEX ELSE REX ENDIF
   21 ?DUP 0= IF EBOT 1- ENDIF DUP 1+
   22 QUE SHOWMARK ;
   23
```

```
 0 T: LEX    ( -- addr | 0 )
 1 PURPOSE: search left for pattern.
 2 if EOS is in lower partition then
 3   search backwards starting PATT
 4   below EBOT/EOS 1-.
 5 if pattern is found then exit.
 6 if not found search upper partition
 7 if EOS is in lower partition
 8   then search entire upper partition.
 9   else search from EOS to BEOT.
10
11 T: REX    ( -- addr | 0 )
12 PURPOSE: search right for PATTern.
13 if not found search lower partition.
14 similar to LEX.
15
16 T: [SEARCH] ( -- )
17 PURPOSE: search for character and
18 display (one character selected).
19 in the current direction
20 search until the pattern is found.
21 if the pattern wasn't found
22 put fat cursor at original selection.
23 show screen with one char selected.
```

```
scr # 202
    0 ( LXX RXX REP ) HEX
    1
    2 T: LXX EOS EBOT 1+ U<
    3 IF BOT EBOT 1-
    4   EOS 1- UMIN
    5   SEEK< ?DUP IF EXIT ENDIF
    6 ENDIF BEOT EOS BEOT U<
    7 IF EOT LEXLEN - 1+
    8 ELSE EOS 1- ENDIF SEEK< ;
    9
   10 T: RXX EBOT EOS 1+ U<
   11 IF BEOT EOS UMAX EOT SEEK>
   12   ?DUP IF EXIT ENDIF
   13 ENDIF EOS EBOT U<
   14 IF EOS ELSE BOT ENDIF
   15 EBOT LEXLEN - 1+ SEEK> ;
   16
   17 T: REP  LEXLEN DUP
   18 IF DROP @K DROP XFLAG 1 =
   19   IF LXX ELSE RXX ENDIF
   20 ENDIF ?DUP 0= IF EBOT 1- ENDIF DUP 1+
   21 QUE SHOWMARK ;
   22 ;S
   23 -1 RESEEK TO
```

```
 0 T: LXX    ( -- addr | 0 )
 1 PURPOSE: repeat left search (again).
 2
 3 false = searched all of text, not found
 4 same as LEX except that search starts
 5   with EOS-1.
 6
 7
 8 T: RXX    ( -- addr | 0 )
 9 PURPOSE: repeat right search (again).
10
11 false = searched all of text, not found
12 same as REX except that search starts
13   with EOS.
14
15
16 T: REP    ( -- )
17 PURPOSE: repeat search (again key).
18
19 discard the again keystroke
20 search in same direction as before
21 show one character selection
22
23
```

```
203
    0 ( SEARCH <SEARCH> ) HEX
    1
    2 LABEL <SEARCH> YSAVE STY,
    3 CHAR LDA, 7F #B AND, LRFLAG LDY, EQ
    4 IF, PATT LDY, 1F #B CPY, NE
    5   IF, INY, ENDIF,
    6 ENDIF,
    7 PATT STY, PATT ,Y STA, 0 #B LDY,
```

```
 0 LABEL <SEARCH>  ( -- )
 1 PURPOSE: adds a character to pattern for
 2 searching.
 3
 4 goes to get a character to PATT.
 5 if there are already 32 chars in PATT
 6 then overwrite the last character.
 7
```

```
 8  LRFLAG STY, YSAVE LDY, TNEXT,
 9
10  T: SEARCH
11  <SEARCH> @K DROP [SEARCH] ;
12
13
14
15
16
17
18
19
20
21
22
23
```

```
 8
 9  T: SEARCH  ( -- )
10  PURPOSE: search for character pattern in
11   the text.
12
13  get a character to PATT.
14  discard character from key queue.
15  lex to character, and display.
16
17
18
19
20
21
22
23
```

```
scr # 204
 0  ( DEL EXPAND ) HEX
 1
 2  T: DEL  @K DROP  1 LEXLEN U<
 3   IF EBOT EOS TO EBOT 1- BOS TO
 4    -1 PATT +! [SEARCH]
 5   ELSE 0 PATT ! EBOT 1- EBOT SHOWMARK
 6   ENDIF ;
 7
 8  T: EXPAND
 9   0 LOCAL1 TO 5 XFLAG TO
10   EOS EBOT -
11   IF EOS EBOT U<
12    IF BOS EBOT ELSE EBOT 1- EOS ENDIF
13    NEWMARK OLDSHOW
14   ELSE OEOS EBOT -
15    IF OEOS BEOT U<
16     IF OEOS EBOT
17     ELSE EBOT 1- OEOS
18     ENDIF 0 EOS TO 0 BOS TO
19     SHOWMARK
20   ENDIF ENDIF
21   BEOT EOT = NARROW TO BOS OEOS TO ;
22
23
```

```
 0  T: DEL  ( -- )
 1  PURPOSE: during a LEXREX search delete
 2   a char from PATT.
 3
 4  discard delete keystroke.
 5  if PATT has more than one character
 6   decrements PATT, select char at EBOT-1
 7   search anew.
 8  else clear PATT, show current select.
 9
10
11  T: EXPAND  ( -- )
12  PURPOSE: if both lex keys pressed then
13   select and show text (ie, highlight).
14
15  set XFLAG to 5 (both lex keys down,
16   and selection is already expanded).
17  if selecting during a lex
18   show selected text.
19  else select new text block
20   and show new selection.
21  use fat cursor except at end of text.
22  store BOS into OEOS.
23
```

```
205
 0  ( HARDPAGE SOFTPAGE ) HEX ;S
 1
 2  LABEL HARDPAGE ( addr -- )
 3  YSAVE STY, PAGE# LDY, INY,
 4  0 SP) LDA, PGS0 ,Y STA,
 5  1 SP) LDA, PGS1 ,Y STA,
 6  INX, INX, YSAVE LDY, TNEXT,
 7
 8  LABEL SOFTPAGE  ( flag -- )  YSAVE STY,
 9  0 SP) LDA, NE
10  IF, LOCAL2 LDA, 1 #B CMP, EQ
11  IF,
12   YPOS LDY, WND3 2 + ,Y LDA, TAY, CLC,
13   PGS0 ,Y LDA, GAP    ADC, PGS0 ,Y STA,
14   PGS1 ,Y LDA, GAP 1+ ADC, PGS1 ,Y STA,
15  ELSE,
16   YPOS LDY, WND3 ,Y LDA, TAY, SEC,
```

```
17    PGS0 ,Y LDA, GAP    SBC, PGS0 ,Y STA,         17
18    PGS1 ,Y LDA, GAP 1+ SBC, PGS1 ,Y STA,         18
19  ENDIF,                                          19
20 ENDIF,                                           20
21 INX, INX, YSAVE LDY, TNEXT,                      21
22                                                  22
23                                                  23 scr #  206
 0 ( OUTLEX ) HEX                                    0 T: MOVEGAP  ( -- )
 1                                                   1 PURPOSE: moves gap and updates
 2 T: OUTLEX    TOP 17 + E# U<                       2 appropriate pointers to account for
 3 IF BOS EOS SHOWMARK ENDIF                         3 the completed leap
 4 EOS EBOT -                                        4
 5 IF EOS EBOT U< DUP                                5 if selection doesn't end past screen
 6   IF EOS EBOT GAP                                 6   then display selection.
 7   ELSE EBOT EOS GAP NEGATE                        7 if lex moved toward beginning of text
 8   ENDIF ROT LOCCHR PAGE#                          8   then move text, update BEOT, EBOT.
 9   INCPAGES                                        9   else if screen no longer displays
10   IF EBOT EOS - >R                               10     old cursor position then initialize
11     EOS BEOT R@ - R@ CMOVE>                      11     window table, recalculate page table,
12     R> NEGATE BEOT +TO                           12     and move text.
13     EOS EBOT TO                                  13     if this selection begins after the
14   ELSE EOS BEOT - >R                             14       old cursor position then
15     EBOT BOW U<                                  15       subtract GAP from BOS.
16     IF BOW GAP - REWINDOW ENDIF                  16     update BEOT, EBOT, and EOS.
17     BEOT EBOT R@ CMOVE                           17 set cursor to previous state unless at
18     BOS BEOT U< 0=                                18   beginning then use thin cursor.
19     IF GAP NEGATE BOS +TO ENDIF                  19
20     R@ BEOT +TO R> EBOT +TO                      20 NOTE1: after OUTLEX then EOS = EBOT.
21     EBOT EOS TO                                  21 NOTE2: the key control feature of OUTLEX
22 ENDIF ENDIF NARROW BOT 1+ EOS U< AND             22   is if EOS is altered (ie, EOS <> EBOT),
23 BEOT EOT = OR NARROW TO ;                        23   e.g., by a lexxing operation.
207
 0 ( PRELEX POSTLEX ) HEX                            0 T: PRELEX ( -- )
 1                                                   1 PURPOSE: prepare for LEXREX operations.
 2 T: PRELEX                                         2
 3 -1 LEXXING TO  XFLAG LOCAL2 TO                    3 set LEXXING flag.
 4 1 LRFLAG TO -1 LOCAL1 TO                          4 set up other flags used by LEXREX:
 5 1 SEL U< OFF                                      5 AXFLAG saves direction of lex key,
 6 IF LOCAL2 1 =                                     6 LRFLAG used by <SEARCH>, set LOCAL1
 7   IF BOS DUP 1+ SHOWMARK LEXCUR                   7 (reset by any LEXREX operation).
 8   ELSE EOS DUP 1- SWAP SHOWMARK                   8 if a selection is highlighted then
 9     BEOT EOT =                                    9 collapse to left or right depending
10     IF LEXCUR ELSE RENCUR ENDIF                  10 upon which lex key was pressed after
11   ENDIF                                          11 turning cursor off, then lexcur.
12   -1 EXTENDED TO 0 LOCAL1 TO                     12 set up E# and B# (used by SHOWMARK ?).
13   -1 RESEEK TO                                   13
14 ENDIF                                            14
15 EOS LOCCHR  LINE# E# TO                          15 T: POSTLEX ( -- )
16 BOS LOCCHR  LINE# B# TO ; ( -- )                 16 PURPOSE: necessary housekeeping after
17                                                  17 LEXREX.
18 T: POSTLEX                                       18
19 NARROW EXTENDED OR EXTENDED TO QUE               19 setup EXTENDED.
20 QIN QOUT TO                                      20 clear the lex keys.
21 CHAR 9B = IF  0 CHAR TO  ENDIF                   21 if an escape character then discard.
22 0 LEXXING TO ; ( -- )                            22 clear LEXXING flag.
23                                                  23 scr #  208
```

```
0 ( CREEPSHOW)  HEX
1
2 T: CREEPSHOW  YPOS LOCAL2 1 =
3 IF BOT BOS U<
4   IF NARROW
5     IF EBOT 1- C@ BEOT 1- C! -1 BEOT +TO
6       -1 EBOT +TO BEOT C@ 1C =
7       IF BEOT 1+ EBOT LOCCHR HARDPAGE
8         0 LOCAL1 TO
9       ELSE EBOT 1- C@ 1C =
10        IF 0 LOCAL1 TO ENDIF
11      ENDIF EBOT 1- EBOT SHOWMARK
12    ENDIF ENDIF
13  ELSE BEOT EOT U<
14    IF BEOT 50 + C@ EBOT 50 + C!
15      1 BEOT +TO 1 EBOT +TO
16      EBOT 1- C@ 1C =
17      IF EBOT BEOT 1- LOCCHR HARDPAGE
18        0 LOCAL1 TO
19      ELSE EBOT 2 - C@ 1C =
20        IF 0 LOCAL1 TO ENDIF
21      ENDIF EBOT 1- EBOT SHOWMARK
22    ENDIF ENDIF ;
23
```

```
0 T: CREEPSHOW ( --)
1 PURPOSE: adds single keystroke cursor
2   movement left or right using lex keys.
3
4 if left cursor pressed then move 1 space
5   to left if not below text and if
6   previous cursor was LEXCUR (thin)
7   (determined by the state of NARROW);
8   if previous cursor was RENCUR (fat)
9   then do nothing because POSTLEX will
10  set cursor with LEXCUR.
11  if a hard page character has been
12    passed then update page table.
13 otherwise right cursor has been pressed;
14  move right 1 space if not above text.
15  also, move 1 character from BEOT+$50 to
16  EBOT+$50 so that wrapping will work
17  properly (this mimicks part of FRESH).
18  if a hard page character has been
19    passed then update page table.
20  scroll screen if ipb at bottom
21
22
23
```

209

```
0 ( CREEPER )
1               .
2 T: CREEPER  CREEPSHOW
3 OEOS 1- BEOT U< EBOT 2 - OEOS U< AND
4 IF LOCAL2 1 =
5   IF BEOT ELSE EBOT 1-
6   ENDIF OEOS TO
7 ENDIF POSTLEX LOCAL1
8 >R BOT 1+ EOS U<
9 IF LEXCUR ELSE RENCUR ENDIF
10 YPOS 2DUP
11 2 + = R@ AND SOFTPAGE
12 2 - = R@ AND SOFTPAGE
13 NUFLAG R> AND DUP
14 YPOS 09 = AND SOFTPAGE
15 YPOS 0C = AND SOFTPAGE
16 0 OLIN TO ;
17
18
19
20
21
22
23
```

```
0 T: CREEPER ( -- )
.1 PURPOSE: move cursor one character and
2   maintain pagetable.
3
4 adjust OEOS so that it is not left in
5   the gap (ie, maintains selection).
6 housekeeping (POSTLEX).
7 if at the very beginning of text use a
8   fat cursor (RENCUR); all other times
9   use a thin cursor (LEXCUR).
10 if a softpage has been passed on the
11  current display then update the page
12  table.
13 if a softpage has been passed on a new
14  display then update the page table.
15 set OLIN to zero so that the next
16  word that uses FRESH will result in
17  fixing a number of problems related to
18  the creeper mechanism. (Note: FRESH was
19  once a part of creeper but was taken
20  out to speed creeper up.)
21
22
23
``` scr # 210

```
0 ( MOVE-GAP LEXREX ) HEX
1
2 T: MOVE-GAP  FLUSH  EOS EBOT -
3 IF EOS EBOT U<
4   IF BEOT ELSE EBOT 1- ENDIF
5   OEOS TO
6 ENDIF OUTLEX
7 QUE 0 OLIN TO FRESH POSTLEX
8 NARROW IF LEXCUR ELSE RENCUR ENDIF ;
```

```
0 T: LEAPER ( --)
1 PURPOSE: perform the operations needed
2   by DEL, SEARCH, REP and EXPAND.
3 update OEOS.
4 move text (OUTLEX).
5 update screen (FRESH).
6 housekeeping (POSTLEX).
7 show thin cursor if lexxed, show fat
8   cursor if expanded selection.
```

```
  9
 10 T: LEXREX    PRELEX
 11    NARROW >R
 12    BEGIN  QUE ?LBLINK ?X  WHILE
 13      ?S IF OFF SEARCH QUE LEXCUR ELSE
 14      ?D IF OFF DEL    QUE LEXCUR ELSE
 15      ?A IF OFF REP    QUE LEXCUR ELSE
 16      ?E IF OFF EXPAND R> DROP 0 >R
 17      ENDIF ENDIF ENDIF ENDIF
 18    REPEAT R> EBOT EOS =
 19    IF NARROW TO ELSE DROP ENDIF
 20    OFF
 21    LOCAL1
 22    IF CREEPER ELSE MOVE-GAP ENDIF ;
 23
```

```
  9
 10 T: LEXREX  ( -- )  pattern search
 11 PURPOSE: interpret and act upon lex
 12  key press(es).
 13 PRELEX sets flags and collapses if a
 14  selection exits.
 15 pole for searching, editting, repeating,
 16  highlighting (highest priority to the
 17  lowest priority).
 18 if a search has failed then restore the
 19  cursor to the same it was before the
 20  search (i.e., fat or thin).
 21 if no other operation has occurred then
 22  move cursor (ie, CREEP cursor).
 23 else move the gap.
```

211
```
  0 ( AUTOEXTEND )  HEX
  1
  2 T: AUTOEXTEND   SEL 2 U<
  3   IF EOS OEOS U<
  4    OFF EXPAND
  5    IF OUTLEX ENDIF
  6    NARROW IF LEXCUR ELSE RENCUR ENDIF
  7   ENDIF -1 EXTENDED TO ;
  8
  9
 10
 11
 12
 13
 14
 15
 16
 17
 18
 19
 20
 21
 22
 23
```

```
  0 T: AUTOEXTEND
  1 PURPOSE:  to automatically highlight
  2  ("select", EXPAND) a section of text
  3  if BOS is not next to EOS.
  4
  5 if a selection can exist then turn off
  6  the cursor and expand the selection.
  7  if EOS < OEOS then outlex.
  8  if lexxed then show thin cursor
  9   (LEXCUR) else fat cursor (RENCUR).
 10 set extended true.
 11
 12
 13
 14
 15
 16
 17
 18
 19
 20
 21
 22
 23
``` scr # 212
```
  0
  1
  2
  3
  4
  5
  6
  7
  8
  9
 10
 11
 12
 13
 14
 15
 16
 17
```

```
        18
        19
        20
        21
        22
        23
213
    0 ( MS MEMIT ) HEX                              0 LABEL MS  ( # -- )
    1                                               1 PURPOSE: wait # milliseconds.
    2 LABEL MS    ( # -- )  YSAVE STY,              2
    3  0 SP) INC, 1 SP) INC,                        3 LABEL MEMIT  ( char -- )
    4  BEGIN, CA #B LDY,                            4 PURPOSE: send char to a super serial
    5   BEGIN, DEY, EQ UNTIL,                       5  card in slot 2.
    6  0 SP) DEC, EQ IF, 1 SP) DEC, ENDIF, EQ       6
    7  UNTIL, INX, INX, YSAVE LDY, TNEXT,           7 load character into Y-reg.
    8                                               8 if super serial card exists then
    9 LABEL MEMIT  YSAVE STY, 0 SP) LDY,            9  if character is form feed then change
   10  INX, INX, SSC? LDA, NE                      10   character value to $0C.
   11  IF, ff #B CPY, EQ IF, 0C #B LDY, ENDIF,     11  if character is a return then change
   12   cr #B CPY, EQ IF, 0D #B LDY, ENDIF,        12   character value to $0D.
   13   BEGIN, C0A9 LDA, 10 #B AND, NE             13  wait until status bit clear (bit $10
   14   UNTIL, C0A8 STY,                           14   at $C0A9) then send character
   15  ENDIF, YSAVE LDY, TNEXT,                    15   (store character at $C0A8).
   16                                              16
   17                                              17 LABEL ?EMPTYBUF  ( -- )
   18                                              18 PURPOSE: send a control-S if full.
   19                                              19
   20                                              20 if RSTAT is true:  clear RSTAT
   21                                              21  wait for status to clear.
   22                                              22  send a control-S
   23                                              23 scr #  214
    0 ( ?M ?LE CONTROL ) HEX                        0 ( ?M ?LE CONTROL ) HEX
    1                                               1
    2 LABEL ?M                                      2 LABEL ?M  ( -- flag )
    3  YSAVE STY, 0 #B LDY,  DEX, DEX,              3 PURPOSE: indicate whether modem needs
    4  MQOUT LDA, MQIN CMP, NE                      4  attention.
    5  IF, DEY, ENDIF,                              5
    6  0 SP) STY, 1 SP) STY, YSAVE LDY, TNEXT,      6 false if modem buffer is empty.  other
    7                                               7  typed chars are placed in key queue.
    8 T: ?LE    LINEND% 0< 0=                       8
    9  IF BOS C@ LINEND% 2DUP                       9
   10    OFF AND SWAP OVER -                       10 T: ?LE  ( -- )
   11    IF DUP MEMIT ENDIF DROP                   11 PURPOSE: send the line end character(s).
   12    SWAB OFF AND ?DUP                         12 NOTE: LINEND% can be 1 or 2 characters.
   13    IF SWAP OVER -                            13
   14      IF DUP MEMIT ENDIF                      14
   15    ENDIF DROP                                15 LABEL CONTROL  ( -- )
   16  ENDIF ;                                     16 PURPOSE: send a character entered from
   17                                              17  the keyboard to the modem.
   18 LABEL CONTROL  YSAVE STY,                    18
   19  BEGIN, C000 LDY, 7F #B CPY, CS              19 wait for a key.
   20  UNTIL, C010 STA, SSC? LDA, NE               20 convert it to a control character.
   21  IF, BEGIN, C0A9 LDA, 10 #B AND, NE          21 send it.
   22   UNTIL, TYA, 1F #B AND, C0A8 STA,           22
   23  ENDIF, YSAVE LDY, TNEXT,                    23 NOTE: this is the control-Z function.
215
    0 ( ?SEND SEND ) HEX                            0 LABEL ?SEND  ( -- )
    1                                               1 PURPOSE: used in SEND to stall until
```

```
 2 LABEL ?SEND                                        2   a control-Q is received.
 3 BEGIN, TSTAT LDA, EQ UNTIL, TNEXT,                 3
 4                                                    4
 5 T: SEND   AUTOEXTEND                               5 T: SEND  ( -- )
 6 BOS LOCCHR LINADR WR!                              6 PURPOSE: send text to modem.
 7 WRAP ENDWRAP DROP WR@                              7
 8 SEL 0                                              8 autoextend selection.
 9 DO ?SEND                                           9 set modem for transmission.
10   BOS OVER =                                      10 send entire selection
11   IF ?LE 4 MS                                     11 at baud rate set by (BASIC) SE%
12   BOS 1- LOCCHR LINE# TOP - OMAX                  12 and display text after each line sent.
13   DUP 2 + SWAP RESHOW                             13 stall if receiver sends back a control
14   WR! WRAP ENDWRAP DROP WR@                       14  S, so wait for control-Q.
15   ENDIF                                           15 FRESH screen.
16   BOS C@ MEMIT                                    16 leave cursor fat at the end of the
17   1 BOS +TO                                       17 transmission unless at the end of the
18 LOOP EOS 1- BOS TO                                18 text (then thin cursor).
19 DROP ?LE                                          19
20 0 OLIN TO FRESH                                   20
21 BEOT EOT = IF LEXCUR ELSE RENCUR ENDIF            21
22 -1 EXTENDED TO ;                                  22
23                                                   23 scr # 216
 0 ( .SWYFT .SENDSWYFT ?RECFULL )  HEX                0
 1                                                    1 FRAG .MEMIT
 2 FRAG .SWYFT   16 C, 13 C, 0D C,                    2 PURPOSE: send the character that is in
 3 53 C, 77 C, 79 C, 66 C, 74 C,                      3  the Y register
 4 43 C, 61 C, 72 C, 64 C, 20 C,                      4
 5 31 C, 30 C, 34 C, 33 C, 20 C,                      5 FRAG .MQUE
 6 2F C, 2F C, 65 C, 0D C, 11 C,                      6 PURPOSE: grab a character from the
 7                                                    7  modem and place it in the Accumulator
 8 FRAG .SENDSWYFT   0 #B LDY, Y0 STY,                8
 9 BEGIN, \ .SWYFT 1+ ,Y LDA, TAY,                    9
10   BEGIN, C0A9 LDA, 10 #B AND, NE                  10
11   UNTIL, C0A8 STY,                                11
12   Y0 INC, Y0 LDY, \ .SWYFT CPY, CS                12
13 UNTIL, RTS,                                       13
14                                                   14
15 LABEL ?RECFULL  ( -- )  RSTAT LDA, NE             15
16 IF, 0 #B LDA, RSTAT STA,                          16
17   BEGIN, C0A9 LDA, 10 #B AND, NE                  17
18   UNTIL, 11 #B LDA, C0A8 STA,                     18
19 ENDIF, TNEXT, ( send control Q )                  19
20                                                   20
21                                                   21
22                                                   22
23                                                   23
217
 0 ( .INTERRUPT )  HEX                                0 FRAG .VQUE ( -- )
 1                                                    1 PURPOSE: receive a character from modem
 2 FRAG .INTERRUPT   PHA, TYA, PHA,                   2
 3 C0A9 LDA, 08 #B AND, NE                            3 FRAG .INTERRUPT ( -- )
 4 IF, C0A8 LDA, 7F #B AND,                           4 PURPOSE: process interrupts from modem
 5   13 #B CMP, NE        ( control S )               5
 6   IF, 11 #B CMP, NE    ( control Q )               6 if there is a character to be read and
 7   IF, 20 #B CMP, NC                                7  if it is not a ^S and
 8    IF, 0C #B CMP, EQ                               8   if it is not a ^Q then
 9     IF, ( send control S )                         9    if a form feed then
10      BEGIN, C0A9 LDA, 10 #B AND, NE               10     send ^S, set RSTAT and set A-reg
11      UNTIL, 13 #B LDA, C0A8 STA,                  11     with ff.
12      FF #B LDA, RSTAT STA,                        12    else (not a form feed)
```

```
13      ff #B LDA,                              13   if a carriage return load cr value.
14      ELSE, 0D #B CMP, EQ                     14.  else (not a carriage return)
15       IF, cr #B LDA,                         15    if it is a ^C then return "SWYFT".
16       ELSE, 05 #B CMP, EQ                    16    else (not a ^C)
17        IF, \ .SENDSWYFT JSR,                 17     if it is a ^G then BEEP endif
18        ELSE, 07 #B CMP, EQ                   18    endif
19         IF, OFF #B LDA, BELL? STA,           19    return from interrupt if ^C or ^G.
20        ENDIF, ENDIF,                         20   endif
21       PLA, TAY, PLA, RTI,                    21  endif endif
22      ENDIF, ENDIF, ENDIF,                    22
23                                              23 scr # 218
 0 ( .INTERRUPT ... ) HEX                        0
 1                                               1   otherwise load char into MQUE if room
 2   MQIN LDY, MQUE ,Y STA, MQIN INC,            2   else wait till clear, send ^S,
 3   SEC, MQOUT LDA, MQIN SBC,                   3     set RSTAT.
 4   8 #B CMP, NC                                4   else it is a ^Q, reset TSTAT
 5   IF, ( send control S )                     5  else it is a ^S, set TSTAT
 6    BEGIN, C0A9 LDA, 10 #B AND, NE             6  restore A-reg and Y-reg
 7    UNTIL, 13 #B LDA, C0A8 STA,                7
 8    FF #B LDA, RSTAT STA,                      8  NOTE1:
 9    ENDIF,                                     9   if a ^Z^C then send back SWYFT message.
10   ELSE, 0 #B LDA, TSTAT STA,                 10   if a ^Z^G then give a beep.
11   ENDIF,                                     11   if a ^Z^S then do not allow
12   ELSE, FF #B LDA, TSTAT STA,                12    interruption.
13  ENDIF, ENDIF,                               13   if a ^Z^Q then allow interruption.
14  PLA, TAY, PLA, RTI,                         14   other control characters are ignored.
15                                              15   if a character then put into MQUE.
16                                              16
17                                              17  NOTE2:
18                                              18   RSTAT receiver status; set if no room
19                                              19    in MQUE to put character or a page
20                                              20    character received.
21                                              21   TSTAT transmitter status; set if a ^S,
22                                              22    reset if a ^Q.
23                                              23
219
 0 ( old .INTERRUPT ) HEX ;S                     0  T: MAPPEND  ( -- )
 1                                               1  PURPOSE: transfer entire contents of
 2 FRAG .INTERRUPT  PHA, TYA, PHA,               2   modem buffer to text at OEOS.
 3 C0A9 LDA, 0F #B AND, NE                       3
 4 IF, 07 #B AND, NE                             4  collapse the selection.
 5  IF, 13 #B LDY,    ( error: send ^S )         5  set OEOS.
 6   BEGIN, C0A9 LDA, 10 #B AND, NE              6  update MQOUT.
 7   UNTIL, C0A8 STY,                            7  make sure there is enough room for text
 8   32 #B LDA, Y0 STA,  ( wait 32 ms )          8   and for pages.
 9   BEGIN, CA #B LDY,                           9  if OEOS is below EOS then move text up
10    BEGIN, DEY, EQ UNTIL,                    10   and move modem que text in place.
11     ( while also reading data line )        11   update EOS and OEOS.
12     C0A9 LDA, TAY, 08 #B AND, NE            12   determine if a NEWMARK exits.
13     IF, TYA, 07 #B AND, EQ                  13   FIXEND, set dirty, update screen.
14      IF, 11 #B LDY, ( char, no error )      14   if the last character was a page' and
15       BEGIN, C0A9 LDA, 10 #B AND, NE        15    there are more than $47 pages then
16       UNTIL, C0A8 STY,    ( send ^Q )       16    THOROUGHly update page table in
17       \ .RECEIVE JMP,                       17    ENDFORM.
18      ENDIF, ENDIF, Y0 DEC, EQ               18   if there are less than $C7 pages then
19    UNTIL, 11 #B LDY,      ( send ^Q )       19    check for full receive buffer.
20    BEGIN, C0A9 LDA, 10 #B AND, NE           20  else not enough room, BEEP and stop the
21    UNTIL, C0A8 STY,                         21   sender from transmitting any more.
```

```
 22   ENDIF, \ .RECEIVE JMP,                    22
 23   ENDIF, PLA, TAY, PLA, RTI,                23 scr # 220
  0 ( MAPPEND ) HEX                             0
  1           -                                 1
  2 T: MAPPEND ?COLLAPSE                        2
  3   EOS OEOS UMIN BOT 1+ UMAX OEOS TO         3
  4   MQUE MQOUT +                              4
  5   MQIN DUP MQOUT U<                         5
  6   IF DROP 0 100 ELSE DUP ENDIF              6
  7   MQOUT - SWAP MQOUT TO                     7
  8   BEOT EBOT 100 + - UMIN 0 OVER U<          8
  9   PAGES 0C9 U< AND                          9
 10   IF OEOS EOS U<                           10
 11     IF OEOS 2DUP + EBOT OEOS - CMOVE>      11
 12     ENDIF SWAP OVER OEOS SWAP CMOVE        12
 13     OEOS LOCCHR LINE# >R                   13
 14     DUP EBOT +TO DUP OEOS +TO              14
 15     EOS + DUP 1- SWAP NEWMARK              15
 16     FIXEND OFF -1 DIRTY TO                 16
 17     E# R> - REFRESHER RENCUR               17
 18     OEOS 1- C@ 01C = 47 PAGES U< AND       18
 19     IF -1 THOROUGH? TO ENDIF ENDFORM       19
 20     PAGES 0C7 U< IF ?RECFULL ENDIF         20
 21   ELSE DROP DROP BEEP 13 MEMIT             21
 22     C7 PAGES U< IF -1 THOROUGH? TO ENDFORM 22
 23   ENDIF ENDIF ;                            23
221
  0 ( .STARTU .ENDU STARTU ENDU ) HEX          0 FRAG .STARTU
  1                                            1 PURPOSE: print USTART string from USTART
  2 FRAG .STARTU  USTART 2 + LDA, NE           2   string.
  3   IF, 0 #B LDY,       ( print USTART $ )   3 NOTE: USTART 2+ has length of string.
  4   BEGIN, USTART 3 + ,Y LDX, Y0 STY,        4
  5     <LEMIT> JSR, Y0 LDY, INY,              5
  6     USTART 2 + CPY, EQ UNTIL, ENDIF, RTS,  6 FRAG .ENDU
  7                                            7 PURPOSE: print UEND string from UEND
  8 FRAG .ENDU  UEND 2 + LDA, 1 #B CMP, NE     8   string.
  9   IF, 1 #B LDY,       ( print UEND $ )     9 NOTE: UEND 2+ has length of string.
 10   BEGIN, UEND 3 + ,Y LDX, Y0 STY,         10
 11     <LEMIT> JSR, Y0 LDY, INY,             11 LABEL STARTU
 12     UEND 2 + CPY, EQ UNTIL, ENDIF, RTS,   12 PURPOSE: start underline if UEND 3 + is
 13                                           13   not zero and UFLAG is set.
 14 LABEL STARTU UEND 3 + LDA, NE IF,         14
 15   UFLAG LDA, NE IF, YSAVE STY, XSAVE STX, 15 LABEL ENDU
 16     \ .STARTU JSR, XSAVE LDX, YSAVE LDY,  16 PURPOSE: end underline if UEND 3 + is
 17   ENDIF, ENDIF, TNEXT,                    17   not zero and UFLAG is set.
 18                                           18
 19 LABEL ENDU   UEND 3 + LDA, NE IF,         19
 20   UFLAG LDA, NE IF, YSAVE STY, XSAVE STX, 20
 21     \ .ENDU JSR, XSAVE LDX, YSAVE LDY,    21
 22   ENDIF, ENDIF, TNEXT,                    22
 23                                           23 scr # 222
  0 ( LEMIT LCR LTYPE LMARGIN .USINGLE ) HEX  0 LABEL LEMIT  ( char -- )
  1           -                                1 PURPOSE: print character.
  2 LABEL LEMIT  YSAVE STY,                    2 save y-reg.
```

```
 3   0 SP) LDA, INX, INX,                      3  remove character from stack
 4   XSAVE STX, TAX, <LEMIT> JSR,               4  save x-reg.
 5   XSAVE LDX, YSAVE LDY, TNEXT,               5  transfer a-reg to x-reg and call <LEMIT>
 6                                              6  restore x and y registers.
 7  T: LCR    0D LEMIT                          7
 8   .LF IF 0A LEMIT ENDIF ;                    8  T: LCR    ( -- )
 9                                              9  PURPOSE: print a carriage return and
10  T: LCRS    0MAX ?DUP                       10  also print a line feed if .LF is true.
11   IF 0 DO LCR LOOP ENDIF ;                  11
12                                             12  T: LCRS   ( n -- )
13  T: LMARGIN   .BL MARGIN% + ?DUP            13  PURPOSE: print n carr returns.
14   IF 0 DO 20 LEMIT LOOP                     14  n can be zero.
15   ENDIF ;                                   15
16                                             16  T: LMARGINS
17  FRAG .USINGLE                              17  PURPOSE: print the left margin.  also
18   Y1 STX, \ .STARTU JSR, Y1 LDX,            18  prevents margins from being underlined
19   <LEMIT> JSR, \ .ENDU JSR,                 19  if underline is turned on.
20   YSAVE LDY, XSAVE LDX, TNEXT,              20
21                                             21  T: .USINGLE
22                                             22  PURPOSE: single underline.
23                                             23
223
 0  ( ULEMIT ) HEX                              0  LABEL ULEMIT
 1  LABEL ULEMIT  ( n -- ) YSAVE STY,           1  PURPOSE: this word controls underlining
 2   1 SP) LDA, Y0 STA,  0 SP) LDA,             2  sent to the printer.
 3   INX, INX, XSAVE STX, TAX, UFLAG LDA, EQ    3
 4   IF, 5F #B CPX, EQ     ( UFLAG not set)     4  underlining is turned on by an underline
 5    IF, OFF #B LDA,      ( underline char )   5  character (a space is printed in its
 6     UFLAG DUP STA, 1+ STA, ( set UFLAG )     6  place) and turned off by another
 7     20 #B LDX, <LEMIT> JSR,   ( space )      7  underline unless there are two
 8     UEND 3 + LDA, NE    ( group u'line? )    8  underlines right next to each other
 9     IF, \ .STARTU JSR, ENDIF, ( start )      9  in which case an underline is printed,
10    ELSE, <LEMIT> JSR, ENDIF,                10  and also turned off by two carriage
11   ELSE, 5F #B CPX, EQ ( UFLAGset, not_?)    11  or by a pagebreak.
12    IF, Y0 LDX, 5F #B CPX, EQ                12
13     IF, 20 #B LDX, UEND 3 + LDA, EQ         13  UFLAG true indicates that underlining
14      IF, \ .USINGLE JMP, ENDIF,    ( 1 )    14  is currently in operation.
15     ELSE, 0 #B LDA,             ( end _ )  15  USTART is string for turning on u'line.
16      UFLAG DUP STA, 1+ STA, ( clrUFLAG )    16  UEND is string for turning off u'line.
17      UEND 3 + LDA, NE           ( group? )  17  the first element contains a group flag
18      IF, \ .ENDU JSR, ENDIF, 20 #B LDX,     18  for backspace underlining: 0 means that
19     ENDIF,                                  19  the printer must backup to underline
20    ELSE, UEND 3 + LDA, EQ                   20  each character.
21     IF, \ .USINGLE JMP, ENDIF,              21
22    ENDIF, <LEMIT> JSR,                      22
23   ENDIF, YSAVE LDY, XSAVE LDX, TNEXT,       23 scr #  224
 0  ( LTYPE V@ V! ) HEX                         0  T: LTYPE   ( -- )
 1                                              1  PURPOSE: print a line from CURR until
 2  T: LTYPE   LMARGIN STARTU                   2  control character encountered.
 3   CURR DUP DUP 50 + SWAP                     3
 4   DO 20 I C@ 7F AND U<                       4  print leading blanks (LMARGIN).
 5    IF DROP I ENDIF                           5  start underline.
 6   LOOP 1+ CURR                               6  examine 80 characters in CURR buffer
 7   DO I C@ 7F U<                              7  for control characters and for
 8    IF I @ ULEMIT                             8  1D=carriage return.
 9    ELSE ENDU 20 LEMIT STARTU                 9  return address of control character.
10    ENDIF                                    10  print all characters substituting the
11   LOOP ENDU ;                               11  control character with a blank.
12                                             12
13  T: V!   V ?DUP                             13
```

```
 14    IF SWAP SWAB SWAP ! ELSE DROP ENDIF ;
 15
 16 T: V@   V @ SWAB ;
 17
 18
 19
 20
 21
 22
 23
225
  0 ( ENDPAGE SETPRINTER ) HEX
  1
  2 T: ENDPAGE   UFLAG
  3    IF WR@ C@ 1C = O= UFLAG TO ENDIF
  4    42 LPAGE% - ABOVE% - LINESCOUNT - LCRS
  5    PCT 8000 + PAGE% + PFLAG% 8000 + U< O=
  6    IF PAGEPRINT ENDIF
  7    O LINESCOUNT TO OC LEMIT ;
  8
  9 T: SETPRINTER
 10    PBUF ADDR DUP 3 + >R
 11    R@ 2 + C@ HEAD% TO
 12    2 + C@ 3 - OMAX ?DUP
 13    IF R@ 3 + SWAP OVER + SWAP
 14       DO I C@ LEMIT LOOP
 15    ENDIF
 16    R@ 1+  C@   .BL TO
 17    R>     C@   .LF TO
 18    .LF IF OD LEMIT ENDIF ;
 19
 20
 21
 22
 23 scr #  226
  0 ( PRINT ) HEX
  1 T: PRINT   AUTOEXTEND
  2    SETPRINTER
  3    BOS LOCCHR LINADR WR!
  4    LINREL LCT TO PAGE# PCT TO
  5    O PRINTBREAK TO O UFLAG TO
  6    BEGIN LINESCOUNT O=
  7    IF WR@ C@ 1C -
  8       IF ABOVE% HEAD% OMAX - LCRS
  9    ENDIF ENDIF ?ONPAGE
 10    IF WRAP ADJUST -1 PRINT? TO TOBUFF
 11       O PRINT? TO LTYPE LCR
 12       1 SPACING 2 = IF LCR DROP 2 ENDIF
 13       LINESCOUNT +TO
 14       WR@ C@ 1D = IF O UFLAG TO ENDIF
 15    ELSE PRINTBREAK IF ENDPAGE ENDIF
 16    ENDIF ENDWRAP O=
 17    WR@ EBOT 1- UMIN DUP BOS TO
 18    BOS BOW U< O=
 19    IF O OLIN TO LCT PCT
 20       FRESH PCT TO LCT TO
 21    ENDIF WR! -1 PRINTBREAK TO
 22    UNTIL SHOW BEOT EOT =
 23    IF LEXCUR ELSE RENCUR ENDIF ;
```

```
 14 T: V! ( # char-pair -- )
 15 PURPOSE:  store a number in the BASIC
 16   variable; if it isn't found, do nothing
 17
 18
 19 T: V@ ( char-pair -- # )
 20 PURPOSE: fetch a value from a BASIC
 21   variable; if it isn't found, return
 22   value stored at O < ** bug? ** >.
 23

0 T: ENDPAGE  ( -- )
  1 PURPOSE: print page number.
  2 turn off underlining if a hard page
  3 break is encountered.
  4 advance to line to print page# on
  5 print the page number only if
  6   page# is greater than (BASIC) PF%
  7 form feed to next page,
  8 clear LINESCOUNT
  9 inputs: LPAGE% ABOVE% LINESCOUNT
 10         PFLAG%
 11
 12 T: SETPRINTER  ( -- )
 13 PURPOSE: initialize the printer.
 14 emit printer string from that saved by
 15   user (see SAVESTRINGS and LOADSTRINGS)
 16   to printer, skipping the first 3 bytes.
 17 store first three bytes in:
 18   .LF     false if cr does a line feed
 19   .BL     # spaces needed for left margin
 20   HEAD%   # lines past tear-off line a
 21           form feed brings print head
 22 emit a carriage return if it won't
 23   send a linefeed to the printer 0 T: PRINT  ( -- )
  1 PURPOSE: print selected area, line by
  2   line, to printer in slot 1.
  3
  4 allows a print job to be stopped and
  5   restarted and still look contiguous
  6   as long as it stops at the end of a
  7   line and starts on the next
  8 allows double spacing (BASIC: SP%=2)
  9 if there is a second carriage return
 10   then turn underline flag off.
 11 won't print a leading pagebreak
 12
 13 Inputs:
 14   VECT points to printer rom code.
 15   .LP holds printer initialization.'
 16   BOS points to start of desired text.
 17
 18 Outputs:
 19   BOS points to last character printed.
 20   EXTENDED holds -1
 21   WR points to ???
 22
 23
```

```
227
  0 ( save, load BASIC strings ) HEX
  1
  2     ( $name buffer max -- )
  3 T: SAVE$    OVER ADDR >R >R
  4   SWAP V DUP 1+ @ ROT -
  5   IF DUP C@ R> UMIN DUP R@ 2 + C!
  6     SWAP 1+ @ DUP R@ !
  7     R> 3 + ROT CMOVE
  8   ELSE R> R> DROP DROP DROP ENDIF ;
  9
 10     ( $name buffer -- )
 11 T: LOAD$    ADDR >R V DUP 1+ @ R@ @ -
 12   IF R@ 2 + C@ DUP >R OVER C!
 13     BASIC0 6F + DUP @ R@ - DUP ROT !
 14     DUP ROT 1+ ! R> ?DUP
 15     IF R@ 3 + ROT ROT CMOVE 1 ENDIF
 16   ENDIF R> DROP DROP ;
 17
 18
 19
 20
 21
 22
 23
```

```
 0 T: SAVE$ ( $name buffer max -- )
 1 PURPOSE:  save a string entered by user
 2   so that when a NEW or RUN is invoked
 3   this string can be restored instead of
 4   the default string.
 5
 6 if the BASIC string and the user string
 7   do not match then store the length and
 8   move the contents from BASIC to the
 9   user string.
10 else drop all parameters.
11
12 T: LOAD$ ( $name buffer -- )
13 PURPOSE:  load a string back into the
14   BASIC string area.
15
16 if the BASIC string and the user string
17   do not match then store the length and
18   move the contents from the user string
19   to the BASIC string.
20 and drop all parameters.
21
22
23
```

```
scr #  228
  0 ( save, load PR$ string at PBUF ) HEX
  1
  2 T: SAVESTRINGS
  3   55D3 USTART 5 SAVE$
  4   55C5 UEND    5 SAVE$
  5   50D2 PBUF   1D SAVE$ ;
  6
  7 T: LOADSTRINGS
  8   55D3 USTART LOAD$
  9   55C5 UEND    LOAD$
 10   50D2 PBUF    LOAD$ ;
 11
 12
 13
 14
 15
 16
 17
 18
 19
 20
 21
 22
 23
```

```
 0 T: SAVESTRINGS ( -- )
 1 PURPOSE: to save the user strings for
 2   underline start, underline end, and
 3   printer initialization.
 4
 5
 6 T: LOADSTRINGS ( -- )
 7 PURPOSE: to restore the user strings
 8   for underline start, underline end,
 9   and printer initialization.
10
11
12
13
14
15
16
17
18
19
20
21
22
23
```

```
229
  0 ( DEFAULT PRINTER STRINGS ) HEX
  1
  2 FRAG .PRINT
  3   ( UEND ) 1 C, 1B C, 2D C, 30 C,
  4   ( USTART )    1B C, 2D C, 31 C,
  5   ( FX80 ) 0 C, 0 C, 5 C,
  6   1B C, 4D C, 1B C, 6C C, 8 C,
  7
```

```
 0 ( DEFAULT PRINTER STRINGS )
 1
 2 LABEL .PRINT
 3 PURPOSE: default printer strings for
 4   EPSON FX80.
 5
 6
 7
```

```
  8  ;S
  9  ( IMAGEWRITER ) 0 C, 0 C, 6 C,
 10  1B C, 45 C,
 11  1B C, 4C C, 30 C, 30 C, 38 C,
 12  ( IDS ) 0 C, 0 C,
 13  1E C, 1B C, 4A C, 2C C,
 14  36 C, 30 C, 2C C, 24 C,
 15  1B C, 52 C, 2C C, 31 C,
 16  2C C, 24 C,
 17  ( QANTX ) 1 C, 0 C,
 18  1B C, 5B C, 36 C, 73 C,
 19  1B C, 5B C, 32 C, 77 C,
 20  ( QUME ) 1 C, 0C C,
 21  ( MX80 ) 0 C, 10 C, 0F C,
 22  ( PARALLEL CARD ) 0 C, 0 C,
 23  9 C, 38 C, 30 C, 4E C, 9 C,
``` scr # 230
```
  0  ( DEFAULT BASIC zero page ) HEX
  1
  2  FRAG .DEFAULT-  100 ALLOT
  3  11 BLOCK HERE 100 - 100 CMOVE
  4
  5  LOMEM 1+            HERE 100 - 67 + !
  6  LOMEM 3 +           HERE 100 - 69 + !
  7  LOMEM 3 + 10 7 * +  HERE 100 - 6B + !
  8  LOMEM 3 + 10 7 * +  HERE 100 - 6D + !
  9  HIMEM 1F -          HERE 100 - 6F + !
 10  HIMEM               HERE 100 - 73 + !
 11  LOMEM 3 +           HERE 100 - AF + !
 12  4000                HERE 100 - FB + !
 13  0                   HERE 100 - FD + !
 14  OFF                 HERE 100 - FF + C!
 15
```

```
  0  FRAG .DEFAULT ( -- a )
  1  PURPOSE: used to set up page 0 and
  2  variables for BASIC.
  3
  4  copy image of BASIC page 0 from Lyon's
  5  disk. this image of BASIC was retrieved
  6  by Mino with his Wildcard.
  7  adjust it for these variables
  8  from byte 3 to 5B (hex)
  9  and the position of EDDE.
 10  position of string is at HIMEM 18 -.
 11  and some mysterious things:
 12  4000       HERE 100 - FB + !
 13  0          HERE 100 - FD + !
 14  OFF        HERE 100 - FF + C!
 15  the value $10 represents the number of
 16  variables in BASIC.
```

231
```
  0  ( DEFAULT BASIC variables ) HEX
  1
  2  0 C, 0 C, 0 C,
  3  C1CD , 0000 , 0 C, 0 , ( MARGIN% )
  4  CFD2 , 2001 , 0 C, 0 , ( ROOM% )
  5  C2C1 , 0600 , 0 C, 0 , ( ABOVE% )
  6  C9D7 , 5000 , 0 C, 0 , ( WIDE )
  7  C1D0 , 0000 , 0 C, 0 , ( PAGE% )
  8  C5C2 , 0600 , 0 C, 0 , ( BELOW% )
  9  D0CC , 0300 , 0 C, 0 , ( LPAGE% )
 10  C6D0 , 0200 , 0 C, 0 , ( PFLAG% )
 11  D0D3 , 0100 , 0 C, 0 , ( SPACING )
 12  C5CC , FFFF , 0 C, 0 , ( LINEND% )
 13  C5D3 , FFFF , 0 C, 0 , ( SEND% )
 14  CCD0 , 4200 , 0 C, 0 , ( PLEN% )
 15  D4C2 , BOV SWAB , 0 C, 0 , ( BOC )
 16
```

```
  0  .DEFAULT continued...
  1
  2  define the following BASIC variables:
  3  include variables (ascii)
  4  MARGIN%  = 0      C1CD left margin
  5  ROOM%    = 201    CFD2 text available
  6  ABOVE%   = 0      C2C1 top margin
  7  WIDE%    = 50     C9D7 no. columns
  8  PAGE%    = 0      C1D0 page number
  9  BELOW%   = C      C5C2 bottom margin
 10  LPAGE%   = 8      D0CC
 11  PFLAG%   = 2      C6D0 page flag
 12  SPACING  = 1      D0D3 single/double
 13  LINEND%  = -1     C5CC send end line
 14  SEND%    = -1     C5D3 modem initial.
 15  PLEN%    = 42     CCD0 page length
 16  BOC      = BOV    D4C2 bottom of text
```

```
17  D250 ,  8 C, HIMEM 18 - , 0 , ( PR$ )      17  PR$             D250 printer initial
18  D355 ,  3 C, HIMEM 1B - , 0 , ( US$ )      18  US$             D355 u'line start
19  C555 ,  4 C, HIMEM 1F - , 0 , ( UE$ )      19  UE$             C555 u'line end
20  0 , 0 , 0 , 0 , 0 ,                        20
21                                             21
22                                             22  NOTE: variable space is led by three
23                                             23   zeroes and trailed by five zereos.

scr # 232
  0 ( INITBASIC DEFVARS ) HEX                    0 LABEL INITBASIC  ( -- )
  1                                              1 PURPOSE: copy DEFAULT to BASIC0 ($1000)
  2   ( BELONGS IN COLD START )                  2  then do DEFVARS.
  3 LABEL INITBASIC   YSAVE STY, 0 #B LDY,       3
  4 BEGIN, \ .DEFAULT ,Y LDA,                    4 copy BASIC page 0 from .DEFAULT to
  5   BASIC0 ,Y STA, INY, EQ                     5  BASIC0.  later this is moved into page
  6 UNTIL, YSAVE LDY,                            6  zero before calling BASIC.
  7                                              7
  8 LABEL DEFVARS   YSAVE STY,                   8
  9  BASIC0 69 + LDA, X0 STA,                    9 LABEL DEFVARS  ( -- )
 10  BASIC0 6A + LDA, X0 1+ STA,                10 PURPOSE: define BASIC variables.
 11  10 7 * 3 + 5 + #B LDY,                     11
 12  BEGIN, \ .DEFAULT 103 + ,Y LDA,            12 move BASIC variables ($42 bytes)
 13   X0 )Y STA, DEY, MI                        13  from DEFAULT + $103 to BASIC0 + $69.
 14  UNTIL,                                     14 force change in zero page values so
 15  0F #B LDY,  ( bytes in .PRINT )            15  that user strings can be preserved.
 16  HIMEM 1F - DUP OFF AND #B LDA, X0 STA,     16 move printer strings to BASIC area.
 17  BASIC0 6F + STA,                           17
 18  SWAB OFF AND #B LDA, X0 1+ STA,            18
 19  BASIC0 70 + STA,                           19 NOTE: the value $10 represents the
 20  BEGIN, \ .PRINT ,Y LDA, X0 )Y STA,         20  number of BASIC variables present.
 21   DEY, MI                                   21
 22  UNTIL, YSAVE LDY, TNEXT,                   22
 23                                             23
233
  0 ( RESETVARS ) HEX                            0 T: RESETVARS  ( -- )
  1                                              1 PURPOSE: place Swyft default values into
  2 T: RESETVARS                                 2  the BASIC variables.
  3   GAP 100 - D2CF V!                          3
  4   WIDE       D7C9 V!                         4
  5   ABOVE%     C1C2 V!                         5
  6   BELOW%     C2C5 V!                         6
  7   PAGE%      D0C1 V!                         7
  8   MARGIN%    CDC1 V!                         8
  9   LPAGE%     CCD0 V!                         9
 10   PFLAG%     D0C6 V!                        10
 11   SPACING    D3D0 V!                        11
 12   LINEND%    CCC5 V!                        12
 13   SEND%      D3C5 V!                        13
 14   PLEN%      D0CC V!                        14
 15   BOC        C2D4 V! ; .                    15
 16                                             16
 17                                             17
 18                                             18
 19                                             19
 20                                             20
 21                                             21
 22                                             22
 23                                             23
```

```
scr # 234
    0 ( VALIDATE ) HEX
    1
    2 T: VALIDATE
    3    D2CF V
    4    IF CDC1 V   IF C1C2 V   IF C2C5 V
    5    IF D7C9 V   IF D0C1 V   IF CCD0 V
    6    IF D0C6 V   IF D3D0 V   IF CCC5 V
    7    IF D3C5 V   IF D0CC V   IF C2D4 V
    8    IF 50D2 V   IF 55D3 V   IF 55C5 V
    9       IF 1 EXIT ENDIF
   10    ENDIF ENDIF ENDIF ENDIF ENDIF
   11    ENDIF ENDIF ENDIF ENDIF ENDIF
   12    ENDIF ENDIF ENDIF ENDIF ENDIF
   13    DEFVARS
   14    RESETVARS
   15    LOADSTRINGS
   16    BASIC0 69 + @ 70 + DUP
   17    BASIC0 6B + !
   18    BASIC0 6D + ! 0 ;
   19
   20
   21
   22
   23
235
    0 ( F>B ) HEX
    1
    2 LABEL F>B ( FORTH TO BASIC )
    3    XSAVE STX, TSX, SSAVE STX,
    4    YSAVE STY,
    5
    6    4F #B LDX,
    7    BEGIN, 50 ,X LDA, FORTH0 ,X STA,
    8       BASIC0 50 + ,X LDA, 50 ,X STA,
    9       DEX, MI
   10    UNTIL, 3F #B LDX,
   11    BEGIN, 1C0 ,X LDA, FORTH1 ,X STA,
   12       BASIC1 ,X LDA, 1C0 ,X STA, DEX, MI
   13    UNTIL,
   14
   15    CLC, <ZPMOVE> JSR,
   16    SSAV LDX, TXS, SEI, RETN LDA, MI
   17    IF, <D444> JMP,
   18    ENDIF, OFF #B LDA, RETN STA,
   19    XSAV LDX, YSAV LDY, PSAV LDA,
   20    PHA, ASAV LDA, PLP,
   21    <RTS> JMP,
   22
   23 scr # 236
    0 ( CH>F ) HEX
    1
    2 FRAG .CH>F
    3    7F #B AND, RETNCHR STA,
    4    SEC, <ZPMOVE> JSR,
    5    SEC, CH LDA, COL# SBC, RETN STA,
    6    RETNCHR LDA, 0D #B CMP, EQ
    7    IF, 0 #B LDA, CH STA, 57B STA,
```

```
    0 T: VALIDATE  ( -- flag )
    1 PURPOSE: checks to see if all the
    2    proper BASIC values have been set.
    3 true = all required variables present.
    4 false = something missing.
    5
    6 if all the values are not there then
    7    redefine all variables (DEFVARS).
    8    reset their value (RESETVARS and
    9    LOADSTRINGS).
   10    tell basic where to find them.
   11
   12 NOTE: the value $70 is 7 times the
   13    number of variables (both integers and
   14    strings).
   15
   16
   17
   18
   19
   20
   21
   22
   23

0 LABEL F>B  ( -- )
    1 PURPOSE: transfer control from Forth
    2    to BASIC.
    3 save X and S registers.
    4 save second $50 bytes from page 0
    5    at FORTH0, replacing them from BASIC0.
    6 save last $40 bytes from page 1
    7    at FORTH1, replacing them from BASIC1.
    8 for disk based Swyft <ZPMOVE> moves
    9    pages 0 and 1 from aux to main memory.
   10 in ROM Swyft <ZPMOVE> is simply an RTS.
   11 set return stack pointer (from BASIC0).
   12 the first time through:
   13    jump to D444, beginning of BASIC.
   14    it will return to B>F or
   15    it will emit characters through CH>F.
   16 consecutive times through:
   17    store -1 in RETN
   18    restore registers (X, Y, P, A)
   19    return to BASIC to where it emitted
   20    characters.
   21
   22
   23

0 FRAG .CH>F  ( -- )
    1 PURPOSE: receive characters emitted by
    2    BASIC.
    3
    4 strip high byte and save character
    5    in RETNCHR.
    6 in disk version <ZPMOVE> copies
    7    pages 0 and 1 from main to aux.
```

```
 8  COL# STA, cr #B LDA, RETNCHR STA,        8  in ROM version <ZPMOVE> is RTS.
 9  ELSE, CH INC, CH LDA, 57B STA,           9  store difference in cursor horizontal
10  COL# STA,                               10  position in RETN.
11  ENDIF, RETNCHR LDA,                     11  if the char is a carriage return then
12                                          12  store 0 in cursor position,
13  CLC, CS IF,                             13  update 80-column enhanced ($57B),
14  ( skip <ZPMOVE> in B>F )                14  convert RETNCHR to a Swyft return.
15                                          15  else increment cursor position and
16                                          16  update 80-column enhanced ($57B).
17                                          17  restore received character to A reg.
18                                          18  continue with .B>F after skipping
19                                          19  <ZPMOVE> in .B>F....
20                                          20
21                                          21
22                                          22
23                                          23
237
 0  ( B>F )  HEX                             0  FRAG B>F  ( -- )
 1                                           1  PURPOSE: return from BASIC or CH>F to
 2  FRAG .B>F                                2  Forth.
 3  SEC, <ZPMOVE> JSR,                       3
 4  ENDIF, ( skip <ZPMOVE> from C>F )        4  in disk version <ZPMOVE>
 5  CLI,                                     5  and if not from .CH>F then
 6  PHP, ASAV STA, PLA, PSAV STA,            6  copy pages 0 and 1 from main to aux.
 7  XSAV STX, YSAV STY, TSX, SSAV STX,       7  save registers (A, P, X, Y, S)
 8                                           8  exchange BASIC and Forth pages zero:
 9  4F #B LDX,                               9  copy $50 bytes from $50 to BASIC0
10  BEGIN,                                  10  and from FORTH0 to $50.
11    50 ,X LDA, BASIC0 50 + ,X STA,        11  exchange BASIC and Forth pages one:
12    FORTH0 ,X LDA, 50 ,X STA,             12  copy $3F bytes from $1C0 to BASIC1
13    DEX, MI                               13  and from FORTH0 to $1C0.
14  UNTIL, 3F #B LDX,                       14  restore registers (S, X)
15  BEGIN,                                  15  return to TOBASIC
16    1C0 ,X LDA, BASIC1 ,X STA,            16
17    FORTH1 ,X LDA, 1C0 ,X STA,            17
18    DEX, MI                               18
19  UNTIL,                                  19
20                                          20
21  SSAVE LDX, TXS, XSAVE LDX, YSAVE LDY,   21
22  TNEXT,                                  22
23                                          23 scr #  238
 0  ( erase 1st 2 tracks )   HEX             0  FRAG .NEWDISK  ( -- )
 1                                           1  PURPOSE: erase a Swyft disk when the
 2  FRAG .NEWDISK. ( -- )                    2  phrase "CALL 3600" is calculated.
 3  C0E8 LDA, 0 #B LDA, C0EF STA, C0ED STA,  3
 4  ( //c IWM INITIALIZATION )               4
 5  C0EE LDA, C0E9 LDA,    ( turn on drive ) 5
 6  50 #B LDY,             ( step 80 phases) 6
 7  BEGIN, TYA, 3 #B AND, .A ASL,            7
 8    TAX, C0E1 ,X LDA,       ( step motor ) 8
 9    56 #B LDA, FCA8 JSR,         ( delay ) 9
10    C0E0 ,X LDA, DEY, MI   ( step motor ) 10
11  UNTIL,                                  11
12  C0EF LDA,       ( Turn on write current)12
13  FF #B LDA, FCA8 JSR,         ( delay )  13
14  FF #B LDA, FCA8 JSR,         ( delay )  14
15  C0E3 LDA, 56 #B LDA, FCA8 JSR, ( step ) 15
16  C0E5 LDA, C0E2 LDA, 56 #B LDA,  ( to )  16
```

```
17 FCA8 JSR, C0E4 LDA,        ( next track )      17
18 FF #B LDA, FCA8 JSR,            ( delay )      18
19 FF #B LDA, FCA8 JSR,            ( delay )      19
20 C0EE LDA, C0E8 LDA, RTS,     ( Turn off )      20
21                   ( write current and drive )  21
22                                                22
23                                                23
239
 0 ( soft switch words for rom card ) HEX          0 ( SOFT SWITCH WORDS FOR ROM CARD ) HEX
 1                                                 1
 2 FRAG .MONITOR   C0B1 STA, C08A STA,             2 FRAG .MONITOR jump to the Apple monitor
 3       FF69 JMP,                                 3
 4 FRAG .B/F   C0B0 STA,                           4 FRAG .B/F jump to BASIC/FORTH interface
 5      \ .B>F JMP,                                5
 6 FRAG .XNEXT C0B0 STA, YSAVE LDY, TNEXT,         6 FRAG .XNEXT return from bank 2 routine.
 7 FRAG .RTS   C0B1 STA, RTS,                      7 FRAG .RTS return from BASIC.
 8 FRAG .D444  C0B1 STA,.                          8 FRAG .D444 jump to BASIC.
 9      OFF #B LDX, 1 #B LDY,                      9
10      4C #B LDA, FDF0 STA, D444 JMP,            10
11 FRAG .CH/F  C0B0 STA,                          11 FRAG .CH/F return character to Forth.
12      7F #B AND, RETNCHR STA,                   12
13      \ .CH>F JMP,                              13
14 FRAG .XFER  X5 1+ STA, X5 STY,                 14 FRAG .XFER jump to bank 2 routine.
15      C0B2 STA, X5 )JMP,                        15
16 FRAG .LEMIT2 <LEMIT> JSR,                      16 FRAG .LEMIT2 print character.
17      C0B2 STA, RTS,·                           17
18 FRAG .BOOT                                     18 FRAG .BOOT boot disk.
19 C08A STA, C0B1 STA, FFFC )JMP,                 19
20 C0B0 STA, D204 JMP, NOP,                       20
21 D200 , 3E9 , 3 A5 XOR C,                       21
22 FRAG .CDISK YSAVE STY, XSAVE STX,              22 FRAG .CDISK erase Swyft disk.
23      <NDISK> JSR, \ XYNEXT JMP,                23 scr #  240
 0 ( soft switch words for rom card ) HEX          0 FRAG .START ( -- )
 1                                                 1 PURPOSE: prepare to call BASIC.
 2 FRAG .START C08D LDA, C08D LDA,                 2 set up for BASIC ($C08D).
 3 C0B1 STA, D0 #B LDA, X0 1+ STA,                 3 copy BASIC and monitor rom to equivalent
 4 0 #B LDY, X0 STY,                               4  space in ram and modify.
 5 BEGIN,                                          5
 6   BEGIN, X0 )Y LDA, X0 )Y STA, INY, EQ          6 NOTE: $D43C is JMP <B/F> and
 7   UNTIL,  X0 1+ INC, EQ                         7 $FDF1 is <CH/F>.
 8 UNTIL,                                          8
 9 B0 #B LDA, E063 STA,                            9
10 4C #B LDA, D43C STA,                           10
11 <B/F> OFF AND #B LDA, D43D STA,                11 FRAG .LEMIT ( -- )
12 <B/F> SWAB OFF AND #B LDA, D43E STA,           12 PURPOSE: print character from x-reg.
13 <CH/F> OFF AND #B LDA, FDF1 STA,               13
14 <CH/F> SWAB OFF AND #B LDA, FDF2 STA,          14 turn romcard off.
15 C08F LDA, C08F LDA, <XNEXT> JMP,               15 replace Apple output vector $36 with
16                                                16  soft hook in slot one ($C100).
17 FRAG .LEMIT SEI, C0B1 STA,                     17 call output routine $FDED.
18 0 #B LDY, 36 STY, C1 #B LDY, 37 STY,           18 restore original output vector in' $36
19 60 #B LDY, FDF0 STY,                           19 ($FDF0).
20 TXA, FDED JSR,                                 20 self-modify .LEMIT to store new vector
21 36 LDA, F75 STA,                               21 at $36 ($C102) next time through.
22 FD #B LDA, 37 STA, F0 #B LDA, 36 STA,          22 turn romcard on.
23 C0B0 STA, CLI, RTS,                            23
```

241
```
  0 ( .FRAGMENTS FOR ROM CARD ) HEX
  1
  2 LABEL ROM-FRAGMENTS
  3 YSAVE STY, OF #B LDY, BEGIN,
  4 \ .LEMIT2    ,Y LDA, <LEMIT2> ,Y STA,
  5 \ .CDISK     ,Y LDA, <CDISK>  ,Y STA,
  6 \ .XNEXT     ,Y LDA, <XNEXT>  ,Y STA,
  7 \ .MONITOR   ,Y LDA, <MON>    ,Y STA,
  8 \ .B/F       ,Y LDA, <B/F>    ,Y STA,
  9 \ .D444      ,Y LDA, <D444>   ,Y STA,
 10 \ .CH/F      ,Y LDA, <CH/F>   ,Y STA,
 11 \ .XFER      ,Y LDA, <XFER>   ,Y STA,
 12 \ .RTS       ,Y LDA, <RTS>    ,Y STA,
 13 DEY, MI UNTIL, 2F #B LDY, BEGIN,
 14 \ .LEMIT     ,Y LDA, <LEMIT>  ,Y STA,
 15 \ .BOOT 10 - ,Y LDA, 3D0      ,Y STA,
 16 DEY, MI UNTIL, 5F #B LDY, BEGIN,
 17 \ .NEWDISK   ,Y LDA, <NDISK>  ,Y STA,
 18 \ .START     ,Y LDA, <START>  ,Y STA,
 19 DEY, MI UNTIL,
 20 60 #B LDA, <ZPMOVE> STA,
 21 YSAVE LDY, TNEXT,
 22
 23
```

```
  0 LABEL ROM-FRAGMENTS ( -- )
  1 PURPOSE: copy routines that can't
  2 operate in romcard to an area in ram.
  3
  4 .START    to <START>
  5 .RTS      to <RTS>
  6 .CH/F     to <CH/F>
  7 .D444     to <D444>
  8 .B/F      to <B/F>
  9 .LEMIT    to <LEMIT>
 10 .XNEXT    to <XNEXT>
 11 .XFER     to <XFER>
 12 .MONITOR  to <MON>
 13 .BANK1    to <BANK1>
 14 .BOOT 10 - to 3D0
 15 RTS,      to <ZPMOVE>
 16
 17 NOTE: the same space can be loaded with
 18 fragments used by the disk version
 19 which manage bank switching differently
 20
 21
 22
 23
``` scr # 242
```
  0 ( soft switch words for disk ram ) HEX
  1
  2 FRAG D.MONITOR  <MAIN> JSR, C08A LDA,
  3         FF69 JMP,
  4 FRAG D.B/F    C009 STA, C003 STA,
  5         C005 STA, \ .B>F JMP,
  6 FRAG D.XNEXT C08F LDA, C08F LDA,
  7         YSAVE LDY, TNEXT,
  8 FRAG D.RTS  C008 STA, C002 STA,
  9         C004 STA, RTS,
 10 FRAG D.AUX   PLA, TAY, PLA, C009 STA,
 11 C003 STA, C005 STA, PHA, TYA, PHA, RTS,
 12 FRAG D.MAIN  PLA, TAY, PLA, C008 STA,
 13 C002 STA, C004 STA, PHA, TYA, PHA, RTS,
 14 FRAG D.D444  <MAIN> JSR,
 15         OFF #B LDX, 1 #B LDY,
 16         4C #B LDA, FDF0 STA, D444 JMP,
 17 FRAG D.CH/F  C009 STA, C003 STA,
 18         C005 STA, \ .CH>F JMP,
 19 FRAG D.XFER  X5 1+ STA, X5 STY,
 20         C083 LDA, C083 LDA, X5 )JMP,
 21 FRAG D.CDISK  YSAVE STY, XSAVE STX,
 22    <MAIN> JSR, <NDISK> JSR, <AUX> JSR,
 23    \ XYNEXT JMP,
```

```
  0 ( SOFT SWITCH WORDS FOR DISK RAM ) HEX
  1
  2 FRAG D.MONITOR set up main memory then
  3         call the Apple monitor.
  4 FRAG D.B/F BASIC/Forth interface.
  5
  6 FRAG D.XNEXT return from bank 2 routine.
  7
  8 FRAG D.RTS reset banks.
  9
 10 FRAG D.AUX set up auxilliary ram.
 11
 12 FRAG D.MAIN set up main ram.
 13
 14 FRAG D.D444 set up main ram and then
 15         jump to BASIC.
 16
 17 FRAG D.CH/F return character from BASIC.
 18
 19 FRAG D.XFER jump to bank 2 routine.
 20
 21 FRAG D.CDISK set up main memory, erase
 22 Swyft disk, return to auxilliary memory
 23
```

243
```
  0 ( soft switch words for disk ram ) HEX
  1
  2 FRAG D.ZPMOVE  300 STA, 301 STX,
  3 302 STY, PLA, 303 STA, PLA, 304 STA,
  4 0 #B LDY,
  5 BEGIN, NC
  6 IF,  0 ,Y LDA, TAX, 100 ,Y LDA,
  7         C008 STA, 100 ,Y STA, TXA,
```

```
  0 ( SOFT SWITCH WORDS FOR DISK RAM ) HEX
  1
  2 FRAG D.ZPMOVE
  3 PURPOSE: move page 0 from auxilliary
  4 memory to main, or vice versa; carry
  5 flag determines direction in the disk
  6 version only.
  7 save registers beginning at $300.
```

```
  8        0 ,Y STA, C009 STA,                    8  if carry clear then move from auxilliary
  9   ELSE, C008 STA, 0 ,Y LDA, TAX,              9  to main.
 10        100 ,Y LDA, C009 STA,                 10  else carry set so
 11        100 ,Y STA, TXA, 0 ,Y STA,            11  move from main memory to auxilliary.
 12   ENDIF, INY, EQ                             12  restore registers.
 13 UNTIL, 304 LDA, PHA, 303 LDA, PHA,           13
 14 302 LDY, 301 LDX, 300 LDA, RTS,              14  FRAG D.LEMIT
 15                                              15  PURPOSE: print character. x-reg has the
 16 FRAG D.LEMIT  SEI, <MAIN> JSR,                16  character.
 17 C1 #B LDY, 37 STY, 0 #B LDY, 36 STY,         17  set up main memory.
 18 60 #B LDY, FDF0 STY, TXA,                    18  modify Apple vectors.
 19 FDED JSR,  36 LDA, F79 STA,                  19  output character.
 20 FD #B LDA, 37 STA, F0 #B LDA, 36 STA,        20  restore auxilliary memory.
 21 <AUX> JSR, CLI, RTS,                         21
 22                                              22  FRAG D.LEMIT2
 23 FRAG D.LEMIT2  <LEMIT> JMP,                  23  PURPOSE: jump to printer routine.

scr # 244
  0 ( soft switch words for disk ram ) HEX       0  ( SOFT SWITCH WORDS FOR DISK RAM ) HEX
  1                                              1
  2 FRAG D.START                                 2  FRAG D.START
  3   <MAIN> JSR, C08D LDA, C08D LDA,            3  PURPOSE: prepare for BASIC.
  4   D0 #B LDA, X0 1+ STA, 0 #B LDY, X0 STY,    4  set up main memory.
  5   BEGIN,                                     5  set up for BASIC ($C08D).
  6     BEGIN, X0 )Y LDA, X0 )Y STA, INY, EQ     6  move and modify (see .START).
  7     UNTIL,  X0 1+ INC, EQ                    7  restore auxilliary memory.
  8   UNTIL,                                     8
  9   80 #B LDA, E063 STA,                       9
 10   4C #B LDA, D43C STA,                      10
 11   <B/F>    DUP OFF AND #B LDA, D43D STA,    11
 12            SWAB OFF AND #B LDA, D43E STA,   12  FRAG D.BOOT
 13   <CH/F>   DUP OFF AND #B LDA, FDF1 STA,    13  PURPOSE: boot disk.
 14            SWAB OFF AND #B LDA, FDF2 STA,   14
 15   <AUX> JSR, <XNEXT> JMP,                   15
 16                                             16
 17 FRAG D.BOOT                                 17
 18   <AUX> JSR, C08F LDA, C08F LDA,            18
 19   FFF6 LDA, FFFE STA, FFF7 LDA, FFFF STA,   19
 20   D204 JMP,                                 20
 21   C08A LDA, <MAIN> JSR,                     21
 22   0 #B LDA, 3F4 STA, FFFC )JMP, NOP, NOP,   22
 23   D200 , 3C8 , 3 A5 XOR C,                  23
245
  0 ( D:FRAGMENTS FOR DISK RAM ) HEX             0  LABEL DISK-FRAGMENTS ( -- )
  1                                              1  PURPOSE: copy routines that can't
  2 LABEL DISK-FRAGMENTS                         2  operate in ramcard to an area in ram.
  3 YSAVE STY, 5F #B LDY, BEGIN,                 3
  4 \ D.BOOT 28 - ,Y LDA, 3A0       ,Y STA,      4  D.BOOT 28 -  to 3A0
  5 \ D.ZPMOVE      ,Y LDA, <ZPMOVE> ,Y STA,     5  D.ZPMOVE     to <ZPMOVE>
  6 \ D.LEMIT       ,Y LDA, <LEMIT>  ,Y STA,     6  D.LEMIT      to <LEMIT>
  7 \ D.START       ,Y LDA, <START>  ,Y STA,     7  D.START      to <START>
  8 \ .NEWDISK      ,Y LDA, <NDISK>  ,Y STA,     8  .NEWDISK     to <NDISK>
  9 DEY, MI UNTIL, F #B LDY, BEGIN,              9  D.LEMIT2     to <LEMIT2>
 10 \ D.LEMIT2      ,Y LDA, <LEMIT2> ,Y STA,    10  D.XNEXT      to <XNEXT>
 11 \ D.CDISK       ,Y LDA, <CDISK>  ,Y STA,    11  D.MONITOR    to <MON>
 12 \ D.AUX         ,Y LDA, <AUX>    ,Y STA,    12  D.B/F        to <B/F>
 13 \ D.MAIN        ,Y LDA, <MAIN>   ,Y STA,    13  D.D444       to <D444>
 14 \ D.XNEXT       ,Y LDA, <XNEXT>  ,Y STA,    14  D.CH/F       to <CH/F>
 15 \ D.MONITOR     ,Y LDA, <MON>    ,Y STA,    15  D.XFER       to <XFER>
 16 \ D.B/F         ,Y LDA, <B/F>    ,Y STA,    16  D.MAIN       to <MAIN>
```

```
17  \ D.D444      ,Y LDA, <D444>   ,Y STA,        17  D.AUX      to <AUX>
18  \ D.CH/F      ,Y LDA, <CH/F>   ,Y STA,        18  D.RTS      to <RTS>
19  \ D.XFER      ,Y LDA, <XFER>   ,Y STA,        19
20  \ D.RTS       ,Y LDA, <RTS>    ,Y STA,        20  NOTE: the same space can be loaded with
21  DEY, MI UNTIL,                                21  fragments used by the rom version
22  YSAVE LDY, TNEXT,                             22  which manage bank switching differently
23                                                23
``` scr # 246
```
 0 ( START ) HEX                                   0 LABEL START  ( -- )
 1                                                 1 PURPOSE: set up for BASIC.
 2 ( BELONGS IN WARM START )                       2 if using the disk version of Swyft
 3 LABEL START  YSAVE STY, ROM? LDA, EQ            3 (i.e., ROM? is equal to zero) then
 4 IF, 00 #B LDA, 3C STA, 42 STA,                  4 move from auxilliary to main from
 5   03 #B LDA, 3D STA, 43 STA,                    5 $300 through $11FF to $300.
 6   11 #B LDA, 3F STA, FF #B LDA, 3E STA,         6
 7   CLC, C311 JSR,                                7 NOTE: called by WARM.
 8 ENDIF, <START> JMP,                             8
 9                                                 9
10                                                10
11                                                11
12                                                12
13                                                13
14                                                14
15                                                15
16                                                16
17                                                17
18                                                18
19                                                19
20                                                20
21                                                21
22                                                22
23                                                23
```

247
```
 0 ( FRAGMENTS MOVE-VARS ) HEX                     0 T: FRAGMENTS  ( -- )
 1                                                 1 PURPOSE: decide which set of machine
 2 T: FRAGMENTS ROM? IF ROM-FRAGMENTS              2 code routines (disk versus rom) to
 3  ELSE DISK-FRAGMENTS ENDIF ;                    3 copy from rom space to their own ram
 4                                                 4 space.
 5 FRAG .MOVE-VARS  ROM? LDA, EQ                   5 input: ROM? is zero if using the disk
 6  IF, LOMEM                                      6 based version of Swyft.
 7   DUP SWAB OFF AND #B LDA,                      7
 8   3D STA, 43 STA,                               8 FRAG .MOVE-VARS  ( -- )
 9   OFF AND #B LDA, 3C STA, 42 STA,               9 PURPOSE: move BASIC variables in disk
10   BOV 1-                                       10 version of Swyft.
11   DUP SWAB OFF AND #B LDA, 3F STA,             11 in the disk version only:
12   OFF AND #B LDA, 3E STA,                      12 move, between aux to main memory,
13   C311 JSR,                                    13 BASIC variables (1200-15FF)
14  ENDIF, RTS,                                   14 and input buffer (200-2FF)
15                                                15
16                                                16
17                                                17
18                                                18
19                                                19
20                                                20
21                                                21
22                                                22
23                                                23
``` scr # 248
```
 0 ( BEFORE AFTER ) HEX
 1
 2 LABEL BEFORE  -YSAVE STY,
 3   \ .MOVE-VARS JSR, 0 #B LDY,
 4   BEGIN, BASIC0 ,Y LDA, 0 ,Y STA, INY,
 5     50 #B CPY, EQ
 6   UNTIL, A0 #B LDY,
 7   BEGIN, BASIC0 ,Y LDA, 0 ,Y STA, INY, EQ
 8   UNTIL,
 9   ROM? LDA, EQ
10   IF, 02 #B LDA, 3D STA, 43 STA, 3F STA,
11     00 #B LDA, 3C STA, 42 STA,
12     FF #B LDA, 3E STA,
13     CLC, C311 JSR,
14   ENDIF, YSAVE LDY, TNEXT,
15
16 LABEL AFTER  YSAVE STY, 0 #B LDY,
17   BEGIN, 0 ,Y LDA, BASIC0 ,Y STA, INY,
18     50 #B CPY, EQ
19   UNTIL, A0 #B LDY,
20   BEGIN, 0 ,Y LDA, BASIC0 ,Y STA, INY, EQ
21   UNTIL, SEC, \ .MOVE-VARS JSR,
22   YSAVE LDY, TNEXT,
23
```

249
```
 0 ( ?MOVETEXT ) HEX
 1
 2 ( shiftamount -- )
 3 T: MOVETEXT   DUP >R
 4   BOC 2DUP + EOS BOC - R> 0<
 5   IF CMOVE ELSE CMOVE> ENDIF
 6   BOT >R EBOT >R
 7   DUP BOC +TO DUP BOT +TO
 8   DUP BOS +TO DUP EOS +TO
 9   DUP EBOT +TO OEOS +TO
10   FIXEND R> R> +ALIGN
11   TOP LOCLIN LINADR REWINDOW TOPLINE
12   OFF FRESH RENCUR OFF
13   0 NEWBOTTOM TO ;
14
15 T: ?MOVETEXT   C2D4 V@ >R
16   R@ BOC - DUP NEWBOTTOM TO
17   IF BEOT EOS 100 + - BOC + R@ U<
18   R@ BOTTOM U< OR
19     IF BOC C2D4 V! 0 NEWBOTTOM TO
20   ENDIF ENDIF R> DROP ;
21
22
23
``` scr # 250
```
 0 ( MARGIN-CHANGES ) HEX
 1 T: MARGIN-CHANGES   CDC1 V@ MARGIN% -
 2   IF  CDC1 V@ OMAX 30 UMIN
 3     DUP MARGIN% TO CDC1 V! ENDIF
 4
 5   DOCC V@ PLEN% -
 6   IF LINES PAGES - 0 DOCC V@
 7     ABOVE% BELOW% + 1+ UMAX OFF UMIN
```

```
 0 LABEL BEFORE ( -- )
 1 PURPOSE: prepare for BASIC.
 2   if the disk version then move BASIC
 3   variables (.MOVE-VARS).
 4   copy the first $50 and the last $60
 5   bytes from BASIC0 to page 0.
 6   if the disk based Swyft then
 7   move from aux to main memory,
 8   the basic variables and page 2.
 9
10 LABEL AFTER ( -- )
11 PURPOSE: return from BASIC.
12   copy the first 50 and the last 60
13   (hex) bytes from page 0 to BASIC0.
14   if the disk version then move BASIC
15   variables (.MOVE-VARS).
16
17
18
19
20
21
22
23
```

```
 0 T: MOVETEXT ( shiftamount -- )
 1 PURPOSE: move the beginning of text so
 2   that more (or less) room is available
 3   for writing programs.
 4
 5   move bytes up or down from BOC to
 6   BOC+shiftamount.
 7   save old EBOT and BOT values (for use
 8   by +ALIGN).
 9   update BOC, BOT, BOS, EOS, EBOT, OEOS
10   by adding shiftamount.
11   put a form feed at the end (FIXEND).
12   align the page table (using old EBOT and
13   old BOT).
14   rewindow and show a fresh display.
15   turn NEWBOTTOM off.
16
17 T: ?MOVETEXT ( -- )
18 PURPOSE: prevent text from moving too
19   far down.
20   if BT% does not equal BOC and
21   if it is not possible to move text down
22   then keep the BOC the same.
23
```

```
 0 T: MARGIN-CHANGES
 1 PURPOSE: after a BASIC command update
 2   margins (ie, left margin, page length,
 3   header, footer). Note that there is an
 4   interaction of these variables (ie,
 5   they affect each other). in particular,
 6   PLEN% (page length) is not set below
 7   values of ABOVE% plus BELOW%; also
```

```
  8  ABOVE% - BELOW% -
  9  UM/MOD SWAP 0= 0= - - CA U<
 10  IF DOCC V@ OMAX
 11    ABOVE% BELOW% + 1+ UMAX OFF UMIN
 12    DUP PLEN% TO DOCC V!
 13  ELSE PLEN% DOCC V! ENDIF ENDIF
 14
 15  C1C2 V@ ABOVE% -
 16  IF C1C2 V@ OMAX
 17    PLEN% 1- BELOW% - UMIN HEAD% OMAX
 18    UMAX DUP ABOVE% TO C1C2 V! ENDIF
 19
 20  C2C5 V@ BELOW% -
 21  IF C2C5 V@ OMAX PLEN% 1-
 22    ABOVE% - UMIN LPAGE% 2 + OMAX
 23    UMAX DUP BELOW% TO C2C5 V! ENDIF ;
```

251
```
  0  ( WIDTHCHANGE SPACINGCHANGE ) HEX
  1
  2  T: WIDTHCHANGE
  3    D7C9 V@ WIDE -
  4    IF D7C9 V@ WIDE U< DUP
  5    IF DROP 0CA 0
  6      WIDE 0 D7C9 V@
  7      UM/MOD SWAP 0= 0= -
  8      UM/MOD SWAP 0= 0= - PAGES U<
  9    ENDIF 0=
 10    IF D7C9 V@ 50 UMIN 10 UMAX
 11      DUP D7C9 V! WIDE TO
 12      7000 TOP TO BOT BOT NEWPAGES
 13    ELSE WIDE D7C9 V!
 14    ENDIF ENDIF ;
 15  ;S
 16  T: SPACINGCHANGE
 17    SPACING D3D0 V@ OMAX 2 UMIN U<
 18    IF LINES PAGES - 0 PLEN% ABOVE% -
 19    BELOW% - U2/ UM/MOD SWAP 0= 0= - CA U<
 20    IF 2 SPACING TO 2 ELSE 1 ENDIF D3D0 V!
 21  ELSE D3D0 V@ OMAX 2 UMIN DUP
 22    SPACING TO D3D0 V! ENDIF ;
 23
``` scr # 252
```
  0  ( CHECKCHANGES ) HEX
  1  T: CHECKCHANGES WIDTHCHANGE
  2    MARGIN-CHANGES DOC1 V@ PAGE% -
  3    IF DOC1 V@ PAGE% TO
  4      7000 TOP TO EBOT BOT NEWPAGES ENDIF
  5    SPACING D3D0 V@ OMAX 2 UMIN U<
  6    IF LINES PAGES - 0 PLEN% ABOVE% -
  7    BELOW% - U2/ UM/MOD SWAP 0= 0= - CA U<
  8      IF 2 SPACING TO 2 ELSE 1 ENDIF D3D0 V!
  9    ELSE D3D0 V@ OMAX 2 UMIN DUP
 10      SPACING TO D3D0 V! ENDIF
 11    PLEN% BELOW% - ABOVE% - SPACING 2 =
 12    IF 0 2 UM/MOD + ENDIF
 13    DUP LONG -
 14    IF DUP LONG TO 7000 TOP TO
 15      BOT BOT NEWPAGES
 16    ENDIF DROP
 17    CCDO V@ LPAGE% -
 18    IF CCDO V@ OMAX 1 UMAX BELOW% 2 - UMIN
 19      DUP LPAGE% TO CCDO V! ENDIF
 20    DOCE V@ PELAC% TO CCCE V@ LINEND% TO
```

```
  8  PLEN% cannot be set so that page table
  9  overflows.
 10
 11  left margin can range from 0 to $30.
 12
 13  page length ranges from ab%+be%+1 to $FF
 14  if the change in page length will not
 15  overflow the page table then make the
 16  change; otherwise reset BASIC value,
 17  set error# to 19
 18
 19  top margin ranges from pl%+be%-1 to he%.
 20
 21  bottom margin ranges from pl%+ab%-1 to
 22  lp%+2.
 23
```

```
  0  T: WIDTHCHANGE ( -- )
  1  PURPOSE: change the horizontal width of
  2   the text. width will not be changed if
  3   it would cause too many pages for the
  4   page table.
  5
  6  if the BASIC variable WI% and WIDE are
  7   not the same then
  8   if the new width is less than the
  9    current width then
 10    figure out if the new width would
 11    overflow the page table.
 12   if there would be no overflow then make
 13    the change.
 14   else keep the same width with no
 15    change, set error# to 19
 16
 17  NOTE: the width can range from $10 to
 18   $50.
 19
 20
 21
 22
 23
```

```
  0  T: CHECKCHANGES ( -- )
  1  PURPOSE: adjust Swyft for changes in
  2   BASIC variables.
  3
  4  after BASIC returns to Forth then make
  5   changes in the following if needed:
  6  width (WIDTHCHANGE)
  7  margin (MARGIN-CHANGES)
  8  pagination (PAGE%)
  9  page length (PLEN%)
 10  spacing (SPACING)
 11  ( else set error# to 19 )
 12  margin above (ABOVE%)
 13  margin below (BELOW%)
 14  page flag (PFLAG%)
 15  modem initialization (SEND% and
 16   SETMODEM)
 17  printer strings (SAVESTRINGS)
 18  ram key translation and command tables
 19   (?RAMKEYS)
 20  bottom of text (?MOVETEXT)
```

```
253
  0 ( TOINPUT APPEND ) HEX
  1
  2 ( address count -- )
  3 T: TOINPUT
  4   0 OVER 200 + !
  5   200 SWAP CMOVE
  6   300 200
  7   DO I C@ ?DUP
  8   IF 20 U<
  9     IF 20 I C!
 10   ENDIF ENDIF
 11   LOOP ;
 12
 13 ( char -- | insert char at OEOS )
 14 T: APPEND   EBOT C!
 15   1 EBOT +TO 1 EOS +TO
 16   -1 DIRTY TO FIXEND ;
 17
 18
 19
 20
 21
 22
 23
```

```
 0 T: TOINPUT  ( address count -- )
 1 PURPOSE: pass characters to BASIC.
 2
 3 move from text address to BASIC input
 4  area by the count of bytes.
 5 insure that no character is less than
 6  $20.
 7
 8
 9 T: APPEND   ( char -- )
10 PURPOSE: insert character from BASIC at
11   OEOS.
12
13 if text is full, discard and beep.
14 enter a character arriving from BASIC
15  at the end of selection,
16  updating pointers, and setting DIRTY.
```

```
scr # 254
  0 ( TOBASIC ) HEX
  1
  2 ( address count -- )
  3
  4 T: TOBASIC  TOINPUT VALIDATE DROP
  5   OFF RETN TO  0 COL# TO
  6   0 BASIC0 24 + C!
  7   RESETVARS LOADSTRINGS BEFORE
  8   BEGIN F>B
  9     PAGES 0CA U<
 10     EBOT 100 + BEOT U< AND DUP 0=
 11     IF BEEP OFF OFF C! ENDIF
 12     RETN 7F U< AND
 13   WHILE RETN ?DUP
 14     IF 0 DO 20 APPEND LOOP
 15     ENDIF RETNCHR 7 =
 16     IF BEEP
 17     ELSE RETNCHR 1D UMAX DUP APPEND
 18       21 U< IF FRESH ENDIF
 19     ENDIF
 20   REPEAT AFTER FRESH VALIDATE
 21   IF CHECKCHANGES ENDIF ;
 22
 23
```

```
 0 T: TOBASIC  ( address count -- )
 1 PURPOSE: call BASIC to interpret one
 2  line and place its output into text.
 3 only display text after a space or
 4  carriage return, and when done
 5 respond to changes to control variables.
 6
 7 move text to BASIC area, validate
 8  variables, set RETN and COL# to zero,
 9  set BASIC0 ADDR 24 + to zero.
10 reset BASIC variables.
11 BEFORE sets up BASIC for disk version.
12 begin call BASIC interface
13 while RETN and enough pages and room
14   insert spaces in text (RETN gives
15    the horizontal position).
16  if a BASIC error
17   then beep, set error# to 15
18  else insert character in text
19    (BASIC character returned in RETNCHR).
20   fresh screen
21 repeat AFTER resets disk vers from BASIC
22 if any BASIC variables have changed
23   then recalculate text format
```

```
255
  0 ( BASIC ) HEX
  1
  2 T: BASIC
  3   AUTOEXTEND OFF
  4   BOS EOS OVER WR!
  5   BEGIN WRAP WR@ WC@
  6     ENDWRAP DROP WR@ >R
  7     >R 2DUP - R> UMIN
```

```
 0 T: BASIC  ( -- )
 1 PURPOSE: interpret multiple lines of
 2  BASIC and insert response in text.
 3
 4 autoextend selection.
 5 turn off cursor.
 6 interpret selected lines and place their
 7  output into text (TOBASIC).
```

```
  8   TOBASIC                                             8  leave the selection selected.
  9   DUP 1- R> DUP WR! U<                                9  show fat cursor
 10   UNTIL EBOT OVER - >R                               10  unless at the end of the text.
 11   DUP BEOT R@ - R@ CMOVE                             11  wrap text (ENDFORM).
 12   R> NEGATE BEOT +TO DUP EBOT TO                     12  if the bottom of text has been changed
 13   BOS OEOS TO                                        13  then movetext.
 14   NEWMARK NEWND SHOW                                 14
 15   BEOT EOT =                                         15
 16   IF LEXCUR ELSE RENCUR ENDIF                        16
 17   0 OLIN TO ENDFORM                                  17
 18   NEWBOTTOM IF NEWBOTTOM MOVETEXT ENDIF              18
 19   -1 EXTENDED TO ;                                   19
 20                                                     20
 21                                                     21
 22                                                     22
 23                                                     23 scr # 256
  0  ( FIND-PREV ) HEX ;S                                0  ( sort words ) ;S
  1                                                      1
  2  ( addr -- addr )                                    2  this is Mino's sort routine that was not
  3  LABEL FIND-PREV    YSAVE STY,                       3  implemented.
  4   0 SP) LDA, TAY, 0 #B LDA, X0 STA,                  4
  5   1 SP) LDA, X0 1+ STA,                              5  LABEL FIND-PREV
  6   BEGIN, DEY, OFF #B CPY, EQ                         6
  7    IF, X0 1+ DEC, ENDIF,                             7
  8    X0 )Y LDA, 0D #B CMP, NE                          8  LABEL FIND-NEXT
  9    IF, 01C #B CMP, ENDIF, EQ                         9
 10   UNTIL,                                            10
 11   TYA, 0 SP) STA, X0 1+ LDA, 1 SP) STA,             11
 12   YSAVE LDY, TNEXT,                                 12
 13                                                     13
 14  ( addr -- addr )                                   14
 15  LABEL FIND-NEXT    YSAVE STY,                      15
 16   0 SP) LDA, TAY, 0 #B LDA, X0 STA,                 16
 17   1 SP) LDA, X0 1+ STA,                             17
 18   BEGIN, INY, EQ IF, X0 1+ INC, ENDIF,              18
 19    X0 )Y LDA, 0D #B CMP, NE                         19
 20    IF, 01C #B CMP, ENDIF, EQ                        20
 21   UNTIL,                                            21
 22   TYA, 0 SP) STA, X0 1+ LDA, 1 SP) STA,             22
 23   YSAVE LDY, TNEXT,                                 23
257
  0  ( COMPARE ) HEX ;S                                  0  ( sort words ) ;S
  1  ( addr1 len1 addr2 len2 -- flag )                   1
  2  LABEL COMPARE   1 SP) LDA, 5 SP) CMP, EQ            2  this is Mino's sort routine that was not
  3   IF, 0 SP) LDA, 4 SP) CMP, ENDIF, CS                3  implemented.
  4   IF, 4 SP) LDA, X0 STA,                             4
  5    5 SP) LDA, X0 1+ STA,                             5
  6   ELSE, 0 SP) LDA, X0 STA,                           6  LABEL COMPARE
  7    1 SP) LDA, X0 1+ STA,         ENDIF,              7
  8   BEGIN, X0 LDA, X0 1+ ORA, X1 STA, SEC,             8
  9    2 X) LDA, 6 X) SBC, EQ                            9
 10    IF, OFF #B LDA, ELSE, 0 #B LDA, ENDIF,           10
 11    X1 ORA, NE                                       11
 12   WHILE, X0 DEC, X0 LDA, OFF #B CMP, EQ             12
 13    IF, X0 1+ DEC, ENDIF,                            13
 14    CLC, 6 SP) LDA, 01 #B ADC, 6 SP) STA,            14
 15         7 SP) LDA, 00 #B ADC, 7 SP) STA,            15
 16    CLC, 2 SP) LDA, 01 #B ADC, 2 SP) STA,            16
```

```
17        3 SP) LDA, 00 #B ADC, 3 SP) STA,
18   AGAIN, X1 LDA, EQ
19   IF, SEC, 0 SP) LDA, 4 SP) SBC,
20    1 SP) LDA, 5 SP) SBC, ENDIF, NC
21   IF, OFF #B LDA, ELSE, 00 #B LDA, ENDIF,
22   INX, INX, INX, INX, INX, INX,
23   0 SP) STA, 1 SP) STA, TNEXT,
```

```
scr # 258
 0 ( SWAP-NEXT ) HEX ;S
 1
 2 T: SWAP-NEXT -
 3  CURPOS DUP 1- FIND-NEXT
 4  DUP 1+ OVER FIND-NEXT
 5  OVER - FILLED-LEN MIN >R >R OVER -
 6  FIELD-LEN MIN R> R> COMPARE
 7  IF CURPOS 1- DUP FIND-NEXT
 8   DUP FIND-NEXT DUP >R OVER - >R DUP 1+
 9   R> REVERSE OVER - >R DUP 1+ R>
10   R> REVERSE R> OVER - SWAP 1+ SWAP
11   REVERSE -1 SWAPPED TO
12  ENDIF, ;
13
14
15
16 NOTE: this word has been embedded into
17  the next word, SORT.
```

```
0 ( sort words ) ;S
1
2 this is Mino's sort routine that was not
3  implemented.
4
5 T: SWAP-NEXT
```

```
259
 0 ( SORT ) HEX ;S
 1
 2 T: SORT  EOS OEOS TO BEOT EOS EOT BEOT -
 3  DUP EOS + TOT TO CMOVE BOS DUP
 4  FIND-PREV DUP 1+ BOS TO - DUP OFFSET TO
 5  EOS DUP FIND-PREV
 6   - SWAP - OMAX FIELD-LEN TO
 7  BEGIN 0 SWAPPED TO START-ADDR CURPOS TO
 8  BEGIN  CURPOS DUP 1- FIND-NEXT DUP 1+
 9   OVER FIND-NEXT OVER - FILLED-LEN UMIN
10   >R >R OVER - FIELD-LEN UMIN R> R>
11   COMPARE
12   IF CURPOS 1- DUP FIND-NEXT
13    DUP FIND-NEXT DUP >R OVER - >R DUP
14    1+ R> REVERSE OVER - >R DUP 1+ R>
15    R> REVERSE R> OVER - SWAP 1+ SWAP
16    REVERSE -1 SWAPPED TO
17   ENDIF
18   CURPOS FIND-NEXT 1+ DUP CURPOS TO
19   EOS 1- FIND-PREV  1+ DUP LASTREC TO =
20  UNTIL LASTREC EOS TO SWAPPED 0=
21  UNTIL EOS TOT OVER - EOT OVER - SWAP
22  CMOVE   EOT TOT - BEOT TO   EOS EBOT TO
23  7000 TOP TO   BOT BOT NEWPAGES ;
```

```
0 ( sort words ) ;S
1
2 this is Mino's sort routine that was not
3  implemented.
4
5 T: SORT
```

```
scr # 260
  0                                              0  LABEL ACT ( -- )
  1                                              1  PURPOSE: turn disk on.
  2                                              2
  3                                              3  LABEL DEACT ( -- )
  4                                              4  PURPOSE: turn disk off.
  5                                              5
  6                                              6  T: PROT? ( -- flag )
  7                                              7  RESULT: true if disk is write protected.
  8                                              8
  9                                              9  T: SEEK ( # -- )
 10                                             10  PURPOSE: seek to track #
 11                                             11
 12                                             12  T: RECAL ( -- )
 13                                             13  PURPOSE: bang up against seek stop and
 14                                             14   call that track 0.
 15                                             15
 16                                             16  T: DISKON ( -- )
 17                                             17  PURPOSE: set up disk for test of EDDE or
 18                                             18   Apple header.
 19                                             19  go to 1st text track:
 20                                             20  turn disk on, wait 224 milliseconds,
 21                                             21  recalibrate, and seek to track 1
 22                                             22
 23                                             23
261
  0  ( ACT DEACT PROT? DON SEEK HOME ) HEX       0  T: READ ( t -- )
  1                                              1  PURPOSE: read track t.
  2  LABEL ACT C0EA LDA, C0E9 LDA, TNEXT,        2
  3                                              3  seek to track t.
  4  LABEL DEACT C0E8 LDA, TNEXT,                4  read track.
  5                                              5  if track # does not match then
  6  T: PROT?  C0ED C@ DROP 7F C0EE C@ U< ;      6   recalibrate, seek, read.
  7                                              7  if still no match
  8  ( track# -- )                               8   then beep, set error# to 31
  9  T: SEEK  2* <SEEK> 0A MS ;                  9  if the checksum does not match then
 10                                             10   reread.
 11  T: RECAL  50 TRACK TO 0 SEEK ;             11  if still no match
 12                                             12   then beep, set error# to 32
 13  T: DISKON ACT E0 MS RECAL 1 SEEK ;         13
 14                                             14  NOTE: during a read a valid checksum
 15                                             15   is zero (0).
 16                                             16
 17                                             17
 18                                             18
 19                                             19
 20                                             20
 21                                             21
 22                                             22
 23                                             23 scr # 262
  0  ( READ ) HEX                                0  T: GET ( -- )
  1                                              1  PURPOSE: copy an extended selection from
  2  ( track# -- )-                              2   disk to ram.
  3  T: READ  >R R@ SEEK <READ>                  3
  4    B3FF C@ R@ -                              4  turn disk on, seek to track 0.
  5    IF RECAL R@ SEEK <READ>                   5  not an edde disk:
  6       B3FF C@ R@ -                           6   turn disk off, set error# to 7, stop
  7       IF BEEP                                7  else read track 0.
```

```
 8   ENDIF ENDIF CHECKSUM
 9   IF <READ> CHECKSUM
10     IF BEEP
11   ENDIF ENDIF R> DROP ;
12
13  ;S During a read, a valid checksum is 0
14
15  LABEL TLEN
16  DEX, DEX, OC #B LDA, 1 SP) STA,
17  0 #B LDA, 0 SP) STA, TNEXT,
18
19
20
21
22
23
263
 0  ( GET ) HEX
 1  T: GET ACT E0 MS ?EDDE
 2  IF 1 READ B400 ORIGIN ADDR - DUP >R
 3    EOS ADDR + @ BOS ADDR R> + @
 4    DUP ORIGIN ADDR - FIRST TO - SIZE TO
 5    BEOT U2/ EBOT U2/ SIZE U2/ + 80 + U<
 6    IF DEACT BEEP EXIT ENDIF  SIZE CT TO
 7    EOS BOS TO  EOS OEOS TO  EOS PTR TO
 8    FIRST 0 COO UM/MOD 1+ READ
 9    >R B400 R@ + PTR SIZE
10    COO R@ - UMIN CMOVE
11    R> COO - SIZE + F400 OVER U<
12    IF DROP 0 ENDIF SIZE TO
13    CT SIZE - DUP FIRST +TO PTR +TO
14    BEGIN SIZE
15    WHILE FIRST 0 COO UM/MOD
16      1+ READ DROP
17      B400 PTR SIZE COO UMIN DUP >R CMOVE
18      R@ PTR +TO R@ FIRST +TO
19      R> NEGATE SIZE +TO
20    REPEAT CT EBOT +TO CT EOS +TO
21    EBOT CT - BOT NEWPAGES FLUSH
22    -1 EXTENDED TO -1 DIRTY TO
23  ENDIF DEACT ;

scr #  264
 0
 1
 2
 3
 4
 5
 6
 7
 8
 9
10
11
12
13
14
15
16
```

```
 8   get disk's selection parameters.
 9   first=bos-origin size=ct=eos-bos.
10   check: selection won't fit: beep stop.
11   otherwise, move selection from disk to
12    current text, update page table,
13    clear queues, set dirty bit.
14  turn disk off.
15
16
17
18
19
20
21
22
23

0  T: <LOAD> ( #tracks -- )
 1  PURPOSE: load #tracks from disk.
 2  copy code fragments to $0800.
 3  show sign on message.
 4  set disk# and olddisk# from disk.
 5  read all tracks and clear dirty bit.
 6
 7  T: LOAD  ( -- )
 8  PURPOSE: load only the number of tracks
 9   necessary (SAVED) and reinsert gap.
10  read and load parameters.
11  load compressed text.
12  restore gap to text.
13  warmstart.
14
15
16
17
18
19
20
21
22
23

0  T: DRAG ( -- )
 1  PURPOSE: drag text from the current
 2   universe to the text on another disk.
 3
 4  calculate # of tracks needed for saving.
 5  read track 1.
 6  find out # of tracks used on disk.
 7  if there are enough tracks left on disk
 8   move selected text to top of text area.
 9   <load> text from disk.
10   turn off drive.
11   set dirty bit.
12   move selected text to EBOT (3 reverses)
13    and restore gap.
14   make sure last character is form feed.
15   add selection to EBOT.
16   align page table.
```

```
17                                          17  delete selection if too many pages.
18                                          18  show display.
19                                          19  warmstart.
20                                          20  else drop return stack and turn drive
21                                          21  off.
22                                          22  error# is 5 means no more room
23                                          23  error# is 6 means too many pages 265
  0 ( .LTABLE ) HEX                          0 T: WRITE  ( t -- flag )
  1                                          1 PURPOSE: write to disk track t.
  2 FRAG .LTABLE                             2 seek to track t
  3 \ NOOP        , ( 0 )                    3 store serial # at B3FC
  4 \ DELETE      , ( 1 )                    4 and checksum    at B3FE
  5 \ PRINT       , ( 2 )                    5 store track #   at B3FF
  6 \ NOOP        , ( 3  was SORT )          6 write the track (see <WRITE>)
  7 \ NOOP        , ( 4   DISK - was SAVE )  7 check for "ED DE DA" header
  8 \ SEND        , ( 5 )                    8  not there: recalibrate, seek, write
  9 \ GET         , ( 6 )                    9  still not there:
 10 \ PASTE       , ( 7 )                   10   beep, return zero, set error# to 30
 11 \ BASIC       , ( 8 )                   11 return 1 for success
 12 \ .MON        , ( 9  was MON )          12
 13 \ NOOP        , ( 0A was BOOT7.5 )      13 T: APPLEDISK  ( -- )
 14 \ NOOP        , ( 0B was BOOTABLE )     14 PURPOSE: boot Apple disk.
 15 \ CONTROL     , ( 0C was STOPSEND )     15 if text is dirty and
 16 \ NOOP        , ( 0D was STARTSEND )    16   if text is empty then boot Apple disk.
 17 \ NOOP        , ( 0E)                   17   else beep, set error# to 4
 18 \ NOOP        , ( 0F)                   18 else boot Apple disk.
 19 \ NOOP        , ( 10)                   19
 20 \ NOOP        , ( 11)                   20
 21 \ NOOP        , ( 12)                   21
 22 \ NOOP        , ( 13)                   22
 23 \ NOOP        , ( 14)                   23 scr #  266
  0 ( LOOKUP LTABLE ) HEX                   0 T: WRITES  ( address hi+1 lo -- flag )
  1                                         1 PURPOSE: write a range of tracks to the
  2 \ NOOP          ,-( 15 )                2 disk.
  3 \ NOOP          , ( 16 )                3 write tracks lo through hi, inclusive
  4 \ NOOP          , ( 17 )                4 in 3K hunks, beginning at address
  5 \ NOOP          , ( 18 )                5 true = success
  6 \ NOOP          , ( 19 )                6
  7 \ NOOP          , ( 1A )                7 WARNING: the flag is FALSE after
  8 \ TAB           , ( 1B )                8 successfully writing the last C00 bytes
  9 \ ENTER         , ( 1C::ASCII CHARS )   9 in memory (from F400 to FFFF) so do not
 10 EDDE            , ( magic number )     10 use the flag if you are writing the
 11                                        11 last C00 bytes.
 12 LABEL LOOKUP  0 SP) LDA, ff #B CMP, CS 12
 13 IF, \ ENTER JMP,                       13
 14 ENDIF, INX, INX, .A ASL,                14
 15 YSAVE STY, TAY,                        15
 16 RTABLE    ,Y LDA, X5 STA,               16
 17 RTABLE 1+ ,Y LDA, X5 1+ STA,           17
 18 YSAVE LDY, X5 )JMP,                    18
 19                                        19
 20                                        20
 21                                        21
 22                                        22
 23                                        23
```

```
267
  0 ( BUG RP! MAIN ) HEX
  1
  2 LABEL BUG ( -- flag )
  3   YSAVE STY, 0 #B LDY, SP0 #B CPX, NE
  4   IF, SP0 #B LDX, DEY, ENDIF,
  5   DEX, DEX, 0 SP) STY, 1 SP) STY,
  6   YSAVE LDY, TNEXT,
  7
  8 LABEL RP! ( -- )  TXA, 04F #B LDX,
  9   TXS, TAX, TNEXT,
 10
 11 T: MAIN  RP!
 12   BEGIN ?X
 13     IF LEXREX
 14     ELSE
 15       ?K IF @K DUP >R LOOKUP R> LASTC TO
 16       ENDIF
 17       ?M IF MAPPEND ENDIF
 18       BELL? IF BEEP 0 BELL? TO ENDIF
 19     ENDIF
 20     QUE ?BLINK
 21     BUG IF BEEP BEEP BEEP BEEP ENDIF
 22   AGAIN ;
 23
```

```
  0 T: SAVE  ( -- )
  1 PURPOSE: save the text to disk.
  2 assumes EDDE disk turning at track 1
  3 with matching old disk #
  4
  5 if write protected then beep
  6 else collapse the gap, get new disk#
  7   calculate the number of tracks needed
  8   to save the text and store in SAVED
  9   write text to disk
 10   if successful then old disk number
 11     equals the newly disk number
 12     calculated disk number, clear the
 13     dirty bit, write boot 0 and
 14     if that is successful,
 15       write the rest of the program image
 16     else restore original disk number
 17   move text back into its original
 18     position.
 19
 20 T: IMAGE  ( flag -- )
 21 PURPOSE: Write edde image if TRUE
 22 in blocks $13 thru $16
 23
```

```
scr # 268
  0 ( WARM ) HEX
  1
  2 T: WARM  DEACT FRAGMENTS START
  3   0 LEXXING TO 0 BELL? TO
  4   FLUSH
  5   SETDISP
  6   36A5 39E !
  7   SETMODEM
  8   0 LINESCOUNT TO
  9   0 PRINT? TO
 10   ?RAMKEYS
 11   -1 TEOS TO
 12   PREALIGN <ENDFORM>
 13   TOP LOCLIN LINADR REWINDOW
 14   FRESH
 15   NARROW EOT BEOT = OR
 16   IF LEXCUR ELSE RENCUR ENDIF
 17   MAIN ;
 18
 19
 20
 21
 22
 23
```

```
  0 T: DISK  ( -- )
  1 PURPOSE: smart disk command.
  2 turn disk on.
  3 check up to two times for EDDE header.
  4 if a Swyft disk and
  5   if text is empty then load.
  6   else (not empty) <read> the disk and
  7     if disk# matches then save.
  8     else (not the same disk) and
  9       if dirty and
 10         if the whole text has been selected
 11           then drag the text else beep.
 12       else (not dirty) and
 13         if the bootup# = olddisk# and
 14           if the last command was Disk
 15             then save.
 16           else beep and set error# to 2
 17         else (no match) and
 18           if there is a selection then drag.
 19           else load.
 20 else seek to track 0 and
 21   if Apple disk then load
 22   else save text, write edde image (disk)
 23 turn disk off.
```

```
269
  0 ( ?RAMKEYS ) HEX
  1
  2 LABEL ?RAMKEYS ( -- )
  3  \ .MSG0 0B + RTABLE 3A +
  4   2DUP LDA, CMP, EQ
  5   IF, >R 2DUP 1+ LDA, 1+ CMP, EQ
  6    IF, >R 2DUP 2 + LDA, 2 + CMP, EQ
  7     IF, >R 3 + LDA, 3 + CMP, EQ
```

```
  8       IF, TNEXT,
  9  R> R> R> ENDIF, ENDIF, ENDIF, ENDIF,
 10
 11
 12
 13
 14
 15          .
 16
 17
 18
 19
 20
 21
 22
 23 scr # 270
  0 ( RAMKEYS ) HEX
  1
  2 LABEL RAMKEYS. ( -- )
  3 \ .XLAT DUP OFF AND #B LDA, X0 STA,
  4         SWAB OFF AND #B LDA, X0 1+ STA,
  5 HIMEM  DUP OFF AND #B LDA, X1 STA,
  6         SWAB OFF AND #B LDA, X1 1+ STA,
  7 \ .LTABLE DUP OFF AND #B LDA, X2 STA,
  8         SWAB OFF AND #B LDA, X2 1+ STA,
  9 RTABLE  DUP OFF AND #B LDA, X3 STA,
 10         SWAB OFF AND #B LDA, X3 1+ STA,
 11 YSAVE STY, 1F #B LDY,
 12 BEGIN, X0 )Y LDA, X1 )Y STA, DEY, MI
 13 UNTIL, 3F #B LDY,
 14 BEGIN, X2 )Y LDA, X3 )Y STA, DEY, MI
 15 UNTIL, RTABLE 3A + \ .MSG0 0B +
 16 2DUP LDA, STA,
 17 2DUP 1+ LDA, 1+ STA,
 18 2DUP 2 + LDA, 2 + STA,
 19 3 + LDA, 3 + STA,
 20 YSAVE LDY, TNEXT,
 21
 22
 23

271
  0 ( INIT <INIT> ) HEX
  1
  2 LABEL INIT  0 #B LDA, BOTTOM STA,
  3 BOV SWAB OFF AND #B LDA, BOTTOM 1+ STA,
  4 EOV 1- OFF AND #B LDA, EOT STA,
  5 EOV 1- SWAB OFF AND #B LDA, EOT 1+ STA,
  6 30 #B LDA, YWRAP STA,
  7
  8 T: <INIT>  0 QOUT TO 0 QIN TO 0 CHAR TO
  9  0 MQIN TO 0 MQOUT TO 0 TOP TO
 10  50 WIDE TO 36 LONG TO  BOTTOM BOT TO
 11  BOT BOC TO BOT 1+ EBOT TO BOT BOS TO
 12  EOT 1- BEOT TO 1D1C BEOT ! EBOT EOS TO
 13  BOS OEOS TO BEOT EBOT - GAP TO
 14  0 LCT TO  0 PCT TO SERIAL# OLDISK# TO
 15  1C BOT C! BOT REWINDOW
 16  -1 EXTENDED TO 0 NARROW TO 0 DIRTY TO
```

```
  8
  9
 10
 11
 12
 13
 14
 15
 16
 17
 18
 19
 20
 21
 22
 23

0 FRAG .LTABLE   ( -- )
  1 PURPOSE: main control character
  2  execution vector table.
  3
  4 control keys are translated by using the
  5  .XLAT table into an index which is used
  6  to access the command table, .LTABLE.
  7  control keys that are not used can have
  8  a NOOP in the command table, .LTABLE,
  9  and/or a zero for that key in the
 10  .XLAT table (or both).
 11 both .XLAT and .LTABLE are downloaded
 12  into ram so that they may be modified
 13  by the user with a BASIC program.
 14 the magic number is used to reinitialize
 15  the ram tables.  this number is the
 16  version number in .MSG0.
 17
 18
 19
 20
 21
 22
 23

0 LABEL LOOKUP  ( index -- )
  1 PURPOSE: execute element of LTABLE.
  2
  3 if the index is greater than a form
  4  feed (1C) then process it as a
  5  character.
  6 remove character from stack, multiply by
  7  2 (ie, ASL), store value from RTABLE +
  8  2*index in X5 and jump to the address
  9  at X5.
 10
 11 NOTE: RTABLE is ram equiv to LTABLE.
 12
 13
 14
 15
 16
```

```
17  100 BL1 TO 200 BL0 TO
18  INITBASIC SAVESTRINGS
19  -1 LINEND% TO 1609 SEND% TO
20  2 PFLAG% TO 0 PAGE% TO 1 SPACING TO
21  0 .LF TO 0 .BL TO 0 MARGIN% TO
22  6 ABOVE% TO 6 BELOW% TO 3 LPAGE% TO
23  42 PLEN% TO RAMKEYS ;
```

```
scr # 272
 0 ( <LOAD> OLDLOAD LOAD ) HEX
 1
 2 T: <LOAD>    >R B400 800 C00 CMOVE
 3   FRAGMENTS SIGNON
 4   B3FC @ DUP DISK# TO OLDISK# TO
 5   1400 R> 1+ 2
 6   DO I READ  B400 OVER C00 CMOVE  C00 +
 7   LOOP DROP 0 DIRTY TO ;
 8
 9 T: OLDLOAD  ACT E0 MS 1 SEEK ?EDDE
10   IF 1 READ OF <LOAD> WARM ENDIF ;
11
12 T: LOAD  1 READ B400 ORIGIN ADDR -
13   SAVED ADDR + @ <LOAD>
14   EBOT BEOT EOT 1+ OVER - CMOVE>
15   WARM ;
16
17
18
19
20 ;S
21 \ OLDLOAD \ .LTABLE ROM - AIM + 6 + !
22
23
```

```
0 LABEL TIMEOUT?  ( -- flag )
1 PURPOSE: count down the timer, returning
2 TRUE when it gets to 0.  If the value
3 of TIMER is between 128 and 256,
4 prepare the system so that DISK is
5 fooled into loading the disk in the
6 drive.
```

```
273
 0 ( DRAG ) HEX
 1
 2 T: DRAG   SEL 0 C00 UM/MOD SWAP 0= 0= -
 3   1 READ
 4   B400 SAVED ADDR 800 - + @ >R
 5   OF R@ - U<
 6   IF R>
 7     BOS EOT 1+ SEL - SEL DUP >R CMOVE>
 8     <LOAD> DEACT -1 DIRTY TO
 9     EBOT EOT 1+ OVER - REVERSE
10     BEOT EOT 1+ OVER - REVERSE
11     EBOT R@ REVERSE
12     FIXEND
13     R> EBOT DUP >R +TO
14     R@ BOT +ALIGN
15   - PAGES 07F U<
16   IF R> EBOT SHOWMARK WARM ENDIF
17     DELETE BEEP
18   ELSE BEEP DEACT
19   ENDIF R> DROP ;
20
21
22
23
```

```
0 LABEL STACK?  ( -- flag )
1
2 LABEL RP!  ( -- )
3
4 T: MAIN   RP!
```

```
scr # 274
   0 ( WRITE APPLEDISK ) HEX
   1
   2 ( disk# track# -- flag )
   3
   4 T: WRITE  >R R@ SEEK
   5  B3F0 10 0 FILL
   6  DISK# B3FC  !
   7  0     B3FE C!
   8  R@    B3FF C!
   9  CHECKSUM B3FE C!
  10  <WRITE> ?EDDE 0=
  11  IF RECAL R@ SEEK
  12    <WRITE> ?EDDE 0=
  13    IF BEEP DEACT R> DROP 0 EXIT
  14  ENDIF ENDIF R> DROP 1 ;
  15
  16 T: APPLEDISK   DIRTY
  17  IF EBOT BOT - EOT BEOT - + 2 =
  18    IF ABOOT ELSE BEEP ENDIF
  19  ELSE ABOOT ENDIF ;
  20
  21
  22
  23

275
   0 ( WRITES ) HEX
   1
   2 ( address hi-track+1 lo-track -- flag )
   3 ( true = success )
   4
   5 T: WRITES
   6  DO DUP B400 C00 CMOVE
   7    I WRITE 0=
   8    IF DROP 0 LEAVE
   9    ENDIF C00 + 10 MS
  10  LOOP ;
  11
  12 ;S  WARNING, the flag is FALSE after
  13  successfully writing the last C00
  14  bytes in memory ( from F400 - FFFF )
  15  so don't use the flag if you are
  16  writing the last C00 bytes.
  17
  18
  19
  20
  21
  22
  23 scr # 276
   0 ( SAVE ) HEX
   1
   2 ( -- |  assumes EDDE disk turning at
   3  track 0 with matching old disk #)
   4
   5 T: SAVE  PROT?
   6  IF BEEP
```

```
   0 T: WARM
   1
   2
   3
   4
   5
   6
   7
   8
   9
  10
  11
  12
  13
  14
  15
  16
  17
  18
  19
  20
  21
  22
  23

0 FRAG .VECS
   1 PURPOSE: this is a copy of the vectors
   2 needed for the custom modem support:
   3 \ .MQUE JMP,                ( .IVEC )
   4 \ .MEMIT JMP,               ( .OVEC )
   5 RTS, NOP, NOP,              ( .SVEC )
   6 RTS,                        ( .QVEC )
   7 they are moved to $1594 by RAMKEYS
   8
   9 LABEL ?RAMKEYS ( -- )
  10 PURPOSE: reload ramtable if RTABLE+3A
  11  does not equal the version number.
  12
  13 if the value at RTABLE+3A is equal to
  14  the version number then exit.
  15 otherwise execute the next definition,
  16  RAMKEYS....
  17
  18
  19
  20
  21
  22
  23

0 LABEL RAMKEYS ( -- )
   1 PURPOSE: copy key and command
   2  translation tables into ram.
   3
   4 prepare to copy:
   5  store the address of .XLAT in X0.
   6  store the address of HIMEM in X1.
```

```
 7  ELSE 4 LASTC TO
 8  BEOT EBOT EOT 1+ BEOT - CMOVE
 9  DISK# SERIAL# DISK# TO
10  EBOT EOT BEOT - +
11  800 - 1+ 0 C00 UM/MOD SWAP
12  0= 0= - SAVED TO
13  800 SAVED 1+ 1 WRITES
14  IF DROP DISK# OLDISK# TO 0 DIRTY TO
15    0 SEEK WRITE0
16  ELSE DISK# TO
17  ENDIF EBOT BEOT EOT 1+ OVER - CMOVE>
18  ENDIF ;
19
20  ;S    ROM? 0= D000 13 11
21       DO DUP CMOVE2 C00 + I WRITE 0=
22         IF DROP 0 LEAVE ENDIF 30 MS LOOP
23         IF D000 17 13 WRITES DROP
277
 0  ( DISK ) HEX
 1  T: DISK    DISKON ?EDDE DUP 0=
 2  IF DROP RECAL 1 SEEK ?EDDE ENDIF
 3  IF <READ> B3FA @ EDDE =
 4    IF GET EXIT ENDIF
 5    EBOT BOT - EOT BEOT - + 2 =
 6    IF LOAD
 7    ELSE <READ> B3FC @ DISK# =
 8      IF OLDISK# SAVE OLDISK# TO
 9      ELSE DIRTY
10        IF BOS BOT 2 + U<
11           EOT 2 - BEOT U< AND
12           IF DRAG ELSE BEEP ENDIF
13         ELSE B3FC @ OLDISK# =
14           IF LASTC 4 = SERIAL# DISK# = AND
15             IF SAVE ELSE BEEP ENDIF
16           ELSE 1 SEL U<
17             IF DRAG ELSE LOAD ENDIF
18    ENDIF ENDIF ENDIF ENDIF
19  ELSE 0 SEEK ?APPLE
20    IF APPLEDISK ELSE SAVE ENDIF
21  ENDIF DEACT ;
22
23  \ DISK \ .LTABLE ROM - AIM + 8 + !
```

```
 7  store the address of .LTABLE in X2.
 8  store the address of RTABLE in X3.
 9  copy $20 bytes from .XLAT to HIMEM.
10  copy $40 bytes from .LTABLE to RTABLE.
11  store the version number (at .MSG0+$0C)
12  to RTABLE+3A.
13
14  NOTE: this is why the position of the
15  version number in .MSG0, on screen 111,
16  should not be changed unless a similar
17  change is made elsewhere.
18
19
20
21
22
23
 0  LABEL INIT ( -- ) Initialize for no disk
 1  BOTTOM from BOV.  EOT from EOV.
 2  YWRAP is $30, as it counts from $30
 3  to $7F for a total of dec 80 (columns)
 4  before it turns negative. Calls <INIT>.
 5  T: <INIT> ( -- )
 6  clear the key and modem queue.
 7  set page format to hex 50 wide (80)
 8                by hex 36 long (54)
 9  CHAR holds a "null" (0) = empty
10  start display at top
11  nothing in the cut buffer.
12  beginning of text is a formfeed (1C)
13  select the formfeed
14  eot is a CR (1D) and formfeed (1C).
15  total line and page count is zero.
16  REWINDOW from beginning of text.
17  LEXXED state=false  EXTENDED true.
18  calc GAP (- $100 = room%).
19  INITBASIC. save printer string in PBUF.
20  initialize for FX80 printer.
21  set page length to $42.
22  save printer string in PBUF.
23  load tables into ram.
```

```
scr # 278
 0  ( COLD BOOT ) HEX
 1
 2  T: COLD DEACT
 3    ORIGIN ADDR 1000 0 FILL FRAGMENTS
 4    400 MS INIT WARM ;
 5
 6  T: BOOT  C010 C@ 86 =
 7    IF 0 CHAR C! COLD
 8    ENDIF DISKON 0 80 0
 9    DO 7F C0EC C@ U< + LOOP
10    NEGATE 8 U<   IF COLD ENDIF
11    ?EDDE         IF <READ> B3FA @ EDDE =
12      IF COLD ELSE LOAD ENDIF ENDIF
13    0 SEEK ?APPLE IF ABOOT ENDIF
14  COLD ;
15
```

```
 0  T: COLD
 1  PURPOSE: initialize for no disk.
 2  turn disk off.
 3  clear all variables to zero.
 4  load in code fragments.
 5  wait 400 milliseconds
 6  INITialize text variables and BASIC.
 7  WARM start.
 8
 9  T: BOOT   ( -- )
10  PURPOSE: boot Swyft system and copy text
11    from an Edde disk.
12  turn disk on.
13  if holding ^F then do a coldstart.
14  if disk is unformatted (cannot find
15   a header) then do a COLD start.
```

```
16                                                16 if an Edde disk then load it.
17                                                17 if an apple disk then boot it.
18                                                18 if disk is none of the above then do a
19                                                19   COLD start.
20                                                20
21                                                21
22                                                22
23                                                23
279
  0 ( .RESET RESET ) HEX                            0 FRAG .RESET  ( -- )
  1                                                 1 PURPOSE: handle 6502 RESET or NMI.
  2 FRAG .RESET ( -- )  ROM? LDA, NE                2 if this is the romcard version then
  3 IF,    C0B0 LDA,                                3   turn on romcard (LDA$C0B0).
  4 ELSE,   <AUX> JSR, C08F LDA, C08F LDA,          4 else turn on the bank 1 (JSR<AUX>)
  5   \ .INTERRUPT DUP FF AND #B LDA,               5 and store the receive interrupt vector
  6   FFFE STA,                                     6 at $FFFE (6502 IRQ)--this is needed
  7   SWAB FF AND #B LDA, FFFF STA,                 7 since the //c stores an interrupt for
  8 ENDIF, D200 JMP,                                8 the mouse there.
  9                                                 9 jump to D200 and start Swyft.
 10 T: RESET                                       10
 11   FRAGMENTS SETDISP SIGNON                     11 T: RESET ( -- )
 12   7F C061 C@ U< IF ABOOT ENDIF                 12 PURPOSE: respond to control-reset and to
 13   7F C062 C@ U< IF COLD ENDIF                  13   control-apple-reset.
 14   39E @ 36A5 = IF WARM ENDIF                   14 load rom or disk code fragments.
 15   BOOT ;                                       15 set up 80 column display.
 16                                                16 SIGNON here prevents garbage on screen.
 17 ;S Upon reset, the //c stores its mouse        17 if open apple reset, boot the disk.
 18 interrupt vector at the RECEIVE                18 if closed apple reset, do a COLD start.
 19 interrupt (FFFE). ^RESET fixes it.             19 if a warm start has been done
 20                                                20   do it again.
 21 Ctrl-open apple-reset does a mem test          21 if none of the above then do a BOOT.
 22 in the disk version, instead of COLD           22
 23                                                23 NOTE: stored at D00A for reset.

scr #  280
  0 ( last pointers ) HEX                           0 ( last pointers ) HEX
  1                                                 1
  2 ( hard reset vectors for Edde card )            2 set up reset, nonmaskable interrupt and
  3 \ .INTERRUPT AIM 2FFE + ! ( irq )               3   interrupt request vectors
  4 \ .RESET     AIM 2FFC + ! ( reset )             4 vectors for reset and entry points
  5 \ .RESET     AIM 2FFA + ! ( nmi )               5
  6 EDDE         AIM 2FF8 + ! ( romcard id )        6 move $200 bytes to the end of bank 2
  7 \ .INTERRUPT AIM 2FF6 + ! ( copy of irq)        7   for the boot track 0 image
  8                                                 8 there are $200 less bytes in bank 2
  9 ( emplace track 0 boot image )                  9   available than seen on the printout
 10 HEX 12 BLOCK 200 + AIM 200 - 200 CMOVE         10   for compilation
 11                                                11
 12                                                12
 13                                                13
 14                                                14
 15                                                15
 16                                                16
 17                                                17
 18                                                18
 19                                                19
 20                                                20
 21                                                21
 22                                                22
 23                                                23
```

We claim:

1. In a computer system having a display device, a memory device, an entry device and processing means for displaying symbols and a cursor on the display device in response to signals from the entry device, a method for creating and modifying a string of symbols, in response to signals from the entry device, the method comprising the steps of:

displaying on the display device a string of symbols;

displaying on the display device a cursor, said cursor occupying a display region and having a first cursor part occupying a first part of the display region and a second cursor part occupying a second part of the display region adjacent the first part of the display region, the first part of the display region including a symbol in the string of symbols;

in response to signals of a first type from the entry device, said first type of signals including signals representing an entered symbol, inserting the entered symbol into the string of symbols at the second part of the display region; and in response to signals of a second type from the entry device, said second type of signals designating a deletion operation, performing the designated deletion operation by deleting the symbol included in the first part of the display region.

2. The method of claim 1, further comprising the steps of:

in response to signals of a third type from the entry device, moving said cursor to a desired location on the display device indicated by said third type of signals, and coalescing the cursor by positioning the first part of the cursor and the second part of the cursor at a single symbol occupying the desired location.

3. The method of claim 1 wherein the display region is a first display region and said inserting step further comprises moving the cursor to a second display region having a first part including the inserted symbol.

4. The method of claim 2 further comprising the step of: in response to signals of a fourth type from said entry device, extending the first part of the display region to include a plurality of symbols.

5. An apparatus for creating and modifying a string of symbols, the apparatus comprising:

a processing unit;

entry means, coupled to said processing unit, for transmitting signals to said processing unit;

display means coupled to said processing unit for displaying symbols and a cursor at specified locations in response to signals from said processing unit;

said processing unit comprising means for generating signals for:

displaying, on said display means, a string of symbols;

displaying, on said display means, a cursor, said cursor occupying a display region and having a first cursor part occupying a first part of the display region and a second cursor part occupying a second part of the display region adjacent the first part of the display region, the first part of the display region including a symbol in the string of symbols, and in response to to a first type of signals from said entry means inserting an entered symbol into the string of symbols at the second part of the display region, said first type of signals including signals representing the entered symbol; and in response to a second type of signals from said entry means, performing a deletion operation by deleting the symbol included in the first part of the display region;

in response to a third type of signals from said entry means, moving the cursor to a desired location on the display means indicated by said third type of signals and coalescing the cursor by positioning the first part of the cursor and the second part of the cursor on a single symbol occupying the desired location; and in response to signals of a fourth type from the entry device, extending the first part of the display region to include a plurality of symbols.

6. In a computer system having an entry device, a display device and processing means for displaying symbols and a cursor on the display device in response to signals from the entry device, a method for indicating loci of operations, the method comprising the steps of:

displaying a string of symbols on the display device;

displaying a cursor on the display device, said cursor having a first part and a second part;

positioning the first part of the cursor at a first region on the display, the first region including a symbol in the string of symbols;

positioning the second part of the cursor at a second region on the display adjacent to the first region;

in response to signals of a first type from the entry device, said first type of signals including signals representing an entered symbol, inserting the entered symbol into the string of symbols by displaying the entered symbol at the second region, moving the first part of the cursor to the second region and moving the second part of the cursor to a third region on the display adjacent the second region;

in response to externally-supplied signals of a second type, deleting the symbol included in the first region.

7. The method of claim 6 further comprising the step of:

in response to signals of a third type from the entry device, said third type of signals specifying a target location, moving the cursor to the target location and coalescing the cursor by positioning both parts of the cursor on a single symbol occupying the target location.

8. The method of claim 6 wherein the first part of the cursor is displayed in reverse video and the second part of the cursor is displayed as a blinker.

9. The method of claim 8 further comprising the step of: in response to signals of a fourth type from said entry device, extending the first display region to include a plurality of symbols.

* * * * *

UNITED STATES PATENT AND TRADEMARK OFFICE
CERTIFICATE OF CORRECTION

PATENT NO. : 4,806,916
DATED     : February 21, 1989
INVENTOR(S) : Jef Raskin, James Winter, Renwick Curry It is certified that error appears in the above-identified patent and that said Letters Patent is hereby corrected as shown below:

IN THE APPENDIX: Please insert the following copyright notice at the first page of the Source Code Appendix:

--Copyright 1988 Information Appliance, Inc.--

Signed and Sealed this

Twenty-first Day of November, 1989

*Attest:*

JEFFREY M. SAMUELS

*Attesting Officer*    *Acting Commissioner of Patents and Trademarks*